(12) United States Patent
Kawamura et al.

(10) Patent No.: US 9,650,572 B2
(45) Date of Patent: May 16, 2017

(54) LIQUID CRYSTAL COMPOSITION, LIQUID CRYSTAL DISPLAY DEVICE, AND LIQUID CRYSTAL DISPLAY

(71) Applicant: DIC CORPORATION, Tokyo (JP)

(72) Inventors: Joji Kawamura, Kita-adachi-gun (JP); Makoto Negishi, Kita-adachi-gun (JP); Yoshinori Iwashita, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/416,138

(22) PCT Filed: Mar. 25, 2013

(86) PCT No.: PCT/JP2013/058569
§ 371 (c)(1),
(2) Date: Jan. 21, 2015

(87) PCT Pub. No.: WO2014/155485
PCT Pub. Date: Oct. 2, 2014

(65) Prior Publication Data
US 2016/0060524 A1 Mar. 3, 2016

(51) Int. Cl.
*C09K 19/30* (2006.01)
*C09K 19/34* (2006.01)
*C09K 19/20* (2006.01)
*C09K 19/54* (2006.01)
*C09K 19/44* (2006.01)
*C09K 19/02* (2006.01)
*C09K 19/04* (2006.01)
*C09K 19/12* (2006.01)

(52) U.S. Cl.
CPC ...... *C09K 19/3402* (2013.01); *C09K 19/0216* (2013.01); *C09K 19/0403* (2013.01); *C09K 19/20* (2013.01); *C09K 19/44* (2013.01); *C09K 19/54* (2013.01); *C09K 2019/0466* (2013.01); *C09K 2019/124* (2013.01); *C09K 2019/301* (2013.01); *C09K 2019/3004* (2013.01); *C09K 2019/3009* (2013.01); *C09K 2019/3019* (2013.01); *C09K 2019/3021* (2013.01); *C09K 2019/3422* (2013.01)

(58) Field of Classification Search
CPC ...... C09K 2019/123; C09K 19/3066
See application file for complete search history.

(56) References Cited

U.S. PATENT DOCUMENTS

| 6,444,278 | B1 | 9/2002 | Reiffenrath et al. |
| 2006/0011888 | A1 | 1/2006 | Reiffenrath et al. |
| 2008/0029736 | A1 | 2/2008 | Saito |
| 2008/0029737 | A1 | 2/2008 | Saito |
| 2010/0302498 | A1 | 12/2010 | Saito |
| 2011/0001090 | A1* | 1/2011 | Wittek ............ C09K 19/3402 252/299.61 |
| 2011/0051023 | A1 | 3/2011 | Fujita et al. |
| 2013/0027654 | A1* | 1/2013 | Fujita ............ C09K 19/3066 349/182 |

FOREIGN PATENT DOCUMENTS

| DE | 101 17 224 A1 | 2/2002 |
| JP | 9-124529 A | 5/1997 |
| JP | 2006-502205 A | 1/2006 |
| JP | 2006-169472 A | 6/2006 |
| JP | 2008-37918 A | 2/2008 |
| JP | 2008-38018 A | 2/2008 |
| JP | 2010-275390 A | 12/2010 |
| JP | 2011-52120 A | 3/2011 |
| JP | 2011-516628 A | 5/2011 |
| JP | 2013-47327 A | 3/2013 |
| JP | 5170602 B1 | 3/2013 |
| JP | 2013047327 A * | 3/2013 |

OTHER PUBLICATIONS

International Search Report dated May 28, 2013, issued in corresponding application No. PCT/JP2013/058569.

* cited by examiner

*Primary Examiner* — Chanceity Robinson
(74) *Attorney, Agent, or Firm* — Westerman, Hattori, Daniels & Adrian, LLP

(57) ABSTRACT

There is provided a liquid crystal composition containing at least any one of compounds represented by General Formula (i) and at least any one of compounds represented by General Formula (ii).

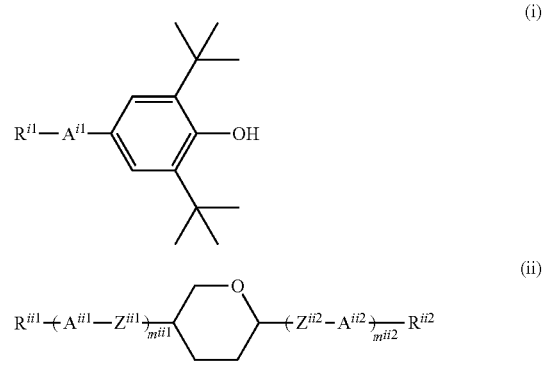

8 Claims, No Drawings

LIQUID CRYSTAL COMPOSITION, LIQUID CRYSTAL DISPLAY DEVICE, AND LIQUID CRYSTAL DISPLAY

TECHNICAL FIELD

The present invention relates to a nematic liquid crystal composition which is useful as a liquid crystal display material and which has a positive or negative dielectric anisotropy (Δ∈), and the present invention also relates to a liquid crystal display device and liquid crystal display each using such a nematic liquid crystal composition.

BACKGROUND ART

Liquid crystal display devices have been applied to, for example, watches, calculators, a variety of measuring equipment, panels used in automobiles, word processors, electronic notebooks, printers, computers, television sets, clocks, and advertising boards. Representative examples of types of liquid crystal display devices include a TN (twisted nematic) type, an STN (super twisted nematic) type, and VA (vertical alignment) and IPS (in-plane switching) types involving use of a TFT (thin film transistor). Liquid crystal compositions used in such liquid crystal display devices need to satisfy the following requirements: being stable to external elements such as moisture, air, heat, and light; having a liquid crystal phase in a wide temperature range mainly including room temperature as much as possible; having a low viscosity; and enabling a low driving voltage. In addition, liquid crystal compositions are composed of several to tens of compounds to adjust, for example, the dielectric anisotropy (Δ∈) and refractive index anisotropy (Δn) to be optimum to individual display devices.

A liquid crystal composition having a negative Δ∈ is used in vertical alignment (VA)-type displays, and a liquid crystal composition having a positive Δ∈ is used in horizontal alignment-type displays such as a TN type, an STN type, and an IPS (in-plane switching) type. Another type of driving has been reported, in which the molecules of a liquid crystal composition having a positive Δ∈ are vertically aligned in a state in which voltage is not applied, and then a horizontal electric field is applied for performing display. A demand for a liquid crystal composition having a positive Δ∈ has therefore further increased. In all types of driving, however, there have been demands for low driving voltage, a quick response, and a broad range of operating temperature. In other words, a liquid crystal composition having a positive or negative Δ∈ with a large absolute value, a low viscosity (η), and a high nematic phase-isotropic liquid phase transition temperature (Tni) has been demanded. In order to control Δn×d that is a product of Δn and a cell gap (d) to be a predetermined value, the Δn of a liquid crystal composition needs to be adjusted to be in a proper range on the basis of the cell gap. In addition, a quick response is important in liquid crystal display devices applied to television sets or other apparatuses, which generates a need for a liquid crystal composition having a small rotational viscosity ($\gamma_1$).

Liquid crystal compositions which enable a quick response have been disclosed; for example, such liquid crystal compositions contain a combination of a liquid crystal compound having a positive Δ∈ and represented by Formula (A-1) or (A-2) and a liquid crystal compound having a neutral Δ∈ and represented by Formula (B). In these liquid crystal compositions, the liquid crystal compound having a positive Δ∈ has a —CF$_2$O— moiety, and the liquid crystal compound having a neutral Δ∈ has an alkenyl group, which are widely known in the field of liquid crystal compositions (see Patent Literatures 1 to 4).

[Chem. 1]

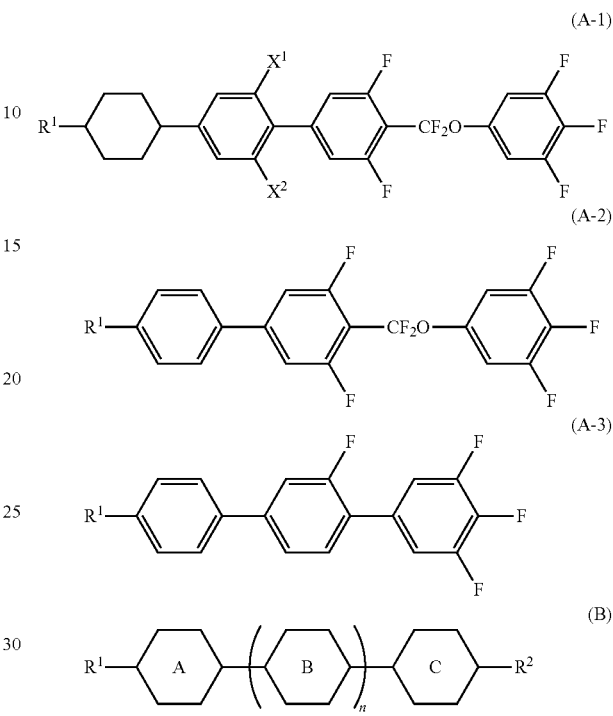

As liquid crystal display devices have come to be used in a broad range of applications, usage and manufacturing thereof have been greatly changed. In order to adapt to such changes, optimization of characteristics other than known basic physical properties has been needed. In particular, a VA type and an IPS type have become popular as liquid crystal display devices utilizing a liquid crystal composition, and these types of display devices even having a very large size (e.g., 50 inches or lager) have been practically used. An increase in the size of substrates has changed a technique for putting a liquid crystal composition between the substrates, and a one-drop-fill (ODF) technique has become mainstream in place of a typically employed vacuum injection technique. Dropping of a liquid crystal composition onto a substrate, however, generates droplet stains with the result that display quality is degraded, which has been problematic. Furthermore, in a process for manufacturing a liquid crystal display device by an ODF technique, a liquid crystal material needs to be dropped in an amount optimum for the size of the liquid crystal display device. In the case where the amount of a liquid crystal material to be dropped largely varies from the optimum level, a predetermined balance between a refractive index and a driving electric field in a liquid crystal display device is disrupted, which causes defective display such as unevenness and defective contrast. In particular, the optimum amount of a liquid crystal material to be dropped is small in small-size liquid crystal display devices well used in smartphones which have become popular in recent years, and thus it is difficult even to control a variation from the optimum amount to be in a certain range. Hence, in order to maintain a high production yield of liquid crystal display devices, for instance, a liquid crystal composition needs to be less affected by impact and a rapid pressure change generated on dropping of the liquid crystal composition in a dropping apparatus and to be able to be stably and continuously dropped for a long time.

In terms of these circumstances, a liquid crystal composition which is used in active-matrix liquid crystal display devices driven by, for example, a TFT device needs to be developed in view of a manufacturing process of liquid crystal display devices as well as the following requirements: to maintain properties and performances needed for liquid crystal display devices, such as enabling quick response, and to have traditionally important properties such as high specific resistance, high voltage holding ratio, and stability to external elements such as light and heat.

CITATION LIST

Patent Literature

PTL 1: Japanese Unexamined Patent Application Publication No. 2008-037918

PTL 2: Japanese Unexamined Patent Application Publication No. 2008-038018

PTL 3: Japanese Unexamined Patent Application Publication No. 2010-275390

PTL 4: Japanese Unexamined Patent Application Publication No. 2011-052120

SUMMARY OF INVENTION

Technical Problem

It is an object of the present invention to provide a liquid crystal composition having a positive or negative $\Delta\epsilon$, the liquid crystal composition also having a liquid crystal phase in a wide temperature range, a low viscosity, a good resistance to resolution at low temperature, a high specific resistance, a high voltage holding ratio, and stability to heat and light and enabling high-yield production of a liquid crystal display device having an excellent display quality with a reduction in defective display such as screen burn-in and droplet stains. It is another object of the present invention to provide a liquid crystal display device using such a liquid crystal composition.

Solution to Problem

The inventors have studied a variety of liquid crystal compounds and chemical substances and found that a combination of specific liquid crystal compounds enables the above-mentioned object to be achieved, thereby accomplishing the present invention. In particular, a first aspect of the present invention provides the following liquid crystal composition, a second aspect of the present invention provides the following liquid crystal device, and a third aspect of the present invention provides the following liquid crystal display.

[1] A liquid crystal composition contains at least any one of compounds represented by General Formula (i) and at least any one of compounds represented by General Formula (ii).

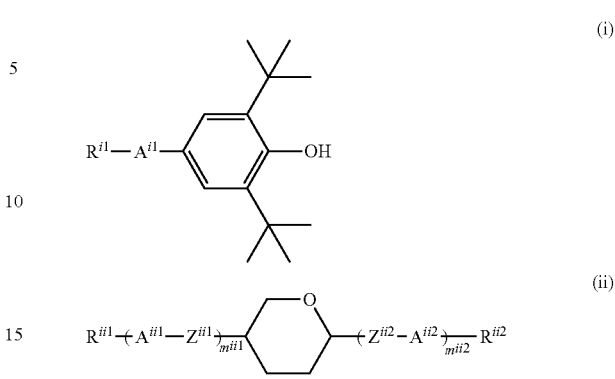

(in the formulae, $R^{i1}$ represents an alkyl group having 1 to 8 carbon atoms; and $A^{i1}$ represents a 1,4-cyclohexylene group (of which one —$CH_2$— or at least two —$CH_2$— not adjoining each other are optionally substituted with —O—), a 1,4-phenylene group (of which at least one hydrogen atom is optionally substituted with a fluorine atom), or a single bond;

$R^{ii1}$ represents an alkyl group having 1 to 8 carbon atoms; and one —$CH_2$— or at least two —$CH_2$— not adjoining each other in the alkyl group are each independently optionally substituted with —CH=CH—, —C≡C—, —O—, —CO—, —COO—, or —OCO—;

$R^{ii2}$ represents a fluorine atom, a chlorine atom, a cyano group, or an alkyl group having 1 to 8 carbon atoms; one —$CH_2$— or at least two —$CH_2$— not adjoining each other in the alkyl group are each independently optionally substituted with —CH=CH—, —C≡C—, —O—, —CO—, —COO—, or —OCO—; and one or two or more hydrogen atoms of the alkyl group are each independently optionally substituted with a fluorine atom;

$A^{ii1}$ and $A^{ii2}$ each independently represent a 1,4-cyclohexylene group (of which one —$CH_2$— or at least two —$CH_2$— not adjoining each other are optionally substituted with —O—) or a 1,4-phenylene group (of which at least one hydrogen atom is optionally substituted with a fluorine atom);

$Z^{ii1}$ and $Z^{ii2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

$m^{ii1}$ and $m^{ii2}$ each independently represent 0, 1, 2, or 3; and $m^{ii1}+m^{ii2}$ is equal to 1, 2, 3, or 4;

in the case where $A^{ii1}$ and $Z^{ii1}$ are multiple, the $A^{ii1}$ moieties and the $Z^{ii1}$ moieties are the same as or different from each other, respectively; and in the case where $A^{ii2}$ and $Z^{ii2}$ are multiple, the $A^{ii2}$ moieties and the $Z^{ii2}$ moieties are the same as or different from each other, respectively.)

[2] The liquid crystal composition according to [1], wherein at least one compound represented by General Formula (ii) in which $R^{ii2}$ represents a fluorine atom, a trifluoromethyl group, a trifluoromethoxy group, or a cyano group is used.

[3] The liquid crystal composition according to [1] or [2], wherein at least one compound represented by General Formula (ii) in which $R^{ii2}$ represents an alkyl group having 1 to 8 carbon atoms or an alkoxy group having 1 to 8 carbon atoms is used.

[4] The liquid crystal composition according to any one of [1] to [3], wherein at least one compound represented by General Formula (ii) in which at least one 2,3-difluorobenzene-1,4-diyl group is present is used.

[5] The liquid crystal composition according to any one of [1] to [4] further contains a compound represented by General Formula (L).

[Chem. 3]

(in the formula, $R^{L1}$ and $R^{L2}$ each independently represent an alkyl group having 1 to 8 carbon atoms; and one —CH$_2$— or at least two —CH$_2$— not adjoining each other in the alkyl group are each independently optionally substituted with —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of (a) a 1,4-cyclohexylene group (of which one —CH$_2$— or at least two —CH$_2$— not adjoining each other are optionally substituted with —O—) and (b) a 1,4-phenylene group (of which one —CH= moiety or at least two —CH= moieties not adjoining each other are optionally substituted with —N=), and one and/or at least two hydrogen atoms contained in the groups (a) and (b) are each independently optionally substituted with a cyano group, a fluorine atom, or a chlorine atom;

$L^{L1}$ and $L^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—;

in the case where OL is 2 or 3 and where $L^{L2}$ is multiple, the $L^{L2}$ moieties are the same as or different from each other; in the case where OL is 2 or 3 and where $B^{L3}$ is multiple, the $B^{L3}$ moieties are the same as or different from each other; and the compound represented by General Formula (L) excludes the compound represented by General Formula (ii).)

[6] The liquid crystal composition according to any one of [1] to [5] further contains a compound represented by General Formula (M)

[Chem. 4]

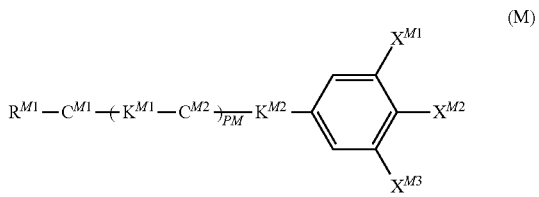

(in the formula, $R^{M1}$ represents an alkyl group having 1 to 8 carbon atoms; and one —CH$_2$— or at least two —CH$_2$— not adjoining each other in the alkyl group are each independently optionally substituted with —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of (d) a 1,4-cyclohexylene group (of which one —CH$_2$— or at least two —CH$_2$— not adjoining each other are optionally substituted with —O— or —S—) and (e) a 1,4-phenylene group (of which one —CH= moiety or at least two —CH= moieties not adjoining each other are optionally substituted with —N=), and one and/or two or more hydrogen atoms contained in the groups (d) and (e) are each independently optionally substituted with a cyano group, a fluorine atom, or a chlorine atom;

$K^{M1}$ and $K^{M2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—;

in the case where PM is 2, 3, or 4 and where $K^{M1}$ is multiple, the $K^{M1}$ moieties are the same as or different from each other; in the case where PM is 2, 3, or 4 and where $C^{M2}$ is multiple, the $C^{M2}$ moieties are the same as or different from each other;

$X^{M1}$ and $X^{M3}$ each independently represent a hydrogen atom, a chlorine atom, or a fluorine atom;

$X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; and the compound represented by General Formula (M) excludes the compound represented by General Formula (ii).)

[7] The liquid crystal composition according to any one of [1] to [6] further contains a compound represented by General Formula (X").

[Chem. 5]

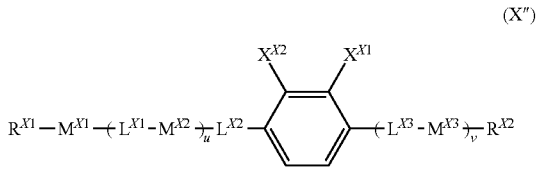

(in the formula, $R^{X1}$ and $R^{X2}$ each independently represent an alkyl group having 1 to 10 carbon atoms, an alkoxy group having 1 to 10 carbon atoms, or an alkenyl group having 2 to 10 carbon atoms; one methylene moiety or at least two methylene moieties not adjoining each other in these groups are optionally substituted with —O— or —S—; at least one hydrogen atom contained in these groups is optionally substituted with a fluorine atom or a chlorine atom;

u and v each independently represent 0, 1, or 2 and satisfy the relationship u+v=2 or less;

$M^{X1}$, $M^{X2}$, and $M^{X3}$ each independently represent a group selected from the group consisting of (a) a trans-1,4-cyclohexylene group (of which one methylene moiety or at least two methylene moieties not adjoining each other are optionally substituted with —O— or —S—) and (b) a 1,4-phenylene group (of which one —CH= moiety or at least two —CH= moieties not adjoining each other are optionally substituted with —N=), and a hydrogen atom contained in the group (a) or (b) is optionally substituted with a cyano group, a fluorine atom, a trifluoromethyl group, a trifluoromethoxy group, or a chlorine atom; in the case where $M^{X2}$ and/or $M^{X3}$ are multiple, the $M^{X2}$ moieties and/or the $M^{X3}$ moieties are the same as or different from each other, respectively;

$L^{X1}$, $L^{X2}$, and $L^{X3}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, —CH=CH—, or —C≡C—; in the case where $L^{X1}$ and/or $L^{X3}$ are multiple, the $L^{X1}$ moieties and/or the $L^{X3}$ moieties are the same as or different from each other, respectively; $X^{X1}$ and $X^{X2}$ each independently represent a trifluoromethyl group, a trifluoromethoxy group, or a fluorine atom; any one of $X^{X1}$ and $X^{X2}$ represents a fluorine atom; and the compound represented by General Formula (X") excludes the compounds represented by General Formulae (ii) and (L).)

[8] There is provided a liquid crystal display device in which the liquid crystal composition according to any one of [1] to [7] is used.

[9] There is provided an IPS mode liquid crystal display device in which the liquid crystal composition according to any one of [1] to [7] is used.

[10] There is provided an FFS mode liquid crystal display device in which the liquid crystal composition according to any one of [1] to [7] is used.

[11] There is provided an OCB mode liquid crystal display device in which the liquid crystal composition according to any one of [1] to [7] is used.

[12] There is provided an ECB mode liquid crystal display device in which the liquid crystal composition according to any one of [1] to [7] is used.

[13] There is provided a VA mode liquid crystal display device in which the liquid crystal composition according to any one of [1] to [7] is used.

[14] There is provided a VA-IPS mode liquid crystal display device in which the liquid crystal composition according to any one of [1] to [7] is used.

[15] A liquid crystal display includes the liquid crystal display device according to any one of [8] to [14].

Advantageous Effects of Invention

The liquid crystal composition of the present invention has a positive or negative dielectric anisotropy, liquid crystal phase in a wide temperature range, significantly smaller viscosity than traditional liquid crystal compositions, good resistance to resolution at low temperature, and specific resistance and voltage holding ratio of which changes brought about by heat or light are very small. Hence, the liquid crystal composition of the present invention is highly practical (usable) in liquid-crystal products, and liquid crystal display devices and liquid crystal displays using the liquid crystal composition, such as an IPS type and an FFS type, can quickly respond. The properties of the liquid crystal composition of the present invention can be stable even after the liquid crystal composition undergoes production processes of liquid crystal display devices, which enables high-yield production of the liquid crystal display devices with a reduction in defective display resulting from the production processes. Thus, the liquid crystal composition is highly useful.

DESCRIPTION OF EMBODIMENTS

The liquid crystal composition having a positive or negative dielectric anisotropy according to a first embodiment of the present invention contains a component (A) that is dielectrically positive or negative. The component (A) is preferably composed of compounds having a dielectric anisotropy of 2 or more or −2 or less. The value of the dielectric anisotropy of such compounds is obtained by extrapolation from the value of the dielectric anisotropy of a composition prepared by adding the compounds to a liquid crystal composition having a dielectric anisotropy of approximately 0 at 25° C.

The term "%" used to describe the following composition refers to "mass %" unless otherwise specified.

The component (A) contains at least any one of compounds represented by General Formula (i) and at least any one of compounds represented by General Formula (ii).

[Chem. 6]

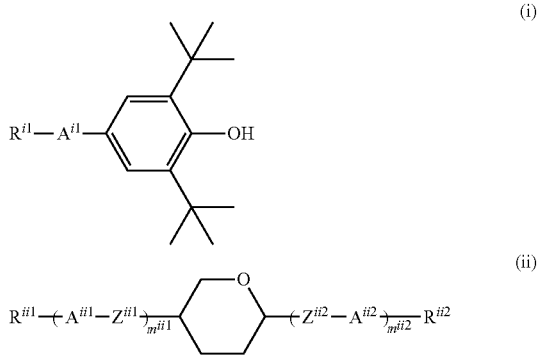

<Compound Represented by General Formula (i)>

In General Formula (i), $R^{i1}$ each independently represents an alkyl group having 1 to 8 carbon atoms, and the alkyl group preferably has a straight-chain structure.

In General Formula (i), $A^{i1}$ represents a 1,4-cyclohexylene group (of which one —$CH_2$— or at least two —$CH_2$— not adjoining each other is optionally substituted with —O—), a 1,4-phenylene group (of which at least one hydrogen atom is optionally substituted with a fluorine atom), or a single bond. The 1,4-cyclohexylene group may be either trans or cis, and preferably trans.

$A^{i1}$ is preferably a 1,4-cyclohexylene group or a 1,4-phenylene group, and more preferably a 1,4-cyclohexylene group.

The upper limit and lower limit of the amount of the compound represented by General Formula (i) are determined for an embodiment in view of properties such as resistance to resolution at low temperature, transition temperature, electric reliability, and birefringence.

The lower limit of the amount of the compound is preferably 0.001 mass %, also preferably 0.005 mass %, and also preferably 0.01 mass % relative to the total mass of the liquid crystal composition of the present invention. The upper limit of the amount of the compound is preferably 1 mass %, also preferably 0.1 mass %, and also preferably 0.05 mass % relative to the total mass of the liquid crystal composition of the present invention.

In the case where the amount of the compound represented by General Formula (i) is excessive, the effect of the compound as an antioxidant is enhanced; however, the initial current value which will be described later is increased.

To the contrary, in the case where the amount of the compound is insufficient, the function as the antioxidant is defective.

Examples of a preferred combination of the lower limit and the upper limit are as follows: from 0.001 to 1 mass %, from 0.005 to 0.1 mass %, and from 0.01 to 0.05 mass %.

The liquid crystal composition of the present invention contains at least one of compounds represented by General Formula (i); one to five of the compounds are preferably used, and one or two of the compounds are more preferably used.

The compound represented by General Formula (i) is preferably any of compounds represented by General Formulae (i-a), (i-c), and (i-d).

[Chem. 7]

(i-a)

$R^{11a}$—[benzene ring with C(CH₃)₃ at two positions and OH]

(i-c)

$R^{13a}$—[cyclohexane]—[benzene with C(CH₃)₃, OH, C(CH₃)₃]

(i-d)

$R^{13a}$—[benzene]—[benzene with C(CH₃)₃, OH, C(CH₃)₃]

In General Formula (i-a), $R^{11a}$ is preferably a linear alkyl group having 5 to 8 carbon atoms.

In General Formula (i-c), $R^{13a}$ is preferably a linear alkyl group having 1 to 5 carbon atoms.

In General Formula (i-d), $R^{13a}$ is preferably a linear alkyl group having 1 to 5 carbon atoms.

Among compounds represented by General Formulae (i-a), (i-c), and (i-d), the compounds represented by General Formulae (i-a) and (i-c) are more preferred.

<Compound Represented by General Formula (ii)>

In General Formula (ii), $R^{ii1}$ represents an alkyl group having 1 to 8 carbon atoms; in the alkyl group, one —CH₂— or at least two —CH₂— not adjoining each other are each independently optionally substituted with —CH=CH—, —C≡C—, —O—, —CO—, —COO—, or —OCO—. The alkyl group may be either linear or branched.

$R^{ii1}$ is preferably a linear alkyl group, linear alkenyl group, or linear alkoxy group of which a hydrogen atom is not substituted; more preferably a linear alkyl group having 1 to 5 carbon atoms, a linear alkenyl group having 2 to 5 carbon atoms, or an alkoxy group having 1 to 4 carbon atoms; and further preferably a linear alkyl group having 2 to 5 carbon atoms, any of the following alkenyl groups, or an alkoxy group having 1 to 4 carbon atoms.

[Chem. 8]

(i)

(ii)

(iii)

(iv)

(In the formulae, the right end of each alkenyl group is bonded to the ring structure.)

In General Formula (ii), $R^{ii2}$ represents a fluorine atom, a chlorine atom, a cyano group, or an alkyl group having 1 to 8 carbon atoms; in the alkyl group, one —CH₂— or at least two —CH₂— not adjoining each other are each independently optionally substituted with —CH=CH—, —C≡C—, —O—, —CO—, —COO—, or —OCO—; and one or two or more hydrogen atoms of the alkyl group are each independently optionally substituted with a fluorine atom.

$R^{ii2}$ is preferably a fluorine atom or a linear alkyl group, linear alkenyl group, or linear alkoxy group of which a hydrogen atom is not substituted; more preferably a fluorine atom, a linear alkyl group having 1 to 5 carbon atoms, a linear alkenyl group having 2 to 5 carbon atoms, or an alkoxy group having 1 to 4 carbon atoms; and further preferably a fluorine atom, a linear alkyl group having 2 to 5 carbon atoms, any of the following alkenyl groups, or an alkoxy group having 1 to 4 carbon atoms.

[Chem. 9]

(i)

(ii)

(iii)

(iv)

(In the formulae, the right end of each alkenyl group is bonded to the ring structure.)

In General Formula (ii), $A^{ii1}$ and $A^{ii2}$ each independently represent a 1,4-cyclohexylene group (of which one —CH₂— or at least two —CH₂— not adjoining each other are optionally substituted with —O—), a 1,4-phenylene group (of which at least one hydrogen atom is optionally substituted with a fluorine atom), or a single bond. The 1,4-cyclohexylene group may be either trans or cis, and preferably trans.

In General Formula (ii), $m^{ii1}$ and $m^{ii2}$ each independently represent 0, 1, 2, or 3. In this case, $m^{ii1}+m^{ii2}$ is equal to 1, 2, 3, or 4.

In the case where at least any one of $A^{ii1}$, $A^{ii2}$, $Z^{ii1}$ and $Z^{ii2}$ in General Formula (ii) is multiple, the multiple moieties may be the same as or different from each other. In particular, in the case where $A^{ii2}$ and $Z^{ii2}$ are multiple, the $A^{ii2}$ moieties may be the same as or different from each other, and the $Z^{ii1}$ moieties may be the same as or different from each other; in the case where $A^{ii2}$ and $Z^{ii2}$ are multiple, the $A^{ii2}$ moieties may be the same as or different from each other, and the $Z^{ii2}$ moieties may be the same as or different from each other.

In view of an improvement in the response speed of the liquid crystal composition containing the compound represented by General Formula (ii), $m^{ii1}+m^{ii2}$ is preferably equal to 1 or 2; in view of an improvement in the upper limit of the temperature of the liquid crystal phase, $m^{ii1}+m^{ii2}$ is preferably equal to 3 or 4; and in consideration of the balance therebetween, $m^{ii1}+m^{ii2}$ is preferably equal to 2 or 3.

The upper limit and lower limit of the amount of the compound represented by General Formula (ii) are determined for an embodiment in view of properties such as resistance to resolution at low temperature, transition temperature, electric reliability, and birefringence.

The lower limit of the amount of the compound is preferably 1%, also preferably 5%, also preferably 8%, also preferably 10%, also preferably 13%, also preferably 15%, also preferably 18%, and also preferably 20% relative to the total mass of the liquid crystal composition of the present invention; and the upper limit of the amount of the compound is preferably 40%, also preferably 35%, also preferably 30%, also preferably 27%, also preferably 25%, also preferably 23%, also preferably 20%, also preferably 18%, also preferably 15%, also preferably 13%, and also preferably 10% relative thereto. Use of the compound represented by General Formula (ii) enables Δ∈ to be increased without impairment of response speed; however, in the case where the amount of the compound represented by General Formula (ii) is increased, the amount of the compound represented by General Formula (i) needs to be increased.

Examples of a preferred combination of the lower limit and the upper limit are as follows: from 1 to 30 mass %, from 5 to 15 mass %, and from 8 to 10 mass %. In particular, such a combination can be in the range of 1 to 20 mass %, 1 to 13 mass %, or 1 to 8 mass %. Furthermore, the combination also can be in the range of 5 to 30 mass %, 10 to 23 mass %, or 10 to 18 mass %.

In the liquid crystal composition of the present invention, at least one of compounds represented by General Formula (ii) is used; one to five of the compounds are preferably used, and one to three of the compounds are more preferably used.

In the case where one of compounds represented by General Formula (ii) is used alone, the lower limit of the amount of the compound is preferably 1%, also preferably 3%, also preferably 6%, and also preferably 8% relative to the above-mentioned total mass; and the upper limit of the amount of the compound is preferably 30%, also preferably 20%, also preferably 15%, and also preferably 12% relative the total mass.

Examples of a preferred combination of the lower limit and the upper limit are as follows: from 1 to 30 mass %, from 3 to 20 mass %, from 6 to 15 mass %, and from 8 to 12 mass %.

In the case where two of compounds represented by General Formula (ii) are used, the lower limit of the total amount of the two compounds is preferably 1%, also preferably 3%, also preferably 6%, and also preferably 8% relative to the above-mentioned total mass; the upper limit of the total amount of the two compounds is preferably 30%, also preferably 20%, also preferably 15%, and also preferably 12% relative the total mass.

Examples of a preferred combination of the lower limit and the upper limit are as follows: from 1 to 30 mass %, from 3 to 20 mass %, from 6 to 15 mass %, and from 8 to 12 mass %.

In a preferred embodiment of the liquid crystal composition of the present invention, the liquid crystal composition contains at least one compound represented by General Formula (ii) in which $R^{ii2}$ is a fluorine atom, a trifluoromethyl group, a trifluoromethoxy group, or a cyano group.

Examples of such a compound include compounds represented by General Formulae (ii-a) to (ii-c).

In the case where $m^{ii1}$ in General Formula (ii) is 0, $m^{ii2}$ is preferably 2 or 3, and more preferably 3; and the compound represented by General Formula (ii) is preferably any of compounds represented by General Formula (ii-a).

[Chem. 10]

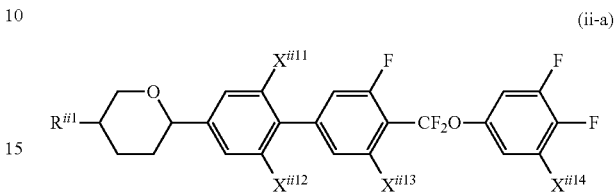

(ii-a)

In General Formula (ii-a), $X^{ii11}$, $X^{ii12}$, $X^{ii13}$, and $X^{ii14}$ each independently represent a hydrogen atom or a fluorine atom.

It is preferred that at least any one of $X^{ii11}$ and $X^{ii12}$ be a hydrogen atom, and it is more preferred that both of $X^{ii11}$ and $X^{ii12}$ be hydrogen atoms.

It is preferred that $X^{ii13}$ be a fluorine atom and that $X^{ii14}$ be a fluorine atom, and it is more preferred that both of $X^{ii13}$ and $X^{ii14}$ be fluorine atoms.

The compound represented by General Formula (ii-a) is preferably any of compounds represented by General Formula (X-6).

[Chem. 11]

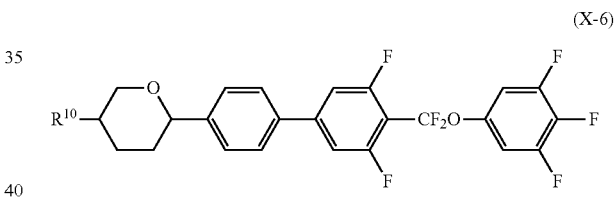

(X-6)

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-6) can be used in any combination; in view of resistance to resolution at low temperature, transition temperature, electric reliability, birefringence, and another property, the compounds are preferably used alone or in combination.

In particular, the compound represented by General Formula (X-6), which is used in the liquid crystal composition of the present invention, is preferably any of compounds represented by Formulae (44.1) to (44.4). Among these, the compound represented by Formula (44.1) and/or the compound represented by Formula (44.2) are preferably used in the liquid crystal composition.

[Chem. 12]

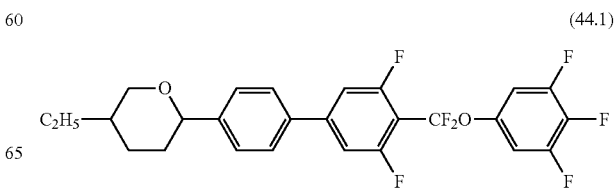

(44.1)

-continued

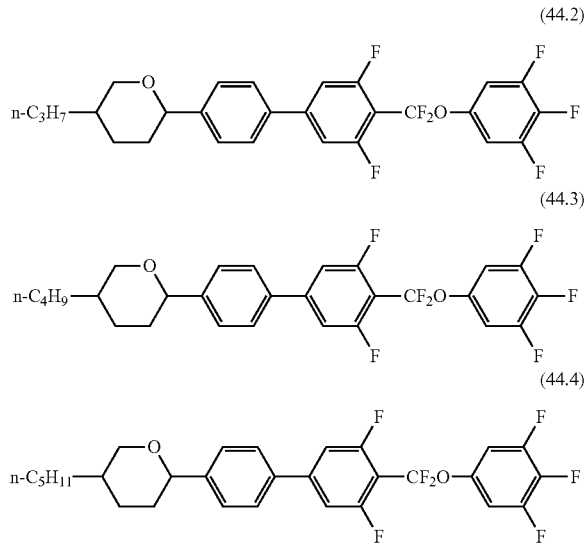

In the liquid crystal composition of the present invention, the amount of the compound represented by Formula (44.1) is preferably in the range of 1 mass % to 25 mass %, more preferably 2 mass % to 15 mass %, further preferably 2 mass % to 10 mass %, especially preferably 2 mass % to 8 mass %, and most preferably 2 mass % to 6 mass % relative to the total mass of the liquid crystal composition of the present invention in view of resistance to resolution at low temperature, transition temperature, electric reliability, and another property.

In the most preferred range, the amount may be from 2 mass % to 5 mass %, 2 mass % to 4 mass %, 2 mass % to 3 mass %, 3 mass % to 6 mass %, 3 mass % to 5 mass %, 4 mass % to 6 mass %, or 5 mass % to 6 mass %.

In the liquid crystal composition of the present invention, the amount of the compound represented by Formula (44.2) is preferably in the range of 1 mass % to 25 mass %, more preferably 2 mass % to 20 mass %, further preferably 3 mass % to 15 mass %, and especially preferably 3 mass % to 12 mass % relative to the total mass of the liquid crystal composition of the present invention in view of resistance to resolution at low temperature, transition temperature, electric reliability, and another property.

In the especially preferred range, the amount may be from 3 mass % to 10 mass %, 3 mass % to 7 mass %, 3 mass % to 6 mass %, 3 mass % to 5 mass %, 3 mass % to 4 mass %, 4 mass % to 12 mass %, 4 mass % to 10 mass %, 5 mass % to 12 mass %, 6 mass % to 12 mass %, 7 mass % to 12 mass %, or 10 mass % to 12 mass %.

In the liquid crystal composition of the present invention, the total amount of the compounds represented by Formulae (44.1) and (44.2) is preferably in the range of 2 mass % to 40 mass %, more preferably 3 mass % to 30 mass %, further preferably 4 mass % to 20 mass %, and especially preferably 5 mass % to 15 mass % relative to the total mass of the liquid crystal composition of the present invention in view of resistance to resolution at low temperature, transition temperature, electric reliability, and another property.

In the especially preferred range, the amount can be, for example, from 5 mass % to 12 mass %, 5 mass % to 10 mass %, 5 mass % to 9 mass %, 5 mass % to 8 mass %, 8 mass % to 15 mass %, 8 mass % to 10 mass %, 9 mass % to 15 mass %, or 10 mass % to 15 mass %.

In the case where $m^{ii1}$ is 1 in General Formula (ii), it is preferred that $A^{ii1}$ be a 1,4-cyclohexylene group and that $Z^{ii1}$ be a single bond. In addition, in the case where $m^{ii1}$ is 1, $m^{ii2}$ is preferably 1, and the compound represented by General Formula (ii) is preferably any of compounds represented by General Formula (ii-b).

[Chem. 13]

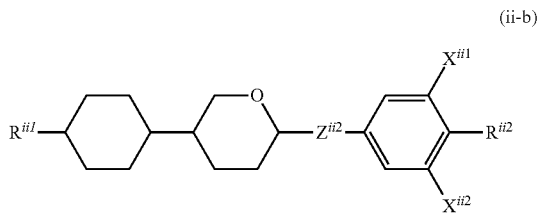

In General Formula (ii-b), $X^{ii1}$ and $X^{ii2}$ each independently represent a hydrogen atom or a fluorine atom, and $Z^{ii2}$, $R^{ii1}$, and $R^{ii2}$ have the same meanings as $Z^{ii2}$, $R^{ii1}$, and $R^{ii2}$ in General Formula (ii), respectively.

The compound represented by General Formula (ii-b) is preferably any of compounds represented by General Formula (ii-b-n).

[Chem. 14]

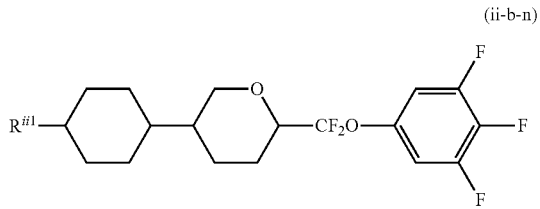

In General Formula (ii-b-n), $R^{ii1}$ has the same meaning as $R^{ii1}$ in General Formula (ii).

Specifically, the compound represented by General Formula (ii-b-n) is preferably any of compounds represented by Formulae (ii-b-1) to (ii-b-6). Among these, the compound represented by Formula (ii-b-3) and/or the compound represented by Formula (ii-b-5) are preferably used in the liquid crystal composition of the present invention.

[Chem. 15]

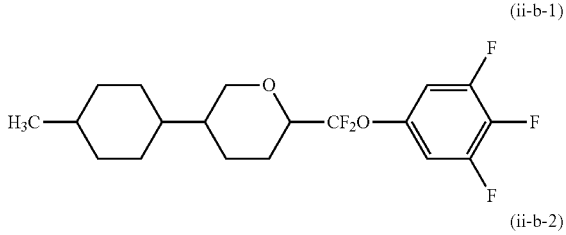

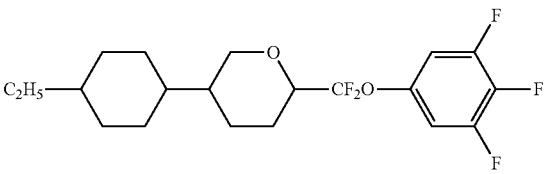

(ii-b-3)

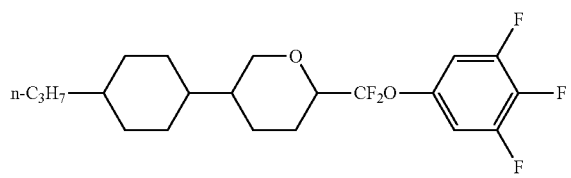

(ii-b-4)

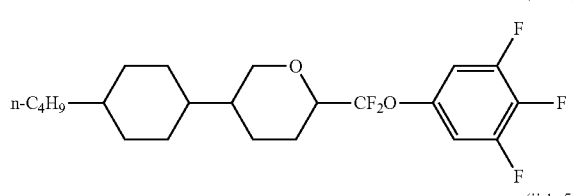

(ii-b-5)

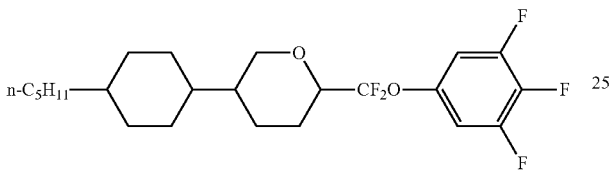

(ii-b-6)

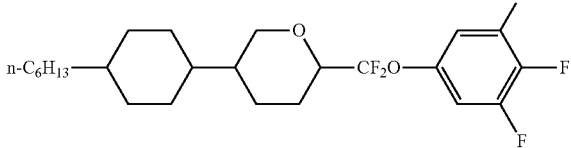

In the liquid crystal composition of the present invention, the total amount of compounds represented by Formula (ii-b-n) is preferably from 1 mass % to 25 mass %, more preferably 3 mass % to 20 mass %, further preferably 6 mass % to 15 mass %, and especially preferably 8 mass % to 12 mass % relative to the total mass of the liquid crystal composition of the present invention in view of resistance to resolution at low temperature, transition temperature, electric reliability, and another property.

In a preferred embodiment of the liquid crystal composition of the present invention, the liquid crystal composition contains at least one compound represented by General Formula (ii) in which $R^{ii2}$ is an alkyl group having 1 to 8 carbon atoms or an alkoxy group having 1 to 8 carbon atoms. Examples of such a compound include compounds represented by General Formula (ii-c).

In a preferred embodiment of the liquid crystal composition of the present invention, the liquid crystal composition contains at least one compound which is represented by General Formula (ii) and which contains at least one 2,3-difluorobenzene-1,4-diyl group. Examples of such a compound include compounds represented by General Formula (ii-c).

In the case where $m^{ii1}$ is 2 in General Formula (ii), $m^{ii2}$ is preferably 0, and the compound represented by General Formula (ii) is preferably any of compounds represented by General Formula (ii-c).

[Chem. 16]

(ii-c)

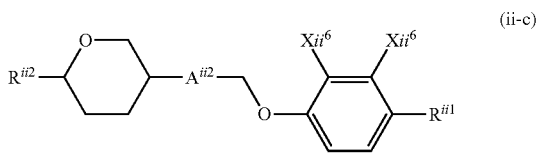

In General Formula (ii-c), $X^{ii5}$ and $X^{ii6}$ each independently represent a hydrogen atom or a fluorine atom; and $A^{ii2}$, $R^{ii1}$, and $R^{ii2}$ have the same meanings as $A^{ii2}$, $R^{ii1}$, and $R^{ii2}$ in General Formula (ii), respectively.

It is preferred that any one of $X^{ii5}$ and $X^{ii6}$ be a fluorine atom, and it is more preferred that both of them be fluorine atoms.

$A^{ii2}$ is preferably a 1,4-cyclohexylene group.

The compound represented by General Formula (ii-c) is preferably any of compounds represented by General Formula (ii-c-n).

[Chem. 17]

(ii-c-n)

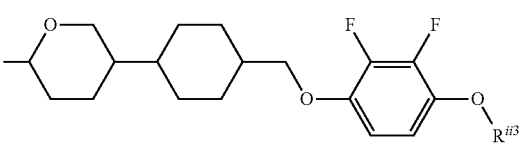

In General Formula (ii-c-n), $R^{ii3}$ is preferably an alkyl group having 1 to 6 carbon atoms, more preferably a linear alkyl group having 1 to 4 carbon atoms, and further preferably an alkyl group having 1 or 2 carbon atoms.

In General Formula (ii-c-n), $R^{ii4}$ is preferably an alkyl group having 1 to 8 carbon atoms or an alkenyl group having 2 to 8 carbon atoms, and more preferably a linear alkyl group having 1 to 5 carbon atoms or an alkenyl group having 2 to 5 carbon atoms.

The compound represented by General Formula (ii-c-n) is preferably any of compounds represented by Formulae (ii-c-1) to (ii-c-10). Among these, one to three compounds selected from the compounds represented by Formulae (ii-c-3), (ii-b-5), and (ii-c-6) are preferably used in the liquid crystal composition of the present invention.

[Chem. 18]

(ii-c-1)

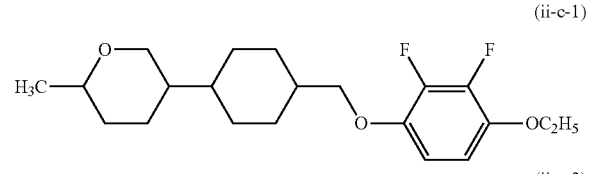

(ii-c-2)

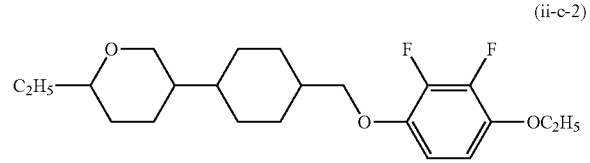

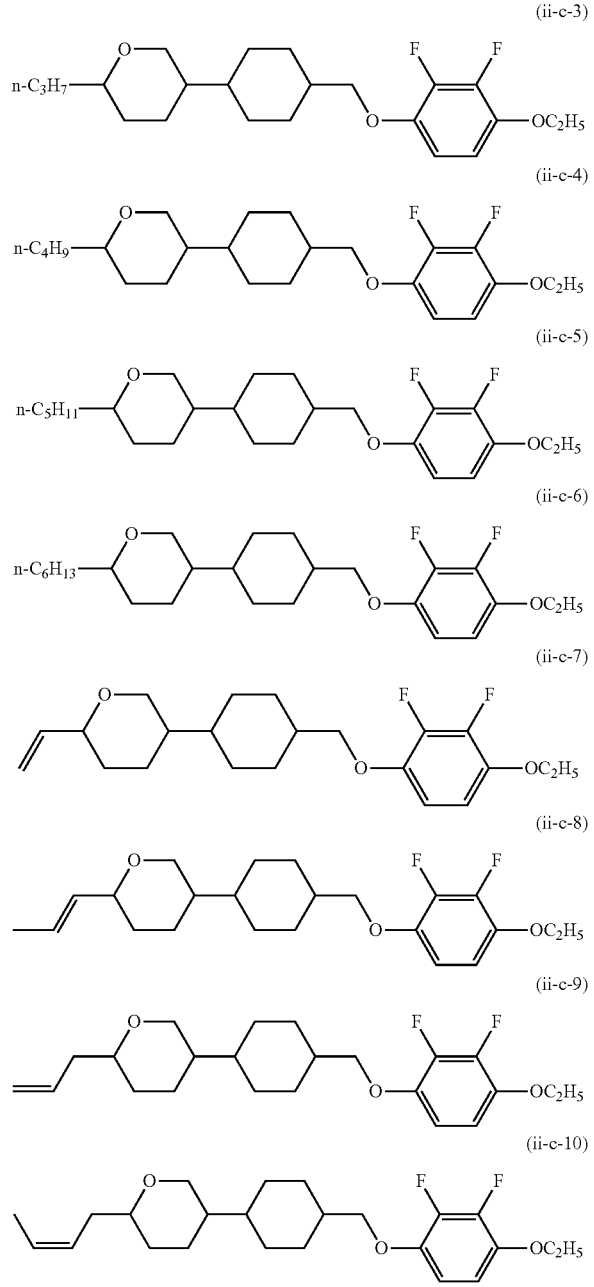

In the liquid crystal composition of the present invention, the total amount of compounds represented by Formula (ii-c-n) is preferably in the range of 1 mass % to 60 mass %, more preferably 10 mass % to 50 mass %, further preferably 20 mass % to 40 mass %, and especially preferably 30 mass % to 40 mass % relative to the total mass of the liquid crystal composition of the present invention in view of resistance to resolution at low temperature, transition temperature, electric reliability, and another property.

In the liquid crystal composition of the present invention, the amount of the compound represented by Formula (ii-c-3) is preferably in the range of 1 mass % to 30 mass %, more preferably 3 mass % to 25 mass %, further preferably 5 mass % to 20 mass %, and especially preferably 8 mass % to 16 mass % relative to the total mass of the liquid crystal composition of the present invention in view of resistance to resolution at low temperature, transition temperature, electric reliability, and another property.

In the liquid crystal composition of the present invention, the amount of the compound represented by Formula (ii-c-5) is preferably in the range of 1 mass % to 30 mass %, more preferably 3 mass % to 25 mass %, further preferably 5 mass % to 20 mass %, and especially preferably 8 mass % to 16 mass % relative to the total mass of the liquid crystal composition of the present invention in view of resistance to resolution at low temperature, transition temperature, electric reliability, and another property.

In the liquid crystal composition of the present invention, the amount of the compound represented by Formula (ii-c-7) is preferably in the range of 1 mass % to 30 mass %, more preferably 3 mass % to 25 mass %, further preferably 5 mass % to 20 mass %, and especially preferably 8 mass % to 16 mass % relative to the total mass of the liquid crystal composition of the present invention in view of resistance to resolution at low temperature, transition temperature, electric reliability, and another property.

In the liquid crystal composition of the present invention, the total amount of the three compounds represented by Formulae (ii-c-3), (ii-c-5), and (ii-c-7) is preferably in the range of 1 mass % to 60 mass %, more preferably 10 mass % to 50 mass %, further preferably 20 mass % to 40 mass %, and especially preferably 30 mass % to 40 mass % relative to the total mass of the liquid crystal composition of the present invention in view of resistance to resolution at low temperature, transition temperature, electric reliability, and another property.

The compound represented by General Formula (ii), which is used in the liquid crystal composition of the present invention, can be any of compounds represented by General Formula (X-4-2).

[Chem. 19]

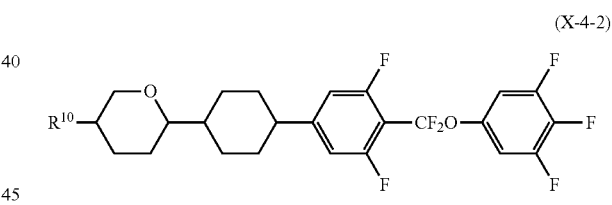

(X-4-2)

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-4-2) can be used in any combination; in view of resistance to resolution at low temperature, transition temperature, electric reliability, birefringence, and another property, one or two or more of the compounds are preferably used, and one to three or more of the compounds are more preferably used.

The amount of the compound represented by General Formula (X-4-2) is preferably in the range of 1 mass % to 30 mass %, more preferably 3 mass % to 20 mass %, and further preferably 5 mass % to 15 mass % relative to the total mass of the liquid crystal composition of the present invention in view of resistance to resolution at low temperature, transition temperature, electric reliability, and another property.

In particular, the compound represented by General Formula (X-4-2), which is used in the liquid crystal composition of the present invention, is preferably any of compounds represented by Formulae (42.11) to (42.14). Among these, the compound represented by Formula (42.13) or (42.14) is more preferably used in the liquid crystal composition of the present invention.

[Chem. 20]

(42.11)

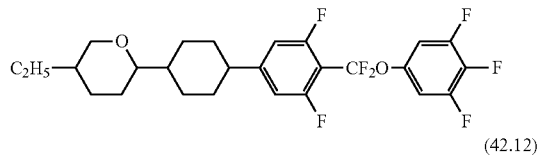
(42.12)

(42.13)

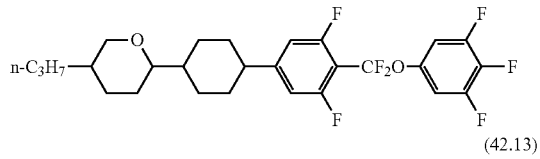
(42.14)

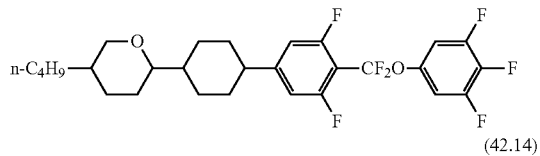

The compound represented by General Formula (ii) may be any of compounds represented by General Formula (X'-7).

[Chem. 21]

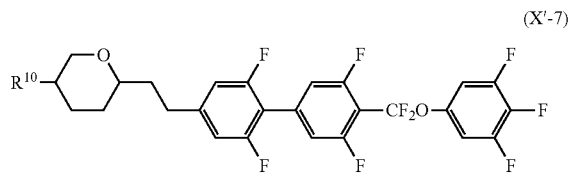
(X'-7)

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X'-7) can be used in any combination; in view of resistance to resolution at low temperature, transition temperature, electric reliability, birefringence, and another property, the compounds are preferably used alone or in combination.

The upper limit and lower limit of the amount of the compound represented by General Formula (X'-7) are determined for an embodiment in view of properties such as resistance to resolution at low temperature, transition temperature, electric reliability, and birefringence.

Relative to the total mass of the liquid crystal composition of the present invention, for example, the amount of the compound is from 4 to 30 mass % in an embodiment of the present invention, the amount of the compound is from 5 to 30 mass % in another embodiment, the amount of the compound is from 6 to 30 mass % in another embodiment, the amount of the compound is from 8 to 30 mass % in another embodiment, the amount of the compound is from 9 to 30 mass % in another embodiment, the amount of the compound is from 11 to 30 mass % in another embodiment, the amount of the compound is from 14 to 30 mass % in another embodiment, and the amount of the compound is from 18 to 30 mass % in another embodiment.

Furthermore, relative to the above-mentioned total mass, for instance, the amount of the compound is from 4 to 30 mass % in an embodiment of the present invention, the amount of the compound is from 4 to 20 mass % in another embodiment, the amount of the compound is from 4 to 13 mass % in another embodiment, the amount of the compound is from 4 to 10 mass % in another embodiment, and the amount of the compound is from 4 to 7 mass % in another embodiment.

In particular, the compound represented by General Formula (X'-7), which is used in the liquid crystal composition of the present invention, is preferably any of compounds represented by Formulae (44.11) to (44.14), and more preferably the compound represented by Formula (44.13).

[Chem. 22]

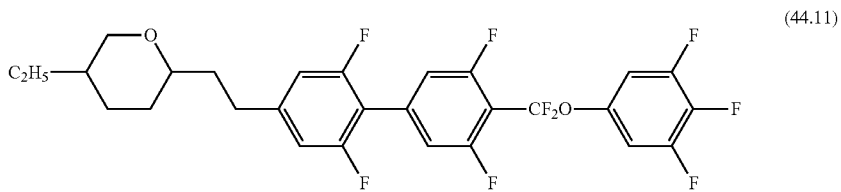
(44.11)

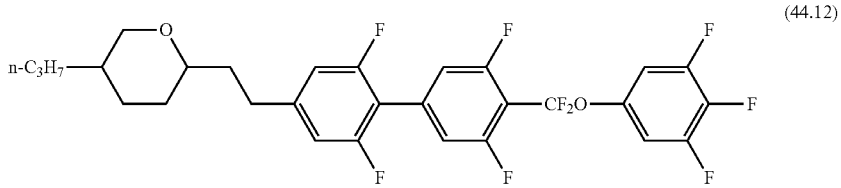
(44.12)

-continued (44.13)
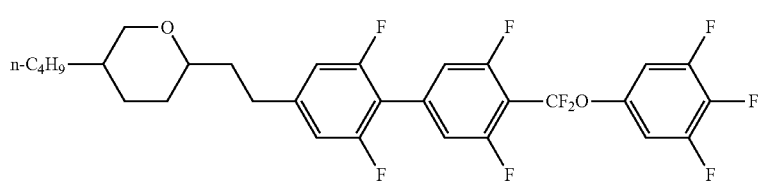

(44.14)
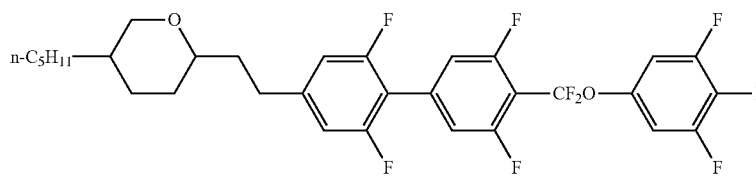

The compound represented by General Formula (ii) can be any of compounds represented by General Formulae (XIII″-40) to (XIII″-43).

[Chem. 23]

(XIII″-40)
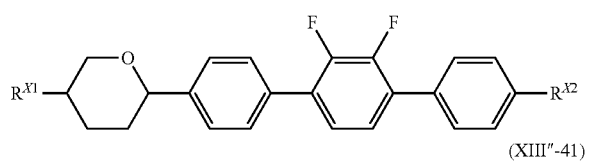

(XIII″-41)
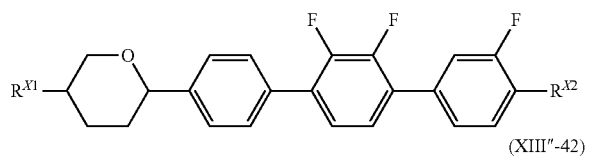

(XIII″-42)
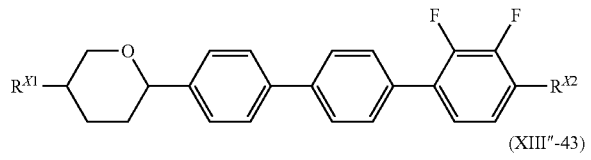

(XIII″-43)
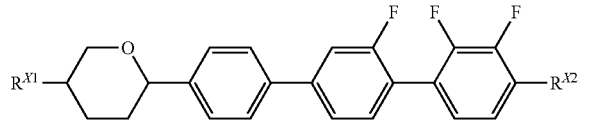

In General Formulae (XIII″-40) to (XIII″-43), $R^{X1}$ and $R^{X2}$ have the same meanings as $R^{X1}$ and $R^{X2}$ in General Formula (X″) which will be described later, respectively.

In these general formulae, $R^{X1}$ preferably represents an alkyl group having 1 to 8 carbon atoms or an alkenyl group having 2 to 8 carbon atoms, more preferably an alkyl group having 1 to 8 carbon atoms, and further preferably an alkyl group having 2 to 5 carbon atoms; in addition, $R^{X1}$ preferably has a straight-chain structure.

In the general formulae, $R^{X2}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; more preferably an alkyl group having 1 to 8 carbon atoms or an alkoxy group having 1 to 8 carbon atoms; and further preferably an alkyl group having 2 to 5 carbon atoms or an alkoxy group having 2 to 4 carbon atoms; in addition, $R^{X2}$ preferably has a straight-chain structure.

$R^{X2}$ is preferably an alkenyl group in terms of an improvement in the response speed of the liquid crystal display device of the present invention or an alkyl group in terms of the reliability of a voltage holding ratio or another property.

Among the compounds represented by General Formulae (XIII″-40) to (XIII″-43), the compounds represented by General Formulae (XIII″-40) and (XIII″-42) are preferred, and the compound represented by General Formula (XIII″-40) is more preferred.

In the liquid crystal composition of the present invention, the amount of the compound represented by General Formula (XIII″-40) is preferably in the range of 1 mass % to 30 mass %, more preferably 1 mass % to 20 mass %, further preferably 5 mass % to 15 mass %, and especially preferably 7 mass % to 13 mass % relative to the total mass of the liquid crystal composition of the present invention in view of resistance to resolution at low temperature, transition temperature, electric reliability, and another property.

The liquid crystal composition of the first embodiment of the present invention can also contain at least any one of compounds represented by General Formula (L).

[Chem. 24]

$$R^{L1}-B^{L1}-L^{L1}-B^{L2}-(L^{L2}-B^{L3})_{OL}R^{L2} \quad (L)$$

(in the formula, $R^{L1}$ and $R^{L2}$ each independently represent an alkyl group having 1 to 8 carbon atoms, and one —$CH_2$— or at least two —$CH_2$— not adjoining each other in the alkyl group are each independently optionally substituted with —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of (a) a 1,4-cyclohexylene group (of which one —$CH_2$— or at least two —$CH_2$— not adjoining each other are optionally substituted with —O—) and (b) a 1,4-phenylene group (of which one —CH= moiety or at least two —CH= moieties not adjoining each other are optionally substituted with —N=), and one and/or at least two hydrogen atoms contained in the groups (a) and (b) are each independently optionally substituted with a cyano group, a fluorine atom, or a chlorine atom;

$L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—;

in the case where OL is 2 or 3 and where $L^{L2}$ is multiple, the $L^{L2}$ moieties are the same as or different from each other;

in the case where OL is 2 or 3 and where $B^{L3}$ is multiple, the $B^{L3}$ moieties are the same as or different from each other; and the compound represented by General Formula (L) excludes the compound represented by General Formula (ii).

Such compounds represented by General Formula (L) can be used in any combination; a proper combination of the compounds can be determined on the basis of predetermined properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven of the compounds are used. In another embodiment of the present invention, eight of the compounds are used. In another embodiment of the present invention, nine of the compounds are used. In another embodiment of the present invention, ten or more of the compounds are used.

In the liquid crystal composition of the present invention, the amount of the compound represented by General Formula (L) needs to be appropriately adjusted on the basis of desired properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of the compound is in the range of 1 to 95 mass % in an embodiment of the present invention; in another embodiment of the present invention, the amount is from 10 to 95 mass %; in another embodiment of the present invention, the amount is from 20 to 95 mass %; in another embodiment of the present invention, the amount is from 30 to 95 mass %; in another embodiment of the present invention, the amount is from 40 to 95 mass %; in another embodiment of the present invention, the amount is from 50 to 95 mass %; in another embodiment of the present invention, the amount is from 55 to 95 mass %; in another embodiment of the present invention, the amount is from 60 to 95 mass %; in another embodiment of the present invention, the amount is from 65 to 95 mass %; in another embodiment of the present invention, the amount is from 70 to 95 mass %; in another embodiment of the present invention, the amount is from 75 to 95 mass %; and in another embodiment of the present invention, the amount is from 80 to 95 mass %.

Furthermore, relative to the total mass of the liquid crystal composition of the present invention, for instance, the amount of the compound is in the range of 1 to 95% in an embodiment of the present invention; in another embodiment of the present invention, the amount is from 1 to 85%; in another embodiment of the present invention, the amount is from 1 to 75%; in another embodiment of the present invention, the amount is from 1 to 65%; in another embodiment of the present invention, the amount is from 1 to 55%; in another embodiment of the present invention, the amount is from 1 to 45%; in another embodiment of the present invention, the amount is from 1 to 35%; and in another embodiment of the present invention, the amount is from 1 to 25%.

In the case where the viscosity of the liquid crystal composition of the present invention needs to be kept at a low level for allowing the liquid crystal composition to contribute to a high response speed, it is preferred that the lower limit of the above-mentioned range be high and that the upper limit thereof be high. In the case where the Tni of the liquid crystal composition of the present invention needs to be kept at a high level to allow the liquid crystal composition to have a high temperature stability, it is preferred that the lower limit of the above-mentioned range be high and that the upper limit thereof be high. In order to increase dielectric anisotropy for keeping driving voltage at a low level, it is preferred that the lower limit of the above-mentioned range be low and that the upper limit thereof be low.

In the case where the ring structures bonded to $R^{L1}$ and $R^{L2}$ are phenyl groups (aromatics), $R^{L1}$ and $R^{L2}$ are each preferably a linear alkyl group having 1 to 5 carbon atoms, a linear alkoxy group having 1 to 4 (or more) carbon atoms, or an alkenyl group having 4 or 5 carbon atoms; in the case where the ring structures bonded to $R^{L1}$ and $R^{L2}$ are saturated rings such as cyclohexane, pyran, and dioxane, $R^{L1}$ and $R^{L2}$ are each preferably a linear alkyl group having 1 to 5 carbon atoms, a linear alkoxy group having 1 to 4 (or more) carbon atoms, or a linear alkenyl group having 2 to 5 carbon atoms.

In the case where the liquid crystal composition needs to be chemically stable, it is preferred that the molecules of the compound represented by General Formula (L) be free from a chlorine atom.

The compound represented by General Formula (L) is, for example, preferably a compound selected from the group consisting of compounds represented by General Formula (I).

[Chem. 25]

$$R^{11}\text{-}A^{11}\text{-}A^{12}\text{-}R^{12} \qquad (I)$$

(in the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms; $A^{11}$ and $A^{12}$ each independently represent a 1,4-cyclohexylene group, a 1,4-phenylene group, a 2-fluoro-1,4-phenylene group, or a 3-fluoro-1,4-phenylene group.)

Such compounds represented by General Formula (I) can be used in any combination; a proper combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

In the liquid crystal composition of the present invention, the amount of the compound represented by General Formula (I) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of the compound is in the range of 3 to 75 mass % in an embodiment of the present invention; in another embodiment of the present invention, the amount is from 15 to 75 mass %; in another embodiment of the present invention, the amount is from 18 to 75 mass %; in another embodiment of the present invention, the amount is from 20 to 75 mass %; in another embodiment of the present invention, the amount is from 29 to 75 mass %; in another embodiment of the present invention, the amount is from 35 to 75 mass %; in another embodiment of the present invention, the amount is from 42 to 75 mass %; in another embodiment of the present invention, the amount is from 47 to 75 mass %; in another embodiment of the present invention, the amount is from 53 to 75 mass %; in another embodiment of the present invention, the amount is from 56 to 75 mass %; in another embodiment of the present invention, the amount is from 60 to 75 mass %; and in another embodiment of the present invention, the amount is from 65 to 75 mass %.

Furthermore, relative to the total mass of the liquid crystal composition of the present invention, for instance, the amount is in the range of 3 to 75 mass % in an embodiment of the present invention; in another embodiment of the present invention, the amount is from 3 to 65 mass %; in another embodiment of the present invention, the amount is from 3 to 55 mass %; in another embodiment of the present invention, the amount is from 3 to 50 mass %; in another embodiment of the present invention, the amount is from 3 to 45 mass %; in another embodiment of the present invention, the amount is from 3 to 40 mass %; in another embodiment of the present invention, the amount is from 3 to 35 mass %; and in another embodiment of the present invention, the amount is from 3 to 30 mass %.

In the case where the viscosity of the liquid crystal composition of the present invention needs to be kept at a low level for allowing the liquid crystal composition to contribute to a high response speed, it is preferred that the lower limit of the above-mentioned range be high and that the upper limit thereof be high. In the case where the Tni of the liquid crystal composition of the present invention needs to be kept at a high level to allow the liquid crystal composition to have a high temperature stability, it is preferred that the lower limit of the above-mentioned range be moderate and that the upper limit thereof be moderate. In order to increase dielectric anisotropy for keeping driving voltage at a low level, it is preferred that the lower limit of the above-mentioned range be low and that the upper limit thereof be low.

In the case where the ring structure bonded to $R^{M1}$ is a phenyl group (aromatic), $R^{M1}$ is preferably a linear alkyl group having 1 to 5 carbon atoms, a linear alkoxy group having 1 to 4 carbon atoms, or an alkenyl group having 4 or 5 carbon atoms; in the case where the ring structure bonded to $R^{M1}$ is a saturated ring such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

The compound represented by General Formula (I) is preferably a compound selected from the group consisting of compounds represented by General Formula (I-1).

[Chem. 26]

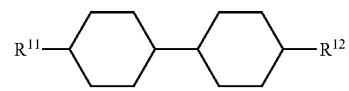

(I-1)

(in the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms.)

Such compounds represented by General Formula (I-1) can be used in any combination; a proper combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five or more of the compounds are used.

In the liquid crystal composition of the present invention, the amount of the compound represented by General Formula (I-1) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of the compound is in the range of 3 to 70 mass % in an embodiment of the present invention; in another embodiment of the present invention, the amount is from 15 to 70 mass %; in another embodiment of the present invention, the amount is from 18 to 70 mass %; in another embodiment of the present invention, the amount is from 25 to 70 mass %; in another embodiment of the present invention, the amount is from 29 to 70 mass %; in another embodiment of the present invention, the amount is from 31 to 70 mass %; in another embodiment of the present invention, the amount is from 35 to 70 mass %; in another embodiment of the present invention, the amount is from 43 to 70 mass %; in another embodiment of the present invention, the amount is from 47 to 70 mass %; in another embodiment of the present invention, the amount is from 50 to 70 mass %; in another embodiment of the present invention, the amount is from 53 to 70 mass %; and in another embodiment of the present invention, the amount is from 56 to 70 mass %.

Moreover, relative to the total mass of the liquid crystal composition of the present invention, for instance, the amount of the compound is in the range of 3 to 70 mass % in an embodiment of the present invention; in another embodiment of the present invention, the amount is from 3 to 60 mass %; in another embodiment of the present invention, the amount is from 3 to 50 mass %; in another embodiment of the present invention, the amount is from 3 to 45 mass %; in another embodiment of the present invention, the amount is from 3 to 40 mass %; in another embodiment of the present invention, the amount is from 3 to 35 mass %; in another embodiment of the present invention, the amount is from 3 to 30 mass %; and in another embodiment of the present invention, the amount is from 3 to 26 mass %.

In the case where the viscosity of the liquid crystal composition of the present invention needs to be kept at a low level for allowing the liquid crystal composition to contribute to a high response speed, it is preferred that the lower limit of the above-mentioned range be high and that the upper limit thereof be high. In the case where the Tni of the liquid crystal composition of the present invention needs to be kept at a high level to allow the liquid crystal composition to have a high temperature stability, it is preferred that the lower limit of the above-mentioned range be moderate and that the upper limit thereof be moderate. In order to increase dielectric anisotropy for keeping driving voltage at a low level, it is preferred that the lower limit of the above-mentioned range be low and that the upper limit thereof be low.

The compound represented by General Formula (I-1) is preferably a compound selected from the group consisting of compounds represented by General Formula (I-1-1).

[Chem. 27]

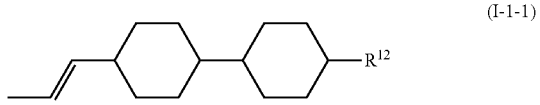

(I-1-1)

(in the formula, $R^{12}$ each independently represents an alkyl group having 1 to 5 carbon atoms, an alkenyl group having 2 to 5 carbon atoms, or an alkoxy group having 1 to 5 carbon atoms.)

In the liquid crystal composition of the present invention, the amount of the compound represented by General Formula (I-1-1) needs to be appropriately adjusted on the basis of desired properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of the compound is in the range of 2 to 60 mass % in an embodiment of the present invention; in another embodiment of the present invention, the amount is from 4 to 60 mass %; in another embodiment of the present invention, the amount is from 7 to 60 mass %; in another embodiment of the present invention, the amount is from 11 to 60 mass %; in another embodiment of the present invention, the amount is from 13 to 60 mass %; in another embodiment of the present invention, the amount is from 15 to 60 mass %; in another embodiment of the present invention, the amount is from 17 to 60 mass %; in another embodiment of the present invention, the amount is from 20 to 60 mass %; in another embodiment of the present invention, the amount is from 25 to 60 mass %; in another embodiment of the present invention, the amount is from 30 to 60 mass %; in another embodiment of the present invention, the amount is from 32 to 60 mass %; and in another embodiment of the present invention, the amount is from 35 to 60 mass %.

Furthermore, relative to the total mass of the liquid crystal composition of the present invention, for example, the amount of the compound is in the range of 2 to 60 mass % in an embodiment of the present invention; in another embodiment of the present invention, the amount is from 2 to 50 mass %; in another embodiment of the present invention, the amount is from 2 to 40 mass %; in another embodiment of the present invention, the amount is from 2 to 35 mass %; in another embodiment of the present invention, the amount is from 2 to 30 mass %; in another embodiment of the present invention, the amount is from 2 to 25 mass %; in another embodiment of the present invention, the amount is from 2 to 20 mass %; and in another embodiment of the present invention, the amount is from 2 to 15 mass %.

The compound represented by General Formula (I-1-1) is preferably a compound selected from the group consisting of compounds represented by Formulae (1.1) to (1.3), more preferably the compound represented by Formula (1.2) or (1.3), and especially preferably the compound represented by Formula (1.3).

[Chem. 28]

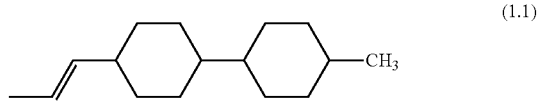

(1.1)

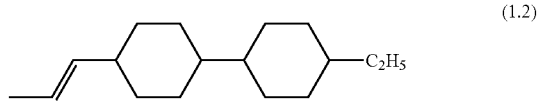

(1.2)

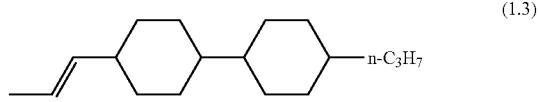

(1.3)

In the case where the compound represented by Formula (1.2) or (1.3) is used alone, the amount of the compound represented by Formula (1.2) is preferably large to improve a response speed, and the amount of the compound represented by Formula (1.3) is preferably within the following ranges to produce a liquid crystal composition which enables a quick response and which has high electric and optical reliabilities.

The amount of the compound represented by Formula (1.3) is preferably in the range of 1 mass % to 35 mass %, more preferably 2 mass % to 25 mass %, and further preferably 3 mass % to 20 mass % relative to the total mass of the liquid crystal composition of the present invention.

In the further preferred rage, the amount may be from 4 to 15 mass %, 4 to 10 mass %, 4 to 7 mass %, 3 to 4 mass %, 7 to 15 mass %, 10 to 15 mass %, or 15 to 20 mass %.

The compound represented by General Formula (I-1) is preferably a compound selected from the group consisting of compounds represented by General Formula (I-1-2).

[Chem. 29]

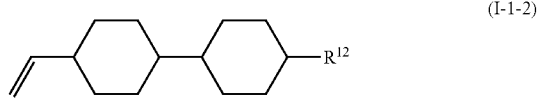

(I-1-2)

(in the formula, $R^{12}$ each independently represents an alkyl group having 1 to 5 carbon atoms, an alkoxy group having 1 to 5 carbon atoms, or an alkenyl group having 2 to 5 carbon atoms.)

Such compounds represented by General Formula (I-1-2) can be used in any combination; a proper combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-1-2) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of the compound is in the range of 7 to 60 mass % in an embodiment of the present invention; in another embodiment of the present invention, the amount is from 15 to 60 mass %; in another embodiment of the present invention, the amount is from 18 to 60 mass %; in another embodiment of the present invention, the amount is from 21 to 60 mass %; in another embodiment of the present invention, the amount is from 24 to 60 mass %; in another embodiment of the present invention, the amount is from 27 to 60 mass %; in another embodiment of the present invention, the amount is from 30 to 60 mass %; in another embodiment of the present invention, the amount is from 34 to 60 mass %; in another embodiment of the present invention, the amount is from 37 to 60 mass %; in another embodiment of the present invention, the amount is from 41 to 60 mass %; in another embodiment of the present invention, the amount is from 47 to 60 mass %; and in another embodiment of the present invention, the amount is from 50 to 60 mass %.

Furthermore, relative to the total mass of the liquid crystal composition of the present invention, for example, the amount of the compound is in the range of 7 to 60 mass % in an embodiment of the present invention; in another embodiment of the present invention, the amount is from 7 to 55 mass %; in another embodiment of the present invention, the amount is from 7 to 45 mass %; in another embodiment of the present invention, the amount is from 7 to 40 mass %; in another embodiment of the present invention, the amount is from 7 to 35 mass %; in another embodiment of the present invention, the amount is from 7 to 30 mass %; in another embodiment of the present invention, the amount is from 7 to 25 mass %; and in another embodiment of the present invention, the amount is from 7 to 20 mass %.

The compound represented by General Formula (I-1-2) is preferably a compound selected from the group consisting of compounds represented by Formulae (2.1) to (2.4), and more preferably any of the compounds represented by Formulae (2.2) to (2.4). In particular, the compound represented by Formula (2.2) is preferred because it especially enhances the response speed of the liquid crystal composition of the present invention. If high Tni is needed rather than the response speed, it is preferred that the compound represented by Formula (2.3) or (2.4) be employed. In order to improve resistance to resolution at low temperature, it is preferred that the amount of each of the compounds represented by Formulae (2.3) and (2.4) be less than 30%.

[Chem. 30]

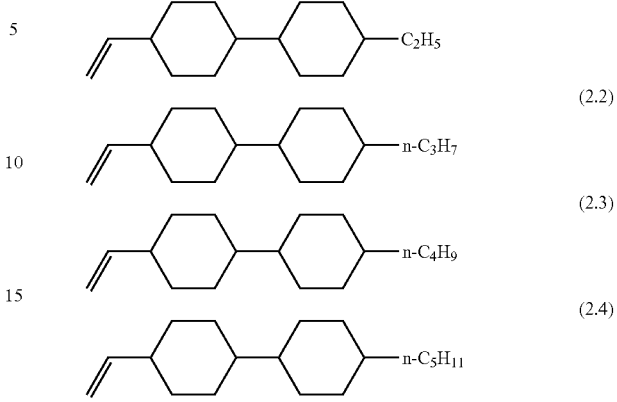

In the liquid crystal composition of the present invention, the amount of the compound represented by Formula (2.2) is preferably in the range of 5 mass % to 55 mass % relative to the total mass of the liquid crystal composition of the present invention.

Preferred examples of the amount are as follows: from 10 mass % to 50 mass %, from 20 mass % to 40 mass %, from 20 mass % to 35 mass %, from 20 mass % to 30 mass %, from 20 mass % to 25 mass %, from 10 mass % to 20 mass %, from 25 mass % to 50 mass %, from 30 mass % to 50 mass %, from 35 mass % to 50 mass %, and from 40 mass % to 50 mass %.

In the liquid crystal composition of the present invention, the amount of the compound represented by Formula (2.3) is preferably in the range of 5 mass % to 55 mass %, more preferably 5 mass % to 45 mass %, further preferably 5 mass % to 35 mass %, further preferably 5 mass % to 25 mass %, and further preferably 10 mass % to 25 mass % relative to the total mass of the liquid crystal composition of the present invention.

In the liquid crystal composition of the present invention, the amount of the compound represented by Formula (2.4) is preferably in the range of 1 mass % to 55 mass %, more preferably 1 mass % to 40 mass %, further preferably 10 mass % to 40 mass %, further preferably 20 mass % to 40 mass %, and especially preferably 25 mass % to 35 mass % relative to the total mass of the liquid crystal composition of the present invention.

The compound represented by General Formula (I) is preferably a compound selected from the group consisting of compounds represented by General Formula (I-2).

[Chem. 31]

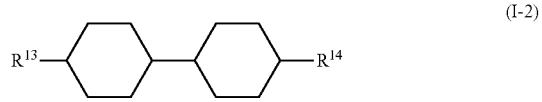

(in the formula, $R^{13}$ and $R^{14}$ each independently represent an alkyl group having 1 to 5 carbon atoms.)

Such compounds represented by General Formula (I-2) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-2) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of the compound is in the range of 3 to 60 mass % in an embodiment of the present invention; in another embodiment of the present invention, the amount is from 4 to 60 mass %; in another embodiment of the present invention, the amount is from 15 to 60 mass %; in another embodiment of the present invention, the amount is from 25 to 60 mass %; in another embodiment of the present invention, the amount is from 30 to 60 mass %; in another embodiment of the present invention, the amount is from 35 to 60 mass %; in another embodiment of the present invention, the amount is from 38 to 60 mass %; in another embodiment of the present invention, the amount is from 40 to 60 mass %; in another embodiment of the present invention, the amount is from 42 to 60 mass %; in another embodiment of the present invention, the amount is from 45 to 60 mass %; in another embodiment of the present invention, the amount is from 47 to 60 mass %; and in another embodiment of the present invention, the amount is from 50 to 60 mass %.

Furthermore, relative to the total mass of the liquid crystal composition of the present invention, for example, the amount of the compound is in the range of 3 to 60 mass % in an embodiment of the present invention; in another embodiment of the present invention, the amount is from 3 to 55 mass %; in another embodiment of the present invention, the amount is from 3 to 45 mass %; in another embodiment of the present invention, the amount is from 3 to 40 mass %; in another embodiment of the present invention, the amount is from 3 to 30 mass %; in another embodiment of the present invention, the amount is from 3 to 20 mass %; in another embodiment of the present invention, the amount is from 3 to 15 mass %; and in another embodiment of the present invention, the amount is from 3 to 5 mass %.

The compound represented by General Formula (I-2) is preferably a compound selected from the group consisting of compounds represented by Formulae (3.1) to (3.4); and more preferably the compound represented by Formula (3.1), (3.3), or (3.4). In particular, the compound represented by Formula (3.2) is preferred because it especially enhances the response speed of the liquid crystal composition of the present invention. If high Tni is needed rather than the response speed, it is preferred that the compound represented by Formula (3.3) or (3.4) be employed. In order to improve resistance to resolution at low temperature, it is preferred that the amount of each of the compounds represented by Formulae (3.3) and (3.4) be less than 20%.

The compound represented by General Formula (I-2) is preferably a compound selected from the group consisting of the compounds represented by Formulae (3.1) to (3.4), and more preferably the compound represented by Formula (3.1), the compound represented by Formula (3.3), and/or the compound represented by Formula (3.4).

[Chem. 32]

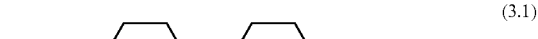

(3.1)

(3.2)

(3.3)

(3.4)

In the liquid crystal composition of the present invention, the amount of the compound represented by Formula (3.1) is preferably in the range of 1 mass % to 30 mass %, more preferably 5 mass % to 25 mass %, further preferably 10 mass % to 20 mass %, and especially preferably 12 mass % to 18 mass % relative to the total mass of the liquid crystal composition of the present invention in view of resistance to resolution at low temperature, transition temperature, electric reliability, and another property.

In the liquid crystal composition of the present invention, the amount of the compound represented by Formula (3.3) is preferably in the range of 1 mass % to 30 mass %, more preferably 1 mass % to 15 mass %, further preferably 1 mass % to 10 mass %, and especially preferably 2 mass % to 8 mass % relative to the total mass of the liquid crystal composition of the present invention in view of resistance to resolution at low temperature, transition temperature, electric reliability, and another property.

In the liquid crystal composition of the present invention, the amount of the compound represented by Formula (3.4) is preferably in the range of 1 mass % to 30 mass %, more preferably 1 mass % to 20 mass %, further preferably 3 mass % to 12 mass %, and especially preferably 5 mass % to 10 mass % relative to the total mass of the liquid crystal composition of the present invention in view of resistance to resolution at low temperature, transition temperature, electric reliability, and another property.

The compound represented by General Formula (I) is preferably a compound selected from the group consisting of compounds represented by General Formula (I-3).

[Chem. 33]

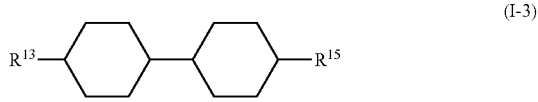

(I-3)

(in the formula, $R^{13}$ represents an alkyl group having 1 to 5 carbon atoms, and $R^{15}$ represents an alkoxy group having 1 to 4 carbon atoms.)

Such compounds represented by General Formula (I-3) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-3) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound is 3 mass % in an embodiment of the present invention; in another embodiment of the present invention, the amount is from 4 to 60 mass %; in another embodiment of the present invention, the amount is from 15 to 60 mass %; in another embodiment of the present invention, the amount is from 25 to 60 mass %; in another embodiment of the present invention, the amount is from 30 to 60 mass %; in another embodiment of the present invention, the amount is from 35 to 60 mass %; in another embodiment of the present invention, the amount is from 38 to 60 mass %; in another embodiment of the present invention, the amount is from 40 to 60 mass %; in another embodiment of the present invention, the amount is from 42 to 60 mass %; in another embodiment of the present invention, the amount is from 45 to 60 mass %; in another embodiment of the present invention, the amount is from 47 to 60 mass %; and in another embodiment of the present invention, the amount is from 50 to 60 mass %.

Moreover, relative to the total mass of the liquid crystal composition of the present invention, for example, the amount of the compound is in the range of 3 to 60 mass % in an embodiment of the present invention; in another embodiment of the present invention, the amount is from 3 to 55 mass %; in another embodiment of the present invention, the amount is from 3 to 45 mass %; in another embodiment of the present invention, the amount is from 3 to 40 mass %; in another embodiment of the present invention, the amount is from 3 to 30 mass %; in another embodiment of the present invention, the amount is from 3 to 20 mass %; in another embodiment of the present invention, the amount is from 3 to 15 mass %; and in another embodiment of the present invention, the amount is from 3 to 5 mass %.

In terms of resistance to resolution at low temperature, the amount is adjusted to be larger to produce a greater effect; in terms of response speed, the amount is adjusted to be smaller to produce a greater effect. In order to enhance resistance to droplet stains and screen burn-in, the range of the amount is preferably adjusted to be intermediate.

The compound represented by General Formula (I-3) is preferably a compound selected from the group consisting of compounds represented by Formulae (4.1) to (4.3), and more preferably the compound represented by Formula (4.3).

[Chem. 34]

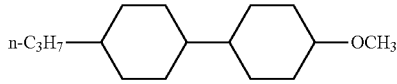

(4.1)

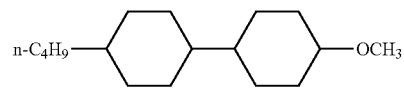

(4.2)

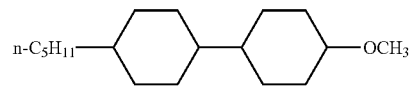

(4.3)

The amount of the compound represented by Formula (4.3) is preferably in the range of 2 mass % to 30 mass % relative to the total mass of the liquid crystal composition of the present invention.

The compound represented by General Formula (I) is preferably a compound selected from the group consisting of compounds represented by General Formula (I-4).

[Chem. 35]

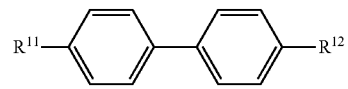

(I-4)

(in the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms.)

Such compounds represented by General Formula (I-4) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used.

In the liquid crystal composition of the present invention, the amount of the compound represented by General Formula (I-4) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound is in the range of 3 to 50 mass % in an embodiment of the present invention; in another embodiment of the present invention, the amount is from 5 to 50 mass %; in another embodiment of the present invention, the amount is from 6 to 50 mass %; in another embodiment of the present invention, the amount is from 8 to 50 mass %; in another embodiment of the present invention, the amount is from 10 to 50 mass %; in another embodiment of the present invention, the amount is from 12 to 50 mass %; in another embodiment of the present invention, the amount is from 15 to 50 mass %; in another embodiment of the present invention, the amount is from 20 to 50 mass %; in another embodiment of the present invention, the amount is from 25 to 50 mass %; in another embodiment of the present invention, the amount is from 30 to 50 mass %; in another embodiment of the present invention, the amount is from 35 to 50 mass %; and in another embodiment of the present invention, the amount is from 40 to 50 mass %.

Moreover, relative to the total mass of the liquid crystal composition of the present invention, for example, the amount of the compound is in the range of 3 to 50 mass % in an embodiment of the present invention; in another embodiment of the present invention, the amount is from 3 to 40 mass %; in another embodiment of the present invention, the amount is from 3 to 35 mass %; in another embodiment of the present invention, the amount is from 3 to 30 mass %; in another embodiment of the present invention, the amount is from 3 to 20 mass %; in another embodiment of the present invention, the amount is from 3 to 15 mass %; in another embodiment of the present invention, the amount is from 3 to 10 mass %; and in another embodiment of the present invention, the amount is from 3 to 5 mass %.

In terms of an enhancement in birefringence, the amount is adjusted to be larger to produce a greater effect; in terms of high Tni, the amount is adjusted to be smaller to produce a greater effect. In order to enhance resistance to droplet stains and screen burn-in, the range of the amount is preferably adjusted to be intermediate.

The compound represented by General Formula (I-4) is preferably a compound selected from the group consisting of compounds represented by Formulae (5.1) to (5.4), and more preferably any of the compounds represented by Formulae (5.2) to (5.4).

[Chem. 36]

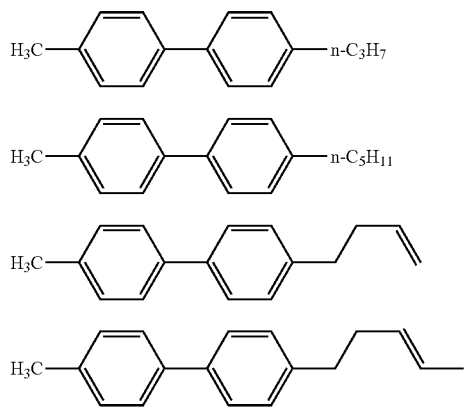

The amount of the compound represented by Formula (5.3) is preferably in the range of 1 mass % to 30 mass %, more preferably 2 mass % to 20 mass %, and further preferably 2 mass % to 10 mass % relative to the total mass of the liquid crystal composition of the present invention.

In the liquid crystal composition of the present invention, the amount of the compound represented by Formula (5.4) is preferably in the range of 1 mass % to 30 mass %, more preferably 1 mass % to 20 mass %, further preferably 1 mass % to 10 mass %, and especially preferably 1 mass % to 5 mass % relative to the total mass of the liquid crystal composition of the present invention in view of resistance to resolution at low temperature, transition temperature, electric reliability, and another property.

The compound represented by General Formula (I) is preferably a compound selected from the group consisting of compounds represented by General Formula (I-5).

[Chem. 37]

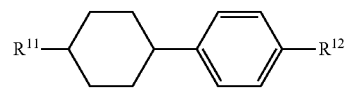

(I-5)

(in the formula, $R^{11}$ represents an alkyl group having 1 to 5 carbon atoms, an alkenyl group having 2 to 5 carbon atoms, or an alkoxy group having 1 to 4 carbon atoms; and $R^{12}$ represents an alkyl group having 1 to 5 carbon atoms, an alkenyl group having 4 or 5 carbon atoms, or an alkoxy group having 1 to 4 carbon atoms.)

Such compounds represented by General Formula (I-5) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used.

In the liquid crystal composition of the present invention, the amount of the compound represented by General Formula (I-5) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound is in the range of 1 to 50 mass % in an embodiment of the present invention; in another embodiment of the present invention, the amount is from 5 to 50 mass %; in another embodiment of the present invention, the amount is from 8 to 50 mass %; in another embodiment of the present invention, the amount is from 11 to 50 mass %; in another embodiment of the present invention, the amount is from 13 to 50 mass %; in another embodiment of the present invention, the amount is from 15 to 50 mass %; in another embodiment of the present invention, the amount is from 17 to 50 mass %; in another embodiment of the present invention, the amount is from 20 to 50 mass %; in another embodiment of the present invention, the amount is from 25 to 50 mass %; in another embodiment of the present invention, the amount is from 30 to 50 mass %; in another embodiment of the present invention, the amount is from 35 to 50 mass %; and in another embodiment of the present invention, the amount is from 40 to 50 mass %.

Furthermore, relative to the total mass of the liquid crystal composition of the present invention, for example, the amount of the compound is in the range of 1 to 50% in an embodiment of the present invention; in another embodiment of the present invention, the amount is from 1 to 40%; in another embodiment of the present invention, the amount is from 1 to 35%; in another embodiment of the present invention, the amount is from 1 to 30%; in another embodiment of the present invention, the amount is from 1 to 20%; in another embodiment of the present invention, the amount is from 1 to 15%; in another embodiment of the present invention, the amount is from 1 to 10%; and in another embodiment of the present invention, the amount is from 1 to 5%.

In terms of resistance to resolution at low temperature, the amount is adjusted to be larger to produce a greater effect; in terms of response speed, the amount is adjusted to be smaller to produce a greater effect. In order to enhance resistance to droplet stains and screen burn-in, the range of the amount is preferably adjusted to be intermediate.

The compound represented by General Formula (I-5) is preferably a compound selected from the group consisting of compounds represented by Formulae (6.1) to (6.6); and more preferably the compound represented by Formula (6.3), (6.4), or (6.6).

[Chem. 38]

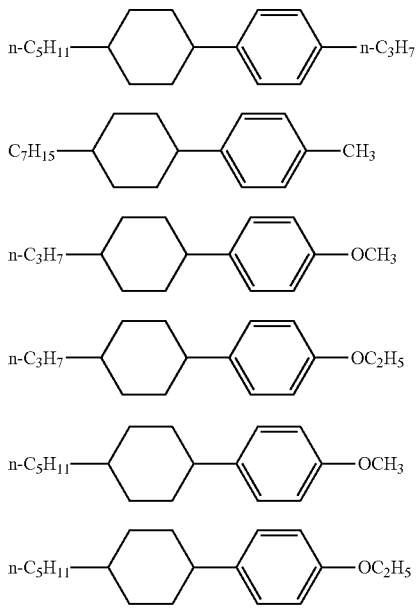

(6.1)
(6.2)
(6.3)
(6.4)
(6.5)
(6.6)

The amount of the compound represented by Formula (6.3) is preferably in the range of 2 mass % to 30 mass %, more preferably 4 mass % to 25 mass %, and further preferably 6 mass % to 20 mass % relative to the total mass of the liquid crystal composition of the present invention.

The compound represented by General Formula (I-5), which can be further contained in the liquid crystal composition of the present invention, can be selected from a compound represented by Formula (6.7) and a compound represented by Formula (6.8).

[Chem. 39]

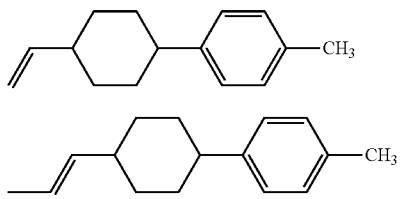

(6.7)
(6.8)

The amount of the compound represented by Formula (6.7) is preferably adjusted on the basis of desired properties such as resistance to resolution at low temperature, transition temperature, electric reliability, and birefringence; the amount of this compound is preferably not less than 2 mass %, more preferably not less than 3 mass %, further preferably not less than 5 mass %, and especially preferably not less than 7 mass % relative to the total mass of the liquid crystal composition of the present invention.

The compound represented by General Formula (I) is preferably a compound selected from the group consisting of compounds represented by General Formula (I-6).

[Chem. 40]

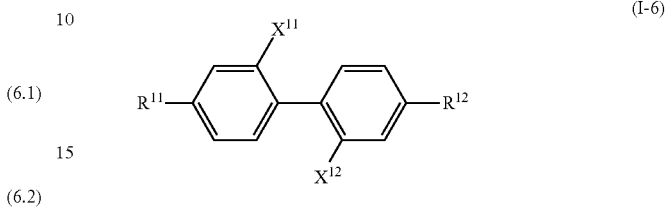

(I-6)

(in the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms; $X^{11}$ and $X^{12}$ each independently represent a fluorine atom or a hydrogen atom; and any one of $X^{11}$ and $X^{12}$ is a fluorine atom.

The amount of the compound represented by General Formula (I-6) is preferably in the range of 2 mass % to 30 mass %, more preferably 4 mass % to 30 mass %, further preferably 5 mass % to 30 mass %, further preferably 6 mass % to 30 mass %, further preferably 9 mass % to 30 mass %, further preferably 12 mass % to 30 mass %, further preferably 14 mass % to 30 mass %, further preferably 16 mass % to 30 mass %, further preferably 18 mass % to 25 mass %, further preferably 20 mass % to 24 mass %, and especially preferably 22 mass % to 23 mass % relative to the total mass of the liquid crystal composition of the present invention.

The compound represented by General Formula (I-6) is preferably a compound represented by Formula (7.1)

[Chem. 41]

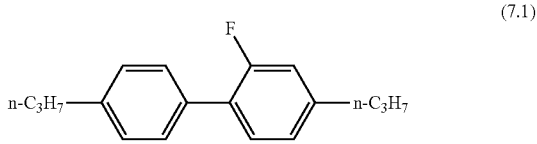

(7.1)

The compound represented by General Formula (I) is preferably a compound selected from the group consisting of compounds represented by General Formula (I-7).

[Chem. 42]

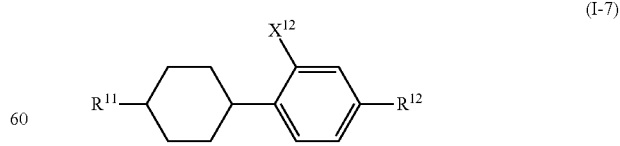

(I-7)

(in the formula, $R^{11}$ and $R^{12}$ each independently represent an alkyl group having 1 to 5 carbon atoms, an alkenyl group having 2 to 5 carbon atoms, or an alkoxy group having 1 to 4 carbon atoms; and $X^{12}$ each independently represents a fluorine atom or a chlorine atom.

The amount of the compound represented by General Formula (I-7) is preferably in the range of 1 mass % to 30 mass %, more preferably 2 mass % to 30 mass %, further preferably 3 mass % to 30 mass %, further preferably 4 mass % to 30 mass %, further preferably 6 mass % to 30 mass %, further preferably 8 mass % to 30 mass %, further preferably 10 mass % to 30 mass %, further preferably 12 mass % to 30 mass %, further preferably 15 mass % to 25 mass %, further preferably 18 mass % to 24 mass %, and especially preferably 21 mass % to 22 mass % relative to the total mass of the liquid crystal composition of the present invention.

The compound represented by General Formula (I-7) is preferably a compound represented by Formula (8.1).

[Chem. 43]

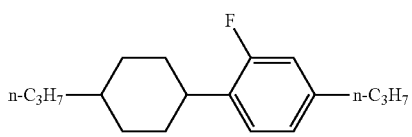

(8.1)

The compound represented by General Formula (I) is preferably a compound selected from the group consisting of compounds represented by General Formula (I-8).

[Chem. 44]

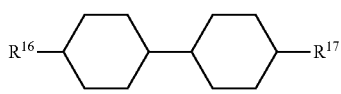

(I-8)

(in the formula, $R^{16}$ and $R^{17}$ each independently represent an alkenyl group having 2 to 5 carbon atoms.)

Such compounds represented by General Formula (I-8) can be used in any combination; in view of desired properties such as resistance to resolution at low temperature, transition temperature, electric reliability, and birefringence, it is preferred that one to three of the compounds be used. The amount of the compound represented by General Formula (I-8) is preferably from 5 mass % to 65 mass %, more preferably 10 mass % to 65 mass %, further preferably 15 mass % to 65 mass %, further preferably 20 mass % to 65 mass %, further preferably 25 mass % to 65 mass %, further preferably 30 mass % to 65 mass %, further preferably 35 mass % to 65 mass %, further preferably 40 mass % to 65 mass %, further preferably 45 mass % to 60 mass %, further preferably 50 mass % to 58 mass %, and especially preferably 55 mass % to 56 mass % relative to the total mass of the liquid crystal composition of the present invention in view of desired properties such as resistance to resolution at low temperature, transition temperature, electric reliability, birefringence, process adaptability, resistance to droplet stains and screen burn-in, and dielectric anisotropy.

The compound represented by General Formula (I-8) is preferably a compound selected from the group consisting of compounds represented by Formulae (9.1) to (9.10); and more preferably any of the compounds represented by Formulae (9.2), (9.4), and (9.7).

[Chem. 45]

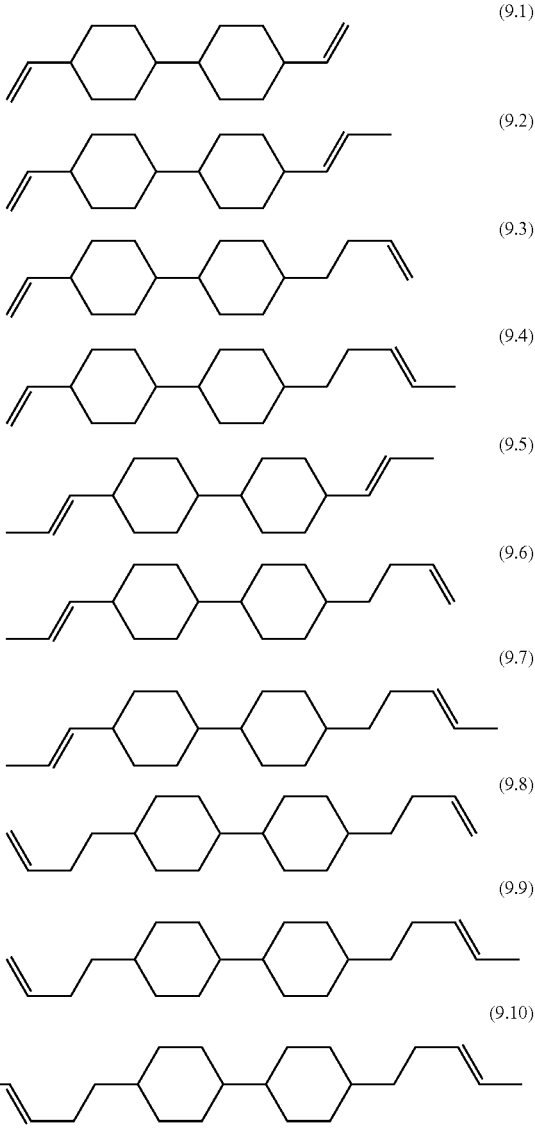

The compound represented by General Formula (L) is, for example, preferably a compound selected from compounds represented by General Formula (II).

[Chem. 46]

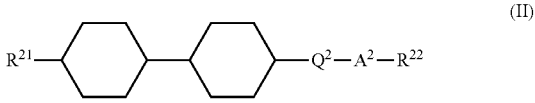

(II)

($R^{21}$ and $R^{22}$ each independently represent an alkenyl group having 2 to 5 carbon atoms, an alkyl group having 1 to 5 carbon atoms, or an alkoxy group having 1 to 4 carbon atoms; $A^2$ represents a 1,4-cyclohexylene group or a 1,4-phenylene group; and $Q^2$ represents a single bond, —COO—, —CH$_2$—CH$_2$—, or —CF$_2$O—.)

Such compounds represented by General Formula (II) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four or more of the compounds are used.

In the liquid crystal composition of the present invention, the amount of the compound represented by General Formula (II) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound is in the range of 3 to 50 mass % in an embodiment of the present invention; in another embodiment of the present invention, the amount is from 5 to 50 mass %; in another embodiment of the present invention, the amount is from 7 to 50 mass %; in another embodiment of the present invention, the amount is from 10 to 50 mass %; in another embodiment of the present invention, the amount is from 14 to 50 mass %; in another embodiment of the present invention, the amount is from 16 to 50 mass %; in another embodiment of the present invention, the amount is from 20 to 50 mass %; in another embodiment of the present invention, the amount is from 23 to 50 mass %; in another embodiment of the present invention, the amount is from 26 to 50 mass %; in another embodiment of the present invention, the amount is from 30 to 50 mass %; in another embodiment of the present invention, the amount is from 35 to 50 mass %; and in another embodiment of the present invention, the amount is from 40 to 50 mass %.

Furthermore, relative to the total mass of the liquid crystal composition of the present invention, for example, the amount of the compound is in the range of 3 to 50 mass % in an embodiment of the present invention; in another embodiment of the present invention, the amount is from 3 to 40 mass %; in another embodiment of the present invention, the amount is from 3 to 35 mass %; in another embodiment of the present invention, the amount is from 3 to 30 mass %; in another embodiment of the present invention, the amount is from 3 to 20 mass %; in another embodiment of the present invention, the amount is from 3 to 15 mass %; in another embodiment of the present invention, the amount is from 3 to 10 mass %; and in another embodiment of the present invention, the amount is from 3 to 5 mass %.

The compound represented by General Formula (II) is, for instance, preferably a compound selected from the group consisting of compounds represented by General Formula (II-1).

[Chem. 47]

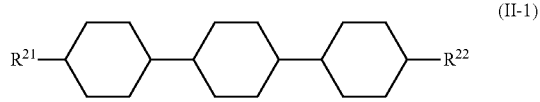

(II-1)

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

The amount of the compound represented by General Formula (II-1) is preferably adjusted on the basis of desired properties such as resistance to resolution at low temperature, transition temperature, electric reliability, and birefringence; the amount is preferably in the range of 4 mass % to 24 mass %, more preferably 8 mass % to 18 mass %, and further preferably 12 mass % to 14 mass %.

The compound represented by General Formula (II-1) is, for example, preferably any of compounds represented by Formulae (10.1) and (10.2).

[Chem. 48]

(10.1)

(10.2)

The compound represented by General Formula (II) is, for instance, preferably a compound selected from the group consisting of compounds represented by General Formula (II-2).

[Chem. 49]

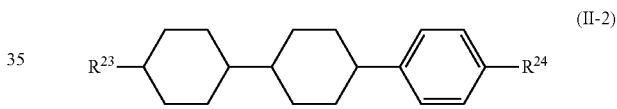

(II-2)

($R^{23}$ represents an alkenyl group having 2 to 5 carbon atoms, and $R^{24}$ represents an alkyl group having 1 to 5 carbon atoms or an alkoxy group having 1 to 4 carbon atoms.)

Such compounds represented by General Formula (II-2) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two or more of the compounds are used.

In the liquid crystal composition of the present invention, the amount of the compound represented by General Formula (II-2) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of the compound is in the range of 3 to 50 mass % in an embodiment of the present invention; in another embodiment of the present invention, the amount is from 5 to 50 mass %; in another embodiment of the present invention, the amount is from 7 to 50 mass %; in another embodiment of the present invention, the amount is from 10 to 50 mass %; in another embodiment of the present invention, the amount is from 14 to 50 mass %; in another embodiment of the present invention, the amount is from 16 to 50 mass %; in another embodiment of the present invention, the amount is from 20 to 50 mass %; in another embodiment of the present invention, the amount is from 23 to 50 mass %; in another embodiment of the present invention, the amount is from 26 to 50 mass %; in another embodiment of the present invention, the amount is from 30 to 50 mass %; in another embodiment of the present invention, the amount is from 35 to 50 mass %; and in another embodiment of the present invention, the amount is from 40 to 50 mass %.

Furthermore, relative to the total mass of the liquid crystal composition of the present invention, for instance, the amount of the compound is in the range of 3 to 50 mass % in an embodiment of the present invention; in another embodiment of the present invention, the amount is from 3 to 40 mass %; in another embodiment of the present invention, the amount is from 3 to 35 mass %; in another embodiment of the present invention, the amount is from 3 to 30 mass %; in another embodiment of the present invention, the amount is from 3 to 20 mass %; in another embodiment of the present invention, the amount is from 3 to 15 mass %; in another embodiment of the present invention, the amount is from 3 to 10 mass %; and in another embodiment of the present invention, the amount is from 3 to 5 mass %.

The compound represented by General Formula (II-2) is, for example, preferably any of compounds represented by Formulae (11.1) to (11.3).

[Chem. 50]

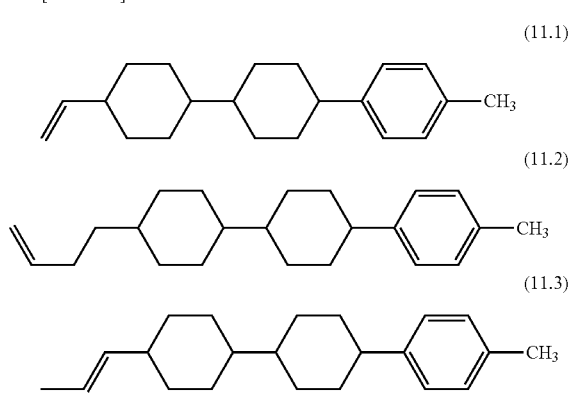

On the basis of desired properties such as resistance to resolution at low temperature, transition temperature, electric reliability, and birefringence, the compound represented by Formula (11.1) may be used, the compound represented by Formula (11.2) may be used, both of the compounds represented by Formulae (11.1) and (11.2) may be used, and all of the compounds represented by Formulae (11.1) to (11.3) may be used. The amount of the compound represented by Formula (11.1) or (11.2) is preferably in the range of 3 mass % to 40 mass %, more preferably 5 mass % to 35 mass %, further preferably 5 mass % to 30 mass %, especially preferably 5 mass % to 25 mass %, and most preferably 5 mass % to 20 mass % relative to the total mass of the liquid crystal composition of the present invention.

The amount of the compound represented by Formula (11.1) is preferably in the range of 1 mass % to 40 mass %, more preferably 2 mass % to 25 mass %, further preferably 3 mass % to 20 mass %, and especially preferably 5 mass % to 15 mass % relative to the total mass of the liquid crystal composition of the present invention.

In the especially preferred range, the amount may be from 5 to 10 mass %, from 5 to 8 mass %, from 8 to 15 mass %, from 10 to 15 mass %, or from 12 to 15 mass %.

The amount of the compound represented by Formula (11.2) is preferably in the range of 1 mass % to 40 mass %, more preferably 2 mass % to 30 mass %, further preferably 3 mass % to 20 mass %, and still further preferably 4 mass % to 15 mass % relative to the total mass of the liquid crystal composition of the present invention.

In the still further preferred range, the amount can be, for instance, from 4 mass % to 12 mass %, from 4 mass % to 8 mass %, from 4 mass % to 6 mass %, from 6 mass % to 15 mass %, from 8 mass % to 15 mass %, from 10 mass % to 15 mass %, or from 12 mass % to 15 mass %.

In the case where both of the compounds represented by Formulae (11.1) and (11.2) are used, the total mass of these compounds is preferably in the range of 10 mass % to 45 mass %, more preferably 10 mass % to 35 mass %, and further preferably 14 mass % to 23 mass % relative to the total mass of the liquid crystal composition of the present invention.

The compound represented by General Formula (II) is, for example, preferably a compound selected from the group consisting of compounds represented by General Formula (II-3).

[Chem. 51]

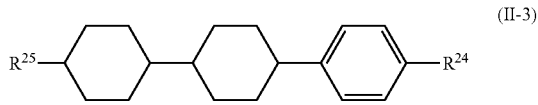

($R^{25}$ represents an alkyl group having 1 to 5 carbon atoms, and $R^{24}$ represents an alkyl group having 1 to 5 carbon atoms or an alkoxy group having 1 to 4 carbon atoms.)

Such compounds represented by General Formula (II-3) can be used in any combination; in view of desired properties such as resistance to resolution at low temperature, transition temperature, electric reliability, and birefringence, it is preferred that one to three of the compounds be used.

The amount of the compound represented by General Formula (II-3) needs to be appropriately adjusted on the basis of predetermined properties such as resistance to resolution at low temperature, transition temperature, electric reliability, birefringence, process adaptability, resistance to droplet stains and screen burn-in, and dielectric anisotropy. The preferred amount of the compound is, for example, from 2 to 45 mass % relative to the total mass of the liquid crystal composition of the present invention. The more preferred amount is, for instance, from 5 to 45 mass %, from 8 to 45 mass %, from 11 to 45 mass %, from 14 to 45 mass %, from 17 to 45 mass %, from 20 to 45 mass %, from 23 to 45 mass %, from 26 to 45 mass %, from 29 to 45 mass %, from 2 to 45 mass %, from 2 to 40 mass %, from 2 to 35 mass %, from 2 to 30 mass %, from 2 to 25 mass %, from 2 to 20 mass %, from 2 to 15 mass %, or from 2 to 10 mass %.

The compound represented by General Formula (II-3) is, for example, preferably any of compounds represented by Formulae (12.1) to (12.3).

[Chem. 52]

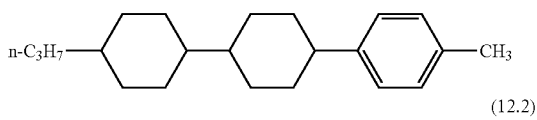

(12.1)

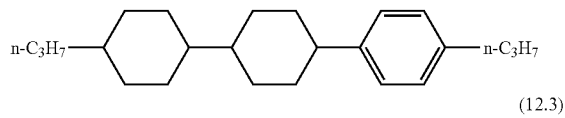

(12.2)

(12.3)

On the basis of desired properties such as resistance to resolution at low temperature, transition temperature, electric reliability, and birefringence, the compound represented by Formula (12.1) may be used, the compound represented by Formula (12.2) may be used, and both of the compounds represented by Formulae (12.1) and (12.2) may be used. The amount of the compound represented by Formula (12.1) or (12.2) is preferably in the range of 3 mass % to 40 mass % relative to the total mass of the liquid crystal composition of the present invention. The amount of the compound represented by Formula (12.2) is preferably in the range of 3 mass % to 40 mass % relative to the total mass of the liquid crystal composition of the present invention. In the case where both of the compounds represented by Formulae (12.1) and (12.2) are used, the total mass of these compounds is preferably in the range of 15 mass % to 45 mass % relative to the total mass of the liquid crystal composition of the present invention.

The amount of the compound represented by Formula (12.3) is preferably in the range of 0.05 mass % to 2 mass % relative to the total mass of the liquid crystal composition of the present invention. The compound represented by Formula (12.3) may be an optically active compound.

The compound represented by General Formula (II-3) is, for example, preferably a compound selected from the group consisting of compounds represented by General Formula (II-3-1).

[Chem. 53]

(II-3-1)

($R^{25}$ represents an alkyl group having 1 to 5 carbon atoms, and $R^{26}$ represents an alkoxy group having 1 to 4 carbon atoms.)

Such compounds represented by General Formula (II-3-1) can be used in any combination; in view of desired properties such as resistance to resolution at low temperature, transition temperature, electric reliability, and birefringence, it is preferred that one to three of the compounds be used.

The amount of the compound represented by General Formula (II-3-1) is preferably adjusted on the basis of predetermined properties such as resistance to resolution at low temperature, transition temperature, electric reliability, and birefringence; the amount is preferably in the range of 1 mass % to 24 mass %, more preferably 4 mass % to 18 mass %, and further preferably 8 mass % to 14 mass %.

The compound represented by General Formula (II-3-1) is, for instance, preferably any of compounds represented by Formulae (13.1) to (13.4), and especially preferably the compound represented by Formula (13.3).

[Chem. 54]

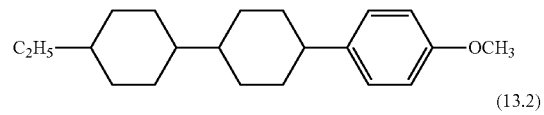

(13.1)

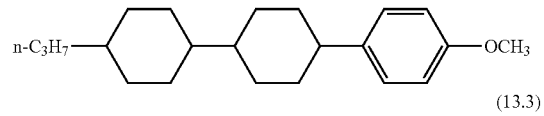

(13.2)

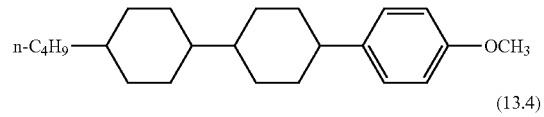

(13.3)

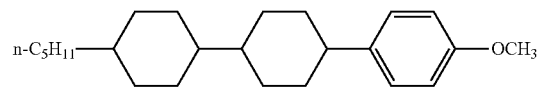

(13.4)

The compound represented by General Formula (L) is preferably a compound selected from the group consisting of compounds represented by General Formula (III).

[Chem. 55]

(III)

($R^{31}$ and $R^{32}$ each independently represent an alkenyl group having 2 to 5 carbon atoms, an alkyl group having 1 to 5 carbon atoms, or an alkoxy group having 1 to 4 carbon atoms.)

In view of desired properties such as birefringence and resistance to resolution, the amount of the compound represented by General Formula (III) is preferably in the range of 3 mass % to 25 mass %, more preferably 6 mass % to 20 mass %, and further preferably 8 mass % to 15 mass % relative to the total mass of the liquid crystal composition of the present invention.

The compound represented by General Formula (III) is, for instance, preferably a compound represented by Formula (15.1) or (15.2), and especially preferably the compound represented by Formula (15.1).

[Chem. 56]

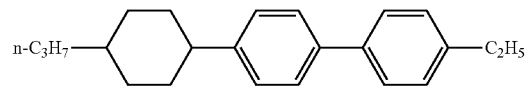

(15.1)

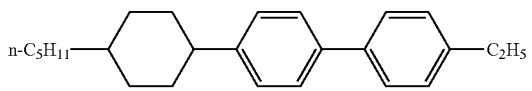

(15.2)

In the liquid crystal composition of the present invention, the amount of the compound represented by Formula (15.1) is preferably in the range of 1 mass % to 30 mass %, more preferably 1 mass % to 20 mass %, further preferably 1 mass % to 10 mass %, and especially preferably 2 mass % to 8 mass % relative to the total mass of the liquid crystal composition of the present invention in view of resistance to resolution at low temperature, transition temperature, electric reliability, and another property.

The compound represented by General Formula (III) is preferably a compound selected from the group consisting of compounds represented by General Formula (III-1).

[Chem. 57]

(III-1)

($R^{33}$ represents an alkenyl group having 2 to 5 carbon atoms, and $R^{32}$ each independently represents an alkyl group having 1 to 5 carbon atoms or an alkoxy group having 1 to 4 carbon atoms.)

The amount of the compound represented by General Formula (III-1) is preferably adjusted on the basis of desired properties such as resistance to resolution at low temperature, transition temperature, electric reliability, and birefringence; the amount is preferably in the range of 4 mass % to 23 mass %, more preferably 6 mass % to 18 mass %, and further preferably 10 mass % to 13 mass %.

The compound represented by General Formula (III-1) is, for example, preferably a compound represented by Formula (16.1) or (16.2).

[Chem. 58]

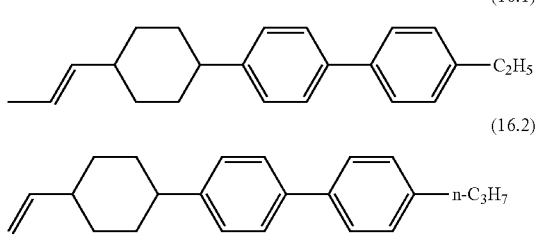

(16.1)

(16.2)

The compound represented by General Formula (III) is preferably a compound selected from the group consisting of compounds represented by General Formula (III-2).

[Chem. 59]

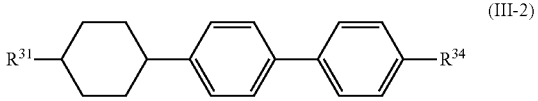

(III-2)

($R^{31}$ represents an alkyl group having 1 to 5 carbon atoms, and $R^{34}$ represents an alkoxy group having 1 to 4 carbon atoms.)

The amount of the compound represented by General Formula (III-2) is preferably adjusted on the basis of desired properties such as resistance to resolution at low temperature, transition temperature, electric reliability, and birefringence; the amount is preferably in the range of 4 mass % to 23 mass %, more preferably 6 mass % to 18 mass %, and further preferably 10 mass % to 13 mass %.

The compound represented by General Formula (III-2) is, for instance, preferably a compound selected from the group consisting of compounds represented by Formulae (17.1) to (17.3), and especially preferably the compound represented by Formula (17.3).

[Chem. 60]

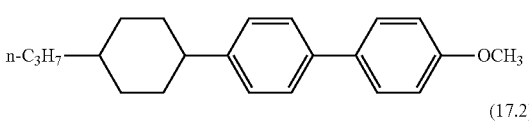

(17.1)

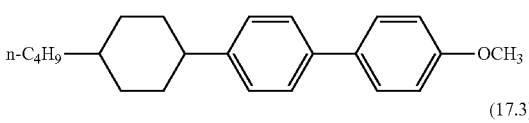

(17.2)

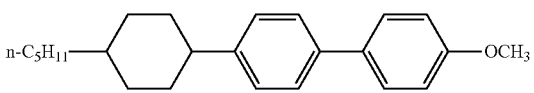

(17.3)

The compound represented by General Formula (L) is preferably a compound selected from the group consisting of compounds represented by General Formula (IV).

[Chem. 61]

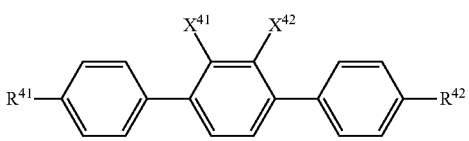

(IV)

(in the formula, $R^{41}$ and $R^{42}$ each independently represent an alkyl group having 1 to 5 carbon atoms or an alkenyl group having 2 to 5 carbon atoms, and $X^{41}$ and $X^{42}$ each independently represent a hydrogen atom or a fluorine atom.)

Such compounds represented by General Formula (IV) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

The compound represented by General Formula (IV) is, for instance, preferably a compound selected from the group consisting of compounds represented by General Formula (IV-1).

[Chem. 62]

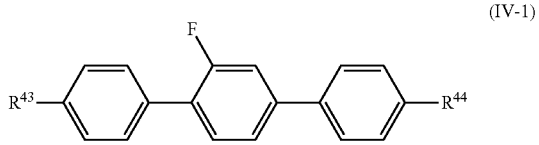

(IV-1)

(in the formula, $R^{43}$ and $R^{44}$ each independently represent an alkyl group having 1 to 5 carbon atoms.)

The amount of the compound represented by General Formula (IV-1) needs to be appropriately adjusted on the basis of desired properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound is in the range of 1 to 40 mass % in an embodiment; in another embodiment of the present invention, the amount is from 2 to 40 mass %; in another embodiment of the present invention, the amount is from 4 to 40 mass %; in another embodiment of the present invention, the amount is from 6 to 40 mass %; in another embodiment of the present invention, the amount is from 8 to 40 mass %; in another embodiment of the present invention, the amount is from 10 to 40 mass %; in another embodiment of the present invention, the amount is from 12 to 40 mass %; in another embodiment of the present invention, the amount is from 15 to 40 mass %; in another embodiment of the present invention, the amount is from 18 to 40 mass %; and in another embodiment of the present invention, the amount is from 21 to 40 mass %.

Moreover, relative to the total mass of the liquid crystal composition of the present invention, for instance, the amount of the compound is in the range of 1 to 40 mass % in an embodiment of the present invention; in another embodiment of the present invention, the amount is from 1 to 30 mass %; in another embodiment of the present invention, the amount is from 1 to 25 mass %; in another embodiment of the present invention, the amount is from 1 to 20 mass %; in another embodiment of the present invention, the amount is from 1 to 15 mass %; in another embodiment of the present invention, the amount is from 1 to 10 mass %; in another embodiment of the present invention, the amount is from 1 to 5 mass %; and in another embodiment of the present invention, the amount is from 1 to 4 mass %.

The compound represented by General Formula (IV-1) is, for instance, preferably any of compounds represented by Formulae (18.1) to (18.9).

[Chem. 63]

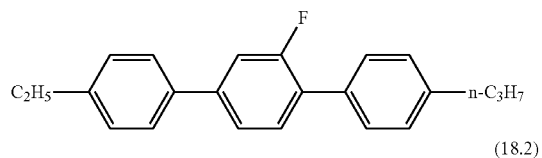

(18.1)

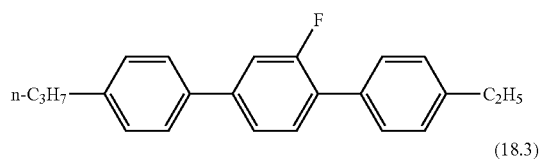

(18.2)

(18.3)

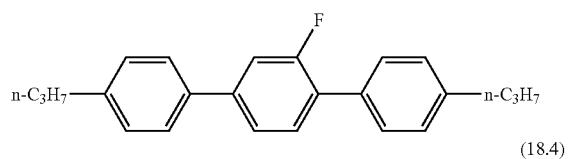

(18.4)

(18.5)

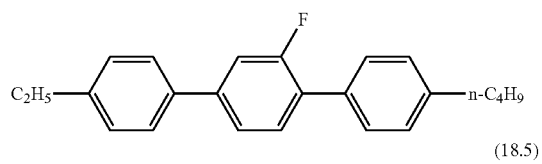

(18.6)

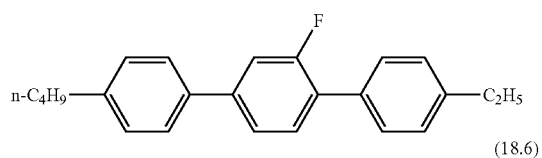

(18.7)

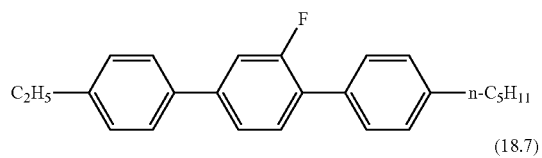

(18.8)

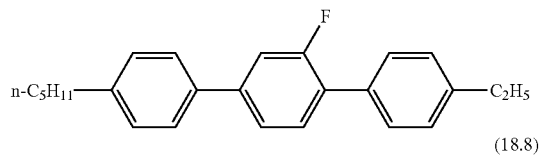

(18.9)

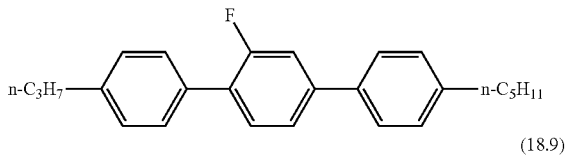

Such compounds can be used in any combination; one to three of the compounds are preferably used, and one to four of the compounds are more preferably used. Use of a compound having a broad molecular weight distribution is also effective for resistance to resolution; hence, a preferred example of use of these compounds is as follows: one compound is selected from the compounds represented by Formulae (18.1) and (18.2), one compound is selected from the compounds represented by Formulae (18.4) and (18.5), one compound is selected from the compounds represented by Formulae (18.6) and (18.7), one compound is selected from the compounds represented by Formulae (18.8) and (18.9), and a proper combination of the selected compounds is determined. In particular, it is preferred that the compound represented by Formula (18.1), the compound represented by Formula (18.3), the compound represented by Formula (18.4), the compound represented by Formula (18.6), and the compound represented by Formula (18.9) be used.

The compound represented by General Formula (IV) is, for example, preferably a compound selected from the group consisting of compounds represented by General Formula (IV-2).

[Chem. 64]

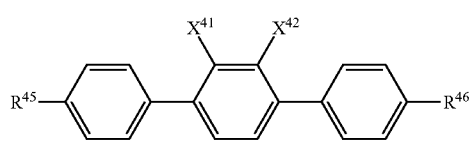

(IV-2)

(in the formula, $R^{45}$ and $R^{46}$ each independently represent an alkyl group having 1 to 5 carbon atoms or an alkenyl group having 2 to 5 carbon atoms, and at least one of them represents an alkenyl group having 2 to 5 carbon atoms; and $X^{41}$ and $X^{42}$ each independently represent a hydrogen atom or a fluorine atom.)

Such compounds represented by General Formula (IV-2) can be used in any combination; a combination of the compounds can be determined on the basis of desired properties such as resistance to resolution at low temperature, transition temperature, electric reliability, and birefringence.

The amount of the compound represented by General Formula (IV-2) needs to be appropriately adjusted on the basis of predetermined properties such as resistance to resolution at low temperature, transition temperature, electric reliability, birefringence, process adaptability, resistance to droplet stains and screen burn-in, and dielectric anisotropy. The amount of the compound is, for example, preferably in the range of 0.5 to 40 mass % relative to the total mass of the liquid crystal composition of the present invention. The amount can be, for instance, more preferably from 1 to 40 mass %, 2 to 40 mass %, 3 to 40 mass %, 5 to 40 mass %, 7 to 40 mass %, 9 to 40 mass %, 12 to 40 mass %, 15 to 40 mass %, 20 to 40 mass %, 1 to 40 mass %, 1 to 30 mass %, 1 to 25 mass %, 1 to 20 mass %, 1 to 15 mass %, 1 to 10 mass %, 1 to 5 mass %, or 1 to 4 mass %.

The compound represented by General Formula (IV-2) is, for instance, preferably any of compounds represented by Formulae (19.1) to (19.8), and more preferably the compound represented by Formula (19.2).

[Chem. 65]

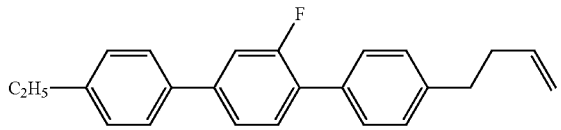

(19.1)

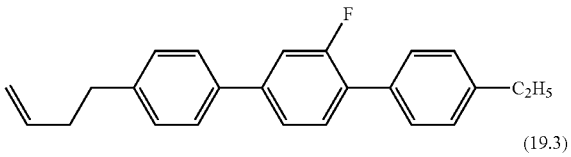

(19.2)

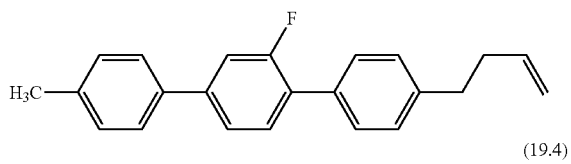

(19.3)

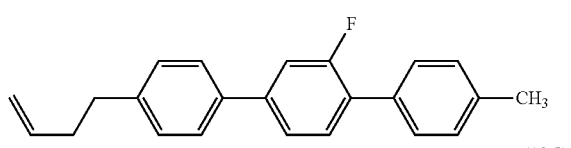

(19.4)

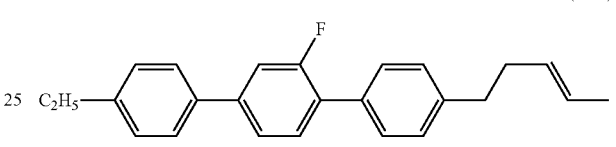

(19.5)

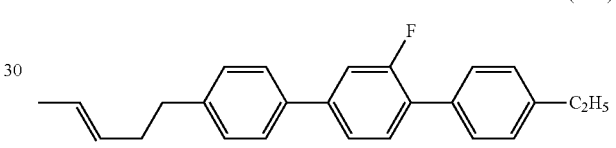

(19.6)

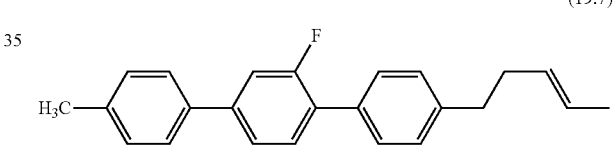

(19.7)

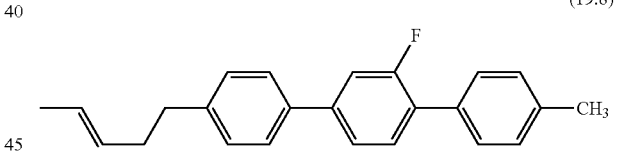

(19.8)

Use of a compound having a broad molecular weight distribution as a component of the liquid crystal composition is also effective for resistance to resolution; hence, a preferred example of use of these compounds is as follows: one compound is selected from the compounds represented by Formulae (19.1) and (19.2), one compound is selected from the compounds represented by Formulae (19.3) and (19.4), one compound is selected from the compounds represented by Formulae (19.5) and (19.6), one compound is selected from the compounds represented by Formulae (19.7) and (19.8), and a proper combination of these selected compounds is determined.

In the liquid crystal composition of the present invention, the amount of the compound represented by Formula (19.2) is preferably in the range of 0.5 mass % to 15 mass % relative to the total mass of the liquid crystal composition of the present invention in view of resistance to resolution at low temperature, transition temperature, electric reliability, and another property.

In the liquid crystal composition of the present invention, the amount of the compound represented by Formula (19.4)

is preferably in the range of 1 mass % to 25 mass %, more preferably 3 mass % to 20 mass %, further preferably 5 mass % to 15 mass %, and especially preferably 7 mass % to 13 mass % relative to the total mass of the liquid crystal composition of the present invention in view of resistance to resolution at low temperature, transition temperature, electric reliability, and another property.

The compound represented by General Formula (L) is preferably a compound selected from the group consisting of compounds represented by General Formula (V).

[Chem. 66]

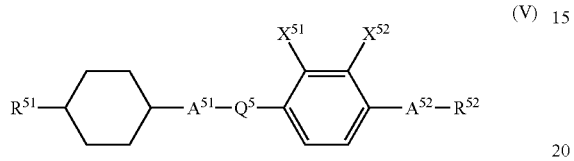

(V)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms; $A^{51}$ and $A^{52}$ each independently represent a 1,4-cyclohexylene group or a 1,4-phenylene group; $Q^5$ represents a single bond or —COO—; and $X^{51}$ and $X^{52}$ each independently represent a fluorine atom or a hydrogen atom.)

Such compounds represented by General Formula (V) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used.

Relative to the total mass of the liquid crystal composition of the present invention, for example, the amount of the compound is in the range of 2 to 40 mass % in an embodiment of the present invention; in another embodiment of the present invention, the amount is from 4 to 40 mass %; in another embodiment of the present invention, the amount is from 7 to 40 mass %; in another embodiment of the present invention, the amount is from 10 to 40 mass %; in another embodiment of the present invention, the amount is from 12 to 40 mass %; in another embodiment of the present invention, the amount is from 15 to 40 mass %; in another embodiment of the present invention, the amount is from 17 to 40 mass %; in another embodiment of the present invention, the amount is from 18 to 40 mass %; in another embodiment of the present invention, the amount is from 20 to 40 mass %; and in another embodiment of the present invention, the amount is from 22 to 40 mass %.

Furthermore, relative to the total mass of the liquid crystal composition of the present invention, for example, the amount of the compound is in the range of 2 to 40 mass % in an embodiment of the present invention; in another embodiment of the present invention, the amount of the compound is from 2 to 30 mass %; in another embodiment of the present invention, the amount of the compound is from 2 to 25 mass %; in another embodiment of the present invention, the amount of the compound is from 2 to 20 mass %; in another embodiment of the present invention, the amount of the compound is from 2 to 15 mass %; in another embodiment of the present invention, the amount of the compound is from 2 to 10 mass %; in another embodiment of the present invention, the amount of the compound is from 2 to 5 mass %; and in another embodiment of the present invention, the amount of the compound is from 2 to 4 mass %.

The compound represented by General Formula (V) is preferably a compound represented by General Formula (V-1).

[Chem. 67]

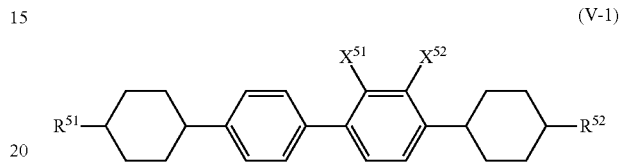

(V-1)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms; and $X^{51}$ and $X^{52}$ each independently represent a fluorine atom or a hydrogen atom.)

The compound represented by General Formula (V-1) is preferably any of compounds represented by General Formula (V-1-1).

[Chem. 68]

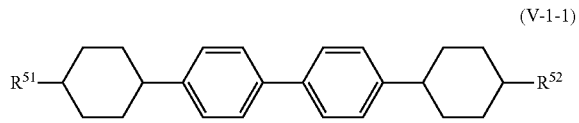

(V-1-1)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The amount of the compound represented by General Formula (V-1-1) is preferably in the range of 1 mass % to 15 mass %, more preferably 2 mass % to 15 mass %, further preferably 3 mass % to 10 mass %, and especially preferably 4 mass % to 8 mass % relative to the total mass of the liquid crystal composition of the present invention.

The compound represented by General Formula (V-1-1) is preferably any of compounds represented by Formulae (20.1) to (20.4), and more preferably the compound represented by Formula (20.2).

[Chem. 69]

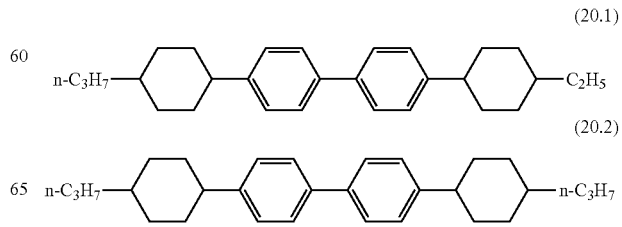

-continued

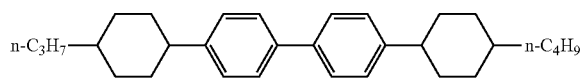
(20.3)

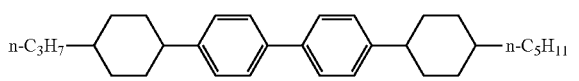
(20.4)

The amount of the compound represented by Formula (20.2) is preferably in the range of 1 mass % to 30 mass %, more preferably 1 mass % to 15 mass %, further preferably 1 mass % to 10 mass %, and especially preferably 2 mass % to 8 mass % relative to the total mass of the liquid crystal composition of the present invention in view of resistance to resolution at low temperature, transition temperature, electric reliability, birefringence, and another property.

Furthermore, the compound represented by General Formula (V-1-1) is also preferably any of compounds represented by Formulae (20.5) to (20.8). In particular, it is preferred that the compound represented by Formula (20.7) and/or the compound represented by Formula (20.8) be used in the liquid crystal composition of the present invention.

[Chem. 70]

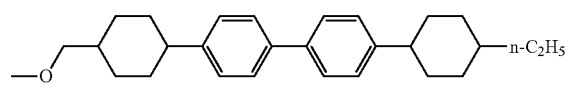
(20.5)

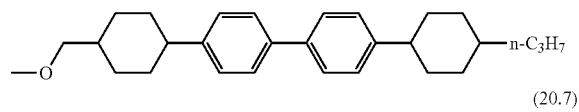
(20.6)

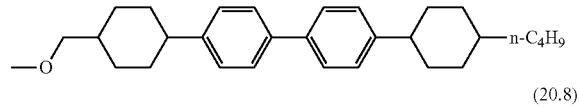
(20.7)

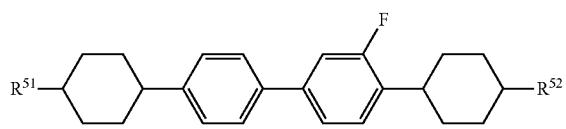
(20.8)

The amount of the compound represented by Formula (20.7) is preferably in the range of 1 mass % to 30 mass %, more preferably 1 mass % to 15 mass %, further preferably 1 mass % to 10 mass %, and especially preferably 2 mass % to 8 mass % relative to the total mass of the liquid crystal composition of the present invention in view of resistance to resolution at low temperature, transition temperature, electric reliability, birefringence, and another property.

The amount of the compound represented by Formula (20.8) is preferably in the range of 1 mass % to 30 mass %, more preferably 1 mass % to 15 mass %, further preferably 1 mass % to 10 mass %, and especially preferably 2 mass % to 8 mass % relative to the total mass of the liquid crystal composition of the present invention in view of resistance to resolution at low temperature, transition temperature, electric reliability, birefringence, and another property.

The total amount of the two compounds represented by Formulae (20.7) and (20.8) is preferably in the range of 1 mass % to 30 mass %, more preferably 3 mass % to 20 mass %, further preferably 5 mass % to 15 mass %, and especially preferably 7 mass % to 13 mass % relative to the total mass of the liquid crystal composition of the present invention in view of resistance to resolution at low temperature, transition temperature, electric reliability, birefringence, and another property.

The compound represented by General Formula (V-1) is preferably any of compounds represented by General Formula (V-1-2).

[Chem. 71]

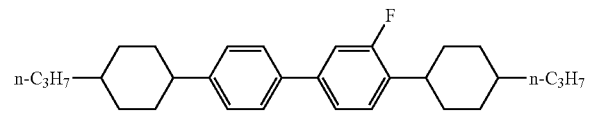
(V-1-2)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The amount of the compound represented by General Formula (V-1-2) is preferably in the range of 1 mass % to 15 mass %, more preferably 2 mass % to 15 mass %, further preferably 3 mass % to 10 mass %, and especially preferably 4 mass % to 8 mass % relative to the total mass of the liquid crystal composition of the present invention.

The compound represented by General Formula (V-1-2) is preferably any of compounds represented by Formulae (21.1) to (21.3), and more preferably the compound represented by Formula (21.1).

[Chem. 72]

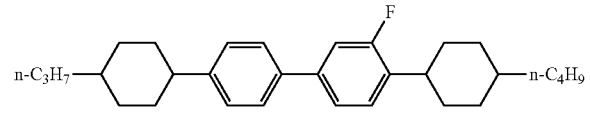
(21.1)

(21.2)

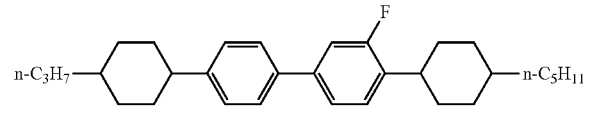
(21.3)

The compound represented by General Formula (V-1) is preferably any of compounds represented by General Formula (V-1-3).

[Chem. 73]

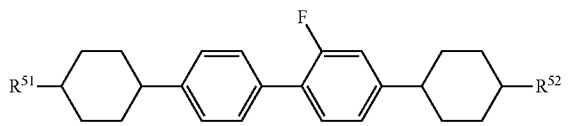
(V-1-3)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The amount of the compound represented by General Formula (V-1-3) is preferably in the range of 1 mass % to 15 mass %, more preferably 2 mass % to 15 mass %, further preferably 3 mass % to 10 mass %, and especially preferably 4 mass % to 8 mass % relative to the total mass of the liquid crystal composition of the present invention.

The compound represented by General Formula (V-1-3) is any of compounds represented by Formulae (22.1) to (22.3). The compound represented by Formula (22.1) is preferred.

[Chem. 74]

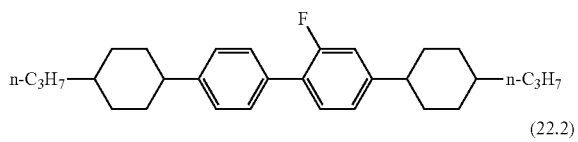
(22.1)

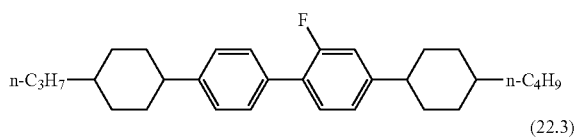
(22.2)

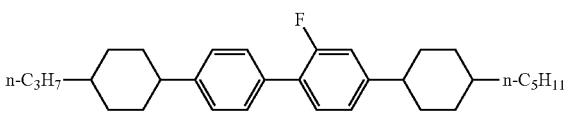
(22.3)

The compound represented by General Formula (V) is preferably any of compounds represented by General Formula (V-2).

[Chem. 75]

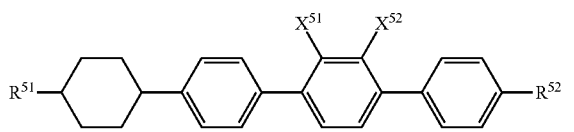
(V-2)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms; and $X^{51}$ and $X^{52}$ each independently represent a fluorine atom or a hydrogen atom.)

Such compounds represented by General Formula (V-2) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two or more of the compounds are used.

Relative to the total mass of the liquid crystal composition of the present invention, for instance, the amount of the compound is in the range of 2 to 40 mass % in an embodiment; in another embodiment of the present invention, the amount of the compound is from 4 to 40 mass %; in another embodiment of the present invention, the amount of the compound is from 7 to 40 mass %; in another embodiment of the present invention, the amount of the compound is from 10 to 40 mass %; in another embodiment of the present invention, the amount of the compound is from 12 to 40 mass %; in another embodiment of the present invention, the amount of the compound is from 15 to 40 mass %; in another embodiment of the present invention, the amount of the compound is from 17 to 40 mass %; in another embodiment of the present invention, the amount of the compound is from 18 to 40 mass %; in another embodiment of the present invention, the amount of the compound is from 20 to 40 mass %; and in another embodiment of the present invention, the amount of the compound is from 22 to 40 mass %.

Furthermore, relative to the total mass of the liquid crystal composition of the present invention, for instance, the amount of the compound is in the range of 2 to 40 mass % in an embodiment of the present invention; in another embodiment of the present invention, the amount of the compound is from 2 to 30 mass %; in another embodiment of the present invention, the amount of the compound is from 2 to 25 mass %; in another embodiment of the present invention, the amount of the compound is from 2 to 20 mass %; in another embodiment of the present invention, the amount of the compound is from 2 to 15 mass %; in another embodiment of the present invention, the amount of the compound is from 2 to 10 mass %; in another embodiment of the present invention, the amount of the compound is from 2 to 5 mass %; and in another embodiment of the present invention, the amount of the compound is from 2 to 4 mass %.

In an embodiment in which the liquid crystal composition of the present invention needs to have a high Tni, the amount of the compound represented by Formula (V-2) is preferably adjusted to be larger; in an embodiment in which the liquid crystal composition needs to have a low viscosity, the amount thereof is preferably adjusted to be smaller.

The compound represented by General Formula (V-2) is preferably any of compounds represented by General Formula (V-2-1).

[Chem. 76]

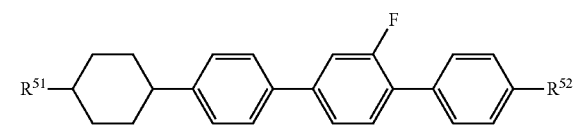
(V-2-1)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The compound represented by General Formula (V-2-1) is preferably any of compounds represented by Formulae (23.1) to (23.4), and more preferably the compound represented by Formula (23.1) or (23.2).

[Chem. 77]

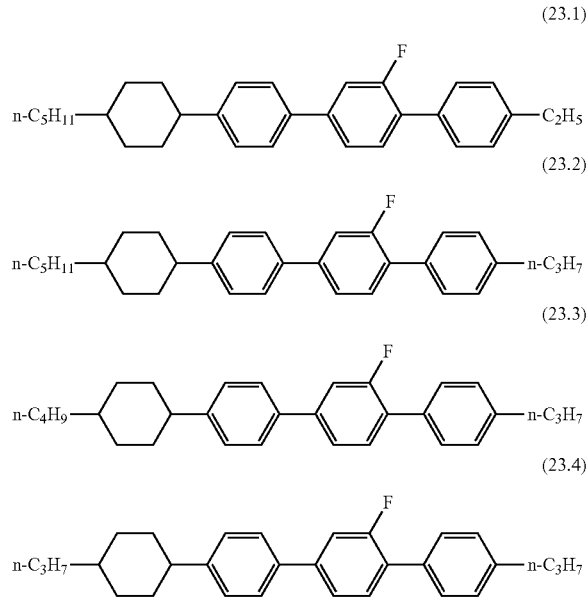

In the liquid crystal composition of the present invention, the amount of the compound represented by Formula (23.1) is preferably in the range of 1 mass % to 25 mass % relative to the total mass of the liquid crystal composition of the present invention in view of resistance to resolution at low temperature, transition temperature, electric reliability, and another property.

In the liquid crystal composition of the present invention, the amount of the compound represented by Formula (23.2) is preferably in the range of 1 mass % to 25 mass % relative to the total mass of the liquid crystal composition of the present invention in view of resistance to resolution at low temperature, transition temperature, electric reliability, and another property.

In the liquid crystal composition of the present invention, the total amount of the compounds represented by Formulae (23.1) and (23.2) is preferably in the range of 1 mass % to 25 mass % relative to the total mass of the liquid crystal composition of the present invention in view of resistance to resolution at low temperature, transition temperature, electric reliability, and another property.

The compound represented by General Formula (V-2) is preferably any of compounds represented by General Formula (V-2-2).

[Chem. 78]

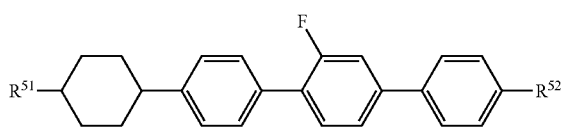

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The compound represented by General Formula (V-2-2) is preferably any of compounds represented by Formulae (24.1) to (24.4), and more preferably the compound represented by Formula (24.1) or (24.2).

[Chem. 79]

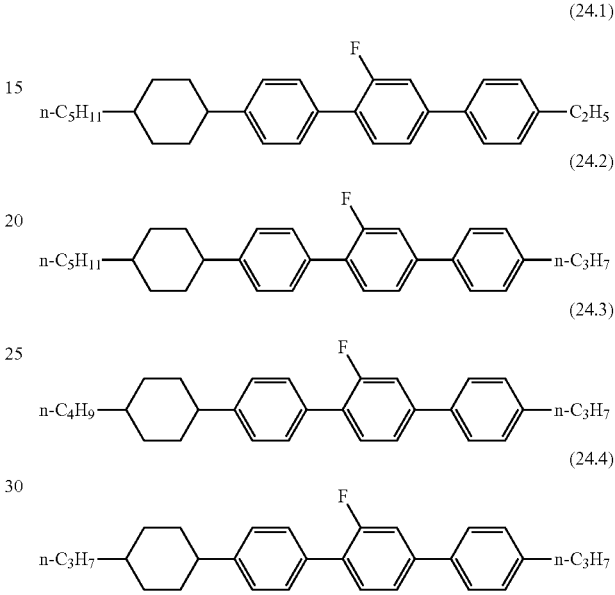

It is also preferred that the liquid crystal composition of the present invention contain at least any one of compounds represented by General Formula (M).

[Chem. 80]

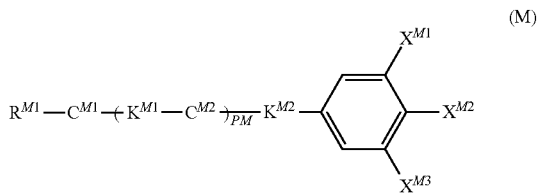

(in the formula, $R^{M1}$ represents an alkyl group having 1 to 8 carbon atoms, and one —$CH_2$— or at least two —$CH_2$— not adjoining each other in the alkyl group are each independently optionally substituted with —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of (d) a 1,4-cyclohexylene group (of which one —$CH_2$— or at least two —$CH_2$— not adjoining each other are optionally substituted with —O— or —S—) and (e) a 1,4-phenylene group (of which one —CH= moiety or at least two —CH= moieties not adjoining each other are optionally substituted with —N=), and the groups (d) and (e) are each independently optionally substituted with a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

in the case where PM is 2, 3, or 4 and where $K^{M1}$ is multiple, the $K^{M1}$ moieties are the same as or different from each other; in the case where PM is 2, 3, or 4 and where $C^{M2}$ is multiple, the $C^{M2}$ moieties are the same as or different from each other;

$X^{M1}$ and $X^{M3}$ each independently represent a hydrogen atom, a chlorine atom, or a fluorine atom;

$X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; and the compound represented by General Formula (M) excludes the compound represented by General Formula (ii).)

Such compounds represented by General Formula (M) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven or more of the compounds are used.

In the liquid crystal composition of the present invention, the amount of the compound represented by General Formula (M) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound is in the range of 1 to 95 mass % in an embodiment of the present invention; in another embodiment of the present invention, the amount of the compound is from 10 to 95 mass %; in another embodiment of the present invention, the amount of the compound is from 20 to 95 mass %; in another embodiment of the present invention, the amount of the compound is from 30 to 95 mass %; in another embodiment of the present invention, the amount of the compound is from 40 to 95 mass %; in another embodiment of the present invention, the amount of the compound is from 45 to 95 mass %; in another embodiment of the present invention, the amount of the compound is from 50 to 95 mass %; in another embodiment of the present invention, the amount of the compound is from 55 to 95 mass %; in another embodiment of the present invention, the amount of the compound is from 60 to 95 mass %; in another embodiment of the present invention, the amount of the compound is from 65 to 95 mass %; in another embodiment of the present invention, the amount of the compound is from 70 to 95 mass %; in another embodiment of the present invention, the amount of the compound is from 75 to 95 mass %; and in another embodiment of the present invention, the amount of the compound is from 80 to 95 mass %.

Moreover, relative to the total mass of the liquid crystal composition of the present invention, for example, the amount of the compound is in the range of 1 to 95 mass % in an embodiment of the present invention; in another embodiment of the present invention, the amount of the compound is from 1 to 85 mass %; in another embodiment of the present invention, the amount of the compound is from 1 to 75 mass %; in another embodiment of the present invention, the amount of the compound is from 1 to 65 mass %; in another embodiment of the present invention, the amount of the compound is from 1 to 55 mass %; in another embodiment of the present invention, the amount of the compound is from 1 to 45 mass %; in another embodiment of the present invention, the amount of the compound is from 1 to 35 mass %; and in another embodiment of the present invention, the amount of the compound is from 1 to 25 mass %.

In the case where the viscosity of the liquid crystal composition of the present invention needs to be kept at a low level for allowing the liquid crystal composition to contribute to a high response speed, it is preferred that the lower limit of the above-mentioned range be low and that the upper limit thereof be low. In the case where the Tni of the liquid crystal composition of the present invention needs to be kept at a high level to allow the liquid crystal composition to have a high temperature stability, it is preferred that the lower limit of the above-mentioned range be low and that the upper limit thereof be low. In order to increase dielectric anisotropy for keeping driving voltage at a low level, it is preferred that the lower limit of the above-mentioned range be high and that the upper limit thereof be high.

In the case where the ring structure bonded to $R^{M1}$ is a phenyl group (aromatic), $R^{M1}$ is preferably a linear alkyl group having 1 to 5 carbon atoms, a linear alkoxy group having 1 to 4 carbon atoms, or an alkenyl group having 4 or 5 carbon atoms; in the case where the ring structure bonded to $R^{M1}$ is a saturated ring such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

In the case where the liquid crystal composition needs to be chemically stable, it is preferred that the molecules of the compound represented by General Formula (M) be free from a chlorine atom. The amount of a chlorine-atom-containing compound in the liquid crystal composition is preferably not more than 5%, also preferably not more than 3%, also preferably not more than 1%, and also preferably not more than 0.5%; and it is also preferred that the liquid crystal composition be substantially free from a chlorine-atom-containing compound. The term "substantially free from a chlorine-atom-containing compound" refers to that only a compound unavoidably containing a chlorine atom, such as a compound generated as an impurity in production of another compound, is contained in the liquid crystal composition.

The compound represented by General Formula (M) is, for instance, preferably a compound selected from the group consisting of compounds represented by General Formula (VIII).

[Chem. 81]

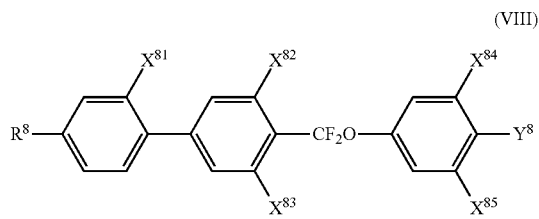

(VIII)

(in the formula, $R^8$ represents an alkyl group having 1 to 5 carbon atoms, an alkenyl group having 2 to 5 carbon atoms, or an alkoxy group having 1 to 4 carbon atoms; $X^{81}$ to $X^{85}$ each independently represent a hydrogen atom or a fluorine atom; and $Y^8$ represents a fluorine atom or $-OCF_3$.)

Such compounds represented by General Formula (VIII) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

In the liquid crystal composition of the present invention, the amount of the compound represented by General Formula (VIII) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound is in the range of 2 to 40 mass % in an embodiment of the present invention; in another embodiment of the present invention, the amount of the compound is from 4 to 40 mass %; in another embodiment of the present invention, the amount of the compound is from 5 to 40 mass %; in another embodiment of the present invention, the amount of the compound is from 6 to 40 mass %; in another embodiment of the present invention, the amount of the compound is from 7 to 40 mass %; in another embodiment of the present invention, the amount of the compound is from 8 to 40 mass %; in another embodiment of the present invention, the amount of the compound is from 9 to 40 mass %; in another embodiment of the present invention, the amount of the compound is from 10 to 40 mass %; in another embodiment of the present invention, the amount of the compound is from 11 to 40 mass %; in another embodiment of the present invention, the amount of the compound is from 12 to 40 mass %; in another embodiment of the present invention, the amount of the compound is from 14 to 40 mass %; in another embodiment of the present invention, the amount of the compound is from 15 to 40 mass %; in another embodiment of the present invention, the amount of the compound is from 21 to 40 mass %; and in another embodiment of the present invention, the amount of the compound is from 23 to 40 mass %.

Furthermore, relative to the total mass of the liquid crystal composition of the present invention, for example, the amount of the compound is in the range of 2 to 40 mass % in an embodiment of the present invention; in another embodiment of the present invention, the amount of the compound is from 2 to 30 mass %; in another embodiment of the present invention, the amount of the compound is from 2 to 25 mass %; in another embodiment of the present invention, the amount of the compound is from 2 to 21 mass %; in another embodiment of the present invention, the amount of the compound is from 2 to 16 mass %; in another embodiment of the present invention, the amount of the compound is from 2 to 12 mass %; in another embodiment of the present invention, the amount of the compound is from 2 to 8 mass %; and in another embodiment of the present invention, the amount of the compound is from 2 to 5 mass %.

In the case where the viscosity of the liquid crystal composition of the present invention needs to be kept at a low level for allowing the liquid crystal composition to contribute to a high response speed, it is preferred that the lower limit of the above-mentioned range be low and that the upper limit thereof be low. In the case where the Tni of the liquid crystal composition of the present invention needs to be kept at a high level to allow the liquid crystal composition to have a high temperature stability, it is preferred that the lower limit of the above-mentioned range be low and that the upper limit thereof be low. In order to increase dielectric anisotropy for keeping driving voltage at a low level, it is preferred that the lower limit of the above-mentioned range be high and that the upper limit thereof be high.

The compound represented by General Formula (VIII) is preferably any of compounds represented by General Formula (VIII-1).

[Chem. 82]

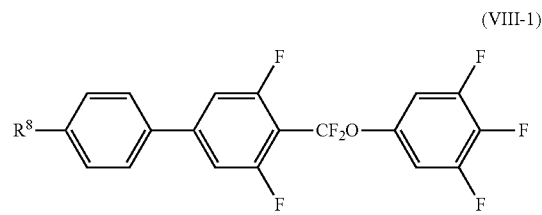

(VIII-1)

(in the formula, $R^8$ represents an alkyl group having 1 to 5 carbon atoms, an alkenyl group having 2 to 5 carbon atoms, or an alkoxy group having 1 to 4 carbon atoms.)

Such compounds represented by General Formula (VIII-1) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two or more of the compounds are used.

In particular, the compound represented by General Formula (VIII-1) is preferably any of compounds represented by Formulae (26.1) to (26.4), more preferably the compound represented by Formula (26.1) or (26.2), and further preferably the compound represented by Formula (26.2).

[Chem. 83]

(26.1)
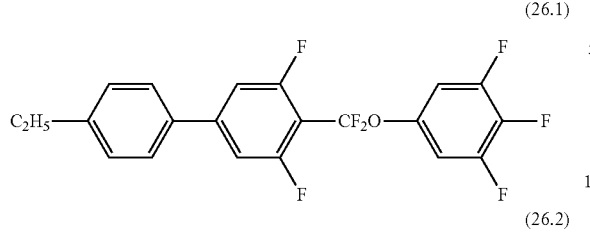

(26.2)
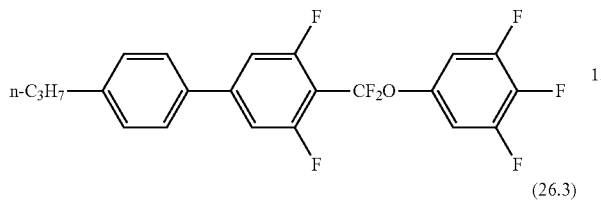

(26.3)
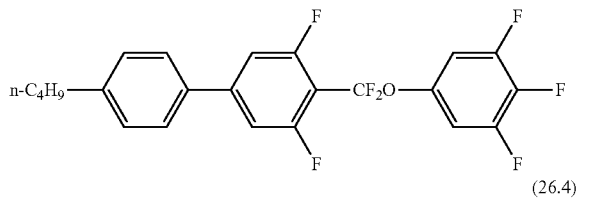

(26.4)
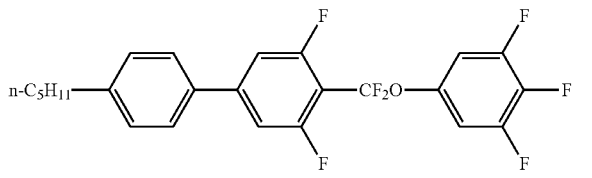

The amount of the compound represented by Formula (26.1) is preferably in the range of 1 mass % to 40 mass %, more preferably 1 mass % to 20 mass %, further preferably 1 mass % to 10 mass %, and still further preferably 1 mass % to 5 mass % relative to the total mass of the liquid crystal composition of the present invention in view of resistance to resolution at low temperature, transition temperature, electric reliability, birefringence, and another property.

The amount of the compound represented by Formula (26.2) is preferably in the range of 1 mass % to 30 mass %, more preferably 2 mass % to 25 mass %, further preferably 3 mass % to 20 mass %, and especially preferably 4 mass % to 15 mass % relative to the total mass of the liquid crystal composition of the present invention in view of resistance to resolution at low temperature, transition temperature, electric reliability, birefringence, and another property.

In the especially preferred range, the amount may be from 4 mass % to 10 mass %, from 4 mass % to 7 mass %, from 4 mass % to 6 mass %, from 4 mass % to 5 mass %, from 5 mass % to 15 mass %, from 6 mass % to 15 mass %, from 7 mass % to 15 mass %, or from 10 mass % to 15 mass %.

The total amount of the compounds represented by Formulae (26.1) and (26.2) is preferably in the range of 1 to 40 mass %, more preferably 3 to 30 mass %, further preferably 5 to 20 mass %, and especially preferably 8 to 16 mass % relative to the total mass of the liquid crystal composition of the present invention.

The compound represented by General Formula (VIII) is preferably any of compounds represented by General Formula (VIII-2).

[Chem. 84]

(VIII-2)
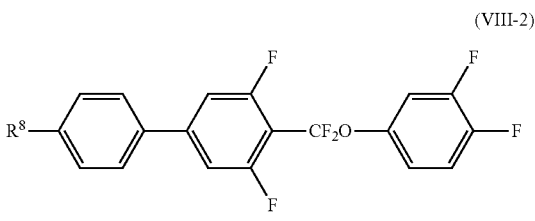

(in the formula, $R^8$ represents an alkyl group having 1 to 5 carbon atoms, an alkenyl group having 2 to 5 carbon atoms, or an alkoxy group having 1 to 4 carbon atoms.)

Such compounds represented by General Formula (VIII-2) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

The amount of the compound represented by General Formula (VIII-2) is preferably in the range of 2.5 mass % to 25 mass %, more preferably 8 mass % to 25 mass %, further preferably 10 mass % to 20 mass %, and further preferably 12 mass % to 15 mass % in view of resistance to resolution at low temperature, transition temperature, electric reliability, birefringence, and another property.

The compound represented by General Formula (VIII-2) is preferably any of compounds represented by Formulae (27.1) to (27.4), and more preferably the compound represented by Formula (27.2).

[Chem. 85]

(27.1)
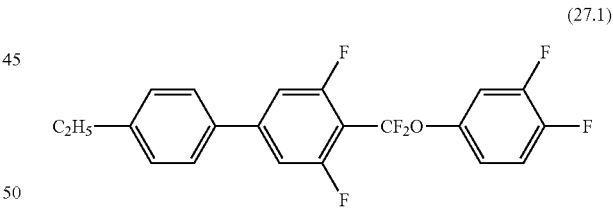

(27.2)
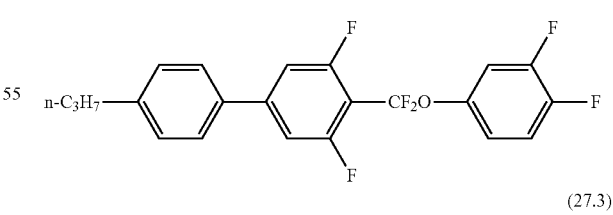

(27.3)
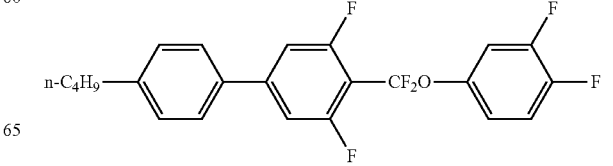

(27.4)

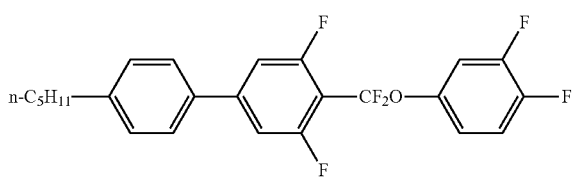

The compound represented by General Formula (VIII) is preferably any of compounds represented by General Formula (VIII-3).

[Chem. 86]

(VIII-3)

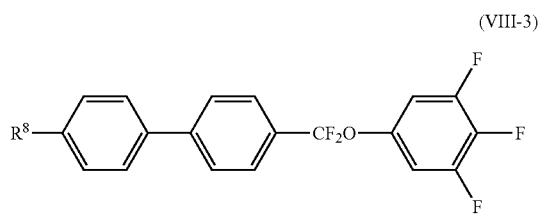

(in the formula, $R^8$ represents an alkyl group having 1 to 5 carbon atoms, an alkenyl group having 2 to 5 carbon atoms, or an alkoxy group having 1 to 4 carbon atoms.)

Such compounds represented by General Formula (VIII-3) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two or more of the compounds are used.

In particular, the compound represented by General Formula (VIII-3) is preferably any of compounds represented by Formulae (26.11) to (26.14), more preferably the compound represented by Formula (26.11) or (26.12), and further preferably the compound represented by Formula (26.12).

[Chem. 87]

(26.11)

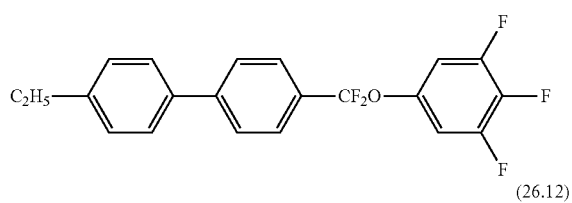

(26.12)

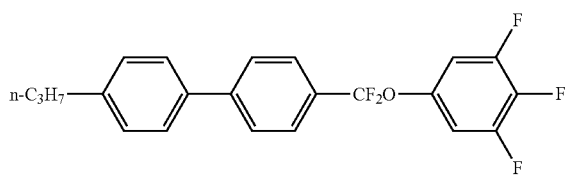

(26.13)

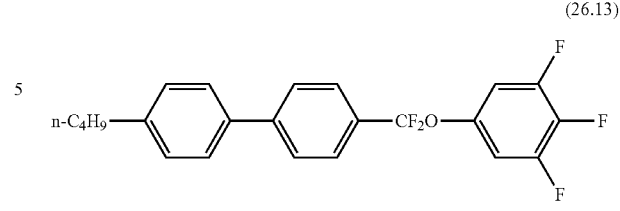

(26.14)

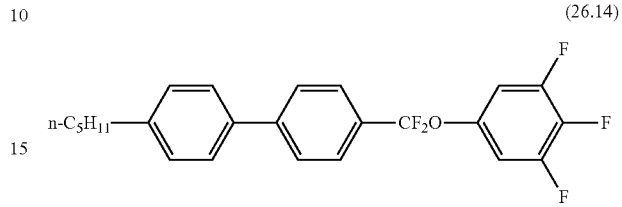

The compound represented by General Formula (M) is, for instance, preferably a compound selected from the group consisting of compounds represented by General Formula (IX). The compound represented by General Formula (IX), however, excludes the compound represented by General Formula (i).

[Chem. 88]

(IX)

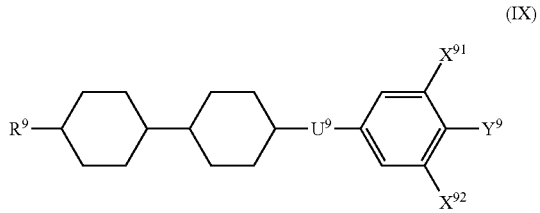

(in the formula, $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; $Y^9$ represents a fluorine atom, a chlorine atom, or —$OCF_3$; and $U^9$ represents a single bond, —COO—, or —$CF_2O$—.)

Such compounds represented by General Formula (IX) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

In the liquid crystal composition of the present invention, the amount of the compound represented by General Formula (IX) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound is in the range of 3 to 70 mass % in an embodiment of the present invention; in another embodiment of the present invention, the amount of the compound is from 5 to 70 mass %; in another embodiment of the present invention, the amount of the compound is from 8 to 70 mass %; in another embodiment of the present invention, the amount of the compound is from 10 to 70 mass %; in another embodiment of the present invention, the amount of the compound is from 12 to 70 mass %; in another embodiment of the present invention, the amount of the compound is from 15 to 70 mass %; in another embodiment of the present invention, the amount of the compound is from 17 to 70 mass %; in another embodiment of the present invention, the amount of the compound is from 20 to 70 mass %; in another embodiment of the present invention, the amount of the compound is from 24 to 70 mass %; in another embodiment of the present invention, the amount of the compound is from 28 to 70 mass %; in another embodiment of the present invention, the amount of the compound is from 30 to 70 mass %; in another embodiment of the present invention, the amount of the compound is from 34 to 70 mass %; in another embodiment of the present invention, the amount of the compound is from 39 to 70 mass %; in another embodiment of the present invention, the amount of the compound is from 40 to 70 mass %; in another embodiment of the present invention, the amount of the compound is from 42 to 70 mass %; and in another embodiment of the present invention, the amount of the compound is from 45 to 70 mass %.

Furthermore, relative to the total mass of the liquid crystal composition of the present invention, for example, the amount of the compound is in the range of 3 to 70 mass % in an embodiment of the present invention; in another embodiment of the present invention, the amount of the compound is from 3 to 60 mass %; in another embodiment of the present invention, the amount of the compound is from 3 to 55 mass %; in another embodiment of the present invention, the amount of the compound is from 3 to 50 mass %; in another embodiment of the present invention, the amount of the compound is from 3 to 45 mass %; in another embodiment of the present invention, the amount of the compound is from 3 to 40 mass %; in another embodiment of the present invention, the amount of the compound is from 3 to 35 mass %; in another embodiment of the present invention, the amount of the compound is from 3 to 30 mass %; in another embodiment of the present invention, the amount of the compound is 25 mass %; in another embodiment of the present invention, the amount of the compound is from 3 to 20 mass %; in another embodiment of the present invention, the amount of the compound is from 3 to 15 mass %; and in another embodiment of the present invention, the amount of the compound is from 3 to 10 mass %.

In the case where the viscosity of the liquid crystal composition of the present invention needs to be kept at a low level for allowing the liquid crystal composition to contribute to a high response speed, it is preferred that the lower limit of the above-mentioned range be low and that the upper limit thereof be low. In the case where the Tni of the liquid crystal composition of the present invention needs to be kept at a high level for allowing the liquid crystal composition to serve for a reduction in screen burn-in, it is preferred that the lower limit of the above-mentioned range be low and that the upper limit thereof be low. In order to increase dielectric anisotropy for keeping driving voltage at a low level, it is preferred that the lower limit of the above-mentioned range be high and that the upper limit thereof be high.

The compound represented by General Formula (IX) is preferably any of compounds represented by General Formula (IX-1).

[Chem. 89]

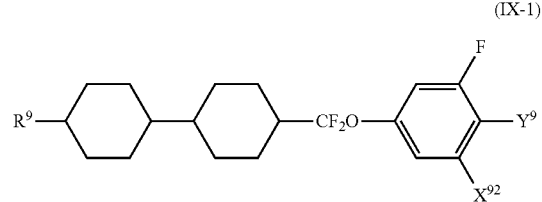

(IX-1)

(in the formula, $R^9$ represents an alkyl group having 1 to 5 carbon atoms, an alkenyl group having 2 to 5 carbon atoms, or an alkoxy group having 1 to 4 carbon atoms; $X^{92}$ represents a hydrogen atom or a fluorine atom; and $Y^9$ represents a fluorine atom or $-OCF_3$.)

Such compounds represented by General Formula (IX-1) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four or more of the compounds are used.

The compound represented by General Formula (IX-1) is preferably any of compounds represented by General Formula (IX-1-1).

[Chem. 90]

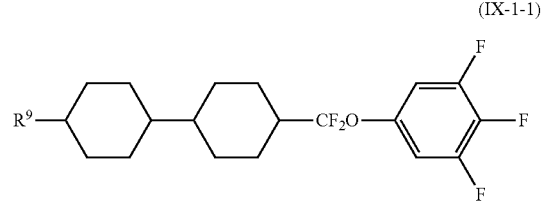

(IX-1-1)

(in the formula, $R^9$ represents an alkyl group having 1 to 5 carbon atoms, an alkenyl group having 2 to 5 carbon atoms, or an alkoxy group having 1 to 4 carbon atoms.)

Such compounds represented by General Formula (IX-1-1) can be used in any combination; a combination of the compounds can be determined on the basis of desired properties such as resistance to resolution at low temperature, transition temperature, electric reliability, and birefringence. In an embodiment of the present invention, for example, one of such compounds is used. In another embodiment of the present invention, two of the compounds are used.

The suitable upper limit and lower limit of the amount of the compound represented by General Formula (IX-1-1) relative to the total mass of the liquid crystal composition of the present invention are determined for an embodiment in view of resistance to resolution at low temperature, transition temperature, electric reliability, birefringence, and another property.

Relative to the total mass, the amount of the compound is in the range of 1 to 40 mass % in an embodiment, 1 to 35 mass % in another embodiment, 1 to 30 mass % in another embodiment, 1 to 25 mass % in another embodiment, 1 to 10 mass % in another embodiment, 1 to 7 mass % in another embodiment, and 1 to 5 mass % in another embodiment.

The compound represented by General Formula (IX-1-1) is preferably any of compounds represented by Formulae (28.1) to (28.5). It is preferred that any one or two of the compounds represented by Formulae (28.3) and (28.5) be used in the liquid crystal composition.

[Chem. 91]

(28.1)

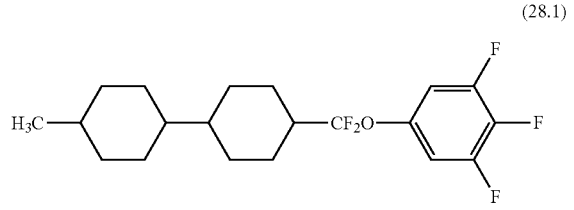

(28.2)

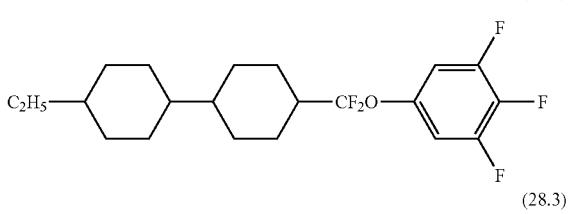

(28.3)

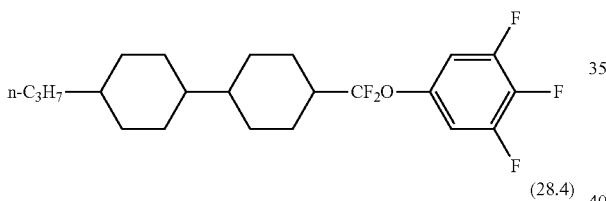

(28.4)

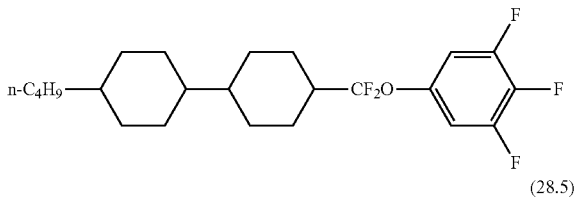

(28.5)

In the liquid crystal composition of the present invention, the amount of the compound represented by Formula (28.3) is preferably in the range of 1 mass % to 30 mass %, more preferably 1 mass % to 20 mass %, further preferably 1 mass % to 15 mass %, and especially preferably 2 mass % to 10 mass % relative to the total mass of the liquid crystal composition in view of resistance to resolution at low temperature, transition temperature, electric reliability, and another property.

In the especially preferred range, the amount may be from 2 mass % to 8 mass %, from 2 mass % to 7 mass %, from 2 mass % to 5 mass %, from 5 mass % to 10 mass %, from 7 mass % to 10 mass %, from 8 mass % to 10 mass %, or from 9 mass % to 10 mass %.

In the liquid crystal composition of the present invention, the amount of the compound represented by Formula (28.5) is preferably in the range of 1 mass % to 30 mass %, more preferably 2 mass % to 20 mass %, further preferably 3 mass % to 15 mass %, and especially preferably 5 mass % to 10 mass % relative to the total mass of the liquid crystal composition in view of resistance to resolution at low temperature, transition temperature, electric reliability, and another property.

In the especially preferred range, the amount may be from 5 mass % to 7 mass % or from 8 mass % to 10 mass %.

In the liquid crystal composition of the present invention, the total amount of the compounds represented by Formulae (28.3) and (28.5) is preferably in the range of 5 mass % to 35 mass %, more preferably 10 mass % to 25 mass %, and further preferably 15 mass % to 18 mass % relative to the total mass of the liquid crystal composition.

In the further preferred range, the amount may be from 15 mass % to 16 mass % or from 17 mass % to 18 mass %.

In the case where the liquid crystal composition contains the compounds represented by Formulae (28.3) and (28.5), the amount of the compound represented by Formula (28.3) may be larger than the amount of the other one, or the amount of the compound represented by Formula (28.5) may be larger than the amount of the other one; in order to enhance the Tni of the liquid crystal composition, it is preferred that the amount of the compound represented by Formula (28.5) be larger than the amount of the other one.

The compound represented by General Formula (IX-1) is preferably any of compounds represented by General Formula (IX-1-2).

[Chem. 92]

(IX-1-2)

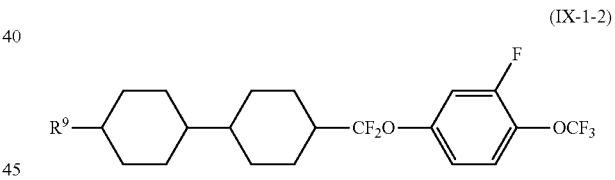

(in the formula, $R^9$ represents an alkyl group having 1 to 5 carbon atoms, an alkenyl group having 2 to 5 carbon atoms, or an alkoxy group having 1 to 4 carbon atoms.)

Such compounds represented by General Formula (IX-1-2) can be used in any combination; in view of resistance to resolution at low temperature, transition temperature, electric reliability, birefringence, and another property, one to three of the compounds are preferably used, and one to four of the compounds are more preferably used.

The amount of the compound represented by General Formula (IX-1-2) is preferably in the range of 1 mass % to 30 mass %, more preferably 5 mass % to 30 mass %, further preferably 8 mass % to 30 mass %, further preferably 10 mass % to 25 mass %, further preferably 14 mass % to 22 mass %, and especially preferably 16 mass % to 20 mass % relative to the total mass of the liquid crystal composition of the present invention in view of resistance to resolution at low temperature, transition temperature, electric reliability, and another property.

The compound represented by General Formula (IX-1-2) is preferably any of compounds represented by Formulae (29.1) to (29.4), and more preferably the compound represented by Formula (29.2) or (29.4).

[Chem. 93]

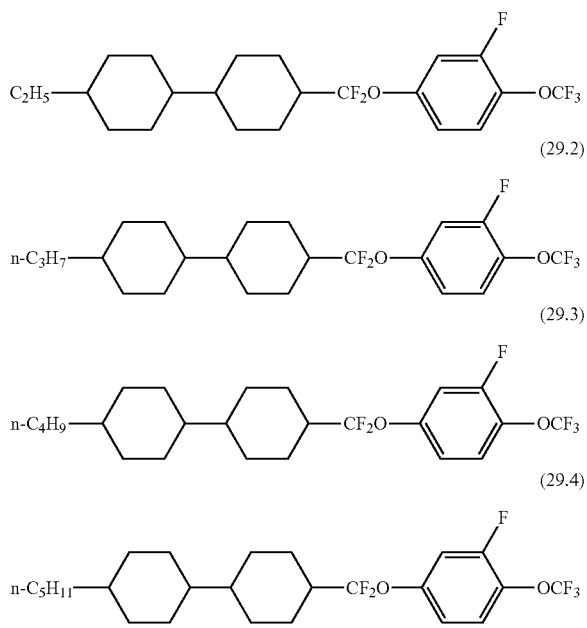

The compound represented by General Formula (IX) is preferably any of compounds represented by General Formula (IX-2).

[Chem. 94]

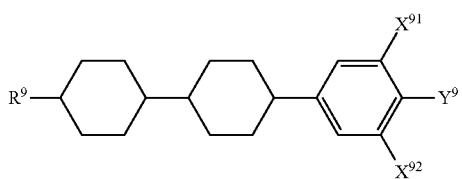

(in the formula, $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; and $Y^9$ represents a fluorine atom, a chlorine atom, or —$OCF_3$.)

Such compounds represented by General Formula (IX-2) can be used in any combination; a proper combination of the compounds for an embodiment can be determined in view of resistance to resolution at low temperature, transition temperature, electric reliability, birefringence, and another property. For example, one of such compounds is used in an embodiment of the present invention; two of the compounds are used in another embodiment, three of the compounds are used in another embodiment, four of the compounds are used in another embodiment, five of the compounds are used in another embodiment, and six or more of the compounds are used in another embodiment.

[Chem. 95]

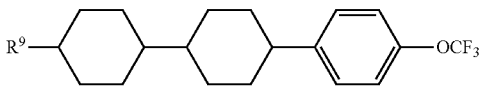

(in the formula, $R^9$ represents an alkyl group having 1 to 5 carbon atoms, an alkenyl group having 2 to 5 carbon atoms, or an alkoxy group having 1 to 4 carbon atoms.)

Such compounds represented by General Formula (IX-2-2) can be used in any combination; in view of resistance to resolution at low temperature, transition temperature, electric reliability, birefringence, and another property, one to three of the compounds are preferably used, and one to four of the compounds are more preferably used.

The upper limit and lower limit of the amount of the compound represented by General Formula (IX-2-2) are determined for an embodiment in view of properties such as resistance to resolution at low temperature, transition temperature, electric reliability, and birefringence. Relative to the total mass of the liquid crystal composition of the present invention, for example, the amount of the compound is in the range of 1 to 40 mass % in an embodiment of the present invention; in another embodiment, the amount of the compound is from 2 to 40 mass %; in another embodiment, the amount of the compound is from 4 to 40 mass %; in another embodiment, the amount of the compound is from 10 to 40 mass %; in another embodiment, the amount of the compound is from 14 to 40 mass %; in another embodiment, the amount of the compound is from 16 to 40 mass %; and in another embodiment, the amount of the compound is from 21 to 40 mass %.

Furthermore, relative to the total mass, for instance, the amount of the compound is in the range of 1 to 40 mass % in an embodiment of the present invention; in another embodiment, the amount of the compound is from 1 to 35 mass %; in another embodiment, the amount of the compound is from 1 to 30 mass %; in another embodiment, the amount of the compound is from 1 to 25 mass %; in another embodiment, the amount of the compound is from 1 to 22 mass %; in another embodiment, the amount of the compound is from 1 to 15 mass %; in another embodiment, the amount of the compound is from 1 to 12 mass %; in another embodiment, the amount of the compound is from 1 to 8 mass %; and in another embodiment, the amount of the compound is from 1 to 4 mass %.

The compound represented by General Formula (IX-2-2) is preferably any of compounds represented by Formulae (31.1) to (31.4), more preferably any of the compounds represented by Formulae (31.2) to (31.4), and further preferably the compound represented by Formula (31.2).

[Chem. 96]

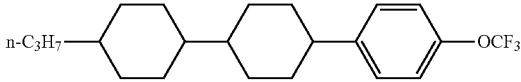

-continued

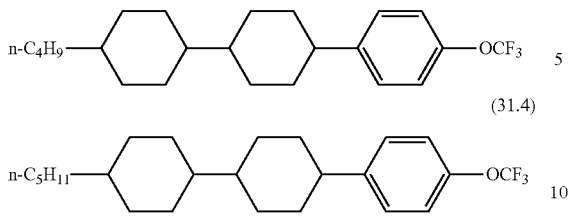

(31.3)

(31.4)

In the liquid crystal composition of the present invention, the amount of the compound represented by Formula (31.2) is preferably in the range of 1 mass % to 35 mass %, more preferably 2 mass % to 20 mass %, further preferably 3 mass % to 10 mass %, and especially preferably 5 mass % to 8 mass % relative to the total mass of the liquid crystal composition of the present invention.

In the especially preferred range, the amount may be from 5 mass % to 6 mass % or from 7 mass % to 8 mass %.

In the liquid crystal composition of the present invention, the amount of the compound represented by Formula (31.4) is preferably in the range of 1 mass % to 35 mass %, more preferably 1 mass % to 20 mass %, further preferably 1 mass % to 10 mass %, and especially preferably 1 mass % to 5 mass % relative to the total mass of the liquid crystal composition of the present invention.

In the liquid crystal composition of the present invention, the total amount of the compounds represented by Formulae (31.2) and (31.4) is preferably in the range of 2 mass % to 35 mass %, more preferably 5 mass % to 25 mass %, and further preferably 7 mass % to 15 mass % relative to the total mass of the liquid crystal composition of the present invention.

The compound represented by General Formula (IX-2) is preferably any of compounds represented by General Formula (IX-2-4).

[Chem. 97]

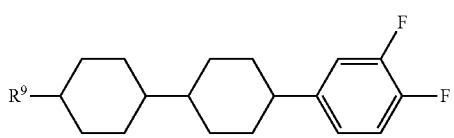

(IX-2-4)

(in the formula, $R^9$ represents an alkyl group having 1 to 5 carbon atoms, an alkenyl group having 2 to 5 carbon atoms, or an alkoxy group having 1 to 4 carbon atoms.)

The amount of the compound represented by General Formula (IX-2-4) is preferably in the range of 1 mass % to 30 mass %, more preferably 3 mass % to 20 mass %, further preferably 6 mass % to 15 mass %, and especially preferably 8 mass % to 10 mass % relative to the total mass of the liquid crystal composition of the present invention in view of resistance to resolution at low temperature, transition temperature, electric reliability, and another property.

The compound represented by General Formula (IX-2-4) is preferably any of compounds represented by Formulae (33.1) to (33.5), and more preferably the compound represented by Formula (33.1) and/or the compound represented by Formula (33.3).

[Chem. 98]

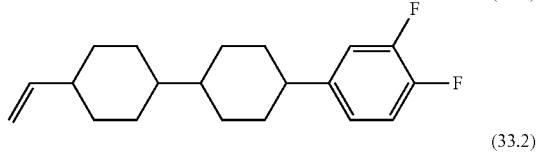

(33.1)

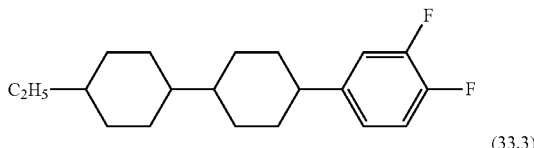

(33.2)

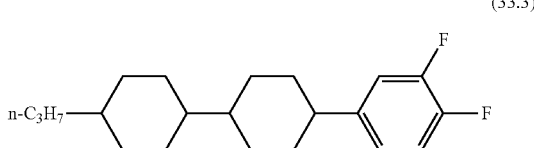

(33.3)

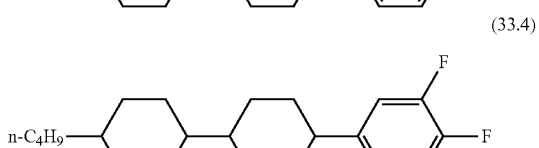

(33.4)

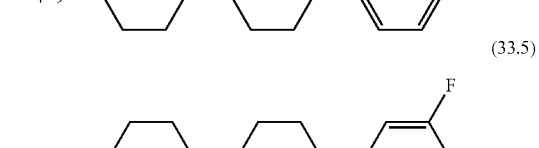

(33.5)

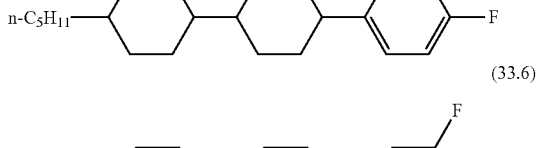

(33.6)

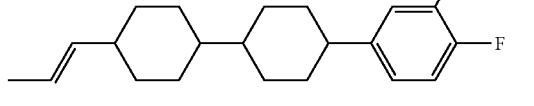

The compound represented by General Formula (IX-2) is preferably any of compounds represented by General Formula (IX-2-5).

[Chem. 99]

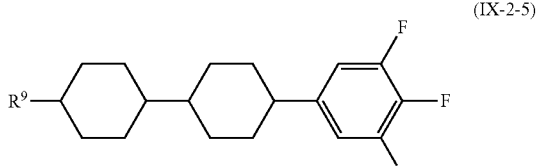

(IX-2-5)

(in the formula, $R^9$ represents an alkyl group having 1 to 5 carbon atoms, an alkenyl group having 2 to 5 carbon atoms, or an alkoxy group having 1 to 4 carbon atoms.)

Such compounds represented by General Formula (IX-2-5) can be used in any combination; a proper combination of the compounds for an embodiment can be determined in view of resistance to resolution at low temperature, transition temperature, electric reliability, birefringence, and another property. For example, one of such compounds is used in an embodiment of the present invention, two of the compounds are used in another embodiment, three of the compounds are used in another embodiment, and four or more of the compounds are used in another embodiment.

The upper limit and lower limit of the amount of the compound represented by General Formula (IX-2-5) are determined for an embodiment in view of properties such as resistance to resolution at low temperature, transition temperature, electric reliability, and birefringence. Relative to the total mass of the liquid crystal composition of the present invention, for example, the amount of the compound is in the range of 4 to 45 mass % in an embodiment of the present invention; in another embodiment, the amount of the compound is from 8 to 45 mass %; in another embodiment, the amount of the compound is from 12 to 45 mass %; in another embodiment, the amount of the compound is from 21 to 45 mass %; in another embodiment, the amount of the compound is from 30 to 45 mass %; in another embodiment, the amount of the compound is from 31 to 45 mass %; and in another embodiment, the amount of the compound is from 34 to 45 mass %. Moreover, relative to the total mass, for instance, the amount of the compound is in the range of 4 to 45 mass % in an embodiment of the present invention; in another embodiment, the amount of the compound is from 4 to 40 mass %; in another embodiment, the amount of the compound is from 4 to 35 mass %; in another embodiment, the amount of the compound is from 4 to 32 mass %; in another embodiment, the amount of the compound is from 4 to 22 mass %; in another embodiment, the amount of the compound is from 4 to 13 mass %; in another embodiment, the amount of the compound is from 4 to 9 mass %; in another embodiment, the amount of the compound is from 4 to 8 mass %; and in another embodiment, the amount of the compound is from 4 to 5 mass %.

In the case where the viscosity of the liquid crystal composition of the present invention needs to be kept at a low level for allowing the liquid crystal composition to contribute to a high response speed, it is preferred that the lower limit of the above-mentioned range be low and that the upper limit thereof be low. In the case where the Tni of the liquid crystal composition of the present invention needs to be kept at a high level for allowing the liquid crystal composition to serve for a reduction in screen-burn in, it is preferred that the lower limit of the above-mentioned range be low and that the upper limit thereof be low. In order to increase dielectric anisotropy for keeping driving voltage at a low level, it is preferred that the lower limit of the above-mentioned range be high and that the upper limit thereof be high.

The compound represented by General Formula (IX-2-5) is preferably any of compounds represented by Formulae (34.1) to (34.5); and more preferably the compound represented by Formula (34.1), the compound represented by Formula (34.2), the compound represented by Formula (34.3), and/or the compound represented by Formula (34.5).

[Chem. 100]

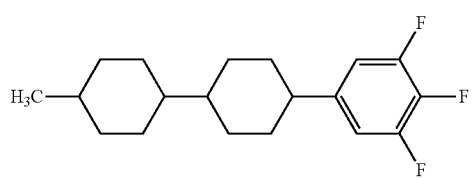
(34.1)

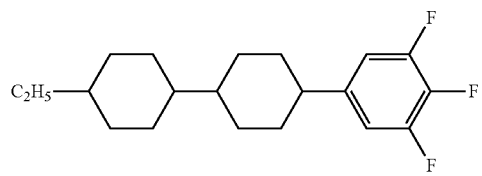
(34.2)

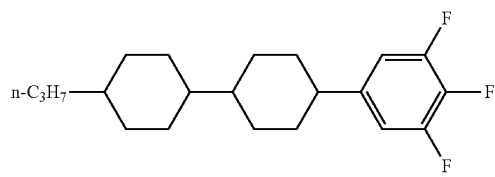
(34.3)

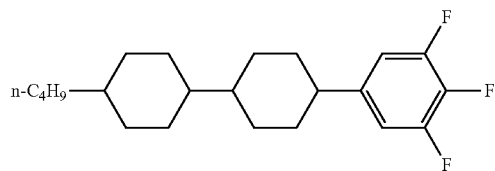
(34.4)

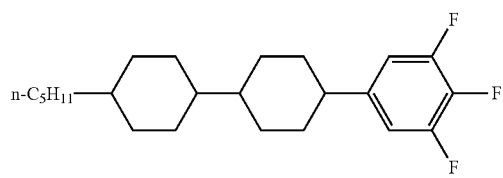
(34.5)

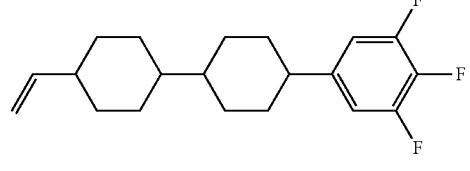
(34.6)

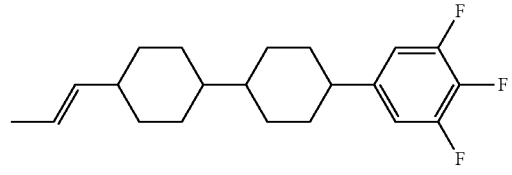
(34.7)

The compound represented by General Formula (M) is preferably any of compounds represented by General Formula (X). Such a compound represented by General Formula (X) excludes the compound represented by General Formula (ii).

[Chem. 101]

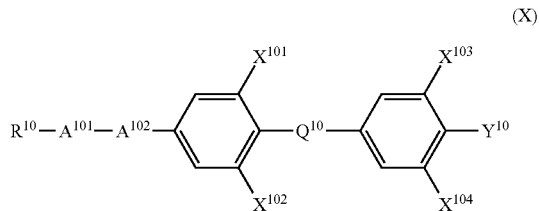

(X)

(in the formula, $X^{101}$ to $X^{104}$ each independently represent a fluorine atom or a hydrogen atom; $Y^{10}$ represents a fluorine atom, a chlorine atom, or —$OCF_3$; $Q^{10}$ represents a single bond or —$CF_2O$—; $R^{10}$ represents an alkyl group having 1 to 5 carbon atoms, an alkenyl group having 2 to 5 carbon atoms, or an alkoxy group having 1 to 4 carbon atoms; and $A^{101}$ and $A^{102}$ each independently represent a 1,4-cyclohexylene group, a 1,4-phenylene group, or a group represented by the following formula, and

[Chem. 102]

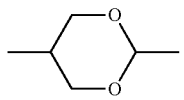

a hydrogen atom of the 1,4-phenylene group is optionally substituted with a fluorine atom.)

Such compounds represented by General Formula (X) can be used in any combination; a proper combination of the compounds for an embodiment can be determined in view of resistance to resolution at low temperature, transition temperature, electric reliability, birefringence, and another property. For example, one of such compounds is used in an embodiment of the present invention, two of the compounds are used in another embodiment of the present invention, three of the compounds are used in another embodiment, four of the compounds are used in another embodiment, and five or more of the compounds are used in another embodiment.

The upper limit and lower limit of the amount of the compound represented by General Formula (X) are determined for an embodiment in view of properties such as resistance to resolution at low temperature, transition temperature, electric reliability, and birefringence. Relative to the total mass of the liquid crystal composition of the present invention, for example, the amount of the compound is in the range of 2 to 45 mass % in an embodiment of the present invention; in another embodiment, the amount of the compound is from 3 to 45 mass %; in another embodiment, the amount of the compound is from 6 to 45 mass %; in another embodiment, the amount of the compound is from 8 to 45 mass %; in another embodiment, the amount of the compound is from 9 to 45 mass %; in another embodiment, the amount of the compound is from 11 to 45 mass %; in another embodiment, the amount of the compound is from 12 to 45 mass %; in another embodiment, the amount of the compound is from 18 to 45 mass %; in another embodiment, the amount of the compound is from 19 to 45 mass %; in another embodiment, the amount of the compound is from 23 to 45 mass %; and in another embodiment, the amount of the compound is from 25 to 45 mass %. Furthermore, relative to the total mass, for instance, the amount of the compound is in the range of 2 to 45 mass % in an embodiment of the present invention; in another embodiment, the amount of the compound is from 2 to 35 mass %; in another embodiment, the amount of the compound is from 2 to 30 mass %; in another embodiment, the amount of the compound is from 2 to 25 mass %; in another embodiment, the amount of the compound is from 2 to 20 mass %; in another embodiment, the amount of the compound is from 2 to 13 mass %; in another embodiment, the amount of the compound is from 2 to 9 mass %; in another embodiment, the amount of the compound is from 2 to 6 mass %; and in another embodiment, the amount of the compound is from 2 to 3 mass %.

In the case where the viscosity of the liquid crystal composition of the present invention needs to be kept at a low level for allowing the liquid crystal composition to contribute to a high response speed, it is preferred that the lower limit of the above-mentioned range be low and that the upper limit thereof be low. In the case where the liquid crystal composition needs to serve for a reduction in screen burn-in, it is preferred that the lower limit of the above-mentioned range be low and that the upper limit thereof be low. In order to increase dielectric anisotropy for keeping driving voltage at a low level, it is preferred that the lower limit of the above-mentioned range be high and that the upper limit thereof be high.

The compound represented by General Formula (X), which is used in the liquid crystal composition of the present invention, is preferably any of compounds represented by General Formula (X-1).

[Chem. 103]

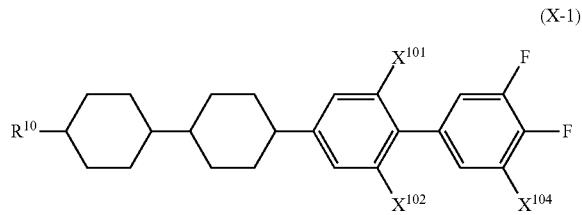

(X-1)

(in the formula, $X^{101}$ to $X^{103}$ each independently represent a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-1) can be used in any combination; a proper combination of the compounds for an embodiment can be determined in view of resistance to resolution at low temperature, transition temperature, electric reliability, birefringence, and another property. For example, one of such compounds is used in an embodiment of the present invention, two of the compounds are used in another embodiment of the present invention, three of the compounds are used in another embodiment, four of the compounds are used in another embodiment, and five or more of the compounds are used in another embodiment.

The upper limit and lower limit of the amount of the compound represented by General Formula (X-1) are determined for an embodiment in view of properties such as resistance to resolution at low temperature, transition temperature, electric reliability, and birefringence. Relative to the total mass of the liquid crystal composition of the present invention, for example, the amount of the compound is in the range of 2 to 40 mass % in an embodiment of the present invention; in another embodiment, the amount of the compound is from 3 to 40 mass %; in another embodiment, the amount of the compound is from 5 to 40 mass %; in another embodiment, the amount of the compound is from 6 to 40 mass %; in another embodiment, the amount of the compound is from 7 to 40 mass %; in another embodiment, the amount of the compound is from 8 to 40 mass %; in another embodiment, the amount of the compound is from 9 to 40 mass %; in another embodiment, the amount of the compound is from 13 to 40 mass %; in another embodiment, the amount of the compound is from 18 to 40 mass %; and in another embodiment, the amount of the compound is from 23 to 40 mass %.

Moreover, relative to the total mass, for instance, the amount of the compound is in the range of 2 to 40 mass % in an embodiment of the present invention; in another embodiment, the amount of the compound is from 2 to 30 mass %; in another embodiment, the amount of the compound is from 2 to 25 mass %; in another embodiment, the amount of the compound is from 2 to 20 mass %; in another embodiment, the amount of the compound is from 2 to 15 mass %; in another embodiment, the amount of the compound is from 2 to 10 mass %; in another embodiment, the amount of the compound is from 2 to 6 mass %; and in another embodiment, the amount of the compound is from 2 to 4 mass %.

The compound represented by General Formula (X-1), which is used in the liquid crystal composition of the present invention, is preferably any of compounds represented by General Formula (X-1-1).

[Chem. 104]

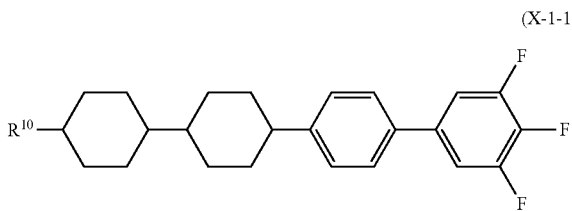

(X-1-1)

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-1-1) can be used in any combination; a proper combination of the compounds for an embodiment can be determined in view of resistance to resolution at low temperature, transition temperature, electric reliability, birefringence, and another property. For instance, one of such compounds is used in an embodiment of the present invention, two of the compounds are used in another embodiment of the present invention, three of the compounds are used in another embodiment, and four or more of the compounds are used in another embodiment.

The upper limit and lower limit of the amount of the compound represented by General Formula (X-1-1) are determined for an embodiment in view of properties such as resistance to resolution at low temperature, transition temperature, electric reliability, and birefringence. Relative to the total mass of the liquid crystal composition of the present invention, for example, the amount of the compound is in the range of 3 to 30 mass % in an embodiment of the present invention; in another embodiment, the amount of the compound is from 4 to 30 mass %; in another embodiment, the amount of the compound is from 6 to 30 mass %; in another embodiment, the amount of the compound is from 9 to 30 mass %; in another embodiment, the amount of the compound is from 12 to 30 mass %; in another embodiment, the amount of the compound is from 15 to 30 mass %; in another embodiment, the amount of the compound is from 18 to 30 mass %; and in another embodiment, the amount of the compound is from 21 to 30 mass %.

Furthermore, relative to the total mass, for instance, the amount of the compound is in the range of 3 to 30 mass % in an embodiment of the present invention; in another embodiment, the amount of the compound is from 3 to 20 mass %; in another embodiment, the amount of the compound is from 3 to 13 mass %; in another embodiment, the amount of the compound is from 3 to 10 mass %; and in another embodiment, the amount of the compound is from 3 to 7 mass %.

In particular, the compound represented by General Formula (X-1-1), which is used in the liquid crystal composition of the present invention, is preferably any of compounds represented by Formulae (36.1) to (36.4), and more preferably the compound represented by Formula (36.1) and/or the compound represented by Formula (36.2).

[Chem. 105]

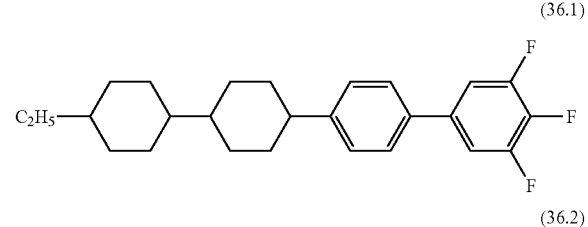

(36.1)

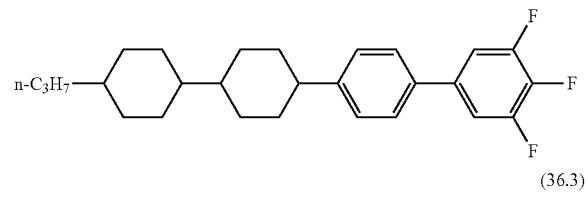

(36.2)

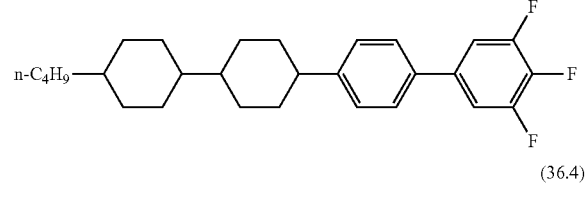

(36.3)

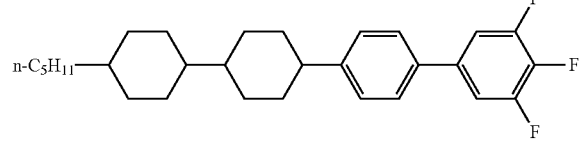

(36.4)

The compound represented by General Formula (X-1), which is used in the liquid crystal composition of the present invention, is preferably any of compounds represented by General Formula (X-1-2).

[Chem. 106]

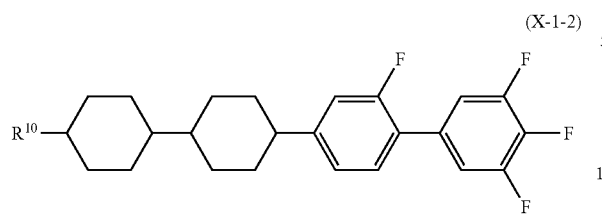

(X-1-2)

(in the formula, $R^{10}$ represents an alkyl group having 1 to 5 carbon atoms, an alkenyl group having 2 to 5 carbon atoms, or an alkoxy group having 1 to 4 carbon atoms.)

The amount of the compound represented by General Formula (X-1-2) is preferably not less than 1 mass %, more preferably not less than 2 mass %, and further preferably not less than 6 mass % relative to the total mass of the liquid crystal composition of the present invention. In addition, in view of resistance to resolution at low temperature, transition temperature, electric reliability, and another property, the amount is preferably up to 20 mass %, more preferably up to 16 mass %, further preferably up to 12 mass %, and especially preferably up to 10 mass %.

Specific examples of the preferred amount are as follows: from 1 to 10 mass %, from 2 to 8 mass %, from 2 to 7 mass %, from 2 to 5 mass %, from 4 to 8 mass %, and from 5 to 8 mass %.

In particular, the compound represented by General Formula (X-1-2), which is used in the liquid crystal composition of the present invention, is preferably any of compounds represented by Formulae (37.1) to (37.4); and more preferably the compound represented by Formula (37.2).

[Chem. 107]

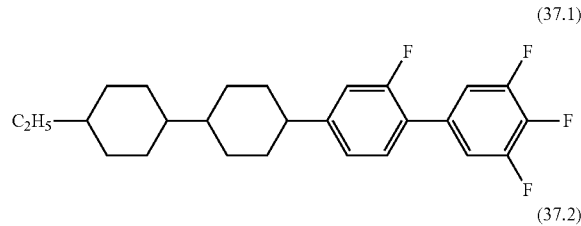

(37.1)

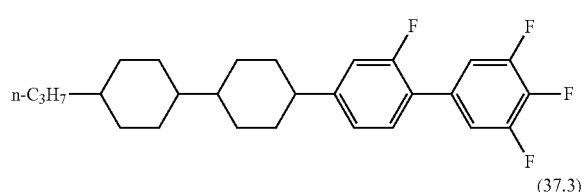

(37.2)

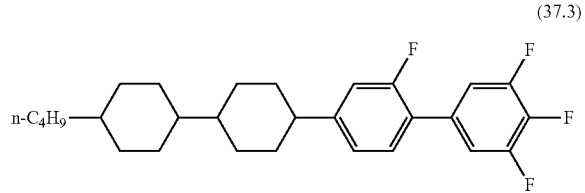

(37.3)

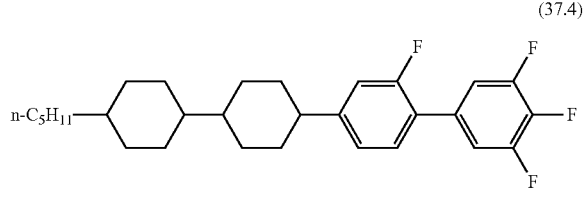

(37.4)

In the liquid crystal composition of the present invention, the amount of the compound represented by Formula (37.2) is preferably in the range of 1 mass % to 25 mass %, more preferably 3 mass % to 20 mass %, further preferably 5 mass % to 15 mass %, and especially preferably 7 mass % to 13 mass % relative to the total mass of the liquid crystal composition of the present invention in view of resistance to resolution at low temperature, transition temperature, electric reliability, and another property.

The compound represented by General Formula (X-1), which is used in the liquid crystal composition of the present invention, is preferably any of compounds represented by General Formula (X-1-3).

[Chem. 108]

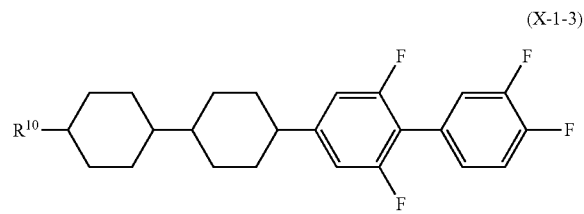

(X-1-3)

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-1-3) can be used in any combination; in view of resistance to resolution at low temperature, transition temperature, electric reliability, birefringence, and another property, the compounds are preferably used alone or in combination.

The amount of the compound represented by General Formula (X-1-3) is preferably not less than 1 mass %, more preferably not less than 2 mass %, and further preferably not less than 6 mass % relative to the total mass of the liquid crystal composition of the present invention. In view of resistance to resolution at low temperature, transition temperature, electric reliability, and another property, the amount is preferably up to 20 mass %, more preferably up to 16 mass %, further preferably up to 12 mass %, and especially preferably up to 10 mass %.

Specific examples of the preferred amount are as follows: from 1 to 10 mass %, from 3 to 8 mass %, from 2 to 6 mass %, from 2 to 5 mass %, from 2 to 4 mass %, from 3 to 6 mass %, from 4 to 6 mass %, and from 5 to 6 mass %.

In particular, the compound represented by General Formula (X-1-3) is preferably any of compounds represented by Formulae (38.1) to (38.4); and more preferably the compound represented by Formula (38.2).

[Chem. 109]

(38.1)
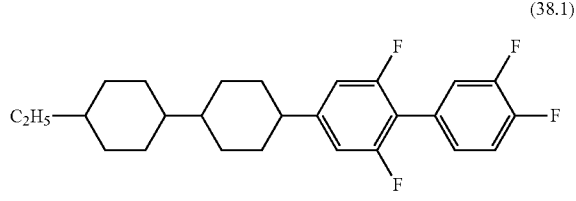

(38.2)
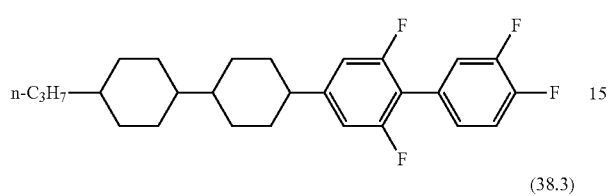

(38.3)
(38.4)
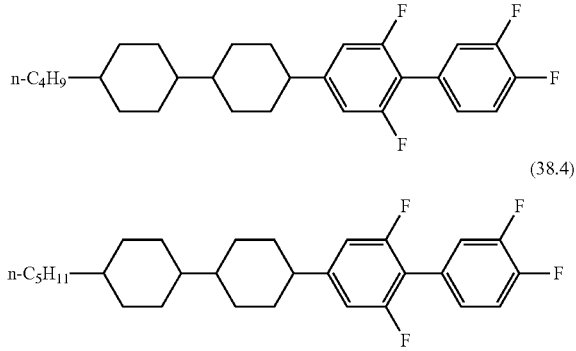

In the liquid crystal composition of the present invention, the amount of the compound represented by Formula (38.2) is preferably in the range of 1 mass % to 35 mass %, more preferably 2 mass % to 25 mass %, and further preferably 3 mass % to 20 mass % relative to the total mass of the liquid crystal composition of the present invention.

The compound represented by General Formula (X), which is used in the liquid crystal composition of the present invention, is preferably any of compounds represented by General Formula (X-2).

[Chem. 110]

(X-2)
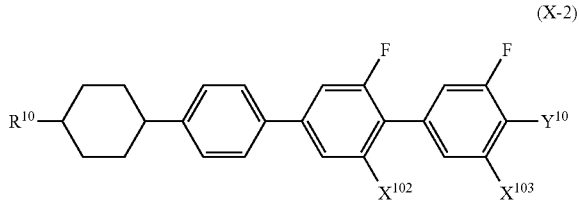

(in the formula, $X^{102}$ and $X^{103}$ each independently represent a fluorine atom or a hydrogen atom; $Y^{10}$ represents a fluorine atom, a chlorine atom, or —$OCF_3$; and $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-2) can be used in any combination; in view of resistance to resolution at low temperature, transition temperature, electric reliability, birefringence, and another property, the compounds are preferably used alone or in combination.

The compound represented by General Formula (X-2), which is used in the liquid crystal composition of the present invention, is preferably any of compounds represented by General Formula (X-2-1).

[Chem. 111]

(X-2-1)
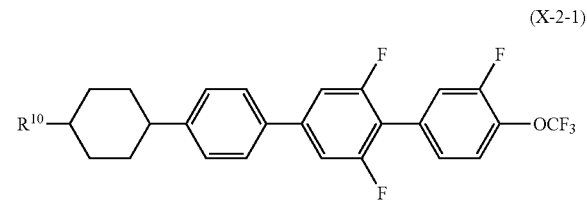

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-2-1) can be used in any combination; in view of resistance to resolution at low temperature, transition temperature, electric reliability, birefringence, and another property, one or two or more of the compounds are preferably used, and one to three or more of the compounds are more preferably used.

The amount of the compound represented by General Formula (X-2-1) is preferably in the range of 1 mass % to 30 mass %, more preferably 1 mass % to 20 mass %, and further preferably 1 mass % to 10 mass % relative to the total mass of the liquid crystal composition of the present invention in view of resistance to resolution at low temperature, transition temperature, electric reliability, and another property.

In particular, the compound represented by General Formula (X-2-1), which is used in the liquid crystal composition of the present invention, is preferably any of compounds represented by Formulae (39.1) to (39.4), and more preferably the compound represented by Formula (39.2).

[Chem. 112]

(39.1)
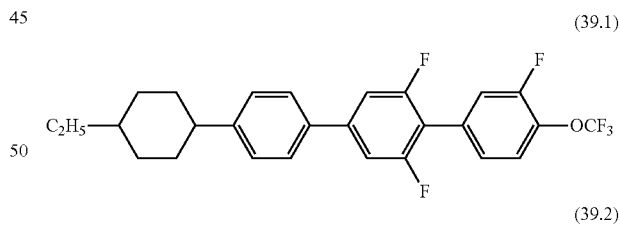

(39.2)
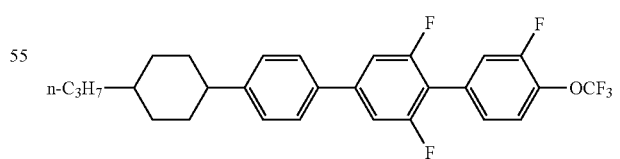

(39.3)
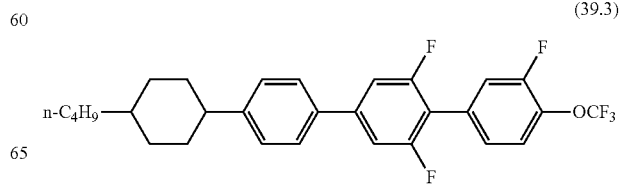

(39.4)

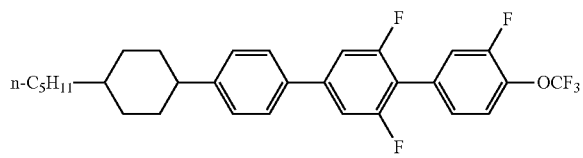

In the liquid crystal composition of the present invention, the amount of the compound represented by Formula (39.2) is preferably in the range of 1 mass % to 30 mass %, more preferably 1 mass % to 20 mass %, and further preferably 1 mass % to 10 mass % relative to the total mass of the liquid crystal composition of the present invention.

The compound represented by General Formula (X-2), which is used in the liquid crystal composition of the present invention, is preferably any of compounds represented by General Formula (X-2-2).

[Chem. 113]

(X-2-2)

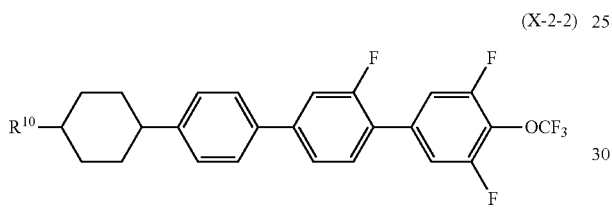

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-2-2) can be used in any combination; in view of resistance to resolution at low temperature, transition temperature, electric reliability, birefringence, and another property, the compounds are preferably used alone or in combination.

The amount of the compound represented by General Formula (X-2-2) is preferably in the range of 3 mass % to 20 mass %, more preferably 6 mass % to 16 mass %, further preferably 9 mass % to 12 mass %, and especially preferably 9 mass % to 10 mass % relative to the total mass of the liquid crystal composition of the present invention in view of resistance to resolution at low temperature, transition temperature, electric reliability, and another property.

In particular, the compound represented by General Formula (X-2-2), which is used in the liquid crystal composition of the present invention, is preferably any of compounds represented by Formulae (40.1) to (40.4), more preferably the compound represented by Formula (40.2).

[Chem. 114]

(40.1)

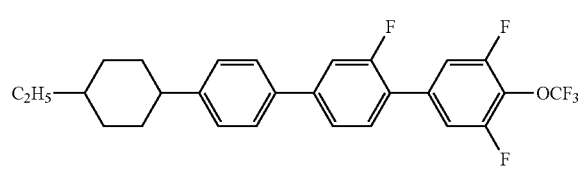

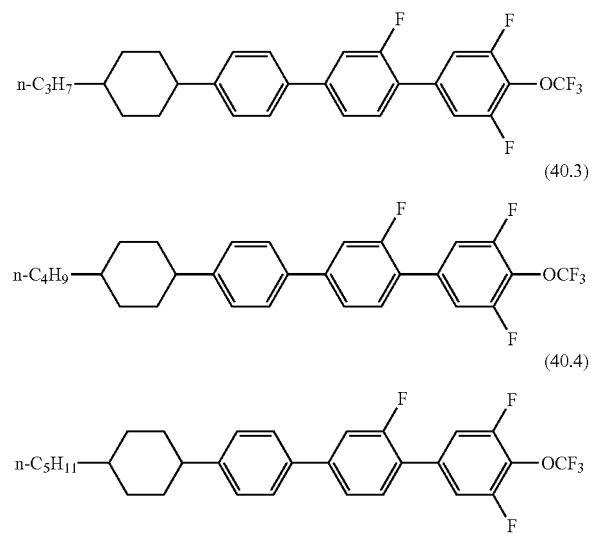

The compound represented by General Formula (X) is preferably any of compounds represented by General Formula (X-3).

[Chem. 115]

(X-3)

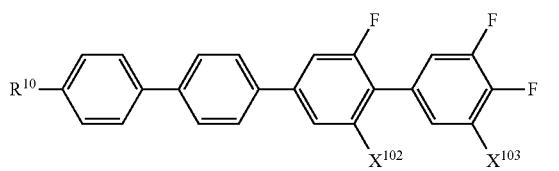

(in the formula, $X^{102}$ and $X^{103}$ each independently represent a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-3) can be used in any combination; in view of resistance to resolution at low temperature, transition temperature, electric reliability, birefringence, and another property, the compounds are preferably used alone or in combination.

The compound represented by General Formula (X-3), which is used in the liquid crystal composition of the present invention, is preferably any of compounds represented by General Formula (X-3-1).

[Chem. 116]

(X-3-1)

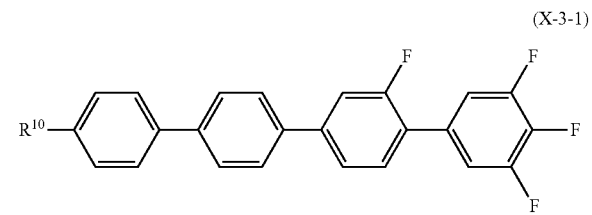

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-3-1) can be used in any combination; in view of resistance to resolution at low temperature, transition temperature, electric reliability, birefringence, and another property, the compounds are preferably used alone or in combination.

The amount of the compound represented by General Formula (X-3-1) is preferably not less than 1 mass %, more preferably not less than 2 mass %, and further preferably not less than 3 mass % relative to the total mass of the liquid crystal composition of the present invention. In view of resistance to resolution at low temperature, transition temperature, electric reliability, and another property, the amount is preferably up to 10 mass %, more preferably up to 8 mass %, further preferably up to 6 mass %, and especially preferably up to 4 mass %.

In particular, the compound represented by General Formula (X-3-1), which is used in the liquid crystal composition of the present invention, is preferably any of compounds represented by Formulae (41.1) to (41.4), and more preferably the compound represented by Formula (41.2).

[Chem. 117]

(41.1)
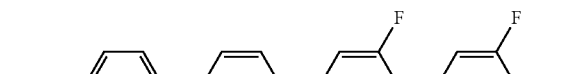

(41.2)
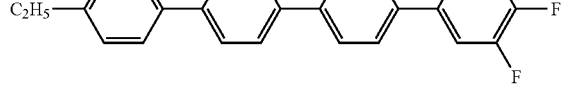

(41.3)
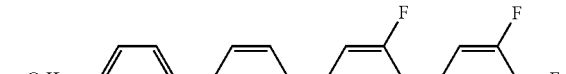

(41.4)
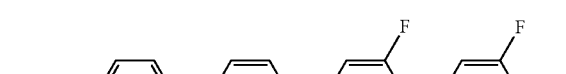

In the liquid crystal composition of the present invention, the amount of the compound represented by Formula (41.2) is preferably in the range of 0.5 mass % to 15 mass %, and more preferably 1 mass % to 10 mass % relative to the total mass of the liquid crystal composition of the present invention.

The compound represented by General Formula (X) is preferably any of compounds represented by General Formula (X-4).

[Chem. 118]

(X-4)
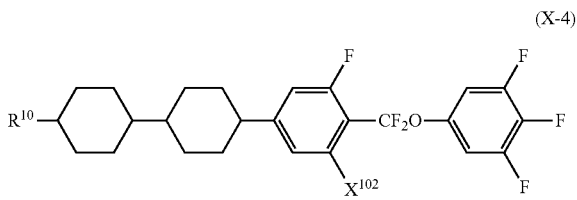

(in the formula, $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-4) can be used in any combination; in view of resistance to resolution at low temperature, transition temperature, electric reliability, birefringence, and another property, one or two or more of the compounds are preferably used, and one to three or more of the compounds are more preferably used.

The compound represented by General Formula (X-4), which is used in the liquid crystal composition of the present invention, is preferably any of compounds represented by General Formula (X-4-1).

[Chem. 119]

(X-4-1)
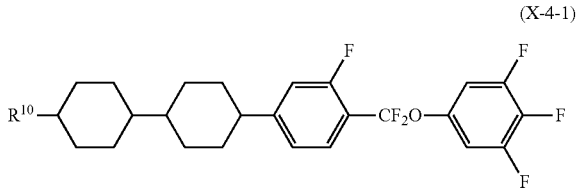

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-4-1) can be used in any combination; in view of resistance to resolution at low temperature, transition temperature, electric reliability, birefringence, and another property, one or two or more of the compounds are preferably used, and one to three or more of the compounds are more preferably used.

The amount of the compound represented by General Formula (X-4-1) is preferably in the range of 2 mass % to 20 mass %, more preferably 5 mass % to 17 mass %, further preferably 10 mass % to 15 mass %, and especially preferably 10 mass % to 13 mass % relative to the total mass of the liquid crystal composition of the present invention in view of resistance to resolution at low temperature, transition temperature, electric reliability, and another property.

In particular, the compound represented by General Formula (X-4-1), which is used in the liquid crystal composition of the present invention, is preferably any of compounds represented by Formulae (42.1) to (42.4), and more preferably the compound represented by Formula (42.3).

[Chem. 120]

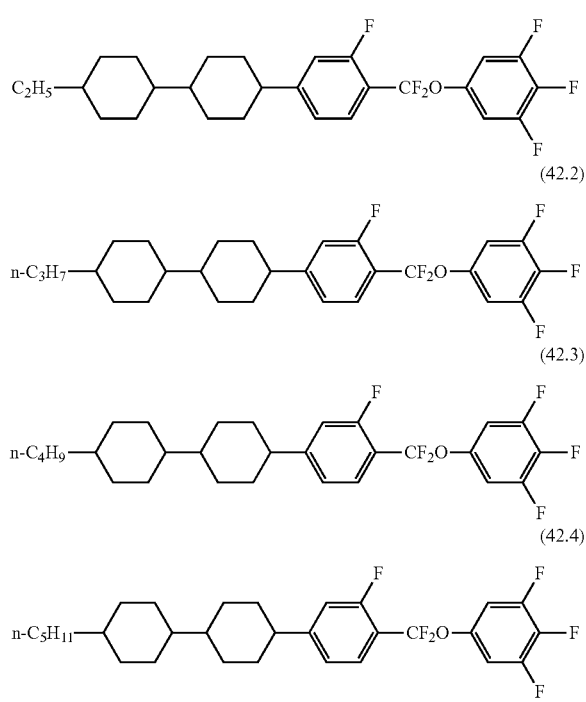

(42.1)
(42.2)
(42.3)
(42.4)

The compound represented by General Formula (X), which is used in the liquid crystal composition of the present invention, is preferably any of compounds represented by General Formula (X-4-3).

[Chem. 121]

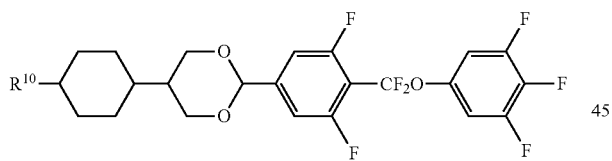

(X-4-3)

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-4-3) can be used in any combination; in view of resistance to resolution at low temperature, transition temperature, electric reliability, birefringence, and another property, one or two or more of the compounds are preferably used, and one to three or more of the compounds are more preferably used.

The amount of the compound represented by General Formula (X-4-3) is preferably in the range of 2 mass % to 20 mass %, more preferably 5 mass % to 17 mass %, further preferably 10 mass % to 15 mass %, and especially preferably 10 mass % to 13 mass % relative to the total mass of the liquid crystal composition of the present invention in view of resistance to resolution at low temperature, transition temperature, electric reliability, and another property.

In particular, the compound represented by General Formula (X-4-3), which is used in the liquid crystal composition of the present invention, is preferably any of compounds represented by Formulae (42.21) to (42.24), and more preferably the compound represented by Formula (42.22).

[Chem. 122]

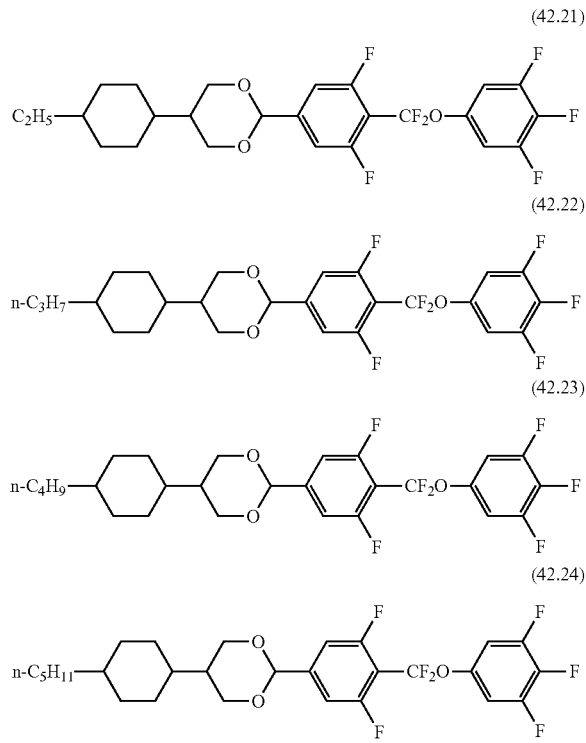

(42.21)
(42.22)
(42.23)
(42.24)

The compound represented by General Formula (X) is preferably any of compounds represented by General Formula (X-5).

[Chem. 123]

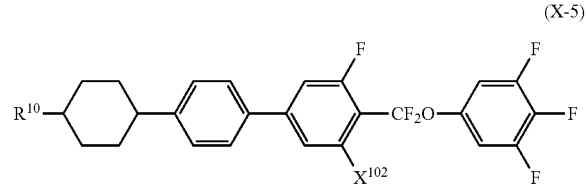

(X-5)

(in the formula, $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-5) can be used in any combination; in view of resistance to resolution at low temperature, transition temperature, electric reliability, birefringence, and another property, one or two or more of the compounds are preferably used, and one to three or more of the compounds are more preferably used.

The compound represented by General Formula (X-5), which is used in the liquid crystal composition of the present invention, is preferably any of compounds represented by General Formula (X-5-1).

[Chem. 124]

(X-5-1)

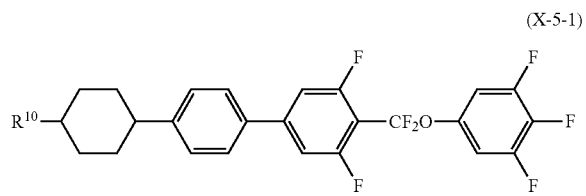

(in the formula, $R^{10}$ represents an alkyl group having 1 to 5 carbon atoms, an alkenyl group having 2 to 5 carbon atoms, or an alkoxy group having 1 to 4 carbon atoms.)

Such compounds represented by General Formula (X-5-1) can be used in any combination; in view of resistance to resolution at low temperature, transition temperature, electric reliability, birefringence, and another property, one or two or more of the compounds are preferably used, and one to three or more of the compounds are more preferably used.

In particular, the compound represented by General Formula (X-5-1), which is used in the liquid crystal composition of the present invention, is preferably any of compounds represented by Formulae (43.1) to (43.4), and more preferably the compound represented by Formula (43.2).

[Chem. 125]

(43.1)

(43.2)

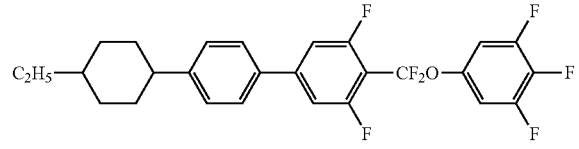

(43.3)

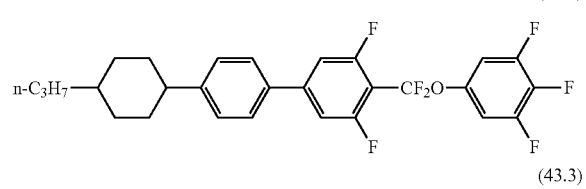

(43.4)

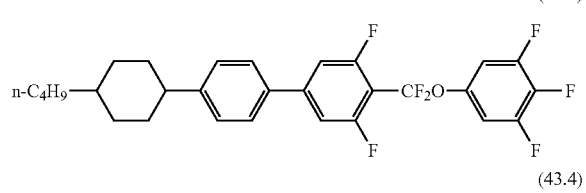

The compound represented by General Formula (X) is preferably a compound selected from the group consisting of compounds represented by General Formula (XI).

[Chem. 126]

(XI)

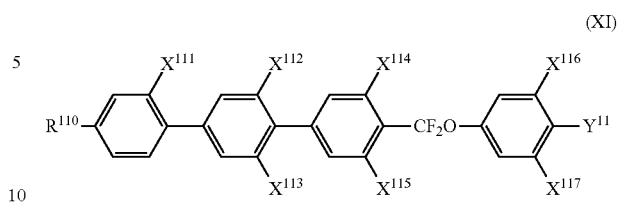

(in the formula, $X^{111}$ to $X^{117}$ each independently represent a fluorine atom or a hydrogen atom, and at least one of $X^{111}$ to $X^{117}$ represents a fluorine atom; $R^{110}$ represents an alkyl group having 1 to 5 carbon atoms, an alkenyl group having 2 to 5 carbon atoms, or an alkoxy group having 1 to 4 carbon atoms; and $Y^{11}$ represents a fluorine atom or —$OCF_3$.)

Such compounds represented by General Formula (XI) can be used in any combination; for example, in view of resistance to resolution at low temperature, transition temperature, electric reliability, birefringence, and another property, one to three or more of the compounds are preferably used.

The upper limit and lower limit of the amount of the compound represented by General Formula (XI) are determined for an embodiment in view of properties such as resistance to resolution at low temperature, transition temperature, electric reliability, and birefringence. Relative to the total mass of the liquid crystal composition of the present invention, for example, the amount of the compound is in the range of 2 to 30 mass % in an embodiment of the present invention; in another embodiment, the amount of the compound is from 4 to 30 mass %; in another embodiment, the amount of the compound is from 5 to 30 mass %; in another embodiment, the amount of the compound is from 7 to 30 mass %; in another embodiment, the amount of the compound is from 9 to 30 mass %; in another embodiment, the amount of the compound is from 10 to 30 mass %; in another embodiment, the amount of the compound is from 12 to 30 mass %; in another embodiment, the amount of the compound is from 13 to 30 mass %; in another embodiment, the amount of the compound is from 15 to 30 mass %; and in another embodiment, the amount of the compound is from 18 to 30 mass %.

Furthermore, relative to the total mass, for instance, the amount of the compound is in the range of 2 to 30 mass % in an embodiment of the present invention; in another embodiment, the amount of the compound is from 2 to 25 mass %; in another embodiment, the amount of the compound is from 2 to 20 mass %; in another embodiment, the amount of the compound is from 2 to 15 mass %; in another embodiment, the amount of the compound is from 2 to 10 mass %; and in another embodiment, the amount of the compound is from 2 to 5 mass %.

In the case where the liquid crystal composition of the present invention is used in a liquid crystal display device having a small cell gap, the appropriate amount of the compound represented by General Formula (XI) is at a higher level. In the case where the liquid crystal composition of the present invention is used in a liquid crystal display device which is driven at a small driving voltage, the appropriate amount of the compound represented by General Formula (XI) is at a higher level. In the case where the liquid crystal composition of the present invention is used in a liquid crystal display device which is used in a low-temperature environment, the appropriate amount of the compound represented by General Formula (XI) is at a lower level. In the case where the liquid crystal composition is used in a liquid crystal display device which quickly responds, the appropriate amount of the compound represented by General Formula (XI) is at a lower level.

The compound represented by General Formula (XI), which is used in the liquid crystal composition of the present invention, is preferably any of compounds represented by General Formula (XI-1).

[Chem. 127]

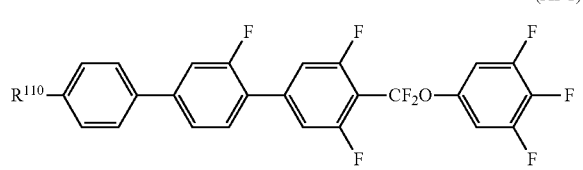

(XI-1)

(in the formula, $R^{110}$ represents an alkyl group having 1 to 5 carbon atoms, an alkenyl group having 2 to 5 carbon atoms, or an alkoxy group having 1 to 4 carbon atoms.)

Such compounds represented by General Formula (XI-1) can be used in any combination; a proper combination of the compounds for an embodiment can be determined in view of resistance to resolution at low temperature, transition temperature, electric reliability, birefringence, and another property. For example, one of the compounds is used in an embodiment of the present invention, two of the compounds are used in another embodiment, and three or more of the compounds are used in another embodiment.

The amount of the compound represented by General Formula (XI-1) is preferably in the range of 1 mass % to 20 mass %, more preferably 3 mass % to 20 mass %, further preferably 4 mass % to 20 mass %, further preferably 6 mass % to 15 mass %, and especially preferably 9 mass % to 12 mass % relative to the total mass of the liquid crystal composition of the present invention in view of resistance to resolution at low temperature, transition temperature, electric reliability, and another property.

In particular, the compound represented by General Formula (XI-1), which is used in the liquid crystal composition of the present invention, is preferably any of compounds represented by Formulae (45.1) to (45.4), more preferably any of the compounds represented by Formulae (45.2) to (45.4), and further preferably the compound represented by Formula (45.2) and/or the compound represented by Formula (45.3).

[Chem. 128]

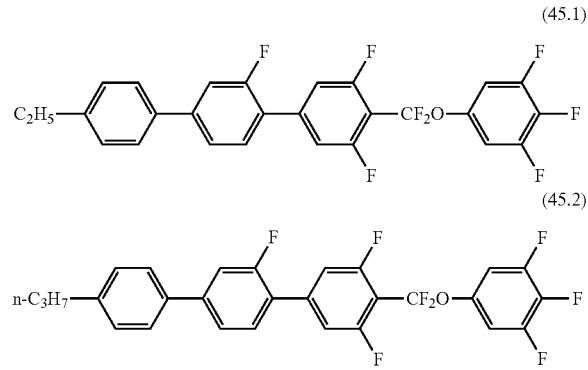

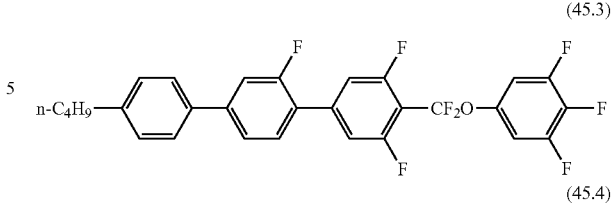

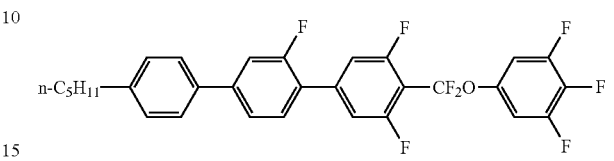

In the liquid crystal composition of the present invention, the amount of the compound represented by Formula (45.2) is preferably in the range of 1 mass % to 30 mass %, more preferably 2 mass % to 20 mass %, further preferably 2 mass % to 10 mass %, and especially preferably 2 mass % to 5 mass % relative to the total mass of the liquid crystal composition of the present invention in view of resistance to resolution at low temperature, transition temperature, electric reliability, and another property.

In the especially preferred range, the amount can be, for example, from 2 mass % to 4 mass %, from 2 mass % to 3 mass %, from 2 mass % to 2.5 mass %, from 2.5 mass % to 5 mass %, from 3 mass % to 5 mass %, from 4 mass % to 5 mass %, or from 4.5 mass % to 5 mass %.

In the liquid crystal composition of the present invention, the amount of the compound represented by Formula (45.3) is preferably in the range of 1 mass % to 25 mass %, more preferably 1 mass % to 20 mass %, further preferably 1 mass % to 10 mass %, and especially preferably 1 mass % to 5 mass % relative to the total mass of the liquid crystal composition of the present invention in view of resistance to resolution at low temperature, transition temperature, electric reliability, and another property.

In the case where the liquid crystal composition of the present invention contains the compounds represented by Formulae (45.2) and (45.3), the total amount thereof is preferably in the range of 1 mass % to 25 mass %, more preferably 2 mass % to 15 mass %, further preferably 3 mass % to 10 mass %, and especially preferably 3 mass % to 7 mass % relative to the total mass of the liquid crystal composition of the present invention.

In the especially preferred range, the amount may be from 3 to 5 mass % or from 6 to 7 mass %.

In the liquid crystal composition of the present invention, the amount of the compound represented by Formula (45.4) is preferably in the range of 1 mass % to 25 mass %, more preferably 2 mass % to 15 mass %, further preferably 3 mass % to 10 mass %, and especially preferably 3 mass % to 7 mass % relative to the total mass of the liquid crystal composition of the present invention in view of resistance to resolution at low temperature, transition temperature, electric reliability, and another property.

In the case where the liquid crystal composition of the present invention contains three compounds represented by Formulae (45.2) to (45.4), the total amount thereof is preferably in the range of 1 mass % to 35 mass %, more preferably 5 mass % to 25 mass %, and further preferably 10 mass % to 20 mass % relative to the total mass of the liquid crystal composition of the present invention.

The compound represented by General Formula (XI), which is used in the liquid crystal composition of the present invention, is preferably any of compounds represented by General Formula (XI-2).

[Chem. 129]

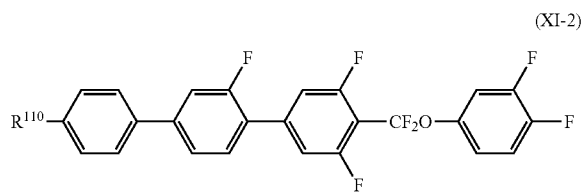

(XI-2)

(in the formula, $R^{110}$ represents an alkyl group having 1 to 5 carbon atoms, an alkenyl group having 2 to 5 carbon atoms, or an alkoxy group having 1 to 4 carbon atoms.)

Such compounds represented by General Formula (XI-2) can be used in any combination; a proper combination of the compounds for an embodiment can be determined in view of resistance to resolution at low temperature, transition temperature, electric reliability, birefringence, and another property. For example, one of the compounds is used in an embodiment of the present invention, two of the compounds are used in another embodiment, and three or more of the compounds are used in another embodiment.

The amount of the compound represented by General Formula (XI-2) is preferably in the range of 1 mass % to 20 mass %, more preferably 3 mass % to 20 mass %, further preferably 4 mass % to 20 mass %, further preferably 6 mass % to 15 mass %, and especially preferably 9 mass % to 12 mass % relative to the total mass of the liquid crystal composition of the present invention in view of resistance to resolution at low temperature, transition temperature, electric reliability, and another property.

In particular, the compound represented by General Formula (XI-2), which is used in the liquid crystal composition of the present invention, is preferably any of compounds represented by Formulae (45.11) to (45.14), more preferably any of the compounds represented by Formulae (45.12) to (45.14), and further preferably the compound represented by Formula (45.12).

[Chem. 130]

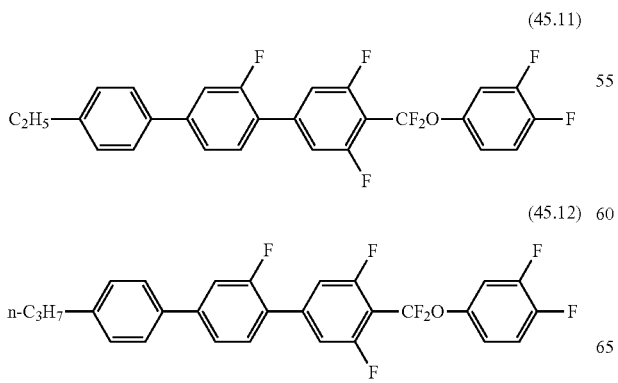

(45.11)

(45.12)

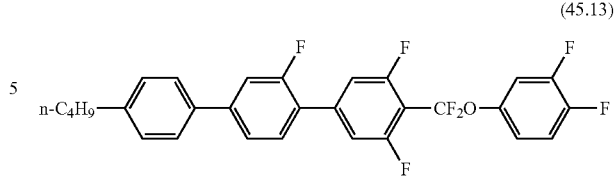

(45.13)

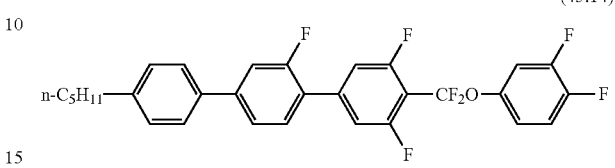

(45.14)

The compound represented by General Formula (X) is preferably a compound selected from the group consisting of compounds represented by General Formula (XII).

[Chem. 131]

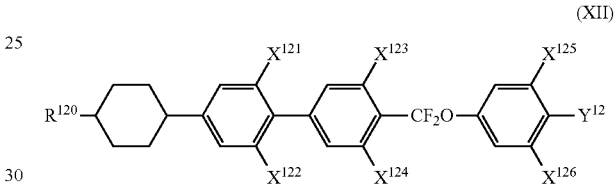

(XII)

(in the formula, $X^{121}$ to $X^{126}$ each independently represent a fluorine atom or a hydrogen atom; $R^{120}$ represents an alkyl group having 1 to 5 carbon atoms, an alkenyl group having 2 to 5 carbon atoms, or an alkoxy group having 1 to 4 carbon atoms; and $Y^{12}$ represents a fluorine atom or —$OCF_3$.)

Such compounds represented by General Formula (XII) can be used in any combination; in view of resistance to resolution at low temperature, transition temperature, electric reliability, birefringence, and another property, it is preferred that one to three or more of the compounds be used, and it is more preferred that one to four or more of the compounds be used.

The compound represented by General Formula (XII), which is used in the liquid crystal composition of the present invention, is preferably any of compounds represented by General Formula (XII-1).

[Chem. 132]

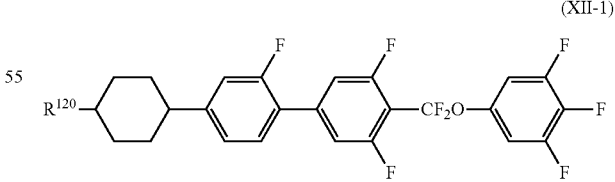

(XII-1)

(in the formula, $R^{120}$ represents an alkyl group having 1 to 5 carbon atoms, an alkenyl group having 2 to 5 carbon atoms, or an alkoxy group having 1 to 4 carbon atoms.)

Such compounds represented by General Formula (XII-1) can be used in any combination; in view of resistance to resolution at low temperature, transition temperature, electric reliability, birefringence, and another property, it is preferred that one or two or more of the compounds be used, and it is more preferred that one to three or more of the compounds be used.

The amount of the compound represented by General Formula (XII-1) is preferably in the range of 1 mass % to 15 mass %, more preferably 2 mass % to 10 mass %, further preferably 3 mass % to 8 mass %, and especially preferably 4 mass % to 6 mass % relative to the total mass of the liquid crystal composition of the present invention in view of resistance to resolution at low temperature, transition temperature, electric reliability, and another property.

In particular, the compound represented by General Formula (XII-1), which is used in the liquid crystal composition of the present invention, is preferably any of compounds represented by Formulae (46.1) to (46.4), and more preferably any of the compounds represented by Formulae (46.2) to (46.4).

[Chem. 133]

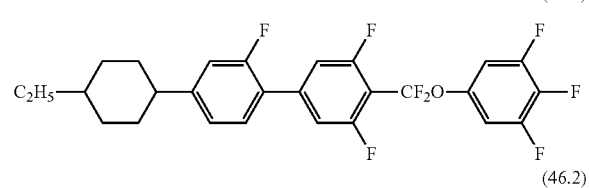

(46.1)

(46.2)

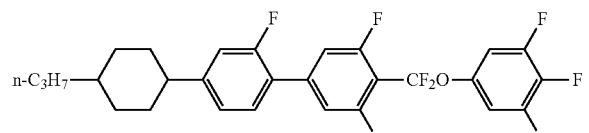

(46.3)

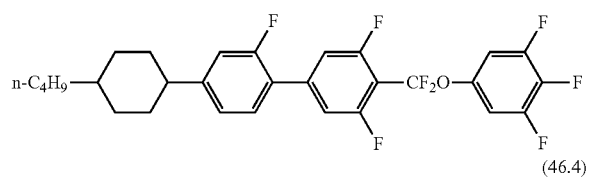

(46.4)

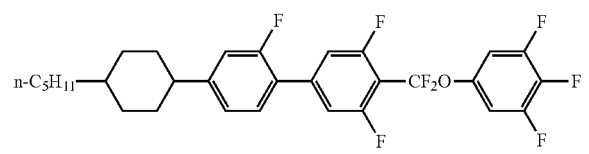

The compound represented by General Formula (XII) is preferably any of compounds represented by General Formula (XII-2).

[Chem. 134]

(XII-2)

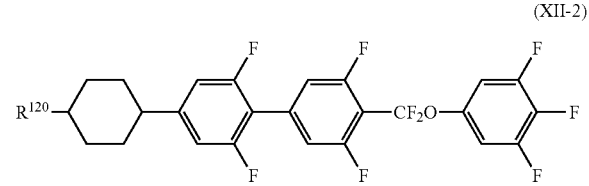

(in the formula, $R^{120}$ represents an alkyl group having 1 to 5 carbon atoms, an alkenyl group having 2 to 5 carbon atoms, or an alkoxy group having 1 to 4 carbon atoms.)

Such compounds represented by General Formula (XII-2) can be used in any combination; in view of resistance to resolution at low temperature, transition temperature, electric reliability, birefringence, and another property, it is preferred that one or two or more of the compounds be used, and it is more preferred that one to three or more of the compounds be used.

The amount of the compound represented by General Formula (XII-2) is preferably in the range of 1 mass % to 20 mass %, more preferably 3 mass % to 20 mass %, further preferably 4 mass % to 17 mass %, further preferably 6 mass % to 15 mass %, and especially preferably 9 mass % to 13 mass % relative to the total mass of the liquid crystal composition of the present invention in view of resistance to resolution at low temperature, transition temperature, electric reliability, and another property.

In particular, the compound represented by General Formula (XII-2), which is used in the liquid crystal composition of the present invention, is preferably any of compounds represented by Formulae (47.1) to (47.4), and more preferably any of the compounds represented by Formulae (47.2) to (47.4).

[Chem. 125]

(47.1)

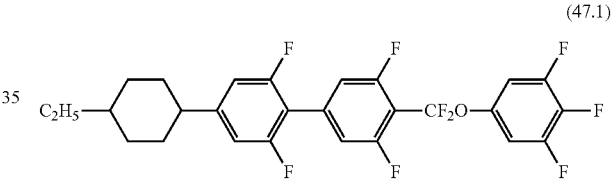

(47.2)

(47.3)

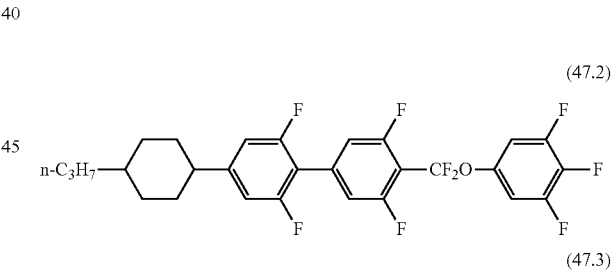

(47.4)

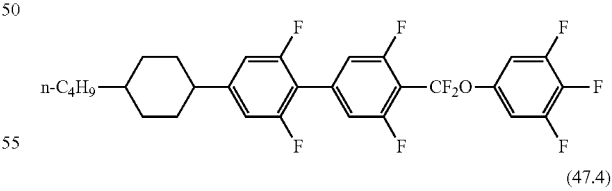

The compound represented by General Formula (M) is preferably a compound selected from the group consisting of compounds represented by General Formula (XIII).

[Chem. 136]

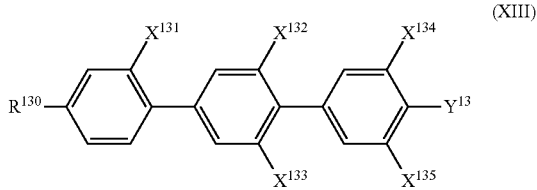

(XIII)

(in the formula, $X^{131}$ to $X^{135}$ each independently represent a fluorine atom or a hydrogen atom; $R^{130}$ represents an alkyl group having 1 to 5 carbon atoms, an alkenyl group having 2 to 5 carbon atoms, or an alkoxy group having 1 to 4 carbon atoms; and $Y^{13}$ represents a fluorine atom or —OCF$_3$.)

Such compounds represented by General Formula (XIII) can be used in any combination; one or two of the compounds are preferably used, one to three of the compounds are more preferably used, and one to four of the compounds are further preferably used.

The upper limit and lower limit of the amount of the compound represented by General Formula (XIII) are determined for an embodiment in view of properties such as resistance to resolution at low temperature, transition temperature, electric reliability, and birefringence.

Relative to the total mass of the liquid crystal composition of the present invention, for example, the amount of the compound is in the range of 2 to 30 mass % in an embodiment of the present invention; in another embodiment, the amount of the compound is from 4 to 30 mass %; in another embodiment, the amount of the compound is from 5 to 30 mass %; in another embodiment, the amount of the compound is from 7 to 30 mass %; in another embodiment, the amount of the compound is from 9 to 30 mass %; in another embodiment, the amount of the compound is from 11 to 30 mass %; in another embodiment, the amount of the compound is from 13 to 30 mass %; in another embodiment, the amount of the compound is from 14 to 30 mass %; in another embodiment, the amount of the compound is from 16 to 30 mass %; and in another embodiment, the amount of the compound is from 20 to 30 mass %.

Moreover, relative to the total mass, for instance, the amount of the compound is in the range of 2 to 30 mass % in an embodiment of the present invention; in another embodiment, the amount of the compound is from 2 to 25 mass %; in another embodiment, the amount of the compound is from 2 to 20 mass %; in another embodiment, the amount of the compound is from 2 to 15 mass %; in another embodiment, the amount of the compound is from 2 to 10 mass %; and in another embodiment, the amount of the compound is from 2 to 5 mass %.

In the case where the liquid crystal composition of the present invention is used in a liquid crystal display device having a small cell gap, the appropriate amount of the compound represented by General Formula (XIII) is at a higher level. In the case where the liquid crystal composition of the present invention is used in a liquid crystal display device which is driven at a small driving voltage, the appropriate amount of the compound represented by General Formula (XIII) is at a higher level. In the case where the liquid crystal composition of the present invention is used in a liquid crystal display device which is used in a low-temperature environment, the appropriate amount of the compound represented by General Formula (XIII) is at a lower level. In the case where the liquid crystal composition is used in a liquid crystal display device which quickly responds, the appropriate amount of the compound represented by General Formula (XIII) is at a lower level.

The compound represented by General Formula (XIII) is preferably any of compounds represented by General Formula (XIII-1).

[Chem. 137]

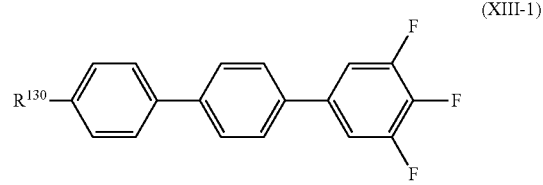

(XIII-1)

(in the formula, $R^{130}$ represents an alkyl group having 1 to 5 carbon atoms, an alkenyl group having 2 to 5 carbon atoms, or an alkoxy group having 1 to 4 carbon atoms.)

The amount of the compound represented by General Formula (XIII-1) is preferably in the range of 1 mass % to 25 mass %, more preferably 3 mass % to 25 mass %, further preferably 5 mass % to 20 mass %, and especially preferably 10 mass % to 15 mass % relative to the total mass of the liquid crystal composition of the present invention.

The compound represented by General Formula (XIII-1) is preferably any of compounds represented by Formulae (48.1) to (48.4), and more preferably the compound represented by Formula (48.2).

[Chem. 138]

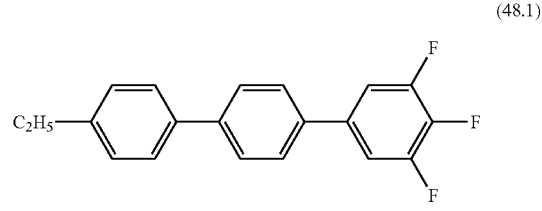

(48.1)

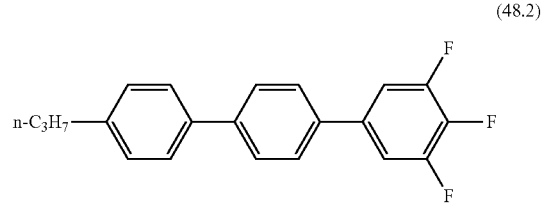

(48.2)

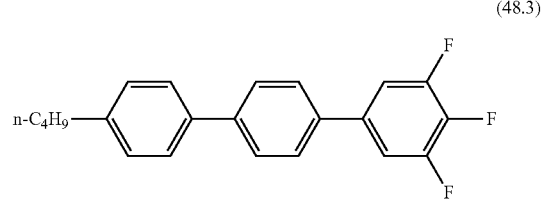

(48.3)

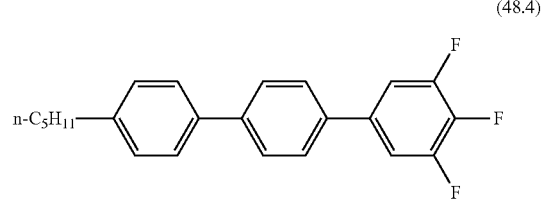

(48.4)

The compound represented by General Formula (XIII) is preferably any of compounds represented by General Formula (XIII-2)

[Chem. 139]

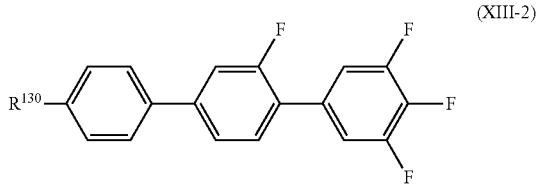

(XIII-2)

(in the formula, $R^{130}$ represents an alkyl group having 1 to 5 carbon atoms, an alkenyl group having 2 to 5 carbon atoms, or an alkoxy group having 1 to 4 carbon atoms.)

Such compounds represented by General Formula (XIII-2) can be used in any combination; at least one of the compounds is preferably used.

The amount of the compound represented by General Formula (XIII-2) is preferably in the range of 5 mass % to 25 mass %, more preferably 6 mass % to 25 mass %, further preferably 8 mass % to 20 mass %, and especially preferably 10 mass % to 15 mass % relative to the total mass of the liquid crystal composition of the present invention.

The compound represented by General Formula (XIII-2) is preferably any of compounds represented by Formulae (49.1) to (49.4), and more preferably the compound represented by Formula (49.1) or (49.2).

[Chem. 140]

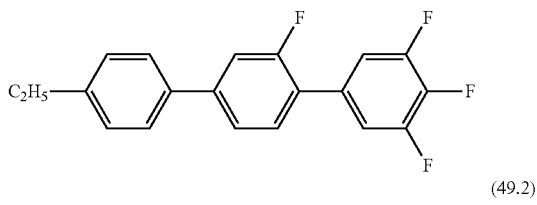

(49.1)

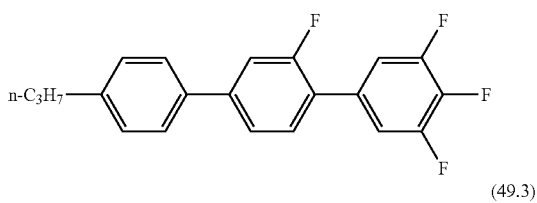

(49.2)

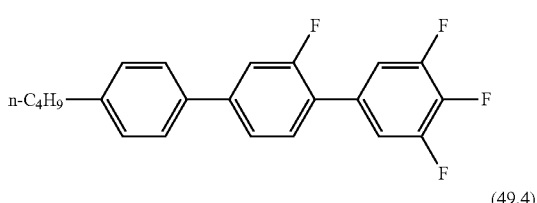

(49.3)

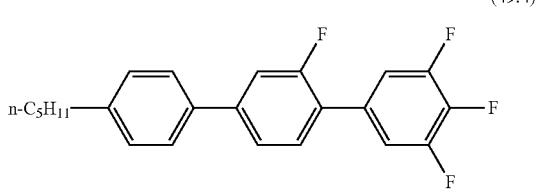

(49.4)

In the liquid crystal composition of the present invention, the amount of the compound represented by Formula (49.2) is preferably in the range of 1 mass % to 25 mass %, more preferably 1 mass % to 15 mass %, further preferably 2 mass % to 10 mass %, and especially preferably 3 mass % to 7 mass % relative to the total mass of the liquid crystal composition of the present invention in view of resistance to resolution at low temperature, transition temperature, electric reliability, and another property.

The compound represented by General Formula (XIII) is preferably any of compounds represented by General Formula (XIII-3).

[Chem. 141]

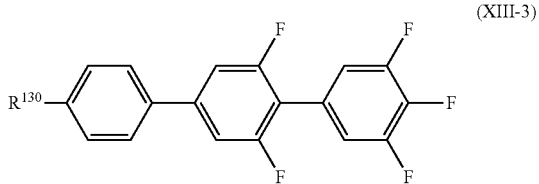

(XIII-3)

(in the formula, $R^{130}$ represents an alkyl group having 1 to 5 carbon atoms, an alkenyl group having 2 to 5 carbon atoms, or an alkoxy group having 1 to 4 carbon atoms.)

Such compounds represented by General Formula (XIII-3) can be used in any combination; one or two of the compounds are preferably used.

The amount of the compound represented by General Formula (XIII-3) is preferably in the range of 2 mass % to 20 mass %, more preferably 4 mass % to 20 mass %, further preferably 9 mass % to 17 mass %, and especially preferably 11 mass % to 14 mass % relative to the total mass of the liquid crystal composition of the present invention.

The compound represented by General Formula (XIII-3) is preferably any of compounds represented by Formulae (50.1) to (50.4), and more preferably the compound represented by Formula (50.1) or (50.2).

[Chem. 142]

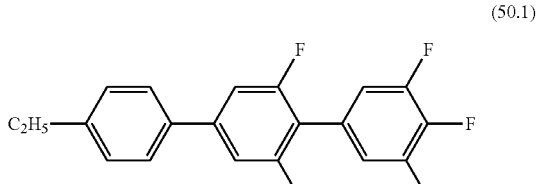

(50.1)

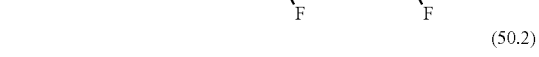

(50.2)

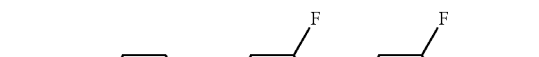

(50.3)

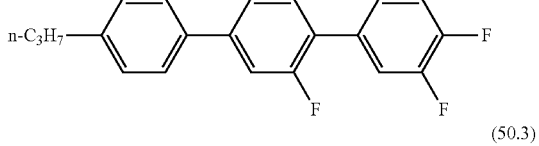

(50.4)

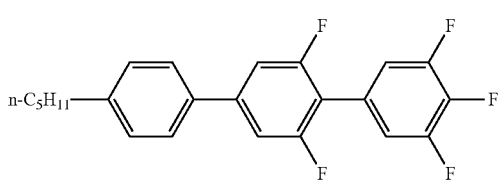

The compound represented by General Formula (M) is preferably a compound selected from the group consisting of compounds represented by General Formula (XIV).

[Chem. 143]

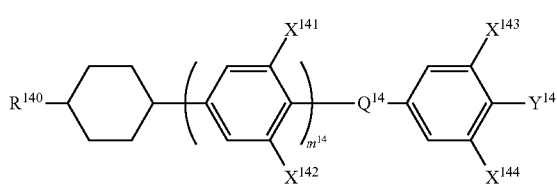

(XIV)

(in the formula, $R^{140}$ represents an alkyl group having 1 to 7 carbon atoms, an alkenyl group having 2 to 7 carbon atoms, or an alkoxy group having 1 to 7 carbon atoms; $X^{141}$ to $X^{144}$ each independently represent a fluorine atom or a hydrogen atom; $Y^{14}$ represents a fluorine atom, a chlorine atom, or —OCF$_3$; $Q^{14}$ represents a single bond, —COO—, or —CF$_2$O—; and $m^{14}$ represents 0 or 1.)

Such compounds represented by General Formula (XIV) can be used in any combination; a proper combination of the compounds for an embodiment can be determined in view of resistance to resolution at low temperature, transition temperature, electric reliability, birefringence, and another property. For example, one of the compounds is used in an embodiment of the present invention, two of the compounds are used in another embodiment of the present invention, three of the compounds are used in another embodiment of the present invention, four of the compounds are used in another embodiment of the present invention, five of the compounds are used in another embodiment of the present invention, and six or more of the compounds are used in another embodiment of the present invention.

The upper limit and lower limit of the amount of the compound represented by General Formula (XIV) are determined for an embodiment in view of properties such as resistance to resolution at low temperature, transition temperature, electric reliability, and birefringence.

Relative to the total mass of the liquid crystal composition of the present invention, for example, the amount of the compound is in the range of 3 to 40 mass % in an embodiment of the present invention; in another embodiment, the amount of the compound is from 7 to 40 mass %; in another embodiment, the amount of the compound is from 8 to 40 mass %; in another embodiment, the amount of the compound is from 11 to 40 mass %; in another embodiment, the amount of the compound is from 12 to 40 mass %; in another embodiment, the amount of the compound is from 16 to 40 mass %; in another embodiment, the amount of the compound is from 18 to 40 mass %; in another embodiment, the amount of the compound is from 19 to 40 mass %; in another embodiment, the amount of the compound is from 22 to 40 mass %; and in another embodiment, the amount of the compound is from 25 to 40 mass %.

Furthermore, relative to the total mass, for instance, the amount of the compound is in the range of 3 to 40 mass % in an embodiment of the present invention; in another embodiment, the amount of the compound is from 3 to 35 mass %; in another embodiment, the amount of the compound is from 3 to 30 mass %; in another embodiment, the amount of the compound is from 3 to 25 mass %; in another embodiment, the amount of the compound is from 3 to 20 mass %; and in another embodiment, the amount of the compound is from 3 to 15 mass %.

In the case where the liquid crystal composition of the present invention is used in a liquid crystal display device which is driven at a small driving voltage, the appropriate amount of the compound represented by General Formula (XIV) is at a higher level. In the case where the liquid crystal composition is used in a liquid crystal display device which quickly responds, the appropriate amount of the compound represented by General Formula (XIV) is at a lower level.

The compound represented by General Formula (XIV-1) is preferably a compound represented by General Formula (XIV-1-2).

[Chem. 144]

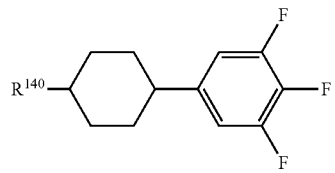

(XIV-1-2)

(in the formula, $R^{140}$ represents an alkyl group having 1 to 7 carbon atoms, an alkenyl group having 2 to 7 carbon atoms, or an alkoxy group having 1 to 7 carbon atoms.)

The amount of the compound represented by General Formula (XIV-1-2) is preferably in the range of 1 mass % to 15 mass %, more preferably 3 mass % to 13 mass %, further preferably 5 mass % to 11 mass %, and especially preferably 7 mass % to 9 mass % relative to the total mass of the liquid crystal composition of the present invention in view of resistance to resolution at low temperature, transition temperature, electric reliability, and another property.

In particular, the compound represented by General Formula (XIV-1-2) is preferably any of compounds represented by Formulae (52.1) to (52.4), and more preferably the compound represented by Formula (52.4).

[Chem. 145]

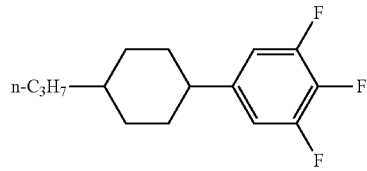

(52.1)

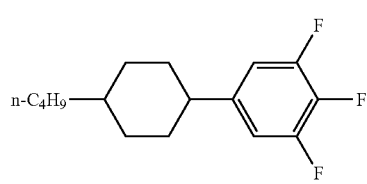

(52.2)

-continued (52.3)
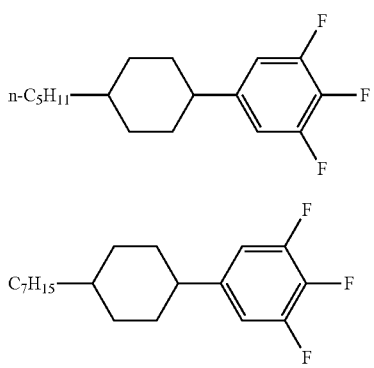

(52.4)
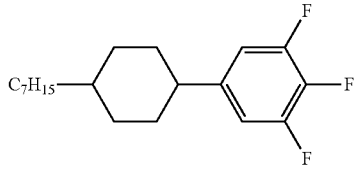

The compound represented by General Formula (XIV) is preferably any of compounds represented by General Formula (XIV-2).

[Chem. 146]

(XIV-2)
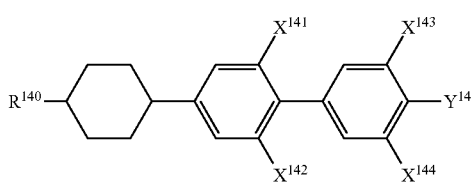

(in the formula, $R^{140}$ represents an alkyl group having 1 to 5 carbon atoms, an alkenyl group having 2 to 5 carbon atoms, or an alkoxy group having 1 to 4 carbon atoms; $X^{141}$ to $X^{144}$ each independently represent a fluorine atom or a hydrogen atom; and $Y^{14}$ represents a fluorine atom, a chlorine atom, or —OCF$_3$.)

Such compounds represented by General Formula (XIV-2) can be used in any combination; a proper combination of the compounds for an embodiment can be determined in view of resistance to resolution at low temperature, transition temperature, electric reliability, birefringence, and another property. For example, one of such compounds is used in an embodiment of the present invention, two of the compounds are used in another embodiment of the present invention, three of the compounds are used in another embodiment of the present invention, four of the compounds are used in another embodiment of the present invention, and five or more of the compounds are used in another embodiment of the present invention.

The upper limit and lower limit of the amount of the compound represented by General Formula (XIV-2) are determined for an embodiment in view of properties such as resistance to resolution at low temperature, transition temperature, electric reliability, and birefringence.

Relative to the total mass of the liquid crystal composition of the present invention, for example, the amount of the compound is in the range of 3 to 40 mass % in an embodiment of the present invention; in another embodiment, the amount of the compound is from 7 to 40 mass %; in another embodiment, the amount of the compound is from 8 to 40 mass %; in another embodiment, the amount of the compound is from 10 to 40 mass %; in another embodiment, the amount of the compound is from 11 to 40 mass %; in another embodiment, the amount of the compound is from 12 to 40 mass %; in another embodiment, the amount of the compound is from 18 to 40 mass %; in another embodiment, the amount of the compound is from 19 to 40 mass %; in another embodiment, the amount of the compound is from 21 to 40 mass %; and in another embodiment, the amount of the compound is from 22 to 40 mass %.

Furthermore, relative to the total mass, for instance, the amount of the compound is in the range of 3 to 40 mass % in an embodiment of the present invention; in another embodiment, the amount of the compound is from 3 to 35 mass %; in another embodiment, the amount of the compound is from 3 to 25 mass %; in another embodiment, the amount of the compound is from 3 to 20 mass %; in another embodiment, the amount of the compound is from 3 to 15 mass %; and in another embodiment, the amount of the compound is from 3 to 10 mass %.

In the case where the liquid crystal composition of the present invention is used in a liquid crystal display device which is driven at a small driving voltage, the appropriate amount of the compound represented by General Formula (XIV-2) is at a higher level. In the case where the liquid crystal composition is used in a liquid crystal display device which quickly responds, the appropriate amount of the compound represented by General Formula (XIV-2) is at a lower level.

The compound represented by General Formula (XIV-2) is preferably any of compounds represented by General Formula (XIV-2-2).

[Chem. 147]

(XIV-2-2)
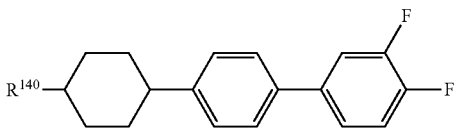

(in the formula, $R^{140}$ represents an alkyl group having 1 to 5 carbon atoms, an alkenyl group having 2 to 5 carbon atoms, or an alkoxy group having 1 to 4 carbon atoms.)

The amount of the compound represented by General Formula (XIV-2-2) is preferably in the range of 3 mass % to 20 mass %, more preferably 6 mass % to 17 mass %, further preferably 9 mass % to 15 mass %, and especially preferably 12 mass % to 14 mass % relative to the total mass of the liquid crystal composition of the present invention in view of resistance to resolution at low temperature, transition temperature, electric reliability, and another property.

In particular, the compound represented by General Formula (XIV-2-2) is preferably any of compounds represented by Formulae (54.1) to (54.4), and more preferably the compound represented by Formula (54.2) and/or the compound represented by Formula (54.4).

[Chem. 148]

(54.1)
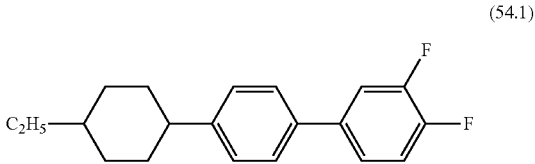

(54.2)

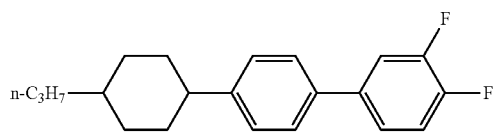

(54.3)

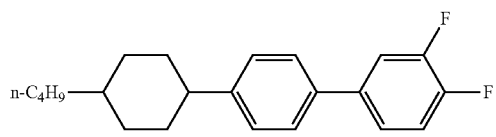

(54.4)

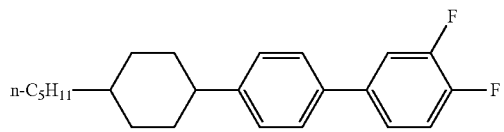

In the liquid crystal composition of the present invention, the amount of the compound represented by Formula (54.2) is preferably in the range of 1 mass % to 25 mass %, more preferably 1 mass % to 10 mass %, and further preferably 2 mass % to 8 mass % relative to the total mass of the liquid crystal composition of the present invention.

The compound represented by General Formula (XIV-2) is preferably a compound represented by General Formula (XIV-2-3).

[Chem. 149]

(XIV-2-3)

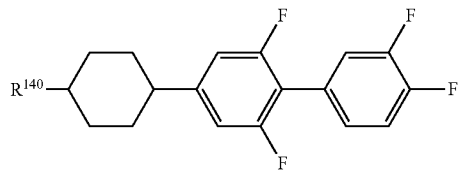

(in the formula, $R^{140}$ represents an alkyl group having 1 to 5 carbon atoms, an alkenyl group having 2 to 5 carbon atoms, or an alkoxy group having 1 to 4 carbon atoms.)

The amount of the compound represented by General Formula (XIV-2-3) is preferably in the range of 5 mass % to 30 mass %, more preferably 9 mass % to 27 mass %, further preferably 12 mass % to 24 mass %, and especially preferably 12 mass % to 20 mass % relative to the total mass of the liquid crystal composition of the present invention in view of resistance to resolution at low temperature, transition temperature, electric reliability, and another property.

In particular, the compound represented by General Formula (XIV-2-3) is preferably any of compounds represented by Formulae (55.1) to (55.4), and more preferably the compound represented by Formula (55.2) and/or the compound represented by Formula (55.4)

[Chem. 150]

(55.1)

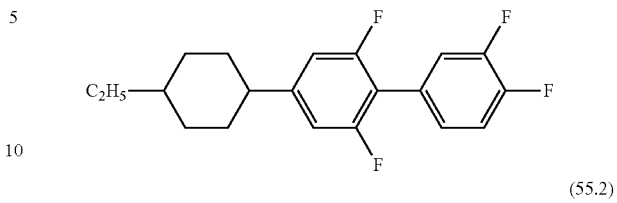

(55.2)

(55.3)

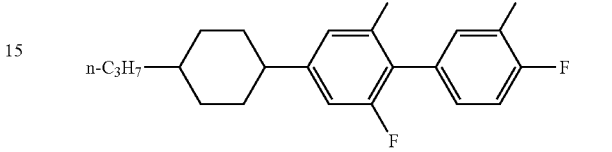

(55.4)

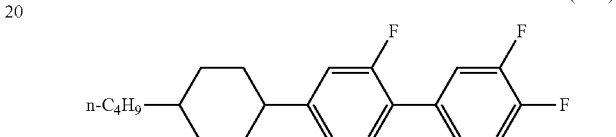

The compound represented by General Formula (XIV-2) is preferably any of compounds represented by General Formula (XIV-2-4).

[Chem. 151]

(XIV-2-4)

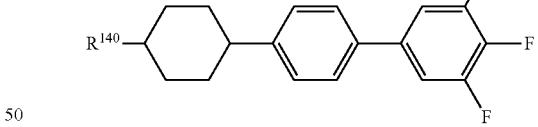

(in the formula, $R^{140}$ represents an alkyl group having 1 to 5 carbon atoms, an alkenyl group having 2 to 5 carbon atoms, or an alkoxy group having 1 to 4 carbon atoms.)

Such compounds represented by General Formula (XIV-2-4) can be used in any combination; a proper combination of the compounds for an embodiment can be determined in view of resistance to resolution at low temperature, transition temperature, electric reliability, birefringence, and another property. For example, one of such compounds is used in an embodiment of the present invention, two of the compounds are used in another embodiment of the present invention, and three or more of the compounds are used in another embodiment of the present invention.

The upper limit and lower limit of the amount of the compound represented by General Formula (XIV-2-4) are determined for an embodiment in view of properties such as resistance to resolution at low temperature, transition temperature, electric reliability, and birefringence.

Relative to the total mass of the liquid crystal composition of the present invention, for example, the amount of the compound is in the range of 2 to 35 mass % in an embodiment of the present invention; in another embodiment, the amount of the compound is from 5 to 35 mass %; in another embodiment, the amount of the compound is from 8 to 35 mass %; in another embodiment, the amount of the compound is from 9 to 35 mass %; in another embodiment, the amount of the compound is from 10 to 35 mass %; in another embodiment, the amount of the compound is from 18 to 35 mass %; in another embodiment, the amount of the compound is from 21 to 35 mass %; in another embodiment, the amount of the compound is from 22 to 35 mass %; and in another embodiment, the amount of the compound is from 24 to 35 mass %.

Furthermore, relative to the total mass, for instance, the amount of the compound is in the range of 2 to 35 mass % in an embodiment of the present invention; in another embodiment, the amount of the compound is from 2 to 30 mass %; in another embodiment, the amount of the compound is from 2 to 25 mass %; in another embodiment, the amount of the compound is from 2 to 20 mass %; in another embodiment, the amount of the compound is from 2 to 15 mass %; and in another embodiment, the amount of the compound is from 2 to 10 mass %.

In the case where the liquid crystal composition of the present invention is used in a liquid crystal display device which is driven at a small driving voltage, the appropriate amount of the compound represented by General Formula (XIV-2-4) is at a higher level. In the case where the liquid crystal composition is used in a liquid crystal display device which quickly responds, the appropriate amount of the compound represented by General Formula (XIV-2-4) is at a lower level.

In particular, the compound represented by General Formula (XIV-2-4) is preferably any of compounds represented by Formulae (56.1) to (56.4), and more preferably the compound represented by Formula (56.1), the compound represented by Formula (56.2), and/or the compound represented by Formula (56.4).

[Chem. 152]

(56.1)

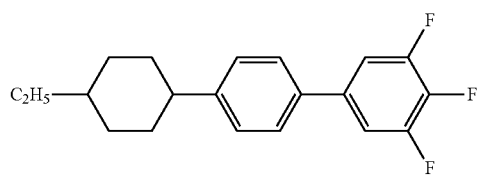

(56.2)

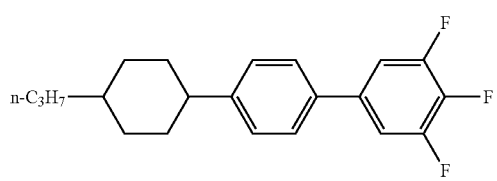

(56.3)

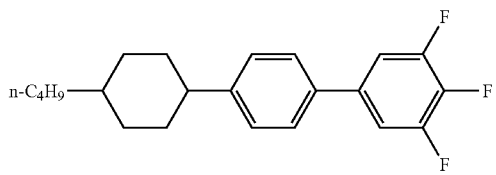

(56.4)

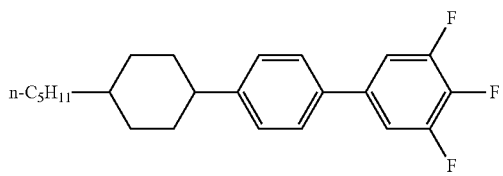

The compound represented by General Formula (XIV-2) is preferably any of compounds represented by General Formula (XIV-2-5).

[Chem. 153]

(XIV-2-5)

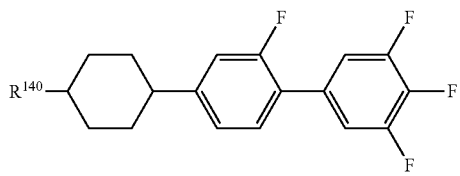

(in the formula, $R^{140}$ represents an alkyl group having 1 to 5 carbon atoms, an alkenyl group having 2 to 5 carbon atoms, or an alkoxy group having 1 to 4 carbon atoms.)

The amount of the compound represented by General Formula (XIV-2-5) is preferably in the range of 5 mass % to 25 mass %, more preferably 10 mass % to 22 mass %, further preferably 13 mass % to 18 mass %, and especially preferably 13 mass % to 15 mass % relative to the total mass of the liquid crystal composition of the present invention in view of resistance to resolution at low temperature, transition temperature, electric reliability, and another property.

In particular, the compound represented by General Formula (XIV-2-5) is any of compounds represented by Formulae (57.1) to (57.4). Among these, it is preferred that the compound represented by Formula (57.1) be employed.

[Chem. 154]

(57.1)

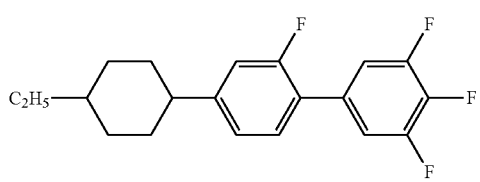

-continued (57.2)
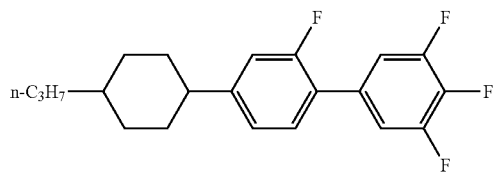

(57.3)
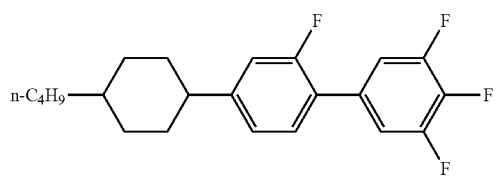

(57.4)
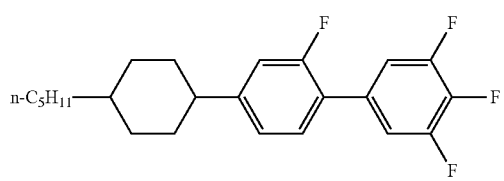

The compound represented by General Formula (XIV-2) is preferably any of compounds represented by General Formula (XIV-2-6).

[Chem. 155]

(XIV-2-6)
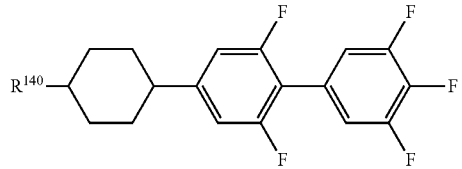

(in the formula, $R^{140}$ represents an alkyl group having 1 to 5 carbon atoms, an alkenyl group having 2 to 5 carbon atoms, or an alkoxy group having 1 to 4 carbon atoms.)

The amount of the compound represented by General Formula (XIV-2-6) is preferably in the range of 5 mass % to 25 mass %, more preferably 10 mass % to 22 mass %, further preferably 15 mass % to 20 mass %, and especially preferably 15 mass % to 17 mass % relative to the total mass of the liquid crystal composition of the present invention in view of resistance to resolution at low temperature, transition temperature, electric reliability, and another property.

In particular, the compound represented by General Formula (XIV-2-6) is preferably any of compounds represented by Formulae (58.1) to (58.4), and more preferably the compound represented by Formula (58.2).

[Chem. 156]

(58.1)
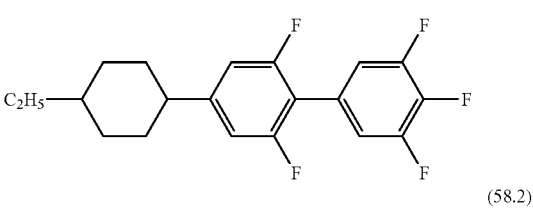

(58.2)
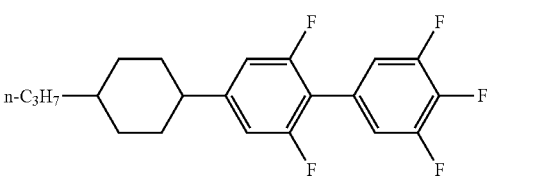

(58.3)
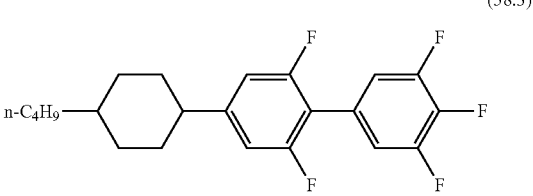

(58.4)
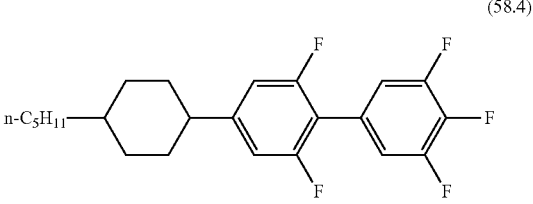

The liquid crystal composition of the first embodiment of the present invention can contain at least any one of compound represented by General Formula (X″). The compound represented by General Formula (X″) excludes the compound represented by General Formula (ii) and the compound represented by General Formula (L).

[Chem. 157]

(X″)
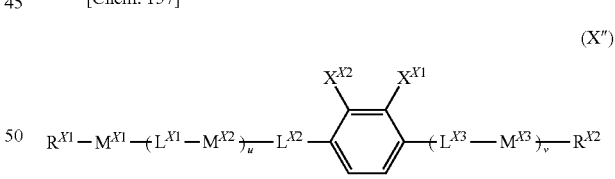

In General Formula (X″), $R^{X1}$ and $R^{X2}$ each independently represent an alkyl group having 1 to 10 carbon atoms, an alkoxy group having 1 to 10 carbon atoms, or an alkenyl group having 2 to 10 carbon atoms.

In the alkyl group, the alkoxy group, and the alkenyl group, one methylene moiety or at least two ethylene moieties not adjoining each other are optionally substituted with —O— or —S—.

In the alkyl group, the alkoxy group, and the alkenyl group, at least one hydrogen atom is optionally substituted with a fluorine atom or a chlorine atom.

In General Formula (X″), u and v each independently represent 0, 1, or 2 and satisfy the relationship u+V=2 or less.

In General Formula (X"), $M^{X1}$, $M^{X2}$, and $M^{X3}$ each independently represent a group selected from the group consisting of (a) a trans-1,4-cyclohexylene group (of which one methylene moiety or at least two methylene moieties not adjoining each other are optionally substituted with —O— or —S—) and (b) a 1,4-phenylene group (of which one —CH= moiety or at least two —CH= moieties not adjoining each other are optionally substituted with —N=).

A hydrogen atom contained in the group (a) or (b) is optionally substituted with a cyano group, a fluorine atom, a trifluoromethyl group, a trifluoromethoxy group, or a chlorine atom.

In the case where $M^{X2}$ and/or $M^{X3}$ are multiple, the $M^{X2}$ moieties and/or the $M^{X3}$ moieties may be the same as or different from each other, respectively.

In General Formula (X"), $L^{X1}$, $L^{X2}$, and $L^{X3}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, —CH=CH—, or —C≡C—. In the case where $L^{X1}$ and/or $L^{X3}$ are multiple, the $L^{X1}$ moieties and/or the $L^{X3}$ moieties may be the same as or different from each other, respectively.

In General Formula (X"), $X^{X1}$ and $X^{X2}$ each independently represent a trifluoromethyl group, a trifluoromethoxy group, or a fluorine atom; and any one of $X^{X1}$ and $X^{X2}$ represents a fluorine atom.

In the case where the ring structure bonded to $R^{X1}$ is a phenyl group (aromatic) in General Formula (X"), $R^{X1}$ is preferably a linear alkyl group having 1 to 5 carbon atoms, a linear alkoxy group having 1 to 4 (or more) carbon atoms, or an alkenyl group having 4 or 5 carbon atoms. In the case where the ring structure bonded to $R^{X1}$ is a saturated ring such as cyclohexane, pyran, or dioxane, $R^{X1}$ is preferably a linear alkyl group having 1 to 5 carbon atoms, a linear alkoxy group having 1 to 4 (or more) carbon atoms, or a linear alkenyl group having 2 to 5 carbon atoms.

In the case where the ring structure bonded to $R^{X2}$ is a phenyl group (aromatic) in General Formula (X"), $R^{X2}$ is preferably a linear alkyl group having 1 to 5 carbon atoms, a linear alkoxy group having 1 to 4 (or more) carbon atoms, or an alkenyl group having 4 or 5 carbon atoms. In the case where the ring structure bonded to $R^{X2}$ is a saturated ring such as cyclohexane, pyran, or dioxane, $R^{X2}$ is preferably a linear alkyl group having 1 to 5 carbon atoms, a linear alkoxy group having 1 to 4 (or more) carbon atoms, or a linear alkenyl group having 2 to 5 carbon atoms.

$R^{X1}$ and/or $R^{X2}$ are each preferably an alkenyl group in terms of an improvement in the response speed of the liquid crystal display device of the present invention or an alkyl group in terms of reliability of a voltage holding ratio or another property. The alkenyl group preferably has any of structures represented by Formulae (Alkenyl-1) to (Alkenyl-4). In the formula, the right end of each alkenyl group is bonded to the ring structure.

[Chem. 158]

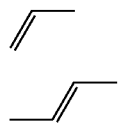

(Alkenyl-1)

(Alkenyl-2)

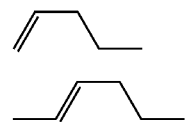

(Alkenyl-3)

(Alkenyl-4)

In the case where the liquid crystal composition of the present invention contains a reactive monomer, the structures represented by Formulae (Alkenyl-2) and (Alkenyl-4) are preferred, and the structure represented by Formula (Alkenyl-2) is more preferred.

In the case where the liquid crystal composition needs to be chemically stable, it is preferred that the molecules of the compound represented by General Formula (X") be free from a sulfur atom, a nitrogen atom, an ester group, a cyano group, and a chlorine atom.

In the case where the compound represented by General Formula (X") is used, the dielectric anisotropy Δ∈ of the liquid crystal composition at 25° C. is preferably from −2.0 to −6.0, more preferably from −2.5 to −5.0, and especially preferably from −2.5 to −4.0. In particular, the dielectric anisotropy Δ∈ is preferably from −2.5 to −3.4 in view of a response speed or from −3.4 to −4.0 in view of a driving voltage.

Such compounds represented by General Formula (X") can be used in any combination; a proper combination of the compounds is determined on the basis of predetermined properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven of the compounds are used. In another embodiment of the present invention, eight of the compounds are used. In another embodiment of the present invention, nine of the compounds are used. In another embodiment of the present invention, ten or more of the compounds are used.

In the liquid crystal composition of the present invention, the amount of the compound represented by General Formula (X") needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the preferred lower limit of the amount is 1% in an embodiment of the present invention, 10% in another embodiment of the present invention, 20% in another embodiment of the present invention, 30% in another embodiment of the present invention, 40% in another embodiment of the present invention, 50% in another embodiment of the present invention, 55% in another embodiment of the present invention, 60% in another embodiment of the present invention, 65% in another embodiment of the present invention, 70% in another embodiment of the present invention, 75% in another embodiment of the present invention, or 80% in another embodiment of the present invention.

Moreover, relative to the total mass of the liquid crystal composition of the present invention, for example, the preferred upper limit of the amount is 95% in an embodiment of the present invention, 85% in another embodiment of the present invention, 75% in another embodiment of the present invention, 65% in another embodiment of the present invention, 55% in another embodiment of the present invention, 45% in another embodiment of the present invention, 35% in another embodiment of the present invention, or 25% in another embodiment of the present invention.

In the case where the viscosity of the liquid crystal composition of the present invention needs to be kept at a low level for allowing the liquid crystal composition to contribute to a high response speed, it is preferred that the above-mentioned lower limit be high and that the upper limit be high. In the case where the Tni of the liquid crystal composition of the present invention needs to be kept at a high level to allow the liquid crystal composition to have a high temperature stability, it is preferred that the lower limit be high and that the upper limit be high. In order to increase dielectric anisotropy for keeping driving voltage at a low level, it is preferred that the lower limit be low and that the upper limit be low.

In the case where the compound represented by General Formula (X") is used, the refractive index anisotropy Δn of the liquid crystal composition at 25° C. is preferably from 0.08 to 0.13, and more preferably from 0.09 to 0.12. In particular, the refractive index anisotropy Δn is preferably from 0.10 to 0.12 in order to form a thin cell gap or from 0.08 to 0.10 in order to form a thick cell gap.

The rotational viscosity (γ1) of the liquid crystal composition of the present invention is preferably not more than 150, more preferably not more than 130, and especially preferably not more than 120.

The compound represented by General Formula (X") is preferably any of compounds represented by General Formula (XI").

[Chem. 159]

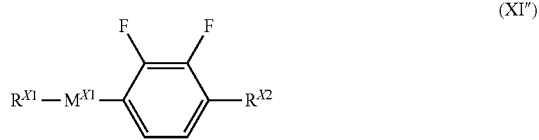

(XI")

In Formula (XI"), $R^{X1}$ has the same meaning as $R^{X1}$ in General Formula (X"), $M^{X1}$ has the same meaning as $M^{X1}$ in General Formula (X"), and $R^{X2}$ has the same meaning as $R^{X2}$ in General Formula (X")

In the case where the compound represented by General Formula (XI") is used, for example, the preferred lower limit of the amount thereof is, relative to the total mass of the liquid crystal composition of the present invention, 1% in an embodiment of the present invention, 5% in another embodiment of the present invention, 10% in another embodiment of the present invention, 11% in another embodiment of the present invention, 14% in another embodiment of the present invention, 15% in another embodiment of the present invention, 16% in another embodiment of the present invention, 17% in another embodiment of the present invention, 18% in another embodiment of the present invention, 19% in another embodiment of the present invention, 20% in another embodiment of the present invention, 21% in another embodiment of the present invention, 22% in another embodiment of the present invention, 23% in another embodiment of the present invention, or 25% in another embodiment of the present invention.

Furthermore, relative to the total mass of the liquid crystal composition of the present invention, for example, the preferred upper limit of the amount is 50% in an embodiment of the present invention, 45% in another embodiment of the present invention, 40% in another embodiment of the present invention, 35% in another embodiment of the present invention, 30% in another embodiment of the present invention, 25% in another embodiment of the present invention, 24% in another embodiment of the present invention, 23% in another embodiment of the present invention, 22% in another embodiment of the present invention, 21% in another embodiment of the present invention, or 20% in another embodiment of the present invention.

In the case where the liquid crystal composition of the present invention contains a compound represented by General Formula (XI"), the amount of the compound represented by General Formula (XI") is preferably in the range of 5 to 35 mass %, more preferably 10 to 30 mass %, further preferably 15 to 25 mass %, and especially preferably 19 to 23 mass % relative to the total mass of the liquid crystal composition.

In General Formula (XI"), $R^{X1}$ preferably represents an alkyl group having 1 to 8 carbon atoms or an alkenyl group having 2 to 8 carbon atoms, more preferably an alkyl group having 1 to 8 carbon atoms, further preferably an alkyl group having 3 to 5 carbon atoms, and further preferably an alkyl group having 3 or 5 carbon atoms; in addition, $R^{X1}$ is preferably linear and has a straight-chain structure.

In General Formula (XI"), $R^{X2}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; more preferably an alkyl group having 1 to 8 carbon atoms or an alkoxy group having 1 to 8 carbon atoms; further preferably an alkyl group having 3 to 5 carbon atoms or an alkoxy group having 2 to 4 carbon atoms; further preferably an alkyl group having 3 or 5 carbon atoms or an alkoxy group having 2 or 4 carbon atoms; and further preferably an alkoxy group having 2 or 4 carbon atoms; in addition, $R^{X2}$ preferably has a straight-chain structure.

$R^{X2}$ is preferably an alkenyl group in terms of an improvement in the response speed of the liquid crystal display device of the present invention or an alkyl group in terms of reliability of a voltage holding ratio or another property.

Such compounds represented by General Formula (XI") can be used in any combination; a proper combination of the compounds is determined on the basis of predetermined properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven of the compounds are used. In another embodiment of the present invention, eight of the compounds are used. In another embodiment of the present invention, nine of the compounds are used. In another embodiment of the present invention, ten or more of the compounds are used.

Such compounds represented by General Formula (XI″) may be used alone; however, two or more of the compounds are preferably used, and three or more of the compounds are also preferably used. In the case where two or more of the compounds represented by General Formula (XI″) are used, compounds represented by General Formula (XI″) in which $R^{X1}$ represents an alkyl group having 3 to 5 carbon atoms and in which $R^{X2}$ represents an alkoxy group having 2 to 4 carbon atoms (hereinafter also referred to as compound α) are preferably used in combination. In the case where the compound α is used in combination with another compound represented by General Formula (XI″), the amount of the compound α is preferably not less than 50 mass %, more preferably not less than 70 mass %, and further preferably not less than 80 mass % relative to the total mass of the compounds represented by General Formula (XI″).

In General Formula (XI″), $M^{X1}$ represents a 1,4-cyclohexylene group, a 1,4-phenylene group, or a tetrahydropyran-2,5-diyl group. In the case where $M^{X1}$ represents a 1,4-phenylene group, at least one hydrogen atom contained in the 1,4-phenylene group may be substituted with a fluorine atom. $M^{X1}$ is preferably a 1,4-cyclohexylene group or a 1,4-phenylene group.

More specifically, $M^{X1}$ preferably represents a 1,4-phenylene group in terms of the response speed of a liquid crystal display device and liquid crystal display in which the liquid crystal composition of the present invention is used. $M^{X1}$ preferably represents a 1,4-cyclohexylene group in order to extend the range of operating temperature to the high-temperature side (increase Tni). In the case where $M^{X1}$ represents a 1,4-phenylene group when Tni needs to be increased, at least one hydrogen atom of the benzene ring thereof may be substituted with a fluorine atom; however, it is preferred that zero to two hydrogen atoms be substituted with fluorine atoms, and it is more preferred that no hydrogen atom be substituted with a fluorine atom (unsubstituted 1,4-phenylene group). In the case where two hydrogen atoms of the phenylene group have been substituted with fluorine atoms, $M^{X1}$ preferably represents a 2,3-difluoro-1,4-phenylene group.

The compound represented by General Formula (XI″) is preferably a compound selected from the group consisting of compounds represented by General Formula (XI″-1) and/or compounds represented by General Formula (XI″-2).

[Chem. 160]

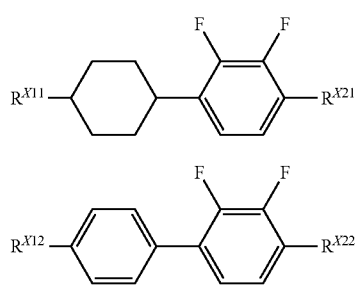

In the formulae, $R^{X11}$, $R^{X21}$, $R^{X12}$, and $R^{X22}$ each independently represent an alkyl group having 1 to 5 carbon atoms, an alkenyl group having 2 to 5 carbon atoms, an alkoxy group having 1 to 5 carbon atoms, or an alkenyloxy group having 2 to 5 carbon atoms.

In the case where $R^{X21}$, $R^{X12}$, and $R^{X22}$ are each an alkenyl group, the alkenyl group preferably has 4 or 5 carbon atoms. $R^{X11}$ preferably represents an alkyl group or an alkenyl group, and more preferably an alkyl group. $R^{X21}$ and $R^{X22}$ are each preferably an alkyl group or an alkoxy group. $R^{X12}$ is preferably an alkyl group or an alkenyl group, and more preferably an alkyl group.

In order to increase the absolute value of the Δ∈ of a compound represented by any of the above-mentioned formulae, $R^{X11}$, $R^{X21}$, $R^{X12}$, and $R^{X22}$ are each preferably an alkoxy group or an alkenyloxy group, and more preferably an alkoxy group.

In particular, the compound represented by General Formula (XI″) is preferably any of compounds represented by Formulae (XI″-1-1) to (XI″-1-8) and Formulae (XI″-2-1) to (XI″-2-4).

[Chem. 161]

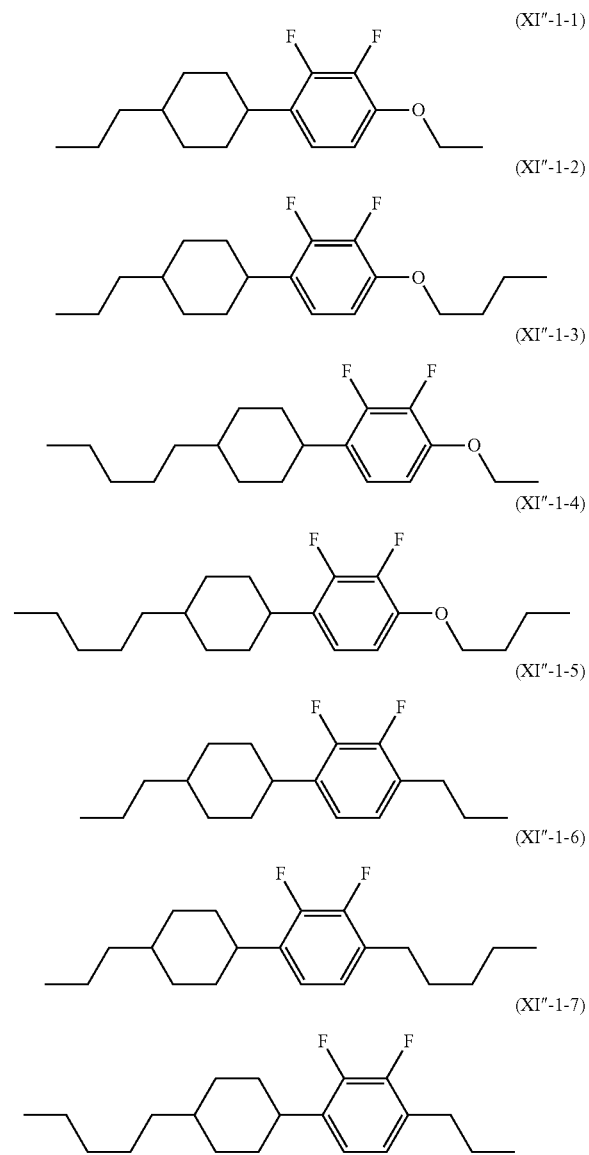

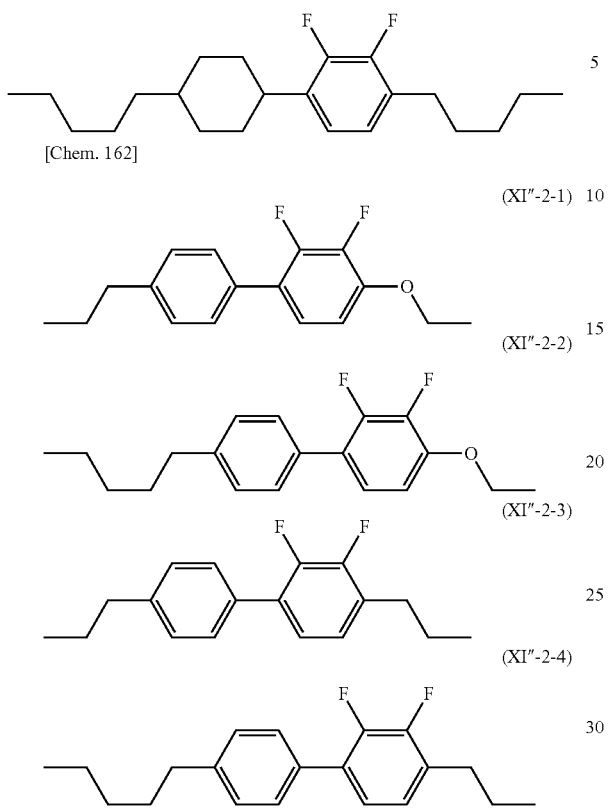

Among the compounds represented by Formulae (XI"-1-1) to (XI"-1-8) and Formulae (XI"-2-1) to (XI"-2-4), the compounds represented by Formulae (XI"-1-1) to (XI"-1-4), (XI"-2-1), and (XI"-2-2) are preferred; the compounds represented by Formulae (XI"-1-1), (XI"-1-3), (XI"-2-1), and (XI"-2-2) are more preferred; and the compounds represented by Formulae (XI"-1-1), (XI"-1-3), and (XI"-2-1) are especially preferred.

In the case where the liquid crystal composition of the present invention needs to have a relatively small refractive index anisotropy Δn (approximately less than 0.100), the compounds represented by Formulae (XI"-1-1) and (XI"-1-3) are most preferred. In the case where the liquid crystal composition of the present invention needs to have a relatively large refractive index anisotropy Δn (approximately 0.100 or more), the compound represented by Formula (XI"-2-1) is most preferred.

In the liquid crystal composition of the present invention, the amount of the compound represented by Formula (XI"-1-1) is preferably in the range of 3 mass % to 20 mass %, more preferably 5 mass % to 18 mass %, further preferably 7 mass % to 15 mass %, and especially preferably 9 mass % to 13 mass % relative to the total mass of the liquid crystal composition of the present invention in view of resistance to resolution at low temperature, transition temperature, electric reliability, and another property.

In the liquid crystal composition of the present invention, the amount of the compound represented by Formula (XI"-2-1) is preferably in the range of 3 mass % to 30 mass %, more preferably 4 mass % to 18 mass %, further preferably 5 mass % to 15 mass %, and especially preferably 7 mass % to 13 mass % relative to the total mass of the liquid crystal composition of the present invention in view of resistance to resolution at low temperature, transition temperature, electric reliability, and another property.

In the case where the compound represented by Formula (XI"-1-1) and the compound represented by Formula (XI"-2-1) are used in combination in the liquid crystal composition of the present invention, the total amount of these two compounds is preferably in the range of 10 mass % to 30 mass %, more preferably 15 mass % to 25 mass %, and further preferably 19 mass % to 23 mass % relative to the total mass of the liquid crystal composition.

In the case where a compound represented by General Formula (XI") contains an alkenyl group, the compound represented by General Formula (XI") is particularly preferably a compound selected from the group consisting of compounds represented by Formulae (XI"-1-10) to (XI"-1-13) and Formulae (XI"-2-10) and (XI"-2-11). In the formulae, $R^{X22}$ has the same meaning as $R^{X22}$ in General Formula (XI"-2).

[Chem. 163]

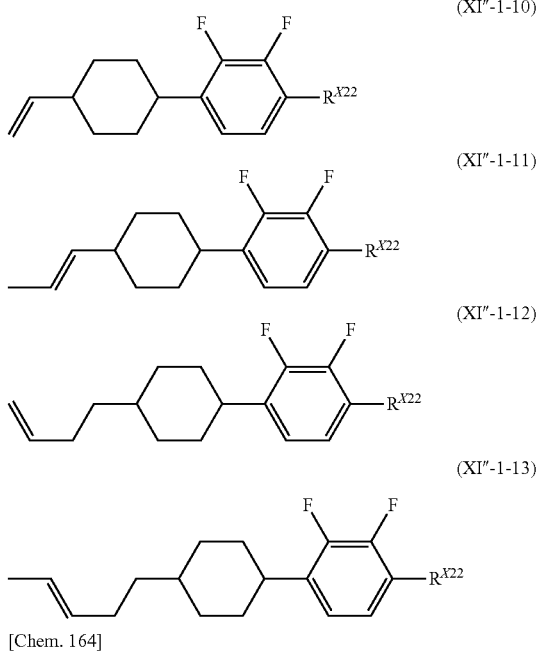

[Chem. 164]

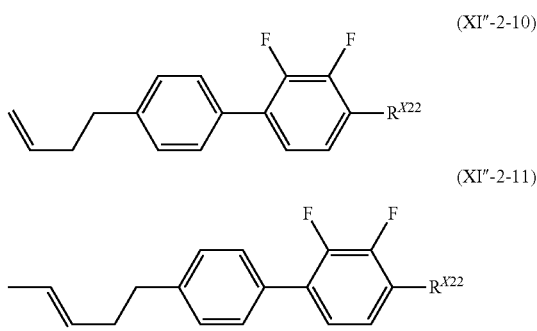

The compound represented by General Formula (X") is preferably any of compounds represented by General Formula (XII").

[Chem. 165]

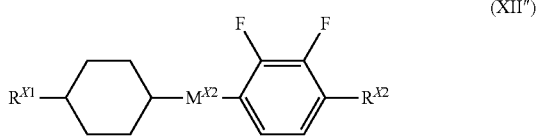
(XII″)

In Formula (XII″), $R^{X1}$ has the same meaning as $R^{X1}$ in General Formula (X″), $M^{X2}$ has the same meaning as $M^{X2}$ in General Formula (X″), and $R^{X2}$ has the same meaning as $R^{X2}$ in General Formula (X″).

In the case where the compound represented by General Formula (XII″) is used, for example, the preferred lower limit of the amount thereof is, relative to the total mass of the liquid crystal composition of the present invention, 1% in an embodiment of the present invention, 5% in another embodiment of the present invention, 10% in another embodiment of the present invention, 11% in another embodiment of the present invention, 15% in another embodiment of the present invention, 18% in another embodiment of the present invention, 19% in another embodiment of the present invention, 20% in another embodiment of the present invention, 23% in another embodiment of the present invention, 25% in another embodiment of the present invention, 26% in another embodiment of the present invention, 27% in another embodiment of the present invention, 28% in another embodiment of the present invention, 29% in another embodiment of the present invention, or 30% in another embodiment of the present invention.

Moreover, relative to the total mass of the liquid crystal composition of the present invention, for example, the preferred upper limit of the amount is 50% in an embodiment of the present invention, 45% in another embodiment of the present invention, 43% in another embodiment of the present invention, 42% in another embodiment of the present invention, 41% in another embodiment of the present invention, 40% in another embodiment of the present invention, 39% in another embodiment of the present invention, 38% in another embodiment of the present invention, 35% in another embodiment of the present invention, 33% in another embodiment of the present invention, or 30% in another embodiment of the present invention.

In General Formula (XII″), $R^{X1}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; more preferably an alkyl group having 1 to 8 carbon atoms or an alkenyl group having 2 to 8 carbon atoms; further preferably an alkyl group having 1 to 8 carbon atoms; further preferably an alkyl group having 2 to 5 carbon atoms; and especially preferably an alkyl group having 3 to 5 carbon atoms. The alkyl group and the alkenyl group each preferably have a straight-chain structure.

In General Formula (XII″), $R^{X2}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. Among these groups, $R^{X2}$ more preferably represents an alkyl group having 1 to 8 carbon atoms or an alkoxy group having 1 to 8 carbon atoms; further preferably an alkyl group having 1 to 5 carbon atoms or an alkoxy group having 1 to 4 carbon atoms; further preferably an alkoxy group having 1 to 4 carbon atoms; and especially preferably an alkoxy group having 2 or 3 carbon atoms. These groups each preferably have a straight-chain structure.

$R^{X2}$ is preferably an alkenyl group in consideration of an improvement in the response speed of the liquid crystal display device of the present invention or an alkyl group in consideration of reliability of a voltage holding ratio or another property.

Furthermore, the compound represented by General Formula (XII″) is preferably any of compounds represented by General Formulae (XII″-1) and (XII″-2).

[Chem. 166]

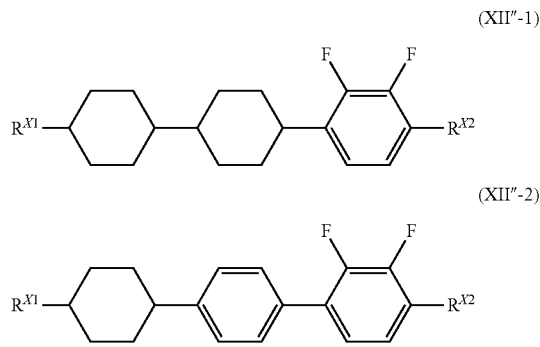

In the formulae, $R^{X1}$ has the same meaning as $R^{X1}$ in General Formula (X″), and $R^{X2}$ has the same meaning as $R^{X2}$ in General Formula (X″).

In particular, the compound represented by General Formula (XII″-1) is preferably any of compounds represented by Formulae (XII″-1-1) to (XII″-1-6).

[Chem. 167]

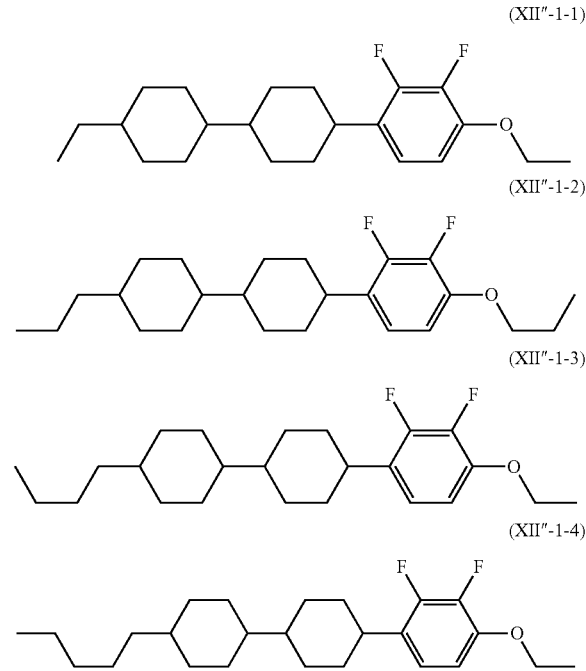

-continued (XII″-1-5)

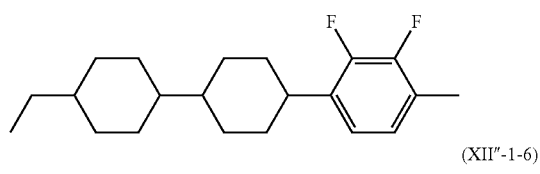

(XII″-1-6)

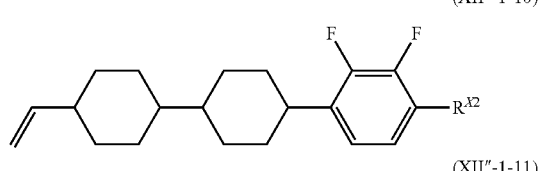

Among the compounds represented by Formulae (XII″-1-1) to (XII″-1-6), the compounds represented by Formulae (XII″-1-1) to (XII″-1-4) are more preferred, the compounds represented by Formulae (XII″-1-1) to (XII″-1-3) are further preferred, and the compounds represented by Formulae (XII″-1-1) and (XII″-1-2) are especially preferred.

In the liquid crystal composition of the present invention, the amount of the compound represented by Formula (XI″-1-2) is preferably in the range of 1 mass % to 30 mass %, more preferably 5 mass % to 20 mass %, further preferably 8 mass % to 18 mass %, and especially preferably 10 mass % to 15 mass % relative to the total mass of the liquid crystal composition of the present invention in view of resistance to resolution at low temperature, transition temperature, electric reliability, and another property.

In the case where a compound represented by General Formula (XII″-1) contains an alkenyl group, the compound represented by Formulae (XII″-1-10) to (XII″-1-13) are particularly preferred. In the formulae, $R^{X2}$ has the same meaning as $R^{X2}$ in General Formula (X″).

[Chem. 168]

(XII″-1-10)

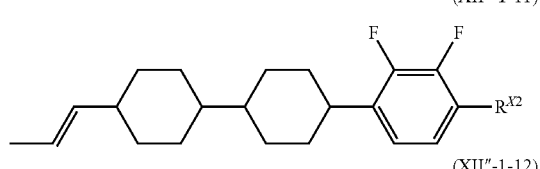

(XII″-1-11)

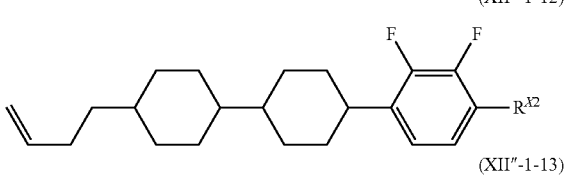

(XII″-1-12)

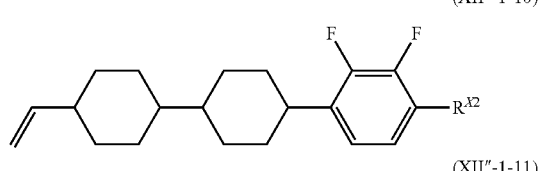

(XII″-1-13)

The compound represented by General Formula (XII″-2) is, in particular, preferably any of compounds represented by Formulae (XII″-2-1) to (XII″-2-6).

[Chem. 169]

(XII″-2-1)

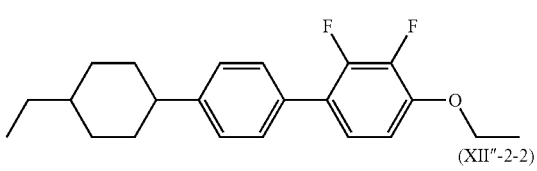

(XII″-2-2)

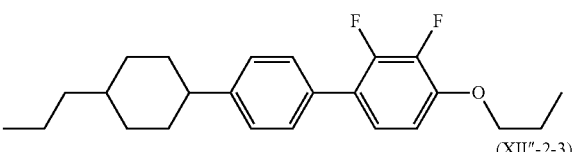

(XII″-2-3)

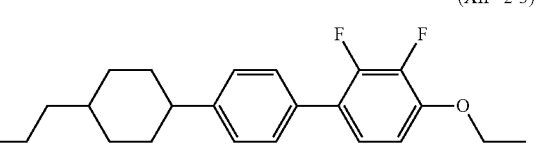

(XII″-2-4)

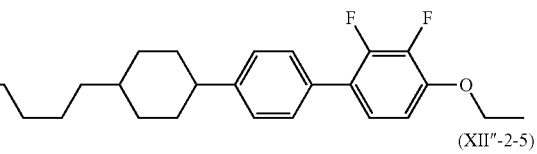

(XII″-2-5)

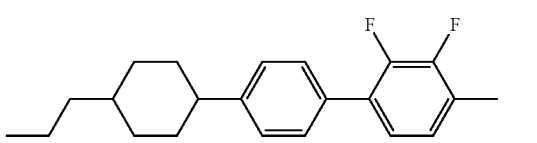

(XII″-2-6)

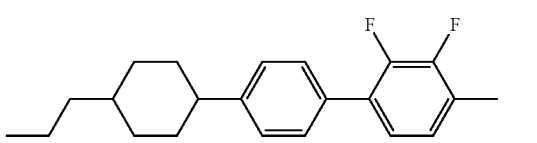

Among the compounds represented by Formulae (XII″-2-1) to (XII″-2-6), the compounds represented by Formulae (XII″-2-1) to (XII″-2-4) are more preferred, the compounds represented by Formulae (XII″-2-1) to (XII″-2-3) are further preferred, and the compounds represented by Formulae (XII″-2-1) and (XII″-2-3) are especially preferred.

In the liquid crystal composition of the present invention, the amount of the compound represented by Formula (XII″-2-1) is preferably in the range of 1 mass % to 30 mass %, more preferably 1 mass % to 20 mass %, further preferably 1 mass % to 15 mass %, and especially preferably 3 mass % to 9 mass % relative to the total mass of the liquid crystal composition of the present invention in view of resistance to resolution at low temperature, transition temperature, electric reliability, and another property.

In the case where a compound represented by General Formula (XII″-2) contains an alkenyl group, it is preferred that the compound represented by General Formula (XII″-2) be specifically any of compounds represented by Formulae (XII″-2-10) to (XII″-2-13). In the formulae, $R^{X2}$ has the same meaning as $R^{X2}$ in General Formula (X″).

[Chem. 170]

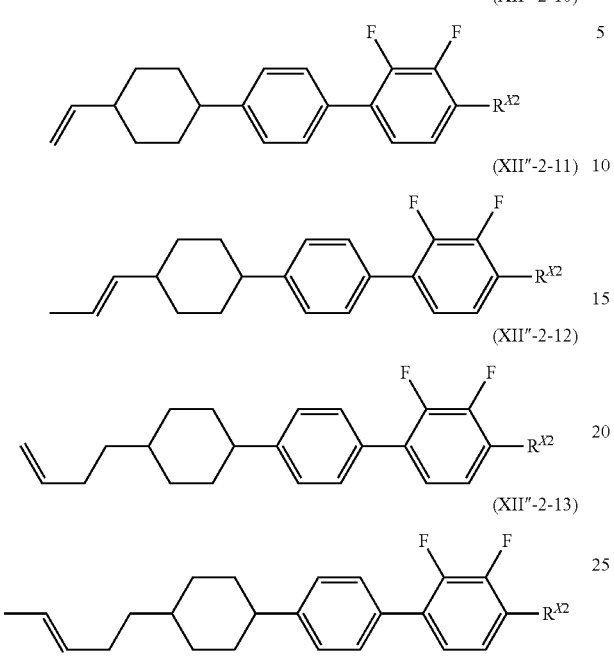

Such compounds represented by General Formula (XII"-2) can be used in any combination; a proper combination of the compounds is determined on the basis of predetermined properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven of the compounds are used. In another embodiment of the present invention, eight of the compounds are used. In another embodiment of the present invention, nine of the compounds are used. In another embodiment of the present invention, ten or more of the compounds are used.

In the case where four or more compounds represented by General Formula (XII") are used, the compounds represented by Formulae (XII"-2-1) to (XII"-2-4) are preferably employed in combination, and the amount of the compounds represented by Formulae (XII"-2-1) to (XII"-2-4) is preferably not less than 50 mass %, more preferably not less than 70 mass %, and further preferably not less than 80 mass % relative to the total mass of the compounds represented by General Formula (XII").

In the case where three compounds represented by General Formula (XII") are used, the compounds represented by Formulae (XII"-2-1) to (XII"-2-3) are preferably employed in combination, and the amount of the compounds represented by Formulae (XII"-2-1) to (XII"-2-3) is preferably not less than 50 mass %, more preferably not less than 70 mass %, and further preferably not less than 80 mass % relative to the total mass of the compounds represented by General Formula (XII").

In the case where two compounds represented by General Formula (XII") are used, the compounds represented by Formulae (XII"-2-1) and (XII"-2-3) are preferably employed in combination, and the amount of the compounds represented by Formulae (XII"-2-1) and (XII"-2-3) is preferably not less than 50 mass %, more preferably not less than 70 mass %, and further preferably not less than 80 mass % relative to the total mass of the compounds represented by General Formula (XII").

The compound represented by General Formula (X") can be any of compounds represented by General Formula (XIII").

[Chem. 171]

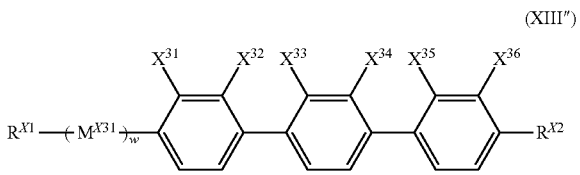

In Formula (XIII"), RX has the same meaning as $R^{X1}$ in General Formula (X"), $M^{X31}$ has the same meaning as $M^{X1}$ in General Formula (X"), $R^{X2}$ has the same meaning as $R^{X2}$ in General Formula (X"), W represents 0 or 1, $X^{31}$ to $X^{36}$ represent hydrogen atoms or fluorine atoms. Among pairs of $X^{31}$ and $X^{32}$, $X^{33}$ and $X^{34}$, and $X^{35}$ and $X^{36}$, at least one of the pairs is composed of fluorine atoms.

Such compounds represented by General Formula (XIII") can be used in any combination; a proper combination of the compounds is determined on the basis of predetermined properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven of the compounds are used. In another embodiment of the present invention, eight of the compounds are used. In another embodiment of the present invention, nine of the compounds are used. In another embodiment of the present invention, ten or more of the compounds are used.

In the case where the compound represented by General Formula (XIII") is used, for example, the preferred lower limit of the amount thereof is, relative to the total mass of the liquid crystal composition of the present invention, 1% in an embodiment of the present invention, 5% in another embodiment of the present invention, 10% in another embodiment of the present invention, 11% in another embodiment of the present invention, 14% in another embodiment of the present invention, 20% in another embodiment of the present invention, 30% in another embodiment of the present invention, 40% in another embodiment of the present invention, 50% in another embodiment of the present invention, 55% in another embodiment of the present invention, 60% in another embodiment of the present invention, 65% in another embodiment of the present invention, 70% in another embodiment of the present invention, 75% in another embodiment of the present invention, or 80% in another embodiment of the present invention.

Furthermore, relative to the total mass of the liquid crystal composition of the present invention, for example, the preferred upper limit of the amount is 95% in an embodiment of the present invention, 85% in another embodiment of the present invention, 75% in another embodiment of the present invention, 65% in another embodiment of the present invention, 55% in another embodiment of the present invention, 45% in another embodiment of the present invention, 35% in another embodiment of the present invention, 30% in another embodiment of the present invention, 28% in another embodiment of the present invention, 27% in another embodiment of the present invention, or 25% in another embodiment of the present invention.

In the case where the compound represented by General Formula (XIII″) is used, the amount thereof is preferably in the range of 0 to 30 mass %, and more preferably 0 to 25 mass % relative to the total mass of the liquid crystal composition of the present invention.

In General Formula (XIII″), $R^{X1}$ and $R^{X2}$ each independently preferably represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; more preferably an alkyl group having 1 to 8 carbon atoms or an alkenyl group having 2 to 8 carbon atoms; further preferably an alkyl group having 1 to 8 carbon atoms; especially preferably an alkyl group having 2 to 5 carbon atoms; and most preferably an alkyl group having 3 to 5 carbon atoms. In this case, the numbers of the carbon atoms of $R^{X1}$ and $R^{X2}$ are preferably different from each other. The alkyl group, the alkenyl group, the alkoxy group, and the alkenyloxy group each preferably have a straight-chain structure.

More specifically, the compound represented by General Formula (XIII″) is preferably a compound in which $R^{X1}$ represents a propyl group and in which $R^{X2}$ represents an ethyl group or a compound in which $R^{X1}$ represents a butyl group and in which $R^{X2}$ represents an ethyl group.

In General Formula (XIII″), it is preferred that $X^{31}$ to $X^{36}$ each independently represent a hydrogen atom or a fluorine atom, it is more preferred that two to five of $X^{31}$ to $X^{36}$ represent fluorine atoms, it is further preferred that two to four of $X^{31}$ to $X^{36}$ represent fluorine atoms, it is especially preferred that two or three of $X^{31}$ to $X^{36}$ represent fluorine atoms, and it is most preferred that two of $X^{31}$ to $X^{36}$ represent fluorine atoms.

In the case where two fluorine atoms are present, it is preferred that any two of $X^{33}$ to $X^{36}$ represent fluorine atoms, it is more preferred that a pair of $X^{33}$ and $X^{34}$ represent fluorine atoms or that a pair of $X^{35}$ and $X^{36}$ represent fluorine atoms, and it is further preferred that a pair of $X^{33}$ and $X^{34}$ represent fluorine atoms. In the case where three or more fluorine atoms are present, it is preferred that at least a pair of $X^{33}$ and $X^{34}$ represent fluorine atoms or that at least a pair of $X^{35}$ and $X^{36}$ represent fluorine atoms, and it is more preferred that at least a pair of $X^{33}$ and $X^{34}$ represent fluorine atoms.

In General Formula (XIII″), $M^{X31}$ preferably represents a 1,4-cyclohexylene group, a 1,4-phenylene group, or a tetrahydropyran-2,5-diyl group. In terms of the response speed of a liquid crystal display device and liquid crystal display in which the liquid crystal composition containing the compound represented by General Formula (XIII″) is used, M preferably represents a 1,4-phenylene group or a tetrahydropyran-2,5-diyl group, and more preferably a 1,4-phenylene group. In terms of the driving voltage of the above-mentioned liquid crystal display device and liquid crystal display, $M^{X31}$ preferably represents a 1,4-phenylene group or a tetrahydropyran-2,5-diyl group, and more preferably a tetrahydropyran-2,5-diyl group. In view of the range of the operating temperature of the above-mentioned liquid crystal display device and liquid crystal display, in other words, when the liquid crystal display device and the liquid crystal display need to operate in a high temperature range (Tni is increased), $M^{X31}$ preferably represents a 1,4-cyclohexylene group or a tetrahydropyran-2,5-diyl group, and more preferably a 1,4-cyclohexylene group. In the case where $M^{X31}$ represents a 1,4-phenylene group, at least one hydrogen atom of the benzene ring thereof may be substituted with a fluorine atom; however, it is preferred that zero to two hydrogen atoms be substituted with fluorine atoms. In the case where two hydrogen atoms of the phenylene group have been substituted with fluorine atoms, $M^{X31}$ preferably represents a 2,3-difluorobenzene-1,4-diyl group.

In General Formula (XIII″), W represents 0 or 1. W preferably represents 0 in consideration of the response speed of the above-mentioned liquid crystal display device and liquid crystal display. W preferably represents 1 in view of the range of the operating temperature of the above-mentioned liquid crystal display device and liquid crystal display, in other words, when the liquid crystal display device and the liquid crystal display need to operate in a high temperature range (Tni is increased).

The compound represented by General Formula (XIII″) is preferably any of compounds represented by General Formulae (XIII″-1) to (XIII″-23). In the formulae, $R^{X1}$ has the same meaning as $R^{X1}$ in General Formula (X″), and $R^{X2}$ has the same meaning as $R^{X2}$ in General Formula (X″).

[Chem. 172]

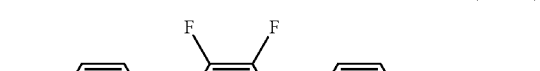

(XIII″-1)

(XIII″-2)

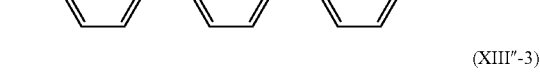

(XIII″-3)

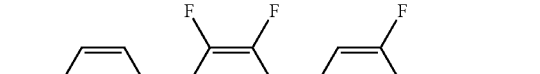

(XIII″-4)

(XIII''-5)
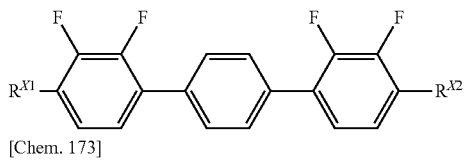
[Chem. 173]

(XIII''-10)
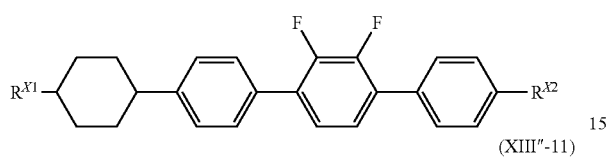

(XIII''-11)

(XIII''-12)

(XIII''-13)
[Chem. 174]

(XIII''-20)
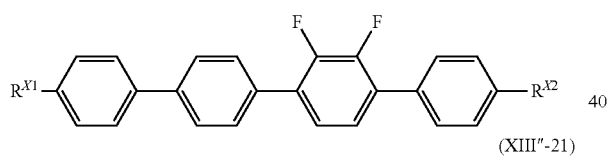

(XIII''-21)

(XIII''-22)

(XIII''-23)
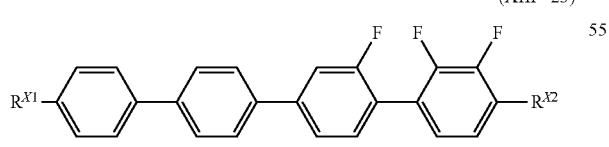

Among the compounds represented by General Formulae (XIII''-1) to (XIII''-23), compounds represented by General Formulae (XIII''-1) to (XIII''-10), (XIII''-12), (XIII''-20), and (XIII''-22) are preferred; the compounds represented by General Formulae (XIII''-1), (XIII''-2), (XIII''-12), (XIII''-20), and (XIII''-22) are more preferred; the compounds represented by General Formulae (XIII''-1) and (XIII''-2) are further preferred; and the compound represented by General Formula (XIII''-1) is especially preferred.

In particular, the compound represented by General Formula (XIII''-1) is preferably any of compounds represented by Formulae (XIII''-1-1) and (XIII''-1-16).

[Chem. 175]

(XIII''-1-1)
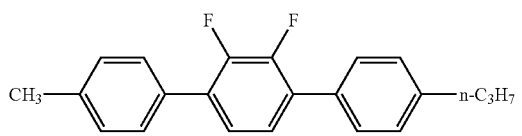

(XIII''-1-2)

(XIII''-1-3)
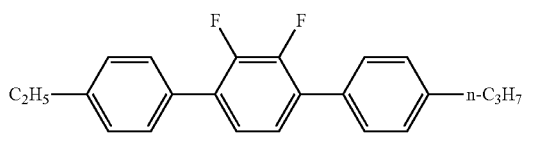

(XIII''-1-4)

(XIII''-1-5)
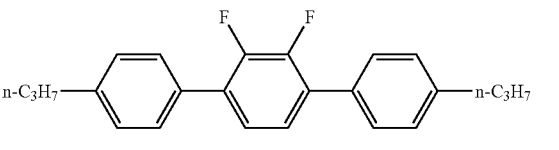

(XIII''-1-6)
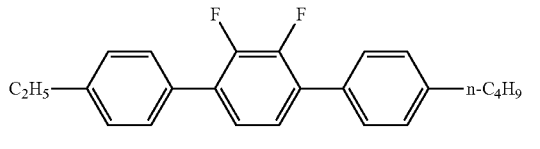

[Chem. 176]

(XIII''-1-10)

(XIII''-1-11)
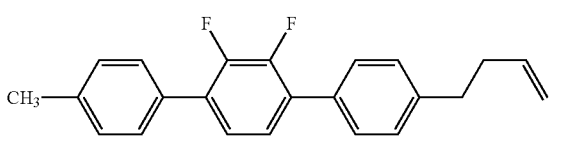

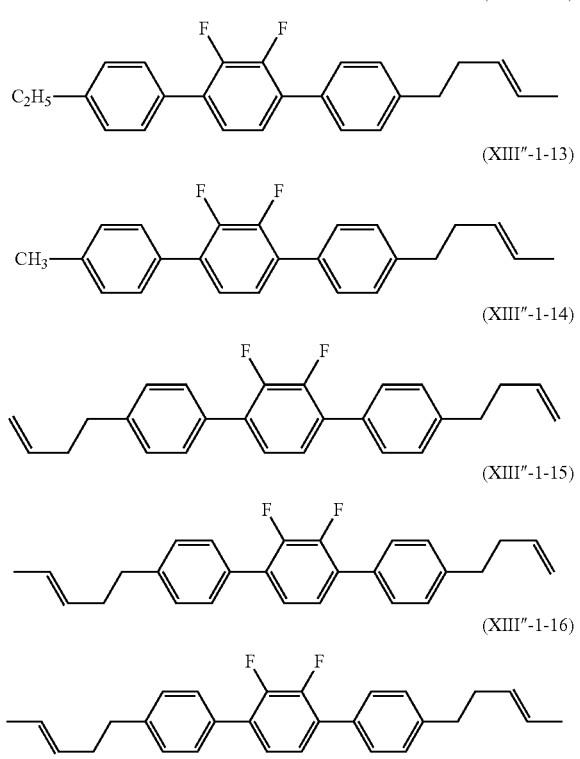

(XIII"-1-12)
(XIII"-1-13)
(XIII"-1-14)
(XIII"-1-15)
(XIII"-1-16)

Among the compounds represented by Formulae (XIII"-1-1) to (XIII"-1-16), the compounds represented by Formulae (XIII"-1-1) to (XIII"-1-6) are preferred; the compounds represented by Formulae (XIII"-1-1), (XIII"-1-2), and (XIII"-1-4) are more preferred; and the compounds represented by Formulae (XIII"-1-2) and (XIII"1-4) are further preferred;

In the liquid crystal composition of the present invention, the amount of the compound represented by Formula (XIII"-1-2) is preferably in the range of 1 mass % to 30 mass %, more preferably 1 mass % to 20 mass %, further preferably 1 mass % to 10 mass %, and especially preferably 2 mass % to 8 mass % relative to the total mass of the liquid crystal composition of the present invention in view of resistance to resolution at low temperature, transition temperature, electric reliability, and another property.

In the case where the dielectric anisotropy $\Delta\in$ of the liquid crystal composition of the present invention is negative, the $\Delta\in$ at 25° C. is preferably in the range of −2.0 to −6.0, more preferably −2.5 to −5.0, and especially preferably −2.5 to −4.0. More specifically, the $\Delta\in$ is preferably from −2.5 to −3.4 in terms of response speed or from −3.4 to −4.0 in terms of a driving voltage.

The refractive index anisotropy $\Delta n$ of the liquid crystal composition of the present invention at 295 K is preferably in the range of 0.08 to 0.13, and more preferably 0.08 to 0.105. More specifically, the refractive index anisotropy is preferably from 0.10 to 0.12 in order to form a thin cell gap or from 0.08 to 0.10 in order to form a thick cell gap.

The rotational viscosity ($\gamma1$) of the liquid crystal composition of the present invention (unit: mPa·s) at 295 K is preferably not more than 150, more preferably not more than 130, and especially preferably not more than 120.

In the case where the liquid crystal composition needs to be chemically stable, it is preferred that the molecules of compounds used in the present invention be free from a chlorine atom. The amount of a chlorine-atom-containing compound in the liquid crystal composition is preferably not more than 5%, also preferably not more than 3%, also preferably not more than 1%, and also preferably not more than 0.5%; and it is most preferred that the liquid crystal composition be substantially free from the chlorine-atom-containing compound. The term "substantially free from a chlorine-atom-containing compound" herein refers to that only a compound unavoidably containing a chlorine atom, such as a compound generated as an impurity in production of another compound, may be contained in the liquid crystal composition.

The molecules of compounds used in the present invention are free from the structure of a peroxy acid (—CO—OO—). In terms of the reliability and long-term stability of the liquid crystal composition, it is preferred that a compound having a cyano group or a carbonyl group be not used. In terms of stability to irradiation with UV, it is preferred that a compound substituted with a chlorine atom be not used. It is also preferred that only compounds having molecules in which all of the ring structures are six-membered rings be used.

The liquid crystal composition of the present invention is preferably free from a compound having a molecular structure in which oxygen atoms are bonded to each other, such as the structure of a peroxy acid (—CO—OO—).

In terms of the reliability and long-term stability of the liquid crystal composition, the amount of a compound having a carbonyl group is preferably not more than 5 mass %, more preferably not more than 3 mass %, and further preferably not more than 1 mass % relative to the total mass of the composition. It is most preferred that the composition be substantially free from such a compound.

In terms of stability to irradiation with UV, the amount of a compound substituted with a chlorine atom is preferably not more than 15 mass %, more preferably not more than 10 mass %, and further preferably not more than 5 mass % relative to the total mass of the composition. It is most preferred that the composition be substantially free from such a compound.

The amount of compounds having molecules in which all of the ring structures are six-membered rings is preferably adjusted to be large. The amount of such compounds having molecules in which all of the ring structures are six-membered rings is preferably not less than 80 mass %, more preferably not less than 90 mass %, and further preferably not less than 95 mass % relative to the total mass of the composition. It is most preferred that the liquid crystal composition be substantially composed of only the compounds having molecules in which all of the ring structures are six-membered rings.

In order to suppress degradation of the liquid crystal composition due to oxidation thereof, the amount of a compound having a cyclohexenylene group that is a ring structure is preferably reduced. The amount of a compound having a cyclohexenylene group is preferably not more than 10 mass %, and more preferably not more than 5 mass % relative to the total mass of the composition. It is further preferred that the liquid crystal composition be substantially free from such a compound.

In terms of improvements in viscosity and Tni, the amount of a compound of which the molecules each contain a 2-methylbenzene-1,4-diyl group in which a hydrogen atom is optionally substituted with a halogen is preferably reduced. The amount of the compound of which the molecules each contain such a 2-methylbenzene-1,4-diyl group is preferably not more than 10 mass %, and more preferably not more than 5 mass % relative to the total mass of the composition. It is further preferred that the composition be substantially free from such a compound.

In the case where a compound contained in the composition of the first embodiment of the present invention has a side chain that is an alkenyl group, the alkenyl group preferably has 2 to 5 carbon atoms if the alkenyl group is bonded to cyclohexane, or the alkenyl group preferably has 4 or 5 carbon atoms if the alkenyl group is bonded to benzene. The unsaturated bond of the alkenyl group is preferably not directly connected to the benzene.

The liquid crystal composition of the present invention can contain a polymerizable compound to produce a liquid crystal display device of a PS mode, PSA mode involving use of a horizontal electric field, or PSVA mode involving use of a horizontal electric field. Examples of a usable polymerizable compound include photopolymerizable monomers which are polymerized by being irradiated with energy rays such as light; in particular, examples of the polymerizable compound include polymerizable compounds having a structure with a liquid crystal molecular framework in which six-membered rings are bonded to each other, such as biphenyl derivatives and terphenyl derivatives. Specifically, the polymerizable compound is preferably a difunctional monomer represented by General Formula (XX).

tives and the lowest in dimethacrylate derivatives, and the rate of polymerization of unsymmetrical compounds is intermediate therebetween. Hence, an appropriate compound can be employed on the basis of the intended application. In PSA display devices, dimethacrylate derivatives are especially preferred.

$Sp^{201}$ and $Sp^{202}$ each independently represent a single bond, an alkylene group having 1 to 8 carbon atoms, or —O—$(CH_2)_s$—; in an application to PSA display devices, at least one of $Sp^{201}$ and $Sp^{202}$ is preferably a single bond, and compounds in which $Sp^{201}$ and $Sp^{202}$ each represent a single bond and compounds in which one of $Sp^{201}$ and $Sp^{202}$ is a single bond and in which the other one thereof represents an alkylene group having 1 to 8 carbon atoms or —O—$(CH_2)_s$— are preferred. In this case, an alkyl group having 1 to 4 carbon atoms is preferably employed, and s preferably ranges from 1 to 4.

$Z^{201}$ is preferably —$OCH_2$—, —$CH_2O$—, —COO—, —OCO—, —$CF_2O$—, —$OCF_2$—, —$CH_2CH_2$—, —$CF_2CF_2$—, or a single bond; more preferably —COO—, —OCO—, or a single bond; and especially preferably a single bond.

$M^{201}$ represents a 1,4-phenylene group in which any hydrogen atom is optionally substituted with a fluorine atom, a trans-1,4-cyclohexylene group, or a single bond; and a 1,4-phenylene group and a single bond are preferred. In the case where $M^{201}$ does not represent a single bond but

[Chem. 177]

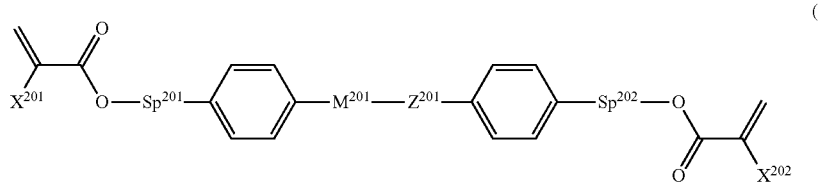

(XX)

(in the formula, $X^{201}$ and $X^{202}$ each independently represent a hydrogen atom or a methyl group;

$Sp^{201}$ and $Sp^{202}$ each independently represent a single bond, an alkylene group having 1 to 8 carbon atoms, or —O—$(CH_2)_s$— (where s represents an integer from 2 to 7, and the oxygen atom is bonded to an aromatic ring);

$Z^{201}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ each independently represent a fluorine atom or a hydrogen atom), —C≡C—, or a single bond; and $M^{201}$ represents a 1,4-phenylene group, a trans-1,4-cyclohexylene group, or a single bond, and in each 1,4-phenylene group in the formula, any hydrogen atom is optionally substituted with a fluorine atom.)

Diacrylate derivatives in which $X^{201}$ and $X^{202}$ each represent a hydrogen atom and dimethacrylate derivatives in which $X^{201}$ and $X^{202}$ are each a methyl group are preferred, and compounds in which one of $X^{201}$ and $X^{202}$ represents a hydrogen atom and in which the other one thereof represents a methyl group are also preferred. Among these compounds, the rate of polymerization is the highest in diacrylate derivarepresents a ring structure, $Z^{201}$ preferably represents a linking group as well as a single bond; in the case where $M^{201}$ represents a single bond, $Z^{201}$ is preferably a single bond.

From these viewpoints, a preferred ring structure between $Sp^{201}$ and $Sp^{202}$ in General Formula (XX) is particularly as follows.

In General Formula (XX), in the case where $M^{201}$ represents a single bond and where the ring structure consists of two rings, the ring structure is preferably represented by any of Formulae (XXa-1) to (XXa-5), more preferably Formulae (XXa-1) to (XXa-3), and especially preferably Formula (XXa-1).

[Chem. 178]

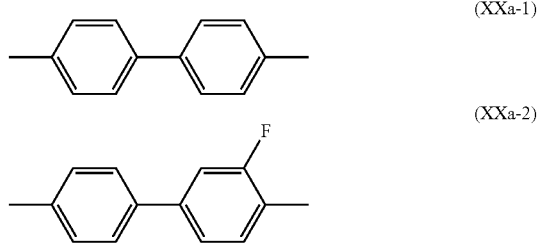

(XXa-1)

(XXa-2)

-continued (XXa-3)

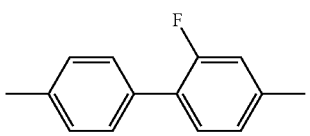

(XXa-4)

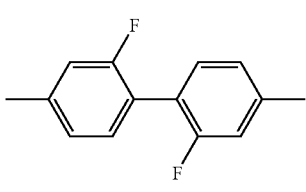

(XXa-5)

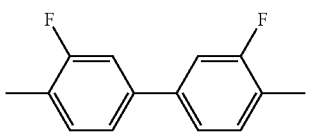

(in the formulae, the two ends of each structure are connected to $Sp^{201}$ and $Sp^{202}$, respectively.)

Polymerizable compounds having such skeletons enable uneven display to be reduced or eliminated in PSA liquid crystal display devices because such polymerizable compounds have optimum alignment regulating force after being polymerized and thus produce a good alignment state.

Accordingly, the polymerizable monomer is especially preferably any of compounds represented by General Formulae (XX-1) to (XX-4), and most preferably the compound represented by General Formula (XX-2).

[Chem. 179]

(XX-1)

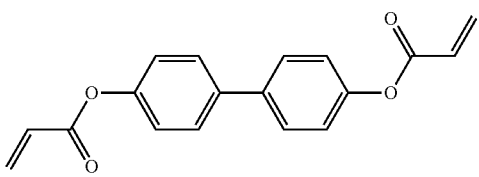

(XX-2)

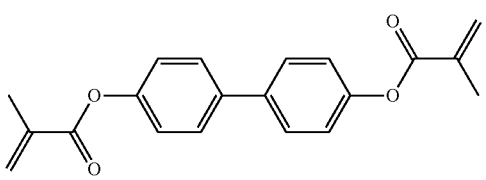

(XX-3)

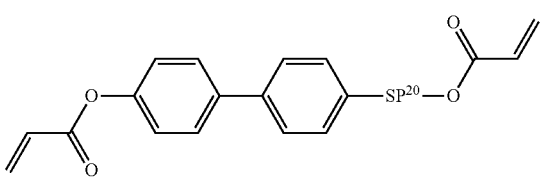

-continued (XX-4)

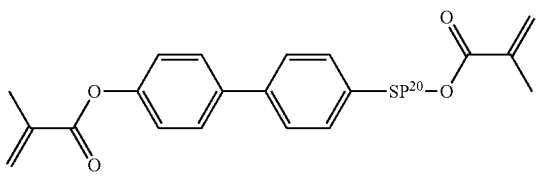

(in the formulae, $Sp^{20}$ represents an alkylene group having 2 to 5 carbon atoms.)

In the case where the monomer is added to the liquid crystal composition of the present invention, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides.

<Liquid Crystal Display Device>

The liquid crystal composition of the present invention, to which a polymerizable compound has been added, is irradiated with ultraviolet to polymerize the polymerizable compound with the result that liquid crystal molecules can be aligned; thus, such a liquid crystal composition is used in liquid crystal display devices in which the birefringence of the liquid crystal composition is utilized to control the amount of light that is to be transmitted. Such a liquid crystal composition is useful for liquid crystal display devices, such as an ECB-LCD, a VA-LCD, an FFS-LCD, an AM-LCD (active-matrix liquid crystal display device), a TN (nematic liquid crystal display device), an STN-LCD (super twisted nematic liquid crystal display device), an OCB-LCD, and an IPS-LCD (in-plane switching liquid crystal display device), particularly useful for an AM-LCD, and can be used in transmissive or reflective liquid crystal display devices.

Two substrates used in a liquid crystal cell included in a liquid crystal display device can be made of a transparent material having flexibility, such as glass or a plastic material, and one of these substrates may be made of a non-transparent material such as silicon. In order to form a transparent electrode layer on a transparent substrate such as a glass plate, for example, indium tin oxide (ITO) is sputtered on the transparent substrate.

Color filters can be produced by, for instance, a pigment dispersion technique, a printing technique, an electrodeposition technique, or a staining technique. In production of the color filters by, for example, a pigment dispersion technique, a curable colored composition for a color filter is applied onto the transparent substrate, subjected to patterning, and then cured by being heated or irradiated with light. This process is carried out for each of three colors of red, green, and blue, thereby being able to produce the pixels of the color filters. Active elements such as a TFT or a thin-film diode may be provided on the resulting substrate to form pixel electrodes.

The substrates are arranged so as to face each other with the transparent electrode layer interposed therebetween. In the arrangement of the substrates, a spacer may be present between the substrates to adjust the distance therebetween. In this case, the distance between the substrates is adjusted so that the thickness of a light modulating layer to be formed is preferably in the range of 1 to 100 μm, and more preferably 1.5 to 10 μm. In the case where a polarizing plate is used, the product of the refractive index anisotropy Δn of liquid crystal and a cell thickness d is preferably adjusted to achieve the maximum contrast. In the case where two polarizing plates are used, the polarization axis of each polarizing plate may be adjusted to give a good viewing angle or contrast. Furthermore, a retardation film may be also used to increase a viewing angle. Examples of the spacer include columnar spacers made of, for instance, glass particles, plastic particles, alumina particles, or photoresist materials. A sealing material such as a thermosetting epoxy composition is subsequently applied to the substrates by screen printing in a state in which a liquid crystal inlet has been formed, the substrates are attached to each other, and then the sealing material is heated to be thermally cured.

The polymerizable-compound-containing liquid crystal composition can be put into the space between the two substrates by a vacuum injection technique or ODF technique which is generally employed. A vacuum injection technique, however, has a problem in which traces of the injection remain while droplet stains do not remain. The present invention can be more suitably applied to display devices manufactured by an ODF technique. In a process for manufacturing a liquid crystal display device by an ODF technique, an optically and thermally curable epoxy-based sealing material is applied to any one of a backplane and a frontplane with a dispenser in the form of a closed loop that serves as a wall, a certain amount of the liquid crystal composition is dropped onto part of the substrate surrounded by the applied sealing material in a degassed atmosphere, and then the frontplane and the backplane are bonded to each other, thereby manufacturing a liquid crystal display device. The liquid crystal composition of the present invention can be stably dropped in an ODF process and can be therefore desirably used.

Since a proper polymerization rate is desired to enable liquid crystal molecules to be aligned in a good manner, the polymerizable compound is preferably polymerized by being irradiated with one of active energy rays, such as an ultraviolet ray and an electron beam, or by being irradiated with such active energy rays used in combination or in sequence. In the use of an ultraviolet ray, a polarized light source or a non-polarized light source may be used. In the case where the polymerizable-compound-containing liquid crystal composition is polymerized in a state in which the composition has been disposed between the two substrates, at least the substrate on the side from which active energy rays are emitted needs to have transparency suitable for the active energy rays. Another technique may be used, in which only the intended part is polymerized by being irradiated with light with a mask, the alignment state of the non-polymerized part is subsequently changed by adjusting conditions such as an electric field, a magnetic field, or temperature, and then polymerization is further carried out through irradiation with active energy rays. In particular, it is preferred that exposure to ultraviolet radiation be carried out while an alternating current electric field is applied to the polymerizable-compound-containing liquid crystal composition. The alternating current electric field to be applied preferably has a frequency ranging from 10 Hz to 10 kHz, and more preferably 60 Hz to 10 kHz; and the voltage is determined on the basis of a predetermined pretilt angle in a liquid crystal display device. In other words, the pretilt angle in a liquid crystal display device can be controlled by adjusting voltage that is to be applied. In MVA-mode liquid crystal display devices which involve use of a horizontal electric field, a pretilt angle is preferably controlled to be from 80 degrees to 89.9 degrees in view of alignment stability and contrast.

The temperature in the irradiation procedure is preferably within a temperature range in which the liquid crystal state of the liquid crystal composition of the present invention can be maintained. Polymerization is preferably carried out at a temperature close to room temperature, i.e., typically from 15 to 35° C. Preferred examples of a lamp usable for emitting an ultraviolet ray include a metal halide lamp, a high-pressure mercury lamp, and an ultrahigh-pressure mercury lamp. In addition, an ultraviolet ray to be emitted preferably has a wavelength that is in a wavelength region different from the wavelength region of light absorbed by the liquid crystal composition; it is preferred that an ultraviolet ray in a particular wavelength range be cut off as needed. The intensity of an ultraviolet ray to be emitted is preferably from 0.1 mW/cm$^2$ to 100 W/cm$^2$, and more preferably 2 mW/cm$^2$ to 50 W/cm$^2$. The energy of an ultraviolet ray to be emitted can be appropriately adjusted: preferably from 10 mJ/cm$^2$ to 500 J/cm$^2$, and more preferably 100 mJ/cm$^2$ to 200 J/cm$^2$. The intensity may be changed in the exposure to ultraviolet radiation. The time of the exposure to ultraviolet radiation is appropriately determined on the basis of the intensity of an ultraviolet ray to be emitted: preferably from 10 seconds to 3600 seconds, and more preferably 10 seconds to 600 seconds.

Liquid crystal display devices using the liquid crystal composition of the present invention are practical because they quickly respond and are less likely to suffer from defective display at the same time; in particular, the liquid crystal composition is useful to active-matrix liquid crystal display devices and can be applied to liquid crystal display devices of a VA mode, PSVA mode, PSA mode, IPS (in-plane switching) mode, FSS (fringe-field switching) mode, VA-IPS mode, and ECB mode.

A liquid crystal display apparatus (liquid crystal display) according to a preferred embodiment of the present invention will now be described in detail.

An example of the liquid crystal display device is a liquid crystal display device which includes two substrates facing each other, a sealing material disposed between the substrates, and liquid crystal confined in a sealed region surrounded by the sealing material.

In particular, according to a specific embodiment, a liquid crystal display device includes a backplane, a frontplane, a sealing material disposed between these substrates, and a liquid crystal layer confined in a sealed region surrounded by the sealing material. The backplane includes a first substrate, TFT layers and pixel electrodes each formed so as to overlie the first substrate, and a passivation film and first alignment film each formed so as to cover these components. The frontplane faces the backplane and includes a second substrate; a black matrix, color filters, planarization film (overcoat layer), and transparent electrode each formed so as to overlie the second substrate; and a second alignment film formed so as to cover these components. In addition, protrusions (columnar spacers) are extending from a surface to which the sealing material has been applied.

Any substantially transparent material can be used for the first substrate or the second substrate; for instance, glass, ceramic materials, and plastic materials can be used. Examples of materials used for the plastic substrate include cellulose derivatives such as cellulose, triacetyl cellulose, and diacetyl cellulose; polyesters such as polycycloolefin derivatives, polyethylene terephthalate, and polyethylene naphthalate; polyolefins such as polypropylene and polyethylene; polycarbonate; polyvinyl alcohol; polyvinyl chloride; polyvinylidene chloride; polyamide; polyimide; polyimideamide; polystyrene; polyacrylate; polymethyl methacrylate; polyethersulfone; polyarylate; and inorganic-organic composite materials such as glass fiber-epoxy resin and glass fiber-acrylic resin.

In the case where the plastic substrate is used, a barrier film is preferably formed. The barrier film serves to reduce the moisture permeability of the plastic substrate, which enhances the reliability of the electrical properties of the liquid crystal display device. Any barrier film having high transparency and low water vapor permeability can be used; in general, a thin film formed of an inorganic material, such as silicon oxide, by vapor deposition, sputtering, or a chemical vapor deposition method (CVD method) can be used.

In the present invention, the first and second substrates may be formed of materials the same as or different from each other without limitation. A glass substrate is preferably employed because using the glass substrate enables manufacturing of a liquid crystal display device exhibiting excellent thermal resistance and dimensional stability. A plastic substrate is also preferably employed because it is suitable for manufacturing by a roll-to-roll process and appropriately enables weight reduction and an enhancement in flexibility. In terms of imparting flatness and thermal resistance to the substrate, a combination of a plastic substrate and a glass substrate can give a good result.

In Examples which will be described later, a substrate is used as a material of the first substrate or the second substrate.

In the backplane, the TFT layers and the pixel electrodes are disposed so as to overlie the first substrate. These components are formed through an arraying process which is generally used. The passivation film and the first alignment film are formed so as to cover these components, thereby completing the formation of the backplane.

The passivation film (also referred to as an inorganic protective film) is a film used for protecting the TFT layers; in general, a nitride film (SiNx), an oxide film (SiOx), or another film is formed by, for example, a chemical vapor deposition (CVD) method.

The first alignment film is a film which serves to align liquid crystal molecules; in general, a polymeric material, such as polyimide, is used in many cases. An alignment agent solution containing a polymeric material and a solvent is used as a coating liquid. The alignment film may reduce adhesion to the sealing material and is therefore applied in patterns in a sealed region. The alignment agent solution is applied by a printing technique, such as flexography, or a droplet ejection technique, such as an ink jet technique. The alignment agent solution which has been applied is temporarily dried to evaporate the solvent and then baked to be cross-linked and cured. Then, the cured product is subjected to an alignment treatment to develop an alignment function.

In general, a rubbing process is employed for the alignment treatment. The polymeric film produced as described above is unidirectionally rubbed with a rubbing cloth formed of a fibrous material such as rayon, which develops a function of aligning liquid crystal molecules.

A photo-alignment technique may be used. In the photo-alignment technique, an alignment function is developed by emitting polarized light onto an alignment film containing a photosensitive organic material, so that damage of a substrate and generation of dusts which are each caused by a rubbing process are eliminated. Examples of the organic materials used in the photo-alignment technique include materials containing dichroic dyes. A material usable as the dichroic dye has a group which induces an optical reaction which results in development of a function of aligning liquid crystal molecules (hereinafter referred to as photo-alignment group): induction of molecular alignment or isomerization reaction (e.g., azobenzene group) caused by the Weigert effect based on photodichroism, a dimerization reaction (e.g., cinnamoyl group), a photo-cross-linking reaction (e.g., benzophenone group), or a photodegradation reaction (e.g., polyimide group). After the applied alignment agent solution is temporarily dried to evaporate the solvent, the product is irradiated with light having a predetermined polarization (polarized light), thereby being able to produce an alignment film which enables alignment in the intended direction.

In the frontplane, the black matrix, the color filters, the planarization film, the transparent electrode, and the second alignment film are disposed so as to overlie the second substrate.

The black matrix is formed by, for example, a pigment dispersion technique. In particular, a color resin liquid in which a black colorant has been uniformly dispersed for formation of the black matrix is applied onto the second substrate on which the barrier film has been formed, thereby forming a colored layer. The colored layer is subsequently cured by being baked. A photoresist is applied onto the cured layer and then pre-baked. The photoresist is exposed to light through a mask pattern, and then development is carried out to pattern the colored layer. Then, the photoresist layer is removed, and the colored layer is baked to complete the black matrix.

Alternatively, a photoresist-type pigment dispersion liquid may be used. In this case, the photoresist-type pigment dispersion liquid is applied, pre-baked, and exposed to light through a mask pattern; and then development is carried out to pattern the colored layer. Then, the photoresist layer is removed, and the colored layer is baked to complete the black matrix.

The color filters are formed by a pigment dispersion technique, an electrodeposition technique, a printing technique, or a staining technique. In a pigment dispersion technique, for example, a color resin liquid in which a pigment (e.g., red) has been uniformly dispersed is applied onto the second substrate and then cured by being baked, and a photoresist is applied onto the cured product and pre-baked. The photoresist is exposed to light through a mask pattern, and then development is carried out to form a pattern. The photoresist layer is subsequently removed, and baking is carried out again, thereby completing a (red) color filter. The color filters may be formed in any order of colors. A green color filter and a blue color filter are similarly formed.

The transparent electrode is formed so as to overlie the color filters (the overcoat layer is optionally formed on the color filters to flatten the surfaces). The transparent electrode preferably has a high light transmittance and low electric resistance. In the formation of the transparent electrode, an oxide film of, for example, ITO is formed by sputtering.

In order to protect the transparent electrode, a passivation film is formed on the transparent electrode in some cases.

The second alignment film is the same as the above-mentioned first alignment film.

Although the specific embodiments of the backplane and frontplane used in the present invention have been described, the present invention is not limited to such specific embodiments, and the embodiments can be freely modified to provide a desired liquid crystal display device.

The columnar spacers may have any shape, and the horizontal section thereof may have any shape such as a circular, square, or polygonal shape; in particular, the horizontal section preferably has a circular shape or a regular polygonal shape in view of a margin for misalignment in the formation process. Furthermore, such protrusions preferably have the shape of a circular truncated cone or truncated pyramid.

Any material which is insoluble in the sealing material, an organic solvent used in the sealing material, and the liquid crystal can be used for the columnar spacers; a synthetic resin (curable resin) is preferably employed in terms of processability and weight reduction. The protrusions can be formed above the surface of the first substrate by photolithography or a droplet ejection technique, the surface being subjected to application of the sealing material. For such a reason, a photocurable resin suitable for photolithography or a droplet ejection technique is preferably employed.

An illustrative case in which the columnar spacers are formed by photolithography will now be described. An example of an exposure process will now be described, in which a pattern for forming the columnar spacers above the black matrix is employed as the pattern of a photomask.

A resin solution (not containing a colorant) used for forming the columnar spacers is applied onto the transparent electrode of the frontplane. Then, the resulting resin layer is cured by being baked. A photoresist is applied onto the cured layer and then pre-baked. The photoresist is exposed to light through a mask pattern, and then development is carried out to pattern the resin layer. The photoresist layer is subsequently removed, and then the resin layer is baked to complete the columnar spacers.

Positions at which the columnar spacers are to be formed can be appropriately determined on the basis of the mask pattern. Accordingly, both the inside of the sealed region and the outside thereof (part to which the sealing material is to be applied) can be simultaneously formed in the liquid crystal display device. The columnar spacers are preferably formed above the black matrix to avoid degrading the quality of the sealed region. The columnar spacers formed by photolithography as described above are also referred to as column spacers or photo spacers.

The material used for forming the spacers is a mixture containing, for example, a negative water-soluble resin, such as a PVA-stilbazo photosensitive resin; a polyfunctional acrylic monomer; an acrylic acid copolymer; and a triazole-based initiator. In another technique, a color rein in which a colorant has been dispersed in a polyimide resin is used. In the present invention, any technique can be employed, and existing materials suitable for liquid crystal and sealing material which are to be used can be used to form the spacers.

After the columnar spacers are formed on part of the surface of the frontplane, which serves as the sealed region, in this manner, the sealing material is applied to the intended part of the surface of the backplane.

Any material can be used as the sealing material, and a curable resin composition prepared by adding a polymerization initiator to an epoxy-based or acrylic resin which is photocurable, thermosetting, or optically and thermally curable is used. Fillers containing inorganic or organic materials are added in some cases to adjust moisture permeability, an elastic modulus, viscosity, and another property. Such fillers may have any shape such as a spherical shape, a fibrous shape, or an amorphous shape. Furthermore, a spherical or fibrous gap material having a single dispersion diameter may be mixed to properly control the cell gap, and a fibrous material which can be easily wound around the protrusions formed above the substrate may be mixed to enhance the adhesion to the plates. The diameter of the fibrous material used in this case is desirably from approximately $1/5$ to $1/10$ of the cell gap, and the length of the fibrous material is desirably shorter than the width of an applied sealing material.

Any substance can be used as the fibrous material provided that the fibrous material can have a predetermined shape; synthetic fibers, such as cellulose, polyamide, and polyester, and inorganic materials, such as glass and carbon, can be appropriately selected.

The sealing material can be applied by a printing technique or a dispensing technique, and a dispensing technique is desirably employed because the amount of the sealing material to be used in the dispensing technique is small. In general, the sealing material is applied to a position corresponding to the position of the black matrix to avoid adversely affecting the sealed region. In order to form a liquid crystal-dropped region used in the subsequent process (to prevent the liquid crystal from leaking), the sealing material is applied in the form of a closed loop.

Liquid crystal is dropped to the closed-loop structure (sealed region) of the frontplane, the closed-loop structure having been formed by application of the sealing material. In general, a dispenser is used. Since the amount of liquid crystal to be dropped should be equivalent to the capacity of a liquid crystal cell, the amount is basically equal to the volume that is the product of the height of the columnar spacers and the area surrounded by the sealing material. In order to reduce the leakage of liquid crystal in a cell bonding process or to optimize displaying characteristics, the amount of the liquid crystal to be dropped may be appropriately adjusted, or positions to which the liquid crystal are dropped may be dispersed.

Then, the backplane is bonded to the frontplane to which the sealing material has been applied and liquid crystal has been dropped. In particular, the frontplane and the backplane are attached to stages having a mechanism for holding the substrates, such as an electrostatic chuck, and then the frontplane and the backplane are disposed at a position (in a distance) which enables the second alignment film of the frontplane to face the first alignment film of the backplane and which enables the sealing material not to contact the other side. In this state, pressure in the system is reduced. After the reduction in pressure, the positions of the frontplane and backplane are adjusted (alignment process) while parts of the frontplane and backplane which are to be bonded to each other are confirmed. After the adjustment of the positions, the frontplane and the backplane are moved to bring the sealing material on the frontplane into contact with the backplane. In this state, the inside of the system is filled with inert gas, and the vacuum is gradually released into normal pressure. In this process, atmospheric pressure enables the frontplane and the backplane to be bonded to each other, and the height of the columnar spacers defines a cell gap. In this state, the sealing material is irradiated with ultraviolet light, thereby curing the sealing material. Through these processes, the liquid crystal cell is produced. Then, a heating process is optionally carried out to promote the curing of the sealing material. The heating process is carried out in many cases to enhance the adhesion of the sealing material and the reliability of electrical properties.

EXAMPLES

Although the present invention will now be described further in detail with reference to Examples, the present invention is not limited to Examples. In compositions which will be described in Examples and Comparative Examples, the term "%" refers to "mass %".

In Examples, the following properties were measured.

Tni: Nematic phase-isotropic liquid phase transition temperature (° C.)

Δn: Refractive index anisotropy at 295 K (also referred to as birefringence)

Δ∈: Dielectric anisotropy at 295 K

η: Viscosity at 295 K (mPa·s)

Initial voltage holding ratio (initial VHR): voltage holding ratio (%) at a frequency of 60 Hz, an applied voltage of 4 V, and a temperature of 50° C.

Voltage holding ratio after heating (VHR after heating): voltage holding ratio (%) measured under the same conditions as the measurement of the initial VHR after retention at 150° C. for an hour.

<Evaluation of Screen Burn-In>

In evaluation of the screen burn-in of a liquid crystal display device, a certain fixed pattern was displayed in a display area for 1440 hours, and then an image was displayed evenly on the whole of the screen. Then, the degree of an afterimage of the fixed pattern was visually observed, and result of the observation was evaluated on the basis of the following four criteria.

Excellent: No afterimage observed

Good: Slight afterimage observed, but acceptable

Bad: Afterimage observed, unacceptable

Poor: Afterimage observed, quite inadequate

<Evaluation of Volatility (Contamination of Manufacturing Equipment)>

In evaluation of the volatility of a liquid crystal material, operation of a vacuum defoaming mixer was observed with a stroboscope to visually survey foaming of the liquid crystal material. In particular, 0.8 kg of a liquid crystal composition was put into the 2.0-L container dedicated to the vacuum defoaming mixer, the vacuum defoaming mixer was operated under a vacuum of 4 kPa at an orbital speed of 15 S$^{-1}$ and a rotating velocity of 7.5 S$^{-1}$, and the time taken for the liquid crystal composition to start foaming was measured. The evaluation was based on the following four criteria using on the measured time.

Excellent: Forming started after a lapse of at least three minutes, low possibility of contamination of manufacturing equipment due to volatilization Good: Forming started after a lapse of a minute or more but less than three minutes, possibility of slight contamination of manufacturing equipment due to volatilization Bad: Forming started after a lapse of 30 seconds or more but less than a minute, occurrence of contamination of manufacturing equipment due to volatilization Poor: Forming started within 30 seconds, possibility of significant contamination of manufacturing equipment due to volatilization <Evaluation of Process Adaptability>

In an ODF process, 40 pL of liquid crystal was dropped 100000 times with a constant volume metering pump, and every 200-times dropping was defined as one cycle such as "0 to 200, 201 to 400, 401 to 600 . . . , and 99801 to 100000". A variation in the amount of the dropped liquid crystal between the individual cycles was evaluated on the basis of the following four criteria to analyze process adaptability.

Excellent: Significantly small variation (stable manufacturing of a liquid crystal display device was possible)

Good: Slight variation, but acceptable

Bad: Unacceptable variation (spots were generated with the result that a production yield was reduced)

Poor: Quite inadequate variation (liquid crystal leaked, and vacuum bubbles were generated)

<Evaluation of Resolution at Low Temperature>

In order to evaluate resolution at low temperature, a liquid crystal composition was prepared, the liquid crystal composition was subsequently weighted to 0.5 g in a 1-mL sample bottle, and the sample bottle was subjected to a continuous temperature change in a temperature controlled chamber in the following cycle: −20° C. (retained for an hour)→heating (0.2° C./min)→0° C. (retained for an hour)→heating (0.2° C./min)→20° C. (retained for an hour)→cooling (−0.2° C./min)→0° C. (retained for an hour)→cooling (−0.2° C./min)→−20° C. Then, precipitate generated in the liquid crystal composition was visually observed, and result of the observation was evaluated on the basis of the following four criteria.

Excellent: No precipitate observed for at least 600 hours

Good: No precipitate observed for at least 300 hours

Bad: Precipitate observed within 150 hours

Poor: Precipitate observed within 75 hours

Examples 1 and 2 and Comparative Examples 1 and 2

Compounds represented by the following chemical formulae were used to prepare compositions, and the physical properties thereof were measured. Table 1 shows results of the measurement.

[Chem. 180]

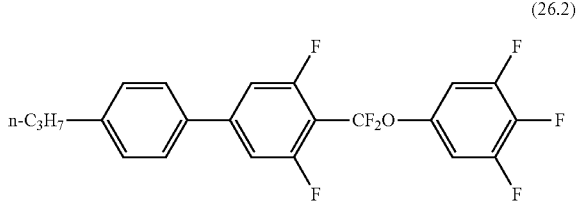

(26.2)

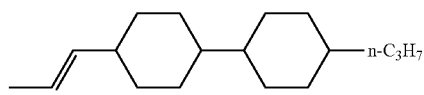

(1.3)

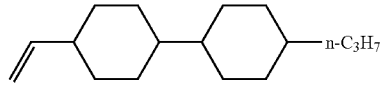

(2.2)

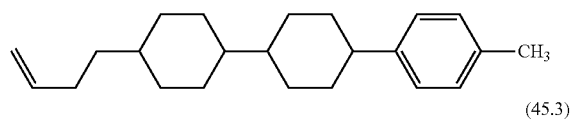

(11.2)

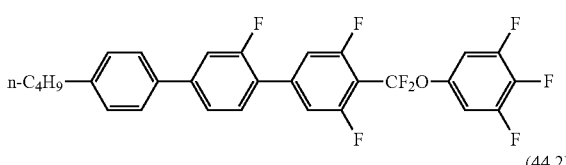

(45.3)

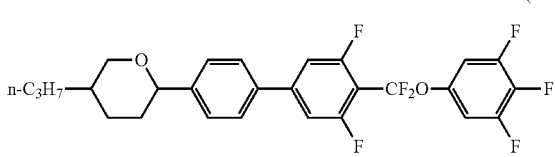

(44.2)

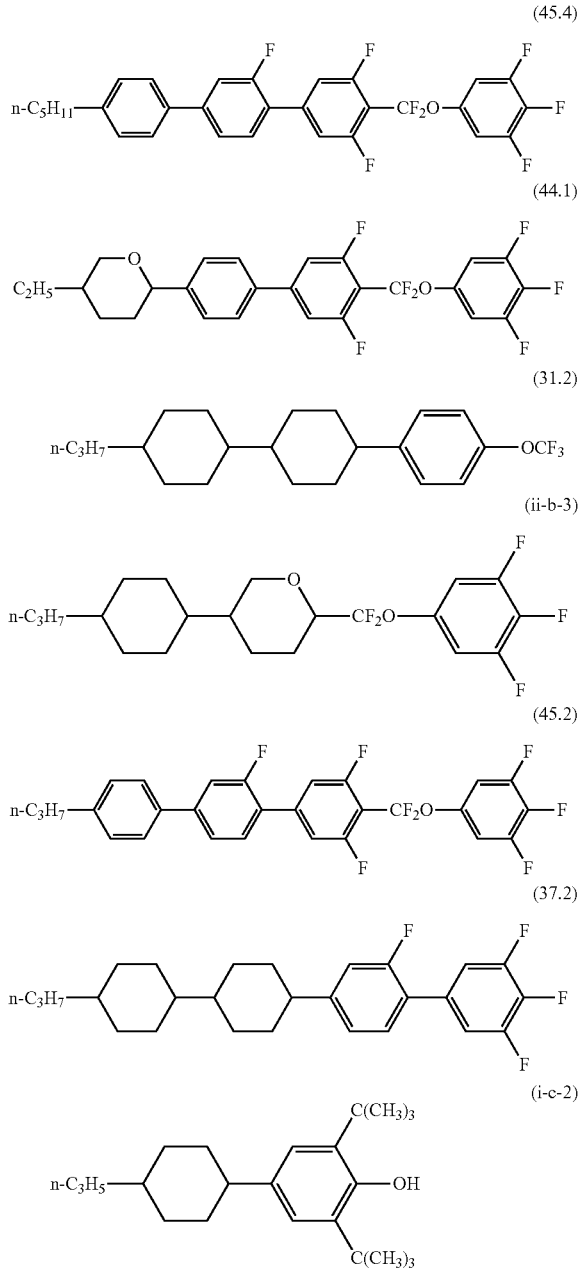

TABLE 1-continued

|  | Example 1 | Comparative Example 1 | Example 2 | Comparative Example 2 |
| --- | --- | --- | --- | --- |
| Formula (31.2) | 5 | 5 | 5 | 5 |
| Formula (ii-b-3) | 0 | 0 | 10 | 10 |
| Formula (45.2) | 3 | 3 | 3 | 3 |
| Formula (37.2) | 0 | 0 | 0 | 0 |
| Use of Compound Represented by Formula (i-c-2) | Use | Nonuse | Use | Nonuse |

In Table 1, the values assigned to the formulae represent the proportions (unit: mass %) of the compounds contained in the compositions.

The liquid crystal compositions of Examples 1 and 2 and Comparative Examples 1 and 2 were subjected to the evaluations of initial VHR, VHR after heating (150° C., 1 hour), screen burn-in, and process adaptability; and Table 2 shows results of the evaluations.

TABLE 2

|  | Example 1 | Comparative Example 1 | Example 2 | Comparative Example 2 |
| --- | --- | --- | --- | --- |
| Initial VHR (%) | 98.7 | 98.6 | 98.5 | 98.6 |
| VHR after Heating (%) | 98.1 | 96.1 | 98 | 96.7 |
| Screen Burn-In | Excellent | Poor | Excellent | Bad |
| Volatility | Good | Good | Good | Good |
| Process Adaptability | Excellent | Bad | Excellent | Bad |
| Resistance to Resolution at Low Temperature | Excellent | Excellent | Excellent | Excellent |

In Example 1, 0.3 parts by weight of the compound represented by Formula (i-c-2) was used relative to 100 parts by weight of the liquid crystal composition of Comparative Example 1. Use of the compound represented by Formula (i-c-2) had no effect on the physical properties of Tni, $\Delta n$, $\Delta\epsilon$, and $\eta$. In other words, the physical properties measured in Example 1 were the same as the physical properties measured in Comparative Example 1.

The results of the evaluations of screen burn-in and process adaptability were excellent in the liquid crystal composition of Example 1.

In Example 2, 0.3 parts by weight of the compound represented by Formula (i-c-2) was used relative to 100 parts by weight of the liquid crystal composition of Comparative Example 2. Use of the compound represented by Formula (i-c-2) had no effect on the physical properties of Tni, $\Delta n$, $\Delta\epsilon$, and $\eta$. In other words, the physical properties measured in Example 2 were the same as the physical properties measured in Comparative Example 2.

The results of the evaluations of screen burn-in and process adaptability were excellent in the liquid crystal composition of Example 2.

It is presumed that the liquid crystal composition of the present invention had such effects because the compounds represented by Formulae (44.1) and (44.2) each had a cyclic ether structure (pyran structure) which can be oxidized to readily generate a peroxy acid. In particular, the compounds represented by General Formula (ii), which each had a pyran structure, enabled the liquid crystal composition to have an improved resistance to resolution and a low viscosity, so that the process adaptability was improved; in addition, the compound represented by General Formula (i) suppressed the oxidation of the pyran structure. Thus, the above-mentioned effects were remarkable effects brought about by combination use of the compound represented by General Formula (i) and the compounds represented by General Formula (ii).

Example 3 and Comparative Example 3

Compounds represented by the following chemical formulae were used to prepare compositions, and the physical properties thereof were measured. Table 3 shows results of the measurement.

[Chem. 181]

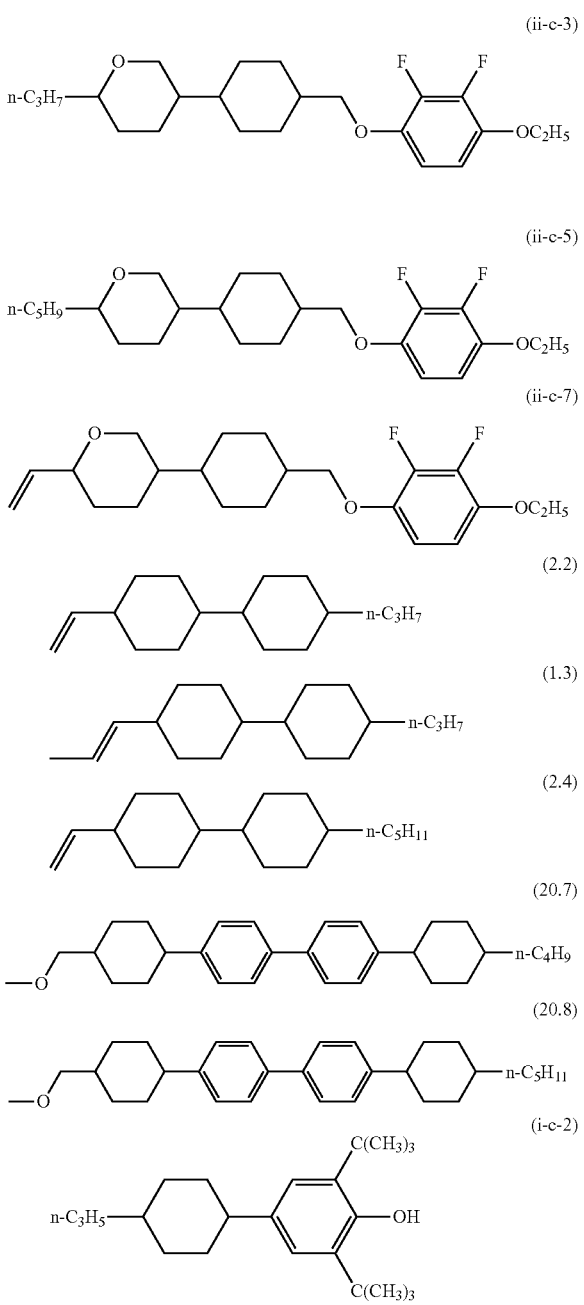

TABLE 3

|  | Example 3 | Comparative Example 3 |
|---|---|---|
| Tni (° C.) | — | 91.7 |
| Δn | — | 0.070 |
| Δε | — | −2.5 |
| η (mPa · s) | — | 20.6 |
| Formula (ii-c-3) | 12 | 12 |
| Formula (ii-c-5) | 12 | 12 |
| Formula (ii-c-7) | 12 | 12 |
| Formula (2.2) | 20 | 20 |
| Formula (1.3) | 4 | 4 |
| Formula (2.4) | 30 | 30 |
| Formula (20.7) | 5 | 5 |
| Formula (20.8) | 5 | 5 |
| Use of Compound Represented by Formula (i-c-2) | Use | Nonuse |

In Table 3, the values assigned to the formulae represent the proportions (unit: mass %) of the compounds contained in the compositions.

The liquid crystal compositions of Example 3 and Comparative Example 3 were subjected to the evaluations of initial VHR, VHR after heating (150° C., 1 hour), screen burn-in, and process adaptability; and Table 4 shows results of the evaluations.

TABLE 4

|  | Example 3 | Comparative Example 3 |
|---|---|---|
| Initial VHR (%) | 98.8 | 98.7 |
| VHR after Heating (%) | 98.2 | 96.8 |
| Screen Burn-In | Excellent | Poor |
| Volatility | Good | Good |
| Process Adaptability | Excellent | Bad |
| Resistance to Resolution at Low Temperature | Excellent | Excellent |

In Example 3, 0.3 parts by weight of the compound represented by Formula (i-c-2) was used relative to 100 parts by weight of the liquid crystal composition of Comparative Example 3. Use of the compound represented by Formula (i-c-2) had no effect on the physical properties of Tni, Δn, Δε, and η. In other words, the physical properties measured in Example 3 were the same as the physical properties measured in Comparative Example 3.

The results of the evaluations of screen burn-in and process adaptability were excellent in the liquid crystal composition of Example 3.

It is presumed that the liquid crystal composition of the present invention had such effects because the compounds represented by Formulae (ii-c-3), (ii-c-5), and (ii-c-7) each had a cyclic ether structure (pyran structure) which can be oxidized to readily generate a peroxy acid. In particular, the compounds represented by General Formula (ii), which each had a pyran structure, enabled the liquid crystal composition to have an improved resistance to resolution and a low viscosity, so that the process adaptability was improved; in addition, the compound represented by General Formula (i) suppressed the oxidation of the pyran structure. Thus, the above-mentioned effects were remarkable effects brought about by combination use of the compound represented by General Formula (i) and the compounds represented by General Formula (ii).

Example 1 and Comparative Examples 4 to 6

Compounds represented by the following chemical formulae were used to prepare compositions, and the physical properties thereof were measured. Table 5 shows results of the measurement. Example 1 in Table 5 is the same as Example 1 in Table 1.

[Chem. 182]

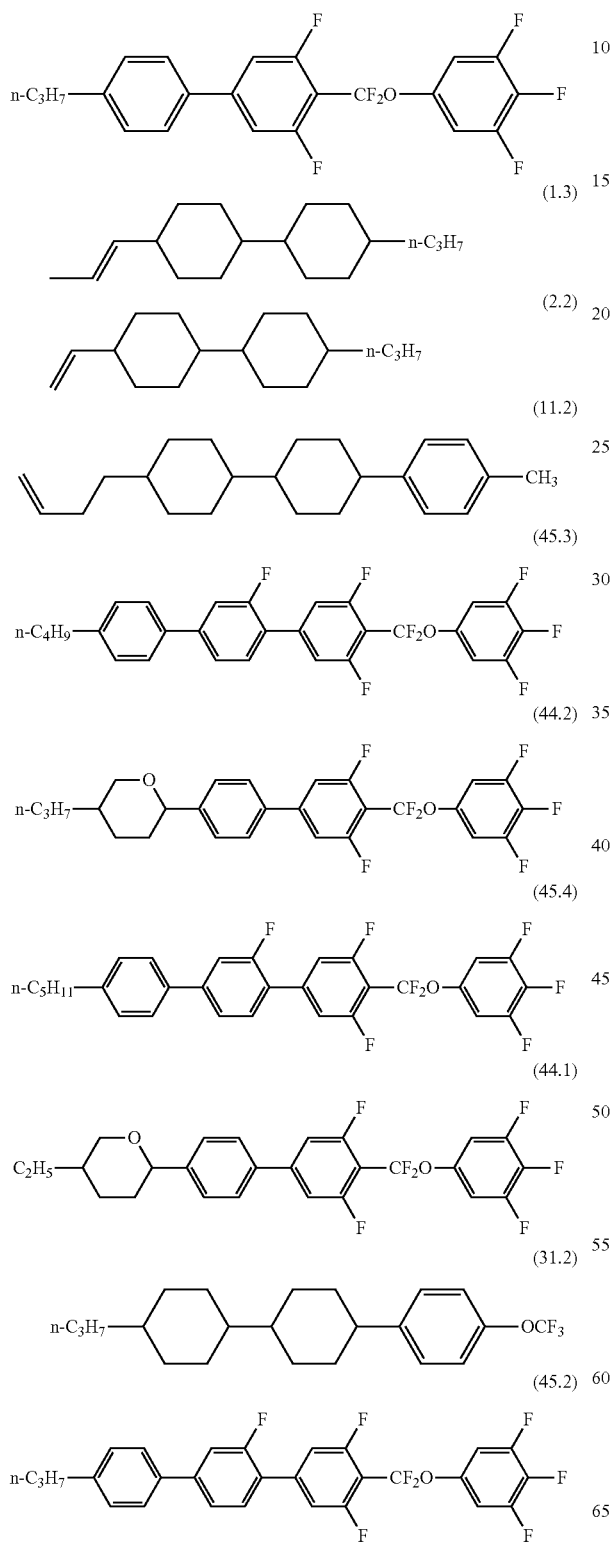

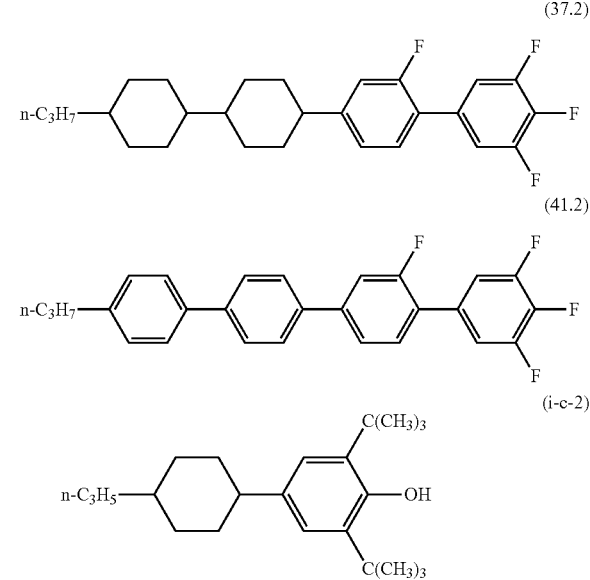

In Table 5, the values assigned to the formulae represent the proportions (unit: mass %) of the compounds contained in the compositions. In Table 5, the physical properties of Tni, Δn, Δ∈, and η in Comparative Example 1 in Table 1 are used to show the physical properties in Example 1.

The liquid crystal compositions of Example 1 and Comparative Examples 4 to 6 were subjected to the evaluations of initial VHR, VHR after heating (150° C., 1 hour), screen burn-in, and process adaptability; and Table 6 shows results of the evaluations.

TABLE 5

|  | Example 1 | Comparative Example 4 | Comparative Example 5 | Comparative Example 6 |
|---|---|---|---|---|
| Tni (° C.) | 86.7 | 82.7 | 94.4 | 77.7 |
| Δn | 0.098 | 0.1 | 0.099 | 0.098 |
| Δ∈ | 8.1 | 8.5 | 7.1 | 8.4 |
| η (mPa · s) | 12 | 13 | 10 | 12 |
| Formula (26.2) | 4 | 4 | 4 | 9 |
| Formula (1.3) | 15 | 15 | 15 | 15 |
| Formula (2.2) | 40 | 40 | 40 | 40 |
| Formula (11.2) | 15 | 15 | 15 | 15 |
| Formula (45.3) | 3 | 8 | 3 | 3 |
| Formula (44.2) | 5 | 0 | 0 | 0 |
| Formula (45.4) | 5 | 5 | 5 | 5 |
| Formula (44.1) | 5 | 0 | 0 | 0 |
| Formula (31.2) | 5 | 5 | 5 | 5 |
| Formula (45.2) | 3 | 8 | 3 | 8 |
| Formula (37.2) | 0 | 0 | 7 | 0 |
| Formula (41.2) | 0 | 0 | 3 | 0 |
| Use of Compound Represented by Formula (i-c-2) | Use | Nonuse | Nonuse | Nonuse |

TABLE 6

|  | Example 1 | Comparative Example 4 | Comparative Example 5 | Comparative Example 6 |
|---|---|---|---|---|
| Initial VHR (%) | 98.7 | 98.6 | 98.5 | 98.8 |
| VHR after Heating (%) | 98.1 | 98.1 | 97.6 | 97.8 |

TABLE 6-continued

| | Example 1 | Comparative Example 4 | Comparative Example 5 | Comparative Example 6 |
|---|---|---|---|---|
| Screen Burn-In | Excellent | Good | Good | Good |
| Volatility | Good | Good | Good | Good |
| Process Adaptability | Excellent | Excellent | Excellent | Excellent |
| Resistance to Resolution at Low Temperature | Excellent | Excellent | Excellent | Excellent |

In the liquid crystal composition of Comparative Example 4, compounds used in the liquid crystal composition of Example 1, namely, the compound represented by General Formula (i) (compound represented by Formula (i-c-2)) and the compounds represented by General Formula (ii) (compounds represented by Formulae (44.1) and (44.2)) were not used; and the larger amount of the compound represented by Formula (45.2) was used.

Comparing the physical properties in Example 1 with those in Comparative Example 4, Tni was greatly decreased in Comparative Example 4, and the viscosity η was increased in Comparative Example 4. Thus, the liquid crystal composition of Example 1 had a higher Tni and was able to be used in a wider temperature range. In addition, the liquid crystal composition of Example 1 had a smaller viscosity, and use thereof in a liquid crystal display device would enable high response speed. Furthermore, the result of the evaluation of screen burn-in was excellent in the liquid crystal composition of Example 1. The reason for the good result of the evaluation in the liquid crystal composition of Example 1 is as described above.

In the liquid crystal composition of Comparative Example 5, compounds used in the liquid crystal composition of Example 1, namely, the compound represented by General Formula (i) (compound represented by Formula (i-c-2)) and the compounds represented by General Formula (ii) (compounds represented by Formulae (44.1) and (44.2)) were not used; and the compounds represented by Formulae (37.2) and (41.2) were used.

Comparing the physical properties in Example 1 with those in Comparative Example 5, Δ∈ was greatly decreased in Comparative Example 5. Thus, use of the liquid crystal composition of Example 1 in a liquid crystal display device would enable a lower driving voltage. Furthermore, the result of the evaluation of screen burn-in was excellent in the liquid crystal composition of Example 1. The reason for the good result of the evaluation in the liquid crystal composition of Example 1 is as described above.

In the liquid crystal composition of Comparative Example 6, compounds used in the liquid crystal composition of Example 1, namely, the compound represented by General Formula (i) (compound represented by Formula (i-c-2)) and the compounds represented by General Formula (ii) (compounds represented by Formulae (44.1) and (44.2)) were not used; and the larger amounts of the compounds represented by Formulae (26.2) and (45.2) were used. The liquid crystal compositions of Comparative Example 6 and Example 1 were prepared so as to have equivalent Δn and viscosity η.

Comparing the physical properties in Example 1 with those in Comparative Example 6, Tni was greatly decreased in Comparative Example 6. Thus, the liquid crystal composition of Example 1 had a higher Tni and was able to be used in a wider temperature range. In addition, the result of the evaluation of screen burn-in was excellent in the liquid crystal composition of Example 1. The reason for the good result of the evaluation in the liquid crystal composition of Example 1 is as described above.

Example 4

Compounds represented by the following chemical formulae were used to prepare a composition, and the physical properties thereof were measured. Table 7 shows results of the measurement.

[Chem. 183]

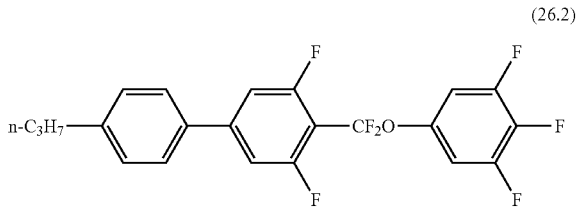

(26.2)

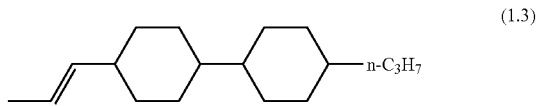

(1.3)

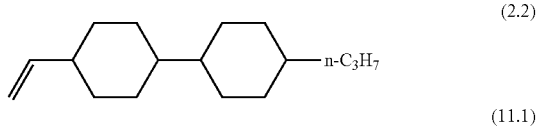

(2.2)

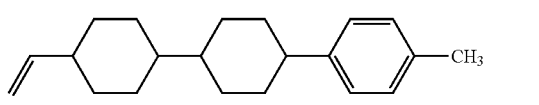

(11.1)

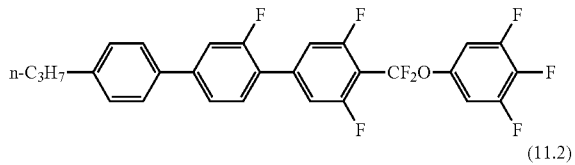

(45.2)

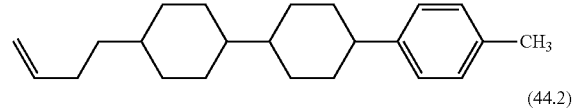

(11.2)

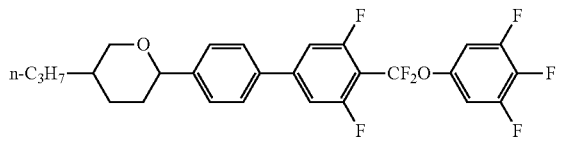

(44.2)

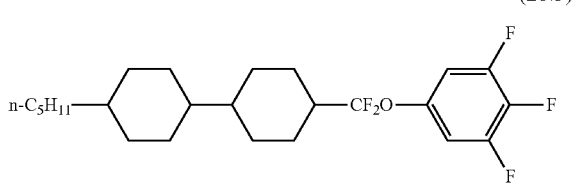

(28.5)

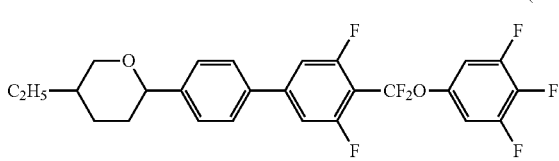

(44.1)

155
-continued

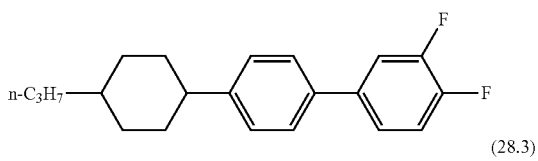

(54.2)

(28.3)

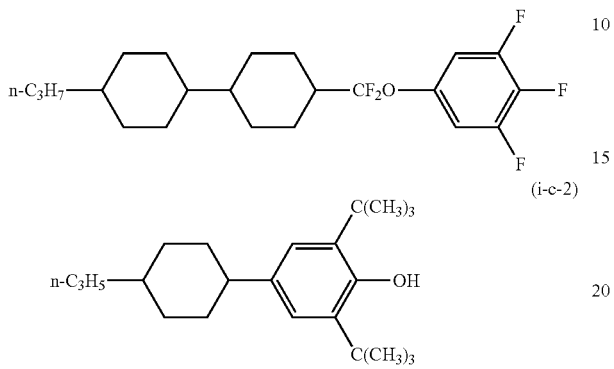

(i-c-2)

TABLE 7

|  | Example 4 |
|---|---|
| Tni (° C.) | 87.4 |
| Δn | 0.105 |
| Δε | 9.5 |
| η (mPa · s) | 17 |
| Formula (26.2) | 10 |
| Formula (1.3) | 7 |
| Formula (2.2) | 25 |
| Formula (11.1) | 15 |
| Formula (45.2) | 5 |
| Formula (11.2) | 8 |
| Formula (44.2) | 5 |
| Formula (28.5) | 5 |
| Formula (44.1) | 5 |
| Formula (54.2) | 5 |
| Formula (28.3) | 10 |
| Use of Compound Represented by Formula (i-c-2) | Use |

In Table 7, the values assigned to the formulae represent the proportions (unit: mass %) of the compounds contained in the composition. In Example 4, 0.3 parts by weight of the compound represented by Formula (i-c-2) was used relative to 100 parts by weight of the liquid crystal composition containing the compounds represented by Formulae (26.2) to (28.3).

The liquid crystal composition of Example 4 was subjected to the evaluations of initial VHR, VHR after heating (150° C., 1 hour), screen burn-in, and process adaptability; and Table 8 shows results of the evaluations.

TABLE 8

|  | Example 4 |
|---|---|
| Initial VHR (%) | 98.6 |
| VHR after Heating (%) | 97.9 |
| Screen Burn-In | Excellent |
| Volatility | Good |
| Process Adaptability | Excellent |
| Resistance to Resolution at Low Temperature | Excellent |

156

Example 5

Compounds represented by the following chemical formulae were used to prepare a composition, and the physical properties thereof were measured. Table 9 shows results of the measurement.

[Chem. 184]

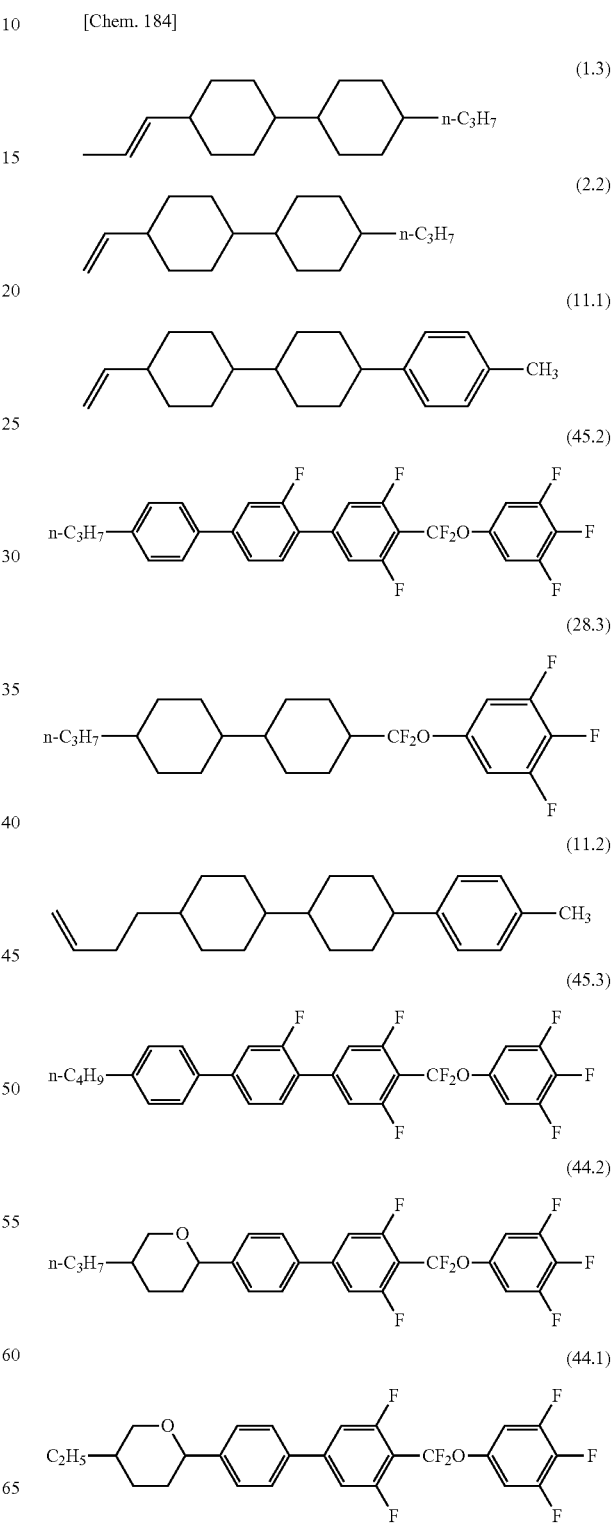

-continued

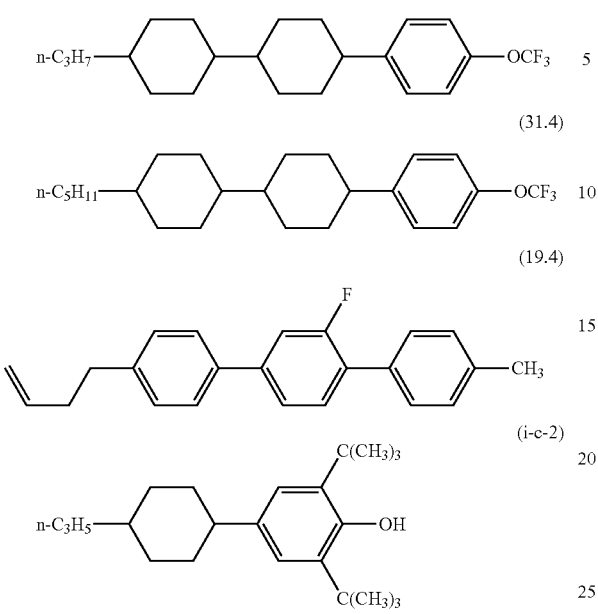

TABLE 9

| | Example 5 |
|---|---|
| Tni (° C.) | 93.2 |
| Δn | 0.105 |
| Δε | 4.9 |
| Formula (1.3) | 10 |
| Formula (2.2) | 40 |
| Formula (11.1) | 10 |
| Formula (45.2) | 2 |
| Formula (28.3) | 2 |
| Formula (11.2) | 4 |
| Formula (45.3) | 3 |
| Formula (44.2) | 4 |
| Formula (44.1) | 4 |
| Formula (31.2) | 8 |
| Formula (31.4) | 3 |
| Formula (19.4) | 10 |
| Use of Compound Represented by Formula (i-c-2) | Use |

In Table 9, the values assigned to the formulae represent the proportions (unit: mass %) of the compounds contained in the composition. In Example 5, 0.3 parts by weight of the compound represented by Formula (i-c-2) was used relative to 100 parts by weight of the liquid crystal composition containing the compounds represented by Formulae (1.3) to (19.4).

The liquid crystal composition of Example 5 was subjected to the evaluations of initial VHR, VHR after heating (150° C., an hour), screen burn-in, and process adaptability; and Table 10 shows results of the evaluations.

TABLE 10

| | Example 5 |
|---|---|
| Initial VHR (%) | 98.8 |
| VHR after Heating (%) | 98.2 |
| Screen Burn-In | Excellent |
| Volatility | Good |

TABLE 10-continued

| | Example 5 |
|---|---|
| Process Adaptability | Excellent |
| Resistance to Resolution at Low Temperature | Excellent |

Example 6

Compounds represented by the following chemical formulae were used to prepare a composition, and the physical properties thereof were measured. Table 11 shows results of the measurement.

[Chem. 185]

-continued

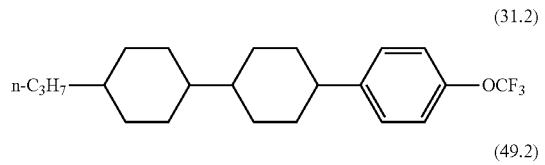
(31.2)

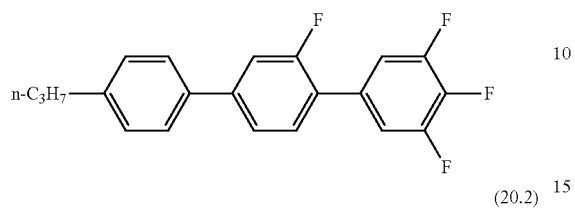
(49.2)

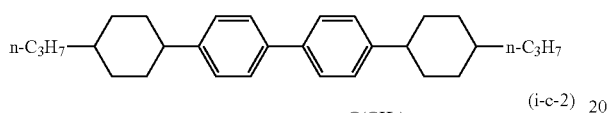
(20.2)

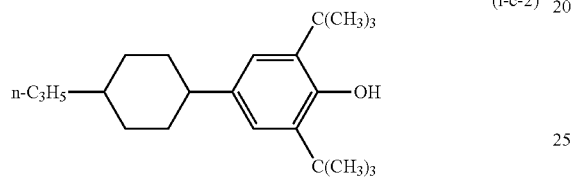
(i-c-2)

TABLE 11

|  | Example 6 |
|---|---|
| Tni (° C.) | 94.7 |
| Δn | 0.097 |
| Δε | 9.4 |
| η (mPa · s) | 16 |
| Formula (26.2) | 7 |
| Formula (2.2) | 35 |
| Formula (11.1) | 5 |
| Formula (28.3) | 8 |
| Formula (37.2) | 10 |
| Formula (44.2) | 10 |
| Formula (28.5) | 10 |
| Formula (31.2) | 5 |
| Formula (49.2) | 5 |
| Formula (20.2) | 5 |
| Use of Compound Represented by Formula (i-c-2) | Use |

In Table 11, the values assigned to the formulae represent the proportions (unit: mass %) of the compounds contained in the composition. In Example 6, 0.3 parts by weight of the compound represented by Formula (i-c-2) was used relative to 100 parts by weight of the liquid crystal composition containing the compounds represented by Formulae (26.2) to (20.2).

The liquid crystal composition of Example 6 was subjected to the evaluations of initial VHR, VHR after heating (150° C., 1 hour), screen burn-in, and process adaptability; and Table 12 shows results of the evaluations.

TABLE 12

|  | Example 6 |
|---|---|
| Initial VHR (%) | 98.9 |
| VHR after Heating (%) | 98.1 |
| Screen Burn-In | Excellent |
| Volatility | Good |

TABLE 12-continued

|  | Example 6 |
|---|---|
| Process Adaptability | Excellent |
| Resistance to Resolution at Low Temperature | Excellent |

Example 7

Compounds represented by the following chemical formulae were used to prepare a composition, and the physical properties thereof were measured. Table 13 shows results of the measurement.

[Chem. 186]

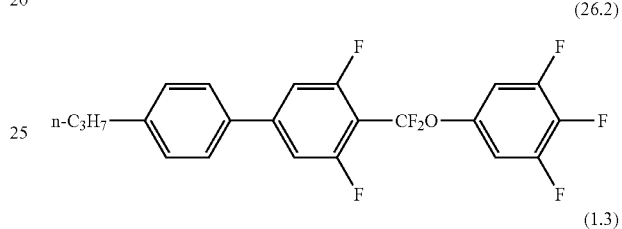
(26.2)

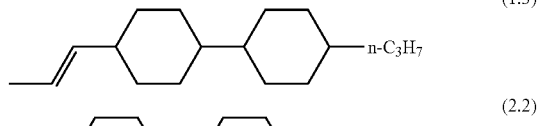
(1.3)

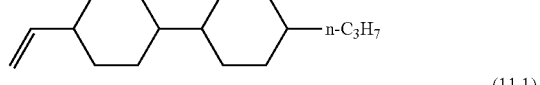
(2.2)

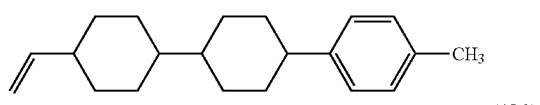
(11.1)

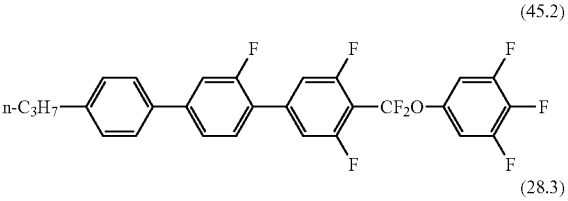
(45.2)

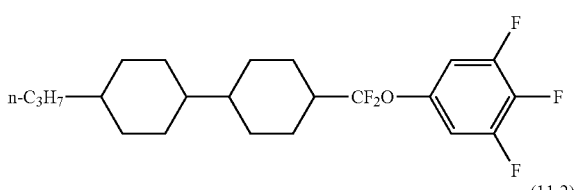
(28.3)

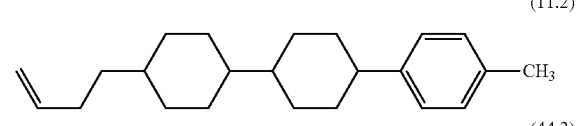
(11.2)

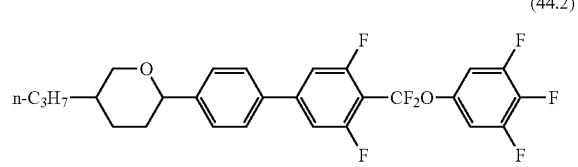
(44.2)

-continued

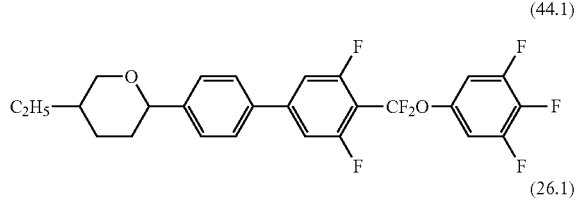

(44.1)

(26.1)

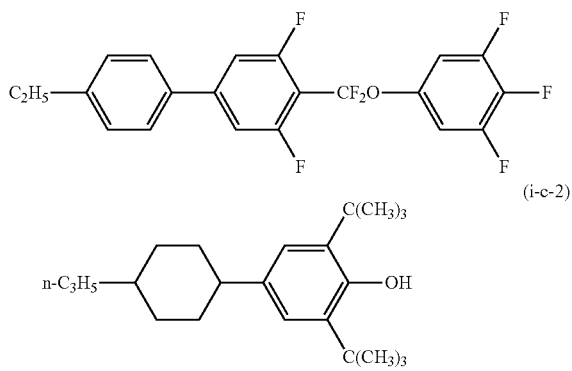

(i-c-2)

TABLE 13

| | Example 7 |
|---|---|
| Tni (° C.) | 90.7 |
| Δn | 0.102 |
| Δε | 6.4 |
| η (mPa · s) | 15 |
| Formula (26.2) | 10 |
| Formula (1.3) | 10 |
| Formula (2.2) | 30 |
| Formula (11.1) | 15 |
| Formula (45.2) | 2 |
| Formula (28.3) | 7 |
| Formula (11.2) | 15 |
| Formula (44.2) | 6 |
| Formula (44.1) | 3 |
| Formula (26.1) | 2 |
| Use of Compound Represented by Formula (i-c-2) | Use |

In Table 13, the values assigned to the formulae represent the proportions (unit: mass %) of the compounds contained in the composition. In Example 7, 0.3 parts by weight of the compound represented by Formula (i-c-2) was used relative to 100 parts by weight of the liquid crystal composition containing the compounds represented by Formulae (26.2) to (26.1).

The liquid crystal composition of Example 7 was subjected to the evaluations of initial VHR, VHR after heating (150° C., 1 hour), screen burn-in, and process adaptability; and Table 14 shows results of the evaluations.

TABLE 14

| | Example 7 |
|---|---|
| Initial VHR (%) | 98.7 |
| VHR after Heating (%) | 98.2 |
| Screen Burn-In | Excellent |
| Volatility | Good |
| Process Adaptability | Excellent |
| Resistance to Resolution at Low Temperature | Excellent |

Example 8 and Comparative Example 7

Compounds represented by the following chemical formulae were used to prepare compositions, and the physical properties thereof were measured. Table 15 shows results of the measurement.

[Chem. 187]

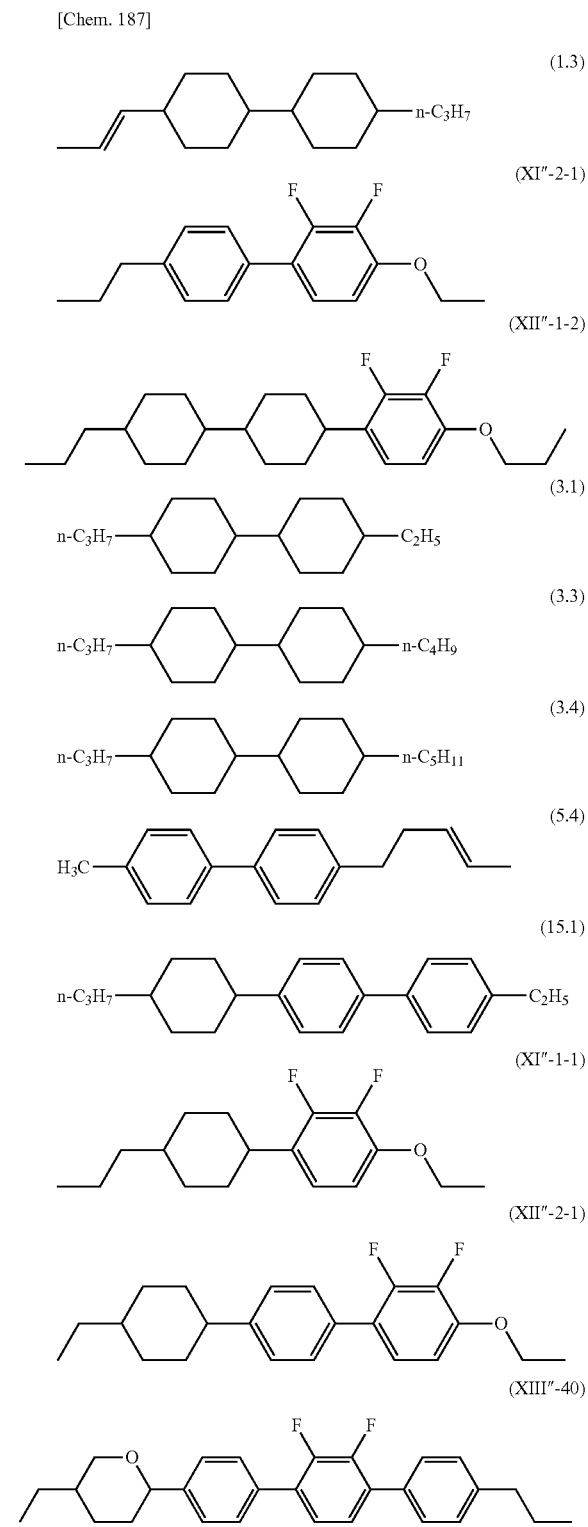

-continued

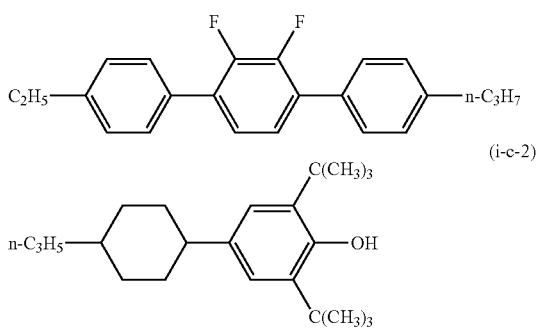

(XIII''-1-2)

(i-c-2)

TABLE 15

|  | Example 8 | Comparative Example 7 |
|---|---|---|
| Formula (1.3) | 10 | 10 |
| Formula (XI''-2-1) | 11 | 11 |
| Formula (XII''-1-2) | 13 | 13 |
| Formula (3.1) | 15 | 15 |
| Formula (3.3) | 5 | 5 |
| Formula (3.4) | 7 | 7 |
| Formula (5.4) | 2 | 2 |
| Formula (15.1) | 5 | 5 |
| Formula (XI''-1-1) | 11 | 11 |
| Formula (XII''-2-1) | 6 | 6 |
| Formula (XIII''-40) | 10 | 10 |
| Formula (XIII''-1-2) | 5 | 5 |
| Use of Compound Represented by Formula (i-c-2) | Use | Nonuse |

In Table 15, the values assigned to the formulae represent the proportions (unit: mass %) of the compounds contained in the compositions.

The liquid crystal compositions of Example 8 and Comparative Example 7 were subjected to the evaluations of initial VHR, VHR after heating (150° C., 1 hour), screen burn-in, and process adaptability; and Table 16 shows results of the evaluations.

TABLE 16

|  | Example 8 | Comparative Example 7 |
|---|---|---|
| Initial VHR (%) | 98.6 | 98.9 |
| VHR after Heating (%) | 98.2 | 96.3 |

In Example 8, 0.3 parts by weight of the compound represented by Formula (i-c-2) was used relative to 100 parts by weight of the liquid crystal composition of Comparative Example 7. Use of the compound represented by Formula (i-c-2) had no effect on the physical properties of Tni, Δn, Δ∈, and η. In other words, the physical properties measured in Example 8 were the same as the physical properties measured in Comparative Example 7.

The liquid crystal composition of Example 8 had good initial VHR and VHR after heating.

Components used in the embodiments described above and combinations thereof are merely examples; and addition, omission, replacement, and another modification of the components are possible without departing from the scope of the present invention. The present invention is not limited to the embodiments but defined only by Claims.

INDUSTRIAL APPLICABILITY

The liquid crystal composition of the present invention can be widely used in the fields of liquid crystal display devices and liquid crystal displays.

The invention claimed is:
1. A liquid crystal composition comprising at least one compound represented by General Formula (i-c-2) and at least one compound represented by General Formula (ii)

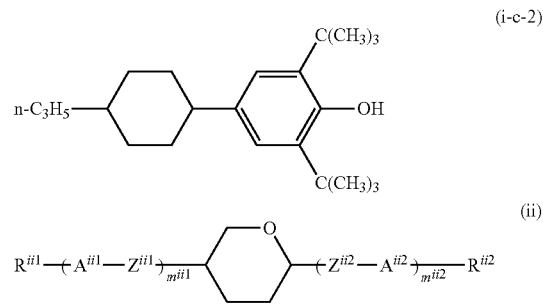

where
$R^{ii1}$ represents an alkyl group having 1 to 8 carbon atoms; and one —$CH_2$— or at least two —$CH_2$— not adjoining each other in the alkyl group are each independently optionally substituted with —CH=CH—, —C≡C—, —O—, —CO—, —COO—, or —OCO—;
$R^{ii2}$ represents a fluorine atom, a chlorine atom, a cyano group, or an alkyl group having 1 to 8 carbon atoms; one —$CH_2$— or at least two —$CH_2$— not adjoining each other in the alkyl group are each independently optionally substituted with —CH=CH—, —C≡C—, —O—, —CO—, —COO—, or —OCO—; and one or two or more hydrogen atoms of the alkyl group are each independently optionally substituted with a fluorine atom;
$A^{ii1}$ and $A^{ii2}$ each independently represent a 1,4-cyclohexylene group of which one —$CH_2$— or at least two —$CH_2$— not adjoining each other are optionally substituted with —O— or a 1,4-phenylene group of which at least one hydrogen atom is optionally substituted with a fluorine atom;
$Z^{ii1}$ and $Z^{ii2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;
$m^{ii1}$ and $m^{ii2}$ each independently represent 0, 1, 2, or 3; and
$m^{ii1}+m^{ii2}$ is equal to 1, 2, 3, or 4;
in the case where $A^{ii1}$ and $Z^{ii1}$ are multiple, the $A^{ii1}$ moieties and the $Z^{ii1}$ moieties are the same as or different from each other, respectively; and
in the case where $A^{ii2}$ and $Z^{ii2}$ are multiple, the $A^{ii2}$ moieties and the $Z^{ii2}$ moieties are the same as or different from each other, respectively,
wherein at least one compound represented by General Formula (ii) in which $R^{ii2}$ represents a fluorine atom, a trifluoromethyl group, a trifluoromethoxy group, or a cyano group, $m^{ii1}$ is 0, $m^{ii2}$ is 3, at least one $Z^{ii2}$ is —$CF_2O$—, and at least one $A^{ii2}$ represents a 1,4-phenylene group of which at least one hydrogen atom of one 1,4-phenylene group is substituted with a fluorine atom is used.

2. The liquid crystal composition according to claim 1, further comprising at least one compound represented by General Formula (ii) in which $R^{ii2}$ represents an alkyl group having 1 to 8 carbon atoms or an alkoxy group having 1 to 8 carbon atoms is used.

3. The liquid crystal composition according to claim 1, wherein at least one compound represented by General Formula (ii) in which at least one 2,3-difluorobenzene-1,4-diyl group is present is used.

4. The liquid crystal composition according to claim 1, further comprising a compound represented by General Formula (L)

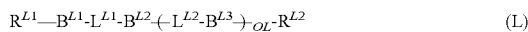   (L)

where $R^{L1}$ and $R^{L2}$ each independently represent an alkyl group having 1 to 8 carbon atoms; and one —CH$_2$— or at least two —CH$_2$— not adjoining each other in the alkyl group are each independently optionally substituted with —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of (a) a 1,4-cyclohexylene group of which one —CH$_2$— or at least two —CH$_2$— not adjoining each other are optionally substituted with —O— and (b) a 1,4-phenylene group of which one —CH= moiety or at least two —CH= moieties not adjoining each other are optionally substituted with —N=, and one and/or at least two hydrogen atoms contained in the groups (a) and (b) are each independently optionally substituted with a cyano group, a fluorine atom, or a chlorine atom;

$L^{L1}$ and $L^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—;

in the case where OL is 2 or 3 and where $L^{L2}$ is multiple, the $L^{L2}$ moieties are the same as or different from each other; in the case where OL is 2 or 3 and where $B^{L3}$ is multiple, the $B^{L3}$ moieties are the same as or different from each other; and the compound represented by General Formula (L) excludes the compound represented by General Formula (ii).

5. The liquid crystal composition according to claim 1, further comprising a compound represented by General Formula (M)

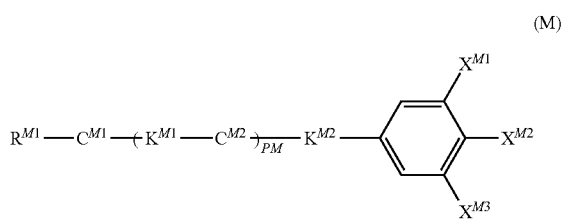   (M)

where $R^{M1}$ represents an alkyl group having 1 to 8 carbon atoms; and one —CH$_2$— or at least two —CH$_2$— not adjoining each other in the alkyl group are each independently optionally substituted with —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of (d) a 1,4-cyclohexylene group of which one —CH$_2$— or at least two —CH$_2$— not adjoining each other are optionally substituted with —O— or —S— and (e) a 1,4-phenylene group of which one —CH= moiety or at least two —CH= moieties not adjoining each other are optionally substituted with —N=, and one and/or two or more hydrogen atoms contained in the groups (d) and (e) are each independently optionally substituted with a cyano group, a fluorine atom, or a chlorine atom;

$K^{M1}$ and $K^{M2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—;

in the case where PM is 2, 3, or 4 and where $K^{M1}$ is multiple, the $K^{M1}$ moieties are the same as or different from each other; in the case where PM is 2, 3, or 4 and where $C^{M2}$ is multiple, the $C^{M2}$ moieties are the same as or different from each other;

$X^{M1}$ and $X^{M3}$ each independently represent a hydrogen atom, a chlorine atom, or a fluorine atom;

$X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; and the compound represented by General Formula (M) excludes the compound represented by General Formula (ii).

6. The liquid crystal composition according to claim 1, further comprising a compound represented by General Formula (X")

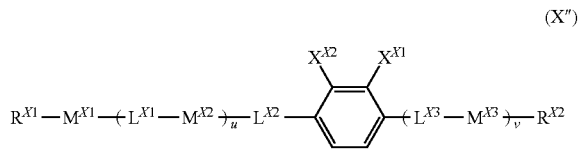   (X")

where $R^{X1}$ and $R^{X2}$ each independently represent an alkyl group having 1 to 10 carbon atoms, an alkoxy group having 1 to 10 carbon atoms, or an alkenyl group having 2 to 10 carbon atoms; one methylene moiety or at least two methylene moieties not adjoining each other in these groups are optionally substituted with —O— or —S—; at least one hydrogen atom contained in these groups is optionally substituted with a fluorine atom or a chlorine atom;

u and v each independently represent 0, 1, or 2 and satisfy the relationship u+v=2 or less;

$M^{X1}$, $M^{X2}$, and $M^{X3}$ each independently represent a group selected from the group consisting of (a) a trans-1,4-cyclohexylene group of which one methylene moiety or at least two methylene moieties not adjoining each other are optionally substituted with —O— or —S— and (b) a 1,4-phenylene group of which one —CH= moiety or at least two —CH= moieties not adjoining each other are optionally substituted with —N=, and a hydrogen atom contained in the group (a) or (b) is optionally substituted with a cyano group, a fluorine atom, a trifluoromethyl group, a trifluoromethoxy group, or a chlorine atom; in the case where $M^{X2}$ and/or $M^{X3}$ are multiple, the $M^{X2}$ moieties and/or the $M^{X3}$ moieties are the same as or different from each other, respectively;

$L^{X1}$, $L^{X2}$, and $L^{X3}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, —CH=CH—, or —C≡C—;

in the case where $L^{X1}$ and/or $L^{X3}$ are multiple, the $L^{X1}$ moieties and/or the $L^{X3}$ moieties are the same as or different from each other, respectively;

$X^{X1}$ and $X^{X2}$ each independently represent a trifluoromethyl group, a trifluoromethoxy group, or a fluorine atom; any one of $X^{X1}$ and $X^{X2}$ represents a fluorine atom; and the compound represented by General Formula (X″) excludes the compounds represented by General Formulae (ii) and (L).

7. A liquid crystal display device comprising the liquid crystal composition according to claim 1.

8. A liquid crystal display device comprising the liquid crystal composition according to claim 1, wherein the liquid crystal display device operates in an IPS mode, an OCB mode, an ECB mode, a VA mode, a VA-IPS mode, or an FFS mode.

\* \* \* \* \*